US005980190A

United States Patent [19]

Takeda

[11] Patent Number: 5,980,190

[45] Date of Patent: Nov. 9, 1999

[54] READY MIX CONCRETE CONVEYING APPARATUS

[75] Inventor: Mitsuo Takeda, Aizuwakamatsu, Japan

[73] Assignee: Kabuki Construction Co., Ltd., Tokyo, Japan

[21] Appl. No.: 09/084,966

[22] Filed: May 27, 1998

Related U.S. Application Data

[60] Division of application No. 08/669,310, Jul. 8, 1996, Pat. No. 5,807,059, which is a continuation-in-part of application No. PCT/JP95/02351, Nov. 17, 1995.

[30] Foreign Application Priority Data

Nov. 22, 1994 [JP] Japan .................................... 6-312614

[51] Int. Cl.$^{6}$ ..................................................... B65G 41/00

[52] U.S. Cl. .................. 414/609; 414/141.8; 414/141.2; 198/317; 198/549

[58] Field of Search .................................... 414/609, 504, 414/592, 610, 624, 625, 615, 140.2, 140.3, 140.4, 141.3, 141.4, 141.6, 141.7, 141.8, 639, 641, 642, 10; 52/741.1; 198/550.11, 317, 318, 540, 549; 249/207; 405/267

[56] References Cited

U.S. PATENT DOCUMENTS

| | | | |
|---|---|---|---|
| 1,318,472 | 10/1919 | Arndt | 414/609 X |
| 1,396,193 | 11/1921 | Godin | 414/140.2 |
| 1,442,521 | 1/1923 | Case | 414/141.8 X |
| 1,588,998 | 6/1926 | Schmid | 414/615 |
| 1,681,742 | 8/1928 | Munn | 414/141.6 |
| 1,852,385 | 4/1932 | Weigert | 414/141.8 X |
| 1,886,117 | 11/1932 | Pardee, Jr. | 414/141.8 X |
| 1,903,633 | 4/1933 | Peebles | 414/615 X |
| 3,486,641 | 12/1969 | Zuseifel et al. | 414/141.2 |

FOREIGN PATENT DOCUMENTS

| | | | |
|---|---|---|---|
| 903678 | 2/1954 | Germany | 414/141.8 |
| 43392 | 11/1965 | Germany | 414/141.8 |
| 58129 | 5/1978 | Japan . | |
| 23454 | 6/1988 | Japan . | |

*Primary Examiner*—Frank E. Werner
*Attorney, Agent, or Firm*—Oblon, Spivak, McClelland, Maier & Neustadt, P.C.

[57] ABSTRACT

There is provided a ready mixed concrete conveying apparatus which carries up ready mixed concrete in the vertical direction, and continuously and quantitatively feeds out the concrete to a belt conveyor to continuously and quantitatively the concrete to a concrete placing position, wherein a lift which includes a boom with the belt conveyor and a tripper for taking out the concrete from the belt conveyor is arranged on a tower mast so as to be liftable, and the concrete which has been carried up by a container-like carrier arranged on the tower mast is continuously and quantitatively supplied to the belt conveyor on the boom by supply means which is arranged on the container-like carrier or a transferring container for receiving the concrete from the container-like carrier.

6 Claims, 81 Drawing Sheets

READY MIX CONCRETE CONVEYING APPARATUS

This application is a Division of Ser. No. 08/669,310 filed Jul. 8, 1996, now U.S. Pat. No. 5,807,059 which is a continuation-in-part of PCT/JP95/02351 (Nov. 17, 1995).

DESCRIPTION

1. Technical Field

The present invention relates to a ready mixed concrete conveying apparatus which can vertically convey ready mixed concrete up to a required height, and which can continuously and quantitatively feed the conveyed ready mixed concrete onto a belt conveyor to continuously and quantitatively supply the ready mixed concrete to a concrete placing position as a target position.

2. Background Art

Ready mixed concrete which is used at a concrete placing position such as a dam is concrete which generally contains large diameter of aggregates and poor mix (the mix proportion of concrete is small). In addition, in most of cases, the ready mixed concrete is required to be conveyed to a relatively high place. For these reasons, use of a concrete pump is not appropriate to forcibly convey the ready mixed concrete. In most of cases, use of a bucket has been adopted for conveyance.

Conveying and placing ready mixed concrete by such a bucket e.g. by use of a tower crane or a cable crane has an advantage in that ready mixed concrete which includes aggregates having relatively large diameters of 80 mm–150 mm and poor mix can be guided and placed to a high position without its properties being degraded. On the other hand, it has disadvantages in that a small placing volume per a unit time lengthens a term of construction work, and that each concrete placing interval widens to crease a problem in terms of thermal stress of placed concrete.

Conveying and placing ready mixed concrete by a bucket using such a tower crane requires an operator skilled in special technique of e.g. crane operation, which means that it is necessary to keep such a skilled operator for a long term.

Conveying and placing ready mixed concrete by use of a cable crane requires many facilities and much labor for stretching a cable, and involves inconvenience wherein the stretch of the cable and the like are accompanied by environmental disruption.

A construction method of conveying ready mixed concrete by dump trucks is good at conveying and placing a large volume of ready mixed concrete for a relatively short time under good placing conditions. On the other hand, such construction method requires that e.g. a cable crane or a tower crane be additionally installed to place dam concrete by these conventional construction methods when dam concrete placing is made at a portion close to the top of a dam with a narrow surface to place dam concrete, or at a riverbed.

A construction method of conveying ready mixed concrete by dump trucks creates problems in e.g. placing dam concrete at a small-scale dam where a surface to place dam concrete is not suitable for dump trucks to run thereon, or placing dam concrete at a sand control dam where a surface to place dam concrete is not suitable for dump trucks to run thereon either.

Taking these problems into account, it has been considered that when dam concrete is placed, a tower with a bucket elevator is installed to place dam concrete by use of the bucket elevator on the tower.

It is predicted that the construction method of placing dam concrete by use of such a bucket elevator offers advantages in that it is possible to convey ready mixed concrete including large diameter of aggregates and having a low slump like the conventional bucket method, and that it is possible to convey more ready mixed concrete to a placing position in comparison with the conventional ready mixed concrete conveyance by use of e.g. a tower crane or a cable crane.

However, when such a bucket elevator is used to place dam concrete, it is supposed that the cost of equipment becomes comparatively high, that it is inconveniently difficult to take out the dam concrete at an arbitrary position because of complexity in operations of e.g. driving portions, and that the cost of maintenance increases in an inconveniently significant manner. It is also predicted that it is necessary to wash many buckets whenever each concrete placing is made.

In addition, it is supposed that the engagement between chains and sprocket wheels, and the slide of buckets generate noise when the bucket elevator is operated.

It is also supposed that when ready mixed concrete to be placed, guided by the bucket elevator is supplied to e.g. a belt conveyor provided on a boom, the supplied ready mixed concrete piles on the belt of the belt conveyor to disturb smooth operation of the belt conveyor. If the supply of the ready mixed concrete to the belt conveyor by the bucket elevator is decreased to keep smooth operation of the belt conveyor, it is supposed that conveying capacity of ready mixed concrete significantly lowers in comparison with the cost of equipment and the cost of maintenance.

It is one of principal objects of the invention to provide a ready mixed concrete conveying apparatus capable of conveying ready mixed concrete to a concrete placing position in a continuous and quantitative manner and in great quantity, thereby continuously placing a great deal of ready mixed concrete when various kinds of structures such as a dam, a building and a smokestack are constructed.

It is another principal object of the invention to provide a ready mixed concrete conveying apparatus capable of being installed in a relatively small area, and of conveying ready mixed concrete in a continuous and quantitative manner and in great quantity in both cases of placing concrete at a low position and placing concrete at a high position.

It is still another principal object of the invention to provide a ready mixed concrete conveying apparatus capable of conveying concrete having large diameter of aggregates and poor mix to a concrete placing position in a continuous and quantitative manner and in great quantity.

It is a further principal object of the invention to provide a ready mixed concrete conveying apparatus which can convey ready mixed concrete to a concrete placing position in a continuous and quantitative manner and in great quantity, which can be installed in a relatively economical manner, and has no need of operation by a skilled operator and can operate in low cost.

Other objects of the invention will become apparent from the detailed description.

DISCLOSE OF INVENTION

In order to attain the objects by the present invention, the ready mixed concrete conveying apparatus according to a first typical aspect of the invention is constructed that it comprises a tower mast A, a lift B arranged on the tower mast A so as to be liftable, and a boom C which is arranged on the lift B so as to be swingable and which comprises a single boom or a plurality of connected booms;

that the tower mast A is provided with a container-like carrier D used for conveyance of ready mixed concrete F so as to be liftable, and the boom C is provided with a belt conveyor G for conveyance of the concrete F fed from the carrier D directly or through transferring means additionally provided;

that a tripper H is arranged at the single boom C or at at least one of the connected booms C located at a mounting side to the lift B; and that the carrier D is provided with supply means E for continuously and quantitatively feeding the concrete conveyed by the carrier D to the belt conveyor G directly or through transferring means additionally provided.

In the ready mixed concrete conveying apparatus having such a structure, the ready mixed concrete F which has been carried up from a lower portion of the tower mast A by the carrier D can be continuously and quantitatively fed to the belt conveyor G on the boom C by the supply means E on the carrier D. The concrete F thus continuously and quantitatively fed can be continuously and quantitatively fed toward a concrete placing position from a leading end of the belt conveyor G or from an arbitrary position on the belt conveyor G by use of the tripper H.

Locating the supply position of the concrete F toward the concrete placing position can be made by locating the take-out position of the concrete F from the belt conveyor G, which is carried out by lifting operation of the lift B on the tower mast A, swinging operation of the boom C on the lift B, and extending and withdrawing operation of an outer boom, or locating operation in displacement of the tripper H on the boom C with respect to the boom C.

Next, in order to attain the objects, the ready mixed concrete conveying apparatus according to a second typical aspect of the invention is constructed so that it comprises a tower mast A, a lift B arranged on the tower A so as to be liftable, a rotary portion N arranged on the lift B so as to be rotatable, and a boom C which is arranged on the rotary portion N and which comprises a single boom or a plurality of connected booms;

that the tower mast A is provided with a container-like carrier used for conveyance of ready mixed concrete F so as to be liftable;

that the boom C is provided with a belt conveyor G for conveyance of the concrete F fed from the carrier D directly or through transferring means additionally provided;

that a tripper H is arranged at the single boom C or at at least one of the connected booms located at a mounting side to the rotary portion N; and that the carrier D is provided with supply means E for continuously and quantitatively feeding the concrete conveyed by the carrier D to the belt conveyor G directly or through transferring means additionally provided.

In the ready mixed concrete conveying apparatus having such a structure, the ready mixed concrete F which has been carried up from a lower portion of the tower mast A by the carrier D can be continuously and quantitatively fed by the supply means E on the carrier D to the belt conveyor G on the boom C directly or through the transferring means additionally provided. The ready mixed concrete F thus continuously and quantitatively fed can be continuously and quantitatively fed to a concrete placing position from a leading end of the belt conveyor G or from an arbitrary position on the belt conveyor G by use of the tripper H.

Locating the supply position of the concrete F toward the concrete placing position can be made by locating the take-out position of the concrete F from the belt conveyor G, which is carried out by lifting operation of the lift B on the tower mast A, rotary operation of the rotary portion N on the lift B, and extending and withdrawing operation of an outer boom, or displacing operation of the tripper H on the boom C with respect to the boom C.

Next, in order to attain the objects, the ready mixed concrete conveying apparatus according to a third typical aspect of the invention is constructed so that it comprises a tower mast A standed so as to be rotatable, a lift B arranged on the tower mast A so as to be liftable, and a boom C which is arranged on the lift B and which comprises a single boom or a plurality of connected booms;

that the tower mast A is provided with a container-like carrier D used for conveyance of ready mixed concrete F so as to be liftable, and the boom C is provided with a belt conveyor G for conveyance of the concrete F fed from the carrier D directly or through transferring means additionally provided;

that a tripper H is arranged at the single boom C or at at least one of the connected booms C located at a mounting side to the lift D; and that the carrier D is provided with supply means E for continuously and quantitatively feeding the concrete F conveyed by the carrier D to the belt conveyor G directly or through the transferring means additionally provided.

In the ready mixed concrete conveying apparatus having such a structure, the ready mixed concrete F which has been carried up from a lower portion of the tower mast A by the carrier D can be continuously and quantitatively fed by the supply means E on the carrier D toward the belt conveyor G on the boom C. The ready mixed concrete F thus continuously and quantitatively fed can be continuously and quantitatively fed toward a concrete placing position from a leading end of the belt conveyor G or from an arbitrary position on the belt conveyor G by use of the tripper H.

Locating the supply position of the concrete F toward the concrete placing position can be made by locating the take-out position of the concrete F from the belt conveyor G, which is carried out by rotary operation of the tower mast A, lifting operation of the lift B on the tower mast A, and extending and withdrawing operation of an outer boom, or displacing operation of the tripper H on the boom C with respect to the boom C.

Next, in order to attain the objects, the ready mixed concrete conveying apparatus according to a fourth typical aspect of the invention is constructed so that it comprises a tower mast A, a lift B arranged on the tower mast A so as to be liftable, and a boom C which is arranged on the lift B so as to be swingable and which comprises a single boom or a plurality of connected booms;

that the tower mast A is provided with a container-like carrier used for conveyance of ready mixed concrete F so as to be liftable, and the boom C is provided with a belt conveyor C for conveyance of the concrete F; that the lift D or the boom C is provided with a transferring container M which includes a receiving container P for receiving the concrete F from the carrier D directly or through transferring means additionally provided, and supply means E for continuously and quantitatively feeding the received concrete F to the belt conveyor G directly or through transferring means additionally provided; and that a tripper H is arranged at the single boom C or at at least one of the connected booms C located at a mounting side to the lift D.

In the ready mixed concrete conveying apparatus having such a structure, the ready mixed concrete F which has been carried up from a lower portion of the tower mast A by the carrier can be received in the receiving container P of the transferring container M directly or through the transferring means additionally provided. The received concrete F is continuously and quantitatively fed to the belt conveyor G on the boom C from the supply means E on the transferring container M directly or through the transferring means additionally provided. The concrete F thus continuously and quantitatively fed can be fed from an arbitrary position on the belt conveyor G toward a concrete placing position using the tripper, or from a leading end of the belt conveyor G toward the concrete placing position.

Locating the supply position of the concrete F toward the concrete placing position can be made by locating the take-out position of the concrete F from the belt conveyor G, which is carried out by lifting operation of the lift B on the tower mast A, swinging operation of the boom C on the lift B, and extending and withdrawing operation of an outer boom, or displacing operation of the tripper H on the boom C with respect to the boom C.

Next, in order to attain the objects, the ready mixed concrete conveying apparatus according to a fifth typical aspect of the invention is constructed so that it comprises a tower mast A, a lift B arranged on the tower mast A so as to be liftable, a rotary portion N arranged on the lift B so as to be rotatable, and a boom C which is arranged on the rotary portion N and which comprises a single boom or a plurality of connected booms;

that the tower mast A is provided with a container-like carrier D used for conveyance of ready mixed concrete F so as to be liftable, and the boom C is provided with a belt conveyor G for conveyance of the concrete F;

that the lift D, the rotary portion N or the boom C is provided with transferring container M which includes a receiving container P for receiving the concrete F from the carrier D directly or through transferring means additionally provided, and supply means E for continuously and quantitatively feeding the received concrete F to the belt conveyor G directly or through transferring means additionally provided; and that a tripper is arranged at the single boom C or at at least one of the connected booms located at a mounting side to the rotary portion N.

In the ready mixed concrete conveying apparatus having such a structure, the ready mixed concrete F which has been carried up from a lower portion of the tower mast A by the carrier D can be received to the receiving container P on the transferring container M directly or through the transferring means additionally provided. The received concrete F can be continuously and quantitatively fed to the belt conveyor G on the boom C by the supply means E on the transferring container M. The concrete F thus continuously and quantitatively fed can be continuously and quantitatively fed toward a concrete placing position from a leading end of the belt conveyor G or toward the concrete placing position from an arbitrary position on the belt conveyor G through the tripper H.

Locating the supply position of the concrete F toward the concrete placing position can be made by locating the take-out position of the concrete F from the belt conveyor G, which is carried out by lifting operation of the lift B on the tower mast A, rotary operation of the rotary portion N on the lift B, and extending and withdrawing operation of an outer boom, or displacing operation of the tripper H on the boom C with respect to the boom C.

Next, in order to attain the objects, the ready mixed concrete conveying apparatus according to a sixth typical aspect of the invention is constructed so that it comprises a tower mast A standed so as to be rotatable, a lift B arranged on the tower mast A so as to be liftable, and a boom C which is arranged on the lift B so as to be swingable and which comprises a single boom or a plurality of connected booms;

that the tower mast A is provided with a container-like carrier D used for conveyance of ready mixed concrete F so as to be liftable, and the boom C is provided with a belt conveyor G for conveyance of the concrete F;

that the lift B or the boom C is provided with a transferring container M which includes a receiving container P for receiving the concrete F from the carrier D directly or through transferring means additionally provided, and supply means E for continuously and quantitatively feeding the received concrete F to the belt conveyor G directly or through transferring means additionally provided; and that a tripper H is arranged at the single boom C or at at least one of the connected booms located at a mounting side to the lift B.

In the ready mixed concrete conveying apparatus having such a structure, the ready mixed concrete F has been carried up from a lower portion of the tower mast A by the carrier D can be received into the receiving container P on the transferring container M from the carrier D directly or through the transferring means additionally provided. The received concrete F can be continuously and quantitatively fed to the belt conveyor G on the boom C by the supply means E on the transferring container M. The concrete F thus continuously and quantitatively fed can be continuously and quantitatively fed to a concrete placing position from a leading end of the belt conveyor G or to the concrete placing position from an arbitrary position on the belt conveyor G using the tripper.

Locating the supply position of the concrete F toward the concrete placing position can be made by locating the take-out position of the concrete F from the belt conveyor G, which is carried out by rotary operation of the tower mast A, lifting operation of the lift B on the tower mast A, and extending and withdrawing operation of an outer boom, or displacing operation of the tripper H on the boom C with respect to the boom C.

The ready mixed concrete conveying apparatus according to the first to the sixth aspects of the invention may be constructed so that the tower mast A is standed in a fixed state at a ready mixed concrete placing work site. The conveying apparatus according to the first to the sixth aspects of the invention may be constructed so that it is movable in a direction along e.g. the crest of a dam to be constructed (the axial direction of the dam), using rails and the like.

The boom C which is provided on the conveying apparatus according to the first to the sixth aspects of the invention may be constituted by a boom which is a single frame extending in the substantially horizontal direction. The boom may also be constituted by an inner boom mounted to the rotary portion N of the lift B in the substantially horizontal direction, and not less than two outer booms with respect to the inner boom. The boom may also be constituted by a plurality of booms which are fixed together to form a single boom.

When the boom C is constituted by the plural booms, the apparatus is constituted so that ready mixed concrete F is taken over from the belt conveyor G on the inner boom to the belt conveyor G on the outer booms in turn.

The tripper H which is provided on the apparatus is arranged to be movable with respect to the boom C when the apparatus have a single boom.

When the boom C is constituted by the plural booms, the apparatus is constituted so that the tripper H is arranged on all booms forming the boom C, the boom locating on the lift B of the boom C or at the mounting side to the rotary portion N, or a plurality of booms including at least the boom at the mounting side.

In the apparatus according to the second and the fifth aspects of the invention, the boom C may be arranged on the rotary portion N so as to be swingable, or may be arranged on the rotary portion N not to be swingable.

The apparatus according to the aspects stated earlier may include a single container-like carrier D or a set of container-like carriers D which are arranged on the tower mast A so as to be liftable.

When a single tower mast A includes a set of the container-like carriers D, the apparatus is preferably constituted so that the carriers feed the ready mixed concrete F onto the belt conveyor G in turn, having different lift timing each other.

The container-like carrier D which is provided on the apparatus is preferably constituted so that the carrier reciprocates vertically along the same plumb line as the tower mast A in the most typical mode.

The container-like carrier D may be constructed so that a lifting carrier K which is provided on the tower mast A so as to be liftable supports the container-like carrier in a riding state, a bridging state or a suspending state, and that the lifting carrier K can be lifted using a wire operated by e.g. a winch to lift the container-like carrier D with respect to the tower mast A. The container-like carrier D may be constructed so that a wire operated by a winch can have an end connected to the container-like carrier itself to directly lift the container-like carrier D itself with respect to the tower mast A.

The container-like carrier D which constitutes a part of the ready mixed concrete conveying apparatus according to the first to the third aspects may be provided with a screw feeder, a belt feeder and so on as the supply means E which continuously and quantitatively feeds out the concrete received by the carrier D. The container-like carrier is constructed so that the ready mixed concrete is continuously and quantitatively fed to the belt conveyor G by the supply means E directly or through the transferring means additionally provided.

The transferring container M which constitutes a part of the ready mixed concrete conveying apparatus according to the fourth to the sixth aspects of the invention is constructed so that the ready mixed concrete F is fed from the container-like carrier D directly or the transferring means additionally provided. The transferring container M is constructed so that it has a lower side provided with the quantitative supply means E such as screw feeder and a belt feeder, i.e. the supply means E which continuously and quantitatively feeds out the concrete F housed in the transferring container M toward the belt conveyor G. The transferring container is constructed so that the supplied concrete F is fed to the belt conveyor G by the supply means E directly or the transferring means additionally provided.

The expression "continuously" which is used with reference to the supply of the concrete F by the supply means E which constitutes a part of the apparatus according to the aspects stated earlier does not mean only that the concrete F is fed onto the belt conveyor G in a continuous strip form without any discontinuation. This expression also covers a case that even if the concrete F is intermittently fed onto the belt conveyor G in a discontinuous manner, the concrete F is discontinuously and sequentially provided onto the belt conveyor G in such a manner that such discontinuous supply does not disturb the conveyance by the belt conveyor G and that the concrete placing surface is not adversely effected.

The expression "quantitatively" in the Description does not mean only that the ready mixed concrete is fed at an equal amount in the strict sense. This expression also covers a case that the ready mixed concrete F is fed having variations in supply in such a manner that the operation of the belt conveyor G is not disturbed and that a change in amount which has an adverse effect to the concrete placing surface does not occur with time, i.e., that the concrete F fed onto the belt conveyor G is fed keeping variations in supply within an acceptable range with time.

The ready mixed concrete conveying apparatus according to the aspects stated earlier is typical examples of the apparatus, and is not limited to the structures stated earlier. The elements which has and will be described are typical elements for the apparatus, and are not limited to the specific forms which have and will be described. The invention can be implemented in various forms by e.g. modifying the elements, or adding another element to the elements.

BRIEF DESCRIPTION OF DRAWINGS

In the accompanying drawings are shown typical and preferable modes of the present invention.

In particular.

In FIG. 1, a conveying apparatus wherein a container-like carrier D which is provided with a supply means E for continuously and quantitatively feeding out ready mixed concrete F is used to continuously and quantitatively feed out the read mixed concrete F onto a belt conveyor G of a swingable boom C provided on a lift B is schematically shown by its constituent element.

In FIG. 2, a conveying apparatus wherein a container-like carrier D which is provided with supply means E for continuously and quantitatively feeding out ready mixed concrete F is used to continuously and quantitatively supply the ready mixed concrete F onto a belt conveyor G of a boom C of a rotary portion N provided on a lift B so as to be rotatable is schematically shown by its constituent element.

In FIG. 3, a conveying apparatus wherein a transferring container M which includes a receiving container P for ready mixed concrete F and supply means E for continuously and quantitatively feeding out the received concrete F is incorporated into a transferring route for delivering the concrete F from a container-like carrier D onto a belt conveyor G of a boom C provided on a lift B to continuously and quantitatively feed out the concrete F is schematically shown by its constituent element.

In FIG. 4, a conveying apparatus wherein a transferring container M which includes a receiving container P for ready mixed concrete F and supply means E for continuously and quantitatively feeding out the received concrete F is incorporated into a transferring route for delivering the concrete F from a container-like carrier D onto a belt conveyor G of a boom C on a rotary portion N provided on a lift B so as to be rotatable is schematically shown by its constituent elements.

With respect to the ready mixed concrete conveying apparatus according to the first mode shown in FIGS. 5–36, FIG. 5 is a view of the entire structure of the apparatus such as a tower mast A forming the apparatus as viewed from a side, FIG. 6 is a view of the state of FIG. 5 as viewed from another side, and FIG. 7 is a view showing the essential parts of the apparatus as viewed in plan.

FIGS. 8–13 are views showing the essential parts of a lower portion of the apparatus, FIG. 8 is a vertical sectional view showing the essential parts for turning the tower mast A except for a running portion, and FIG. 9 is a transverse sectional view showing the essential parts as viewed downwardly from a portion of the tower mast A.

FIG. 10 is a view of the essential parts of the running portion of the tower mast A as viewed from a side, and FIG. 11 is a view of the essential parts of the running portion, taken in a direction perpendicular to rails 17.

FIGS. 12 and 13 are views showing a safety against overturning 16 at a rail portion 17, FIG. 12 being viewed from a side, and FIG. 13 being taken in a direction perpendicular to the rails 17.

FIGS. 14–19 are views showing the essential parts of a climbing portion such as a lifting frame 20, FIG. 14 is a view showing the essential parts of the climbing portion as viewed from a side of the tower mast A, and FIG. 15 is a view showing the essential parts of the climbing portion, taken in a direction perpendicular to the view of FIG. 14.

FIGS. 16–18 are views showing the essential parts of locking means which is used together with the respective lifting means used on the climbing portion, FIG. 16 is a view as viewed from a side of the essential parts, FIG. 17 is a view taken in a direction perpendicular to the view of the FIG. 16, and FIG. 18 is a view showing a receiver 26 which constitutes a part of the locking means.

FIG. 19 is a transverse sectional view showing how the climbing portion which is vertically moved with respect to the tower mast A is engaged in a substantially horizontal direction.

FIGS. 20–22 are views showing a mounting portion of the boom C to the tower mast A, and how the boom is withdrawn and expended, and FIG. 20 is an enlarged sectional view showing the mounting portion of the boom C, in particular, the essential parts of a horizontal boom swinging device 33 and the essential parts of a vertical boom swinging device having a shaft 34 as a rotary shaft.

FIGS. 21 and 22 are views showing means for withdrawing and extending an outer boom C" with respect to an inner boom C', FIG. 21 being viewed from a side, and FIG. 22 being viewed from upward, focusing on the essential parts and showing some parts in section.

FIGS. 23–26 views showing the belt conveyor G provided on the booms C' and C" and a tripper H for the belt conveyor G, FIG. 23 is a view showing the essential parts as viewed from a side, and FIG. 24 is a sectional view showing a portion of the boom C as viewed from the front of the belt conveyor G.

FIG. 25 is the sectional view showing the boom C as viewed from the front of the belt conveyor G as the takeout side of the tripper H in order to facilitate understanding of the tripper H provided on the inner boom C'.

FIG. 26 is a schematic view showing how the belt conveyor G provided on the boom C moves.

FIGS. 27–31 are views showing how to lift the container-like carriers D, FIGS. 27–29 showing a first measure, and FIGS. 30 and 31 showing a second measure.

FIG. 27 is a schematic side view showing how the container-like carriers D are vertically operated by the first lifting measure, FIG. 28 is a schematic view of the first measure as viewed from upward, and FIG. 29 is the schematic view, taken in a direction substantially perpendicular to FIG. 27. With respect to the second lifting measure showing in FIGS. 30 and 31, FIG. 30 is a schematic view of the second measure as viewed from a side of one of the container-like carrier D and so on, and FIG. 31 is a schematic view as viewed from upward in FIG. 30.

FIG. 32 is a sectional view showing the essential parts of one of the container-like carriers D which have screw feeders 75 formed in quantitative supply type of feeders E as a typical example.

FIGS. 33 and 34 are views partly in section showing the essential parts of chutes 70 for taking out the ready mixed concrete F from the container-like carriers D onto the belt conveyor G, FIG. 33 being viewed from a side thereof, and FIG. 34 being viewed from the front thereof.

FIGS. 35 and 36 are views showing the essential parts of one of hoppers 71 which are used as means for supplying the ready mixed concrete into the container-like carriers D. In particular, in order to facilitate understanding of how the hoppers 71 operate, FIGS. 35A and 35B are plan views respectively showing side by side a state wherein the hopper 71 is drawn to a side of a belt conveyor 77 and a state wherein the hopper is extended forwardly from the side of the belt conveyor 77 to locate the hopper 71 above the container-like carrier D in the tower mast A. FIG. 36 is viewed from a side thereof.

FIGS. 37–44 are views showing the apparatus according to a second mode of the present invention as viewed from respective sides of the tower mast A, FIG. 37 is viewed from a side of the tower mast, FIG. 38 is a view taken in a direction substantially perpendicular to the side of FIG. 37, and FIG. 39 is viewed in plan.

FIGS. 40 and 41 are views showing the apparatus, in particular crane means J provided on the boom C, FIG. 40 being a view showing the crane means J, taken in a direction perpendicular to rails 84, and FIG. 41 being a view showing the essential parts of the crane means J as viewed from upward.

FIGS. 42–44 are views showing another hopper for supplying the ready mixed concrete F into the container-like carriers D in the tower mast A, FIG. 42 being a view of the essential parts of the hopper as viewed from a side thereof, FIG. 43 being a view as viewed in plan, and FIG. 44 being a sectional view of a frame which is provided at a sliding portion of the hopper.

FIGS. 45–46 are views showing the tower mast A in the apparatus according to a third mode of the present invention as viewed from respective sides, FIG. 45 being viewed from a side of the tower mast A, and FIG. 46 being taken in a direction substantially perpendicular to the side of FIG. 45.

FIG. 47 is an enlarged side view of the essential parts of the mounting portion of the boom C, and FIG. 48 is a schematic view showing the essential parts required for mounting the lift B to the tower mast A as viewed from upward.

FIGS. 49–58 are views showing means for conveying the container-like carrier D using a lifting carrier K provided on the tower mast A, FIG. 49 is a side view showing the essential parts required for loading the container-like carrier onto the lifting carrier K of the tower mast A using a truck 88, and FIG. 50 is a side view of the essential parts, taken in a direction perpendicular to rails 96 for the truck 88.

FIG. 51 is a perspective view showing the essential parts of a suspending frame 87 used as the lifting carrier K and FIG. 52 is a view showing the essential parts of the suspending frame with the container-like carrier D held therein. FIG. 53 is a sectional view taken on a portion of the tower mast A in order to facilitate a portion with the container-like carriers D taken therein and how the lifting carriers K are incorporated into the tower mast A.

FIGS. 54–58 are views showing how to lift the container-like carriers D using the lifting carriers K, FIGS. 54–56 being views showing a first measure and FIG. 57 and 58 being views showing a second measure.

FIG. 54 is a schematic side view showing how the container-like carriers G are vertically operated by the first lifting measure, FIG. 55 is a schematic side view as viewed taken in a direction substantially perpendicular to the side of FIG. 54, and FIG. 56 is a schematic plan view showing the vertical operation of the carriers.

With respect to the second lifting measure showing in FIGS. 57 and 58, FIG. 57 is a schematic view showing the second measure as viewed from a side of the container-like carrier D, and FIG. 58 is a schematic view showing the second measure as viewed from upward.

FIGS. 59–61 are schematic views showing different means for supplying the ready mixed concrete F into each container-like carrier D on the truck 88.

FIGS. 62–68 are views showing the tower mast A in the apparatus according to a fourth mode of the present invention as viewed from respective sides, FIG. 62 is a schematic view showing the essential parts of the tower mast A as viewed from a side thereof, FIG. 63 is a schematic view showing the essential parts taken in a direction substantially perpendicular to the side of FIG. 62, and FIG. 64 is a schematic view showing the essential parts as viewed from upward.

FIG. 65 is a schematic view of the essential parts necessary to show how the lift B and the rotary portion N are incorporated into the tower mast A, and FIG. 66 is a schematic view of the essential parts as viewed from upward.

FIGS. 67 and 68 are views showing transferring means L, FIG. 67 is a schematic view showing the transferring means L as viewed in plan, and FIG. 68 is a vertical sectional view of the essential parts of the transferring means L.

FIGS. 69–98 are views showing the tower mast A and other members in the apparatus according to a fifth mode of the present invention as viewed from respective sides.

FIG. 69 is a schematic view showing the essential parts as viewed from a side of the tower mast A, FIG. 70 is a schematic view of the essential parts taken in a direction substantially perpendicular to the side of FIG. 69, and FIG. 71 is a schematic view of the essential parts as viewed from upward. FIG. 72 is a view of the top of the tower mast A as viewed from upward.

FIG. 73 is a schematic plan view of the essential parts necessary to show how the lift B is mounted to the tower mast A.

FIG. 74 is a schematic view of the essential parts of a climbing portion of the lift B as viewed from a side thereof, and FIG. 75 is a schematic view of the essential parts taken in a direction substantially perpendicular to the side of FIG. 74.

FIG. 76 is a cross-sectional view of the essential parts of a guide for lifting the lift B along the tower mast A, and FIG. 77 is a sectional view of the essential parts of a locking portion of the lift B to the tower mast A.

FIG. 78 is a side view showing the essential parts of a mounting portion of the boom C.

FIGS. 79–81 are views showing the essential parts of the tripper H mounted on the boom C, FIG. 79 is a side view of the essential parts, FIG. 80 is a view of the essential parts, taken in a direction substantially perpendicular to the side of FIG. 79, and FIG. 81 is a view partly in section of the essential parts as viewed from upward.

FIG. 82 is a schematic view of the essential parts necessary to show how the ready mixed concrete F is delivered from the container-like carrier D to the transferring container M.

FIG. 83 is a sectional view showing the essential parts of a mounting portion of a chute 165 which is used to deliver the ready mixed concrete F.

FIG. 84 is a schematic view of the essential parts which delivers the ready mixed concrete F from the container-like carrier D to the transferring container M, taken in a direction substantially perpendicular to the face of FIG. 82.

FIG. 85 is a schematic view showing the essential parts of an opening in the container-like carrier D, and FIG. 86 is a sectional view showing the essential parts of the opening in the container-like carrier D, taken in a direction substantially perpendicular to FIG. 85.

FIGS. 87–89 are views showing the transferring container M which has a belt feeder as the supply means E for continuously and quantitatively feeding out the ready mixed concrete F, FIG. 87 is a side view thereof, FIG. 88 is a view partly in section taken in a direction substantially perpendicular to FIG. 87, and FIG. 89 is a view partly in section as viewed from upward.

FIGS. 90–92 are views showing the transferring container M which has a screw feeder as the supply means E for continuously and quantitatively feeding out the ready mixed concrete F, FIG. 90 is a side view thereof, FIG. 91 is a view partly in section thereof taken in a direction substantially perpendicular to FIG. 90, and FIG. 92 is a view partly in section thereof as viewed from upward.

FIG. 93 is a schematic plan view showing how the container-like carrier D is taken into a lower portion of the tower mast A.

FIGS. 94–96 are views showing the lifting carrier K, FIG. 94 is a perspective view thereof, FIG. 95 is a side view thereof, and FIG. 96 is a vertical sectional view thereof.

FIGS. 97 and 98 are views showing a cart 195, FIG. 97 is a side view thereof, and FIG. 98 is a plan view partly in section thereof.

FIGS. 99 and 100 are schematic views of the essential parts of the apparatus according to a sixth mode of the present invention, as viewed from respective sides, FIG. 99 is a view showing how the transferring container M is arranged at the rotary portion N or the boom C with the rotary portion N, and FIG. 100 is a view showing how the transferring container M is arranged on the lift B.

BEST MODE FOR CARRYING OUT THE INVENTION

Now, preferred modes of the ready mixed concrete conveying apparatus according to the present invention will be described in detail.

The preferred mode described and shown hereinbelow are some of typical modes according to the present invention. The present invention is not limited to the modes described and shown hereinbelow.

In order to more easily understand the invention and to more easily understand the respective preferred modes explained in detail hereinbelow, more typical modes of the invention will be explained in short with reference to FIGS. 1–4 before describing the preferred modes.

Figure 1:
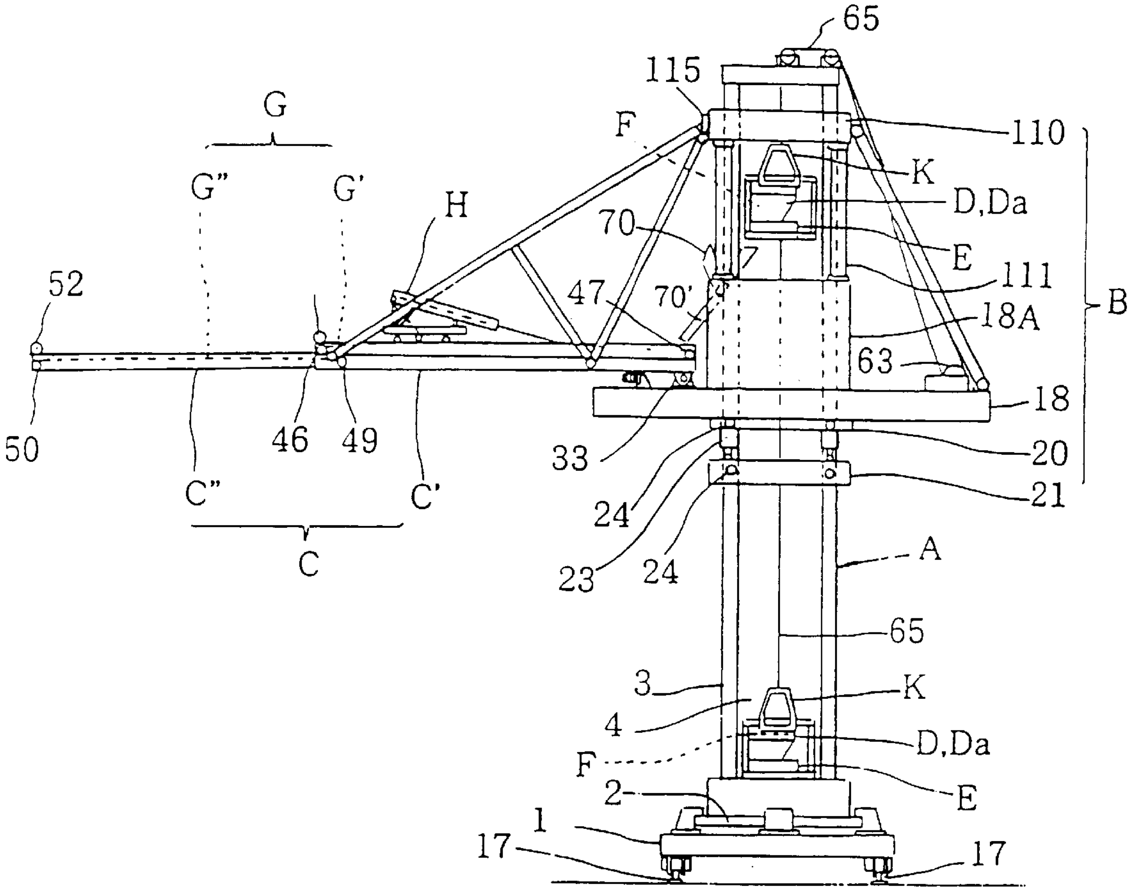
FIGS. 1–4 are schematic views of more typical examples of preferable modes of the present invention.

Firstly, the ready mixed concrete conveying apparatus shown in FIG. 1 is constructed so that it comprises a tower mast A, a lift B arranged on the tower mast A so as to be liftable, and a boom C which is arranged on the lift B so as to be swingable mainly in the horizontal direction and which comprises two connected booms C' and C" in the example shown.

The tower mast A is constructed so that it is provided with container-like carriers D used for conveyance of the ready mixed concrete F so as to be liftable, and that the boom C is provided with a belt conveyor G for conveyance of the concrete F conveyed by the container-like carriers D.

At least the inner boom C' of the boom C is provided with a tripper H.

The container-like carriers D are provided with supply means E for continuously and quantitatively feeding out the concrete F conveyed by the carriers D. (In the example shown, the container-like carriers are constructed as container-like carriers Da with the supply means E.)

The tower mast A shown is constituted by mast frames 3 which are placed so as to stand substantially in the vertical direction. The tower mast has spaces 4 formed therein so as to continuously extend throughout the length thereof in the vertical direction.

The tower mast A is formed to be placed on a turntable 2, which is mounted on a base table 1 so as to be turnable. The tower mast is formed so as to be turnable by rotation of the turn table 2, having the center line of the tower mast A in the plumb direction as a rotary axis.

The lift B arranged on the tower mast A is formed in a frame construction wherein the lift is assembled on the tower mast A so as to engage with the tower mast from outwardly. In the example shown, the lift B is constructed so that an upper lifting frame 20 and a lower lifting frame 21 which are coupled together by hydraulic cylinders 23 are positioned as a base, that a stage 18 is integrally provided on e.g. the upper lifting frame 20, and that a stage post 18A which is standed on the stage 18 so as to surround the tower mast A, and a supporting frame 110 which is assembled to the tower mast A so as to engage with the tower mast from outwardly are connected by poles 111.

The lift B having such a structure is constructed so that the upper lifting frame 20, the stage 18, the stage post 18A, the supporting frame 110 and so on are vertically movable in a single unit with respect to the tower mast A.

The lift B is constructed so as to be moved up and down with reference to the tower mast A by suitable climbing means.

Lifting the lift B is established by a lifting structure wherein the hydraulic cylinders 23 can be arranged between the upper lifting frame 20 forming a part of the lift B and the lower lifting frame 21 provided on the tower mast A below the upper lifting frame 20 to relatively lift the lifting frames 20 and 21 by use of the hydraulic cylinders 23. The lift B is formed to have the upper lifting frame 20 and the lower lifting frame 21 provided with locking means for locking the lifting frames 20 and 21 to the tower mast A at selective stopping positions, e.g. locking means for extending plunger rods of hydraulic cylinders 24 to lock the lifting frames.

The boom C is constructed so that the outer boom C" is arranged on the inner boom C' so as to draw the outer boom C" from the inner boom C' and withdraw the outer boom into the inner boom, and that the inner boom C' has the innermost end assembled to the lift B so as to be turnable.

Assembledge of the boom C in a turnable manner is established by a structure wherein the boom is assembled to the lift B by bearings 115 and a boom swinging device 33 so as to be turnable substantially in the horizontal direction.

The container-like carriers D which are moved up and down by a lifting winch 63 with reference to the tower system are arranged to be vertically movable in the spaces 4 in the tower mast A.

The boom C is provided with belt conveyors G' and G" to correspond to the inner boom C' and the outer boom C", thereby enabling the ready mixed concrete F on the belt conveyor G" to be supplied onto the belt conveyor G".

The boom C, in particular the inner boom C' is provided with the tripper H in a movable manner to take out the concrete F conveyed by the belt conveyor G' laterally of the belt conveyor G' at a location on the belt conveyor G', or to supply the concrete F onto the belt conveyor G' of the boom C' at a leading edge of the boom C'.

In the ready mixed concrete conveying apparatus having such a structure, the ready mixed concrete F which has been housed in the container-like carriers D at a lower portion of the tower mast A is carried up by the lifting winch 63, and the supply means E provided on the carriers D can feed continuously and quantitatively feed the concrete F in the carriers D onto the belt conveyor G, or onto the belt conveyor G through a turnable chute 70 and a fixed chute 70' in the example shown.

In that manner, the belt conveyor G which has continuously and quantitatively received the ready mixed concrete F is constructed to supply the concrete F to a concrete placing surface from a leading edge of the belt conveyor G" on the outer boom C', or from the belt conveyor G' using the tripper H.

In the ready mixed concrete conveying apparatus having such a structure, firstly, rails 17 are used to move the tower mast A upto a target position and set it there.

Next, the lifting frames 20 and 21 are used to set the lift B with respect to the tower mast A at a height appropriate to construction work.

In addition, at the same time, the boom C is turned to a location appropriate to placing the concrete F and is set there.

The apparatus can be used so that, first, the concrete is supplied to concrete placing surfaces from the leading edge of the belt conveyor G" on the outer boom C" while gradually withdrawing the outer boom C" from such a state, e.g. from a state with the outer boom C" extended to the full, and second, the concrete F is supplied concrete placing surfaces while moving the tripper H on the inner boom C' toward the innermost end of the inner boom C' from the position where the outer boom C" has been unable to supply the concrete F to the concrete placing surfaces.

The apparatus can also be used by operation reverse to the operation stated above, i.e. the apparatus can also be used so that, first, the concrete F is placed while gradually moving the tripper H from the innermost end of the inner boom C' on the boom C toward the outermost end of the inner boom, and second, the concrete F is placed from the leading end of the belt conveyor G" on the boom C" while gradually extending the boom C" from a state with the boom C" withdrawn.

The apparatus can be used so that the concrete F is supplied to respective concrete placing surfaces from the leading end of the belt conveyor G" on the outer boom C" or the tripper H on the inner boom C' while turning the boom C.

The apparatus can be used so that the tower mast A is located at an angular position or is rotating with respect to the base table 1 between each operation or during each operation.

The apparatus can be used so that the tower mast A moves on the rails 17 to be located at a location, or is moving on the rails between each operation or during each operation.

The apparatus can be used so that the lift B is moved up and down between each operation or during each operation.

The tower mast A having such a structure may be constructed so that it does not move on the rails, i.e. the base table 1 is fixed at an installation place.

The tower mast may be constructed so that the mast frames 3 are directly assembled to the base table 1 without use of the turn table 2, i.e. the tower mast A does not turn.

The boom C may be constituted by a single boom instead of using two booms, i.e. the inner boom C' and outer boom C" connected together, or by not less than three connected booms.

The plural booms may be fixed together like a single boom, i.e. may be neither extensible nor withdrawable.

The boom C having such a structure has the tripper provided thereon when the boom C is constituted by a single boom.

When the plural booms are formed not to be extensible and withdrawable like a single boom, the respective belt conveyors G on the boom C as the single boom have the trippers provided thereon so as to take out the concrete F at the respective belt conveyors G.

In the boom C which is provided with a withdrawable and extensible boom, the boom which is at the mounting side to the lift B is provided with the tripper H.

Although the carriers G are constructed so as to be carried up by lifting carriers K in the example shown, the lifting winch 63 may have wire ropes 65 connected to the carriers D directly.

Although the turnable chute 70 and the fixed chute 70' are used to continuously and quantitatively supply the concrete F to the belt conveyor G by the carrier D, in particular the supply means E in the example shown, the concrete F may be transferred to the belt conveyor G by other transferring means than the chute, or the concrete F may be continuously and quantitatively fed onto the belt conveyor G directly from the supply means E provided on the carriers D.

In FIG. 1, reference numerals 48 and 52 designate driving motors for the belt conveyor G, and reference numerals 46, 47, 49 and 50 designate pulleys for the belt conveyor G.

Figure 2:
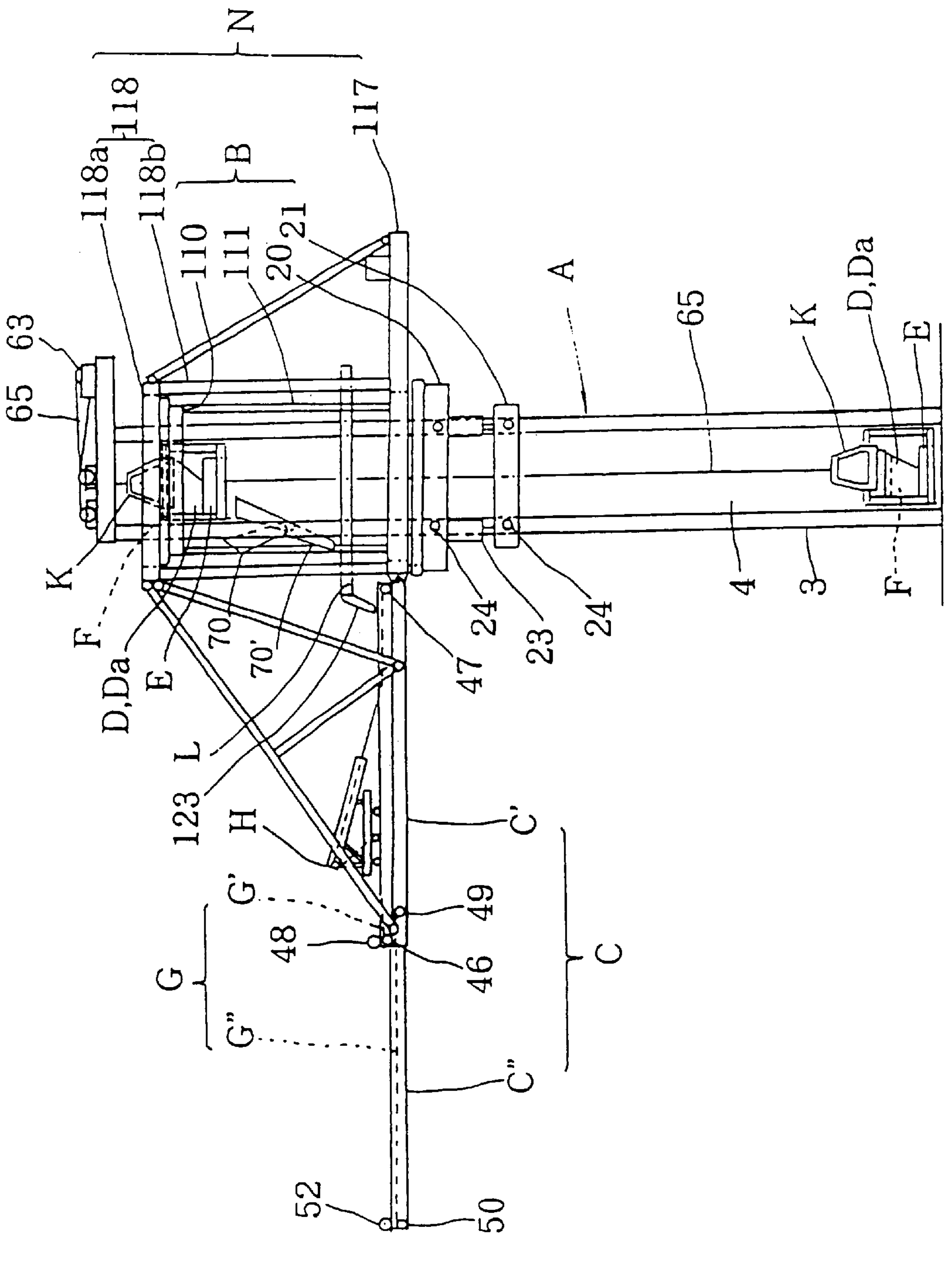

Next, the ready mixed concrete conveying apparatus shown in FIG. 2 is constructed so that it comprises the tower mast A, the lift B arranged on the tower mast A so as to be liftable, a rotary portion N arranged on the lift B so as to be rotatable, and the boom C which is arranged on the rotary portion N and which comprises a single boom or a plurality of connected booms.

The tower mast A is constructed so that it is provided with the container-like carriers used for conveyance of the ready mixed concrete F so as to be liftable, and that the boom C is provided with the belt conveyor G for conveyance of the concrete F conveyed by the carriers D.

At least the inner boom C' of the boom C is provided with the tripper H.

The carriers D are formed to be provided with the supply means E for continuously and quantitatively feeding out the concrete F conveyed by the carriers D. (In the example shown, the carriers are formed as the container-like carriers Da with the supply means E.)

In the ready mixed concrete conveying apparatus shown in FIG. 2 has the same or substantially the same structure as the conveying apparatus shown in FIG. 1 except that the tower mast A does not include the turn table 2, that the boom C is formed to be arranged at the rotary portion N on the lift B so as to be rotatable around the lift B, consequently around the tower mast A, that, with such changes in structure, e.g. the lifting winch 63 is arranged directly on the top of the tower mast A, and that the transferring means L such as a rotary feeder is provided in order to deliver the ready mixed concrete F from the container-like carriers D onto the belt conveyor G.

For these reasons, constituent elements which are the same or substantially the same as those of the apparatus of FIG. 1 are indicated by the same reference symbols, and explanation on these elements will be omitted.

In the apparatus shown in FIG. 2, the lift B which includes the lifting frame 21, the lifting frame 20 and so on has the rotary portion N assembled thereto so as to be rotatable.

The lift B which is arranged on the tower mast A is constructed so that the lifting frame 20, the lifting frame 21, members assembled thereto, and the supporting frame 110 engaged with the tower mast A from outwardly are connected together by the poles 111, and that the members thus connected as a whole are raised and lowered with respect to the tower mast A.

The rotary portion N which is assembled to the lift B is formed to be provided with a stage 117 and a rotary frame 118. Posts **118*b* which are standed from the stage 117 so as to surround the lift B, and an annular frame 118*a* which connects top ends of the posts 118*b* constitute the rotary frame 118. The rotary portion is formed to be assembled to the lifting frame 20, the supporting frame 110** and so on of the lift B so as to be rotatable.

As stated above, there is provided with the structure wherein the rotary portion N is rotatably arranged on the lift B which is liftably provided on the tower mast A, and wherein the boom C is arranged on the rotary portion N. This structure can fully guide the boom C to a position appropriate to concrete placing by rotating the rotary portion N with respect to the lift B.

The tower mast A having the structure does not need to be formed so as to be rotatable itself.

It is not an essential feature that the boom C is arranged on the rotary portion N so as to be turnable.

The method of conveying ready mixed concrete according to the apparatus shown in FIG. 2 is different from that according to the apparatus of FIG. 1 in that the ready mixed concrete F which has been carried up by the container-like carriers D is delivered to feeding means L such as a rotary feeding using e.g. the chutes 70 and 70', and then the concrete is delivered on the belt conveyor G using e.g. a chute 123. In other respects, the conveying method of the ready mixed concrete F may be the same or substantially the same as that according to the conveying apparatus of FIG. 1.

The method of placing ready mixed concrete using the apparatus shown in FIG. 2 can continuously and quantitatively supply the ready mixed concrete to a position appropriate to concrete placing by using the lifting frames 20 and 21 to raise or lower the lift B along the tower mast A upto a height appropriate concrete placing, locating the rotary portion N at such an angular position to locate the boom C at a position appropriate to the concrete placing, and carrying out extending and withdrawing operation of the outer boom C" and displacing operation of the tripper H like the apparatus shown in FIG. 1.

The apparatus may be used so that the rotary portion N is turned at an interval between each concrete placing using the extending and withdrawing operation of the outer boom C" and the displacing operation of the tripper H, or that the rotary portion N is turned while carrying out concrete placing using the extending and withdrawing operation of the outer boom C" and the displacing operation of the tripper H.

The apparatus shown in FIG. 2 may be formed to be movable using the rails like the apparatus shown in FIG. 1, though not shown. In that case, the apparatus may be used so as to move and set the tower mast A at a ready mixed concrete placing position before carrying out each operation stated above, or to carry out each operation while moving the tower mast A.

The apparatus shown in FIG. 2 is constructed so that the concrete F is carried up by the carrier D, the chutes 70 and 70' are used to deliver the concrete F to the feeding means L such as a rotary feeder arranged so as to be around the tower mast A, and then the concrete F delivered to the feeding means L is in turn delivered to the belt conveyor G using the chute 123. However, the apparatus may be constructed so that the concrete F is delivered from the carriers D directly to the feeding means L.

The apparatus may be constructed so that the concrete F which has been carried up by the carriers D is delivered to the belt conveyor from the carriers D without the feeding means L or through e.g. the chute.

The apparatus may be constructed so that the concrete F which has been delivered to the feeding means L is delivered to the belt conveyor G from the feeding means L directly or using other means than the chute 123.

Figure 3:
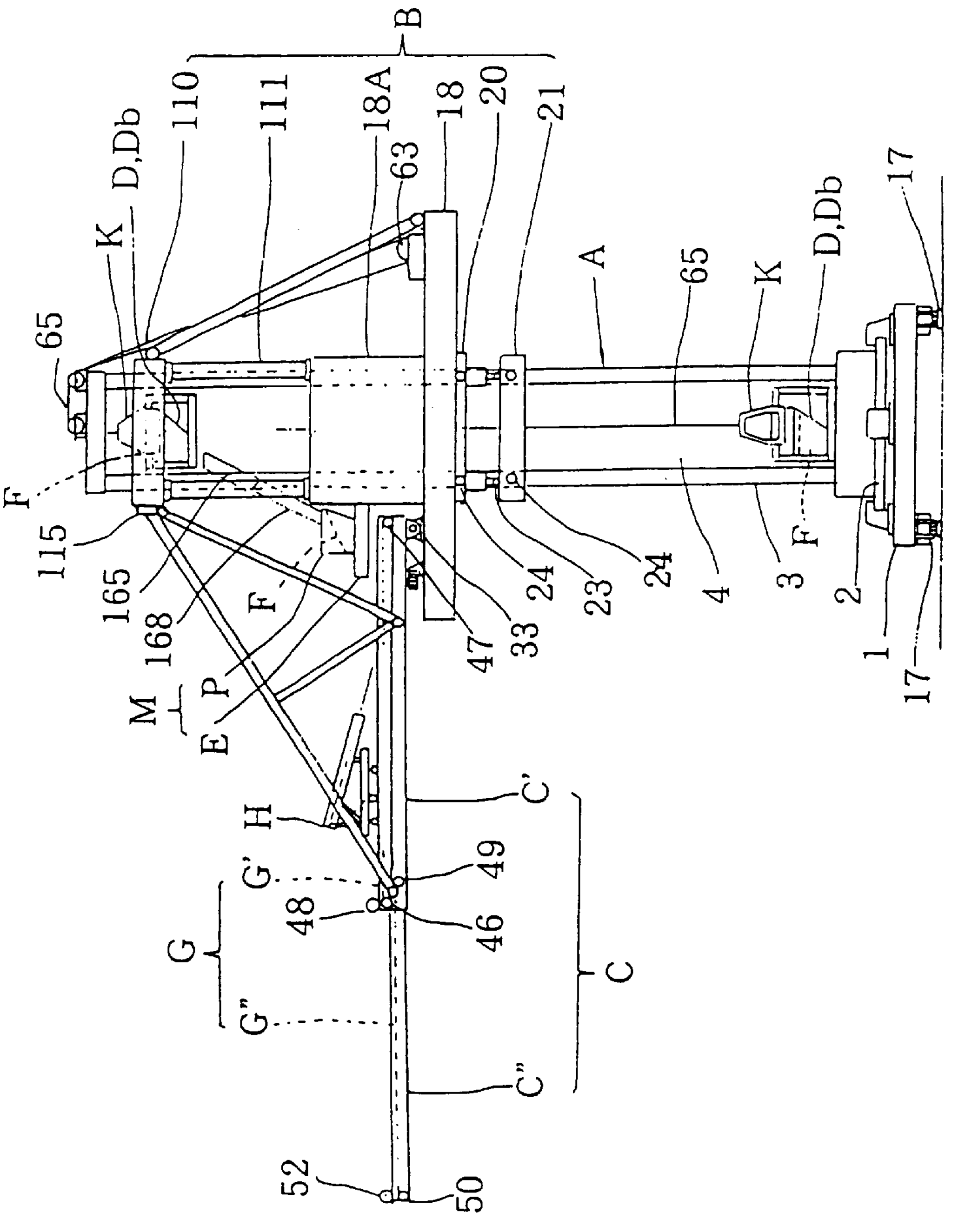

Next, the ready mixed concrete conveying apparatus shown in FIG. 3 is constructed so that it comprises the tower mast A, the lift B arranged on the tower mast A so as to be liftable, and the boom C which is arranged on the lift B so as to be swingable mainly in the horizontal direction and which comprises two connected booms in the example shown.

The tower mast A is provided with the container-like carriers D used for conveyance of the ready mixed concrete F (container-like carriers Db without the supply means E) so as to be liftable, and the boom C is provided with the belt conveyor G for conveyance of the concrete F transferred by the carriers D.

The inner boom C' of the boom C is provided with the tripper H.

A transferring route between the conveyance of the concrete F by the carriers D and the conveyance of the concrete F by the belt conveyor G contains a transferring container M which is provided with receiving means P for receiving the concrete F conveyed by the carriers D and supply means E for continuously and quantitatively feeding out the received concrete F. In particular, in the example shown, the lift B or the boom C is formed to be provided with the transferring container M.

The conveying apparatus shown in FIG. 3 is constructed so that the transferring container M which is provided with the receiving means P for receiving the concrete F conveyed by the carriers D and the supply means E for continuously and quantitatively feeding out the received concrete F is arranged on the lift B or the boom C, and that the concrete F carried up by the carriers D is fed out to the belt conveyor G through the transferring container M to eliminate the need for arranging on the carriers D the supply means E for continuously and quantitatively feeding out the concrete F. The other constituent elements are the same or substantially the same as those of the apparatus shown in FIG. 1.

For these reasons, constituent elements which are the same or substantially the same as those of the apparatus of FIG. 1 are indicated by the same reference symbols, and explanation on these elements will be omitted.

In the conveying apparatus shown in FIG. 3, the transferring container M is arranged on the lift B. The transferring container M is formed to be provided with the receiving means P for receiving the concrete F from the carriers D, and the supply means E for continuously and quantitatively feeding out the concrete F, such a screw feeder and a belt feeder.

In the conveying apparatus having such a structure, the moving operation of the tower mast, the lifting operation of the lift B, the swinging operation of the boom C, the extending and withdrawing operation of the outer boom C", and the displacing operation of the tripper H can be carried out by the same method as the conveying apparatus shown in FIG. 1.

The concrete F which has been carried up by the carriers D is guided to the transferring container M by chutes 165 and 168 first. The concrete F thus guided is continuously and quantitatively fed out to the belt conveyor G by the supply means E which is arranged on the transferring container M to continuously and quantitatively feed out the concrete. The concrete F which has been guided to the belt conveyor G is supplied to a concrete placing position from the leading edge of the belt conveyor G" of the outer boom C" or the tripper H of the inner boom C".

Such concrete placing can be controlled by the moving operation of the tower mast A, the lifting operation of the lift B, the swinging operation of the boom C, the extending and withdrawing operation of the outer boom C", the displacing operation of the tripper H or the like. The concrete placing can be made while carrying out each operation.

The conveying apparatus shown is constructed so that the tower mast A is movable on the rails 17, and that the turn table 2 allows the tower mast A to rotate. The apparatus may be constructed so that the tower mast A is not movable on the rails 17, and that the tower mast is standed at a concrete placing site so as to be rotatable by the turn table 2.

The apparatus may be constructed so that the tower mast A is not provided with the turn table 2 and that the tower mast is movable on the rails 17.

When the tower mast A is formed to be rotatable by the turn table 2. The boom C may be fixed to the lift B not to be swingable.

Although the transferring container M is constructed so that it is arranged on the lift B, the transferring container M may be arranged on the boom C provided on the lift B.

Delivering the concrete F from the carriers D into the transferring container M may be made through other chuting means than the chutes 165 and 168, or other suitable transferring means.

There may be provided an arrangement wherein delivering the concrete F is made from the carriers D directly to the transferring container M without help of such transferring means.

Delivering the concrete F from the transferring container M onto the belt conveyor G can be made through a chute, or other suitable transferring means.

There may be provided an arrangement wherein delivering the concrete F is made from the transferring container M directly to the belt conveyor G without help of these transferring means.

Figure 4:
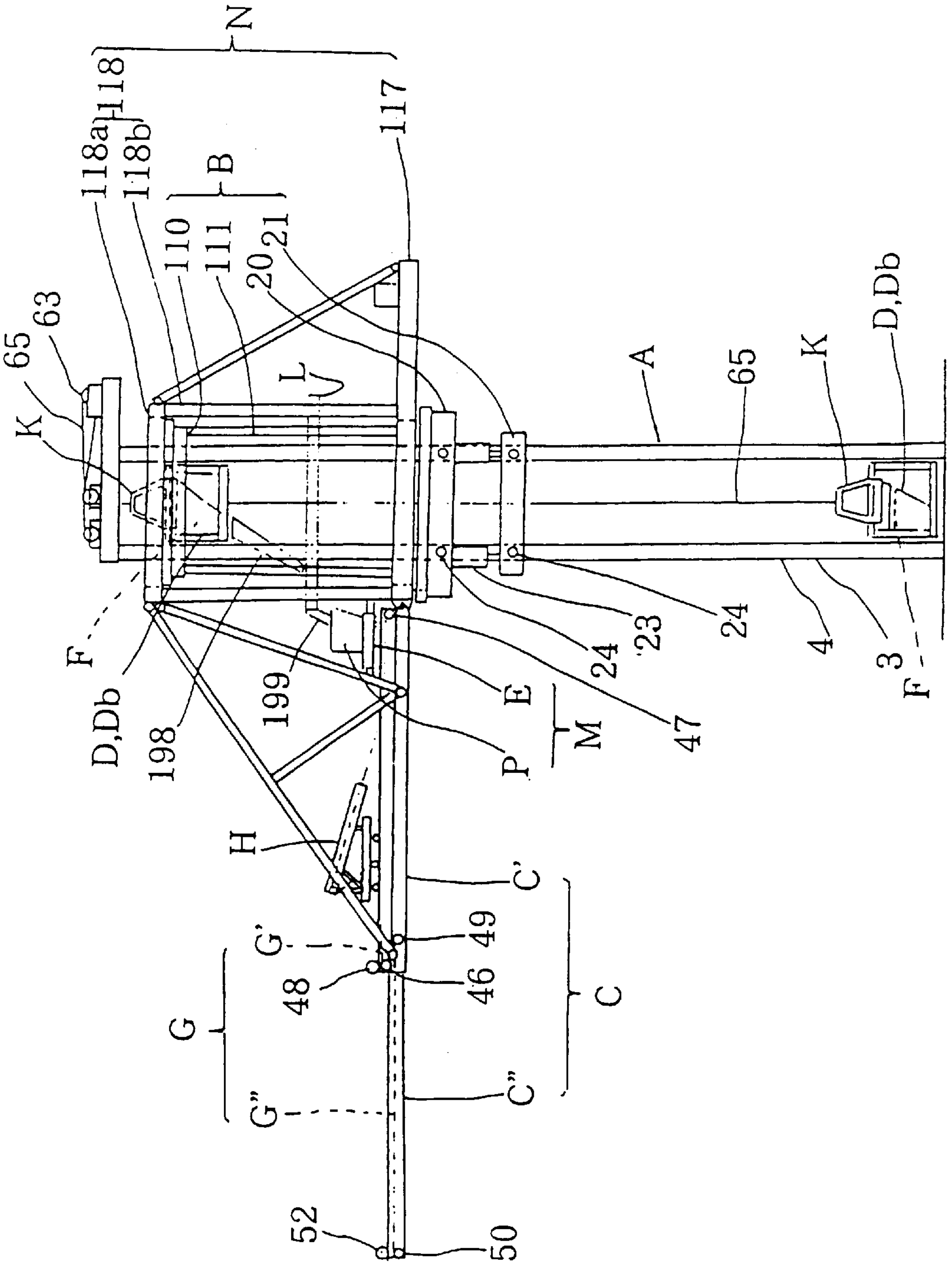
Figure 5:
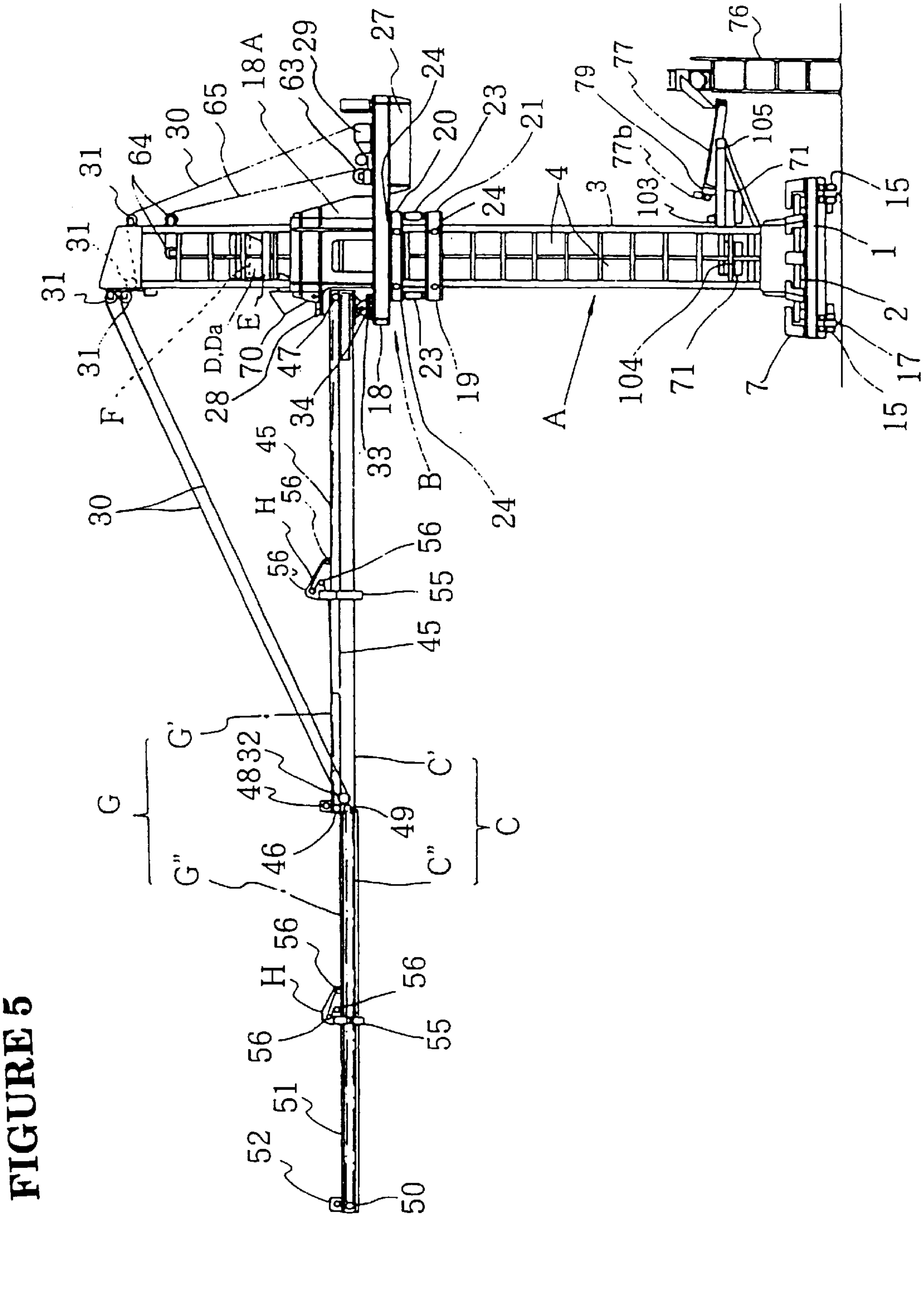
FIGS. 5–36 are views showing the ready mixed concrete conveying apparatus according to a first mode.
Figure 6:
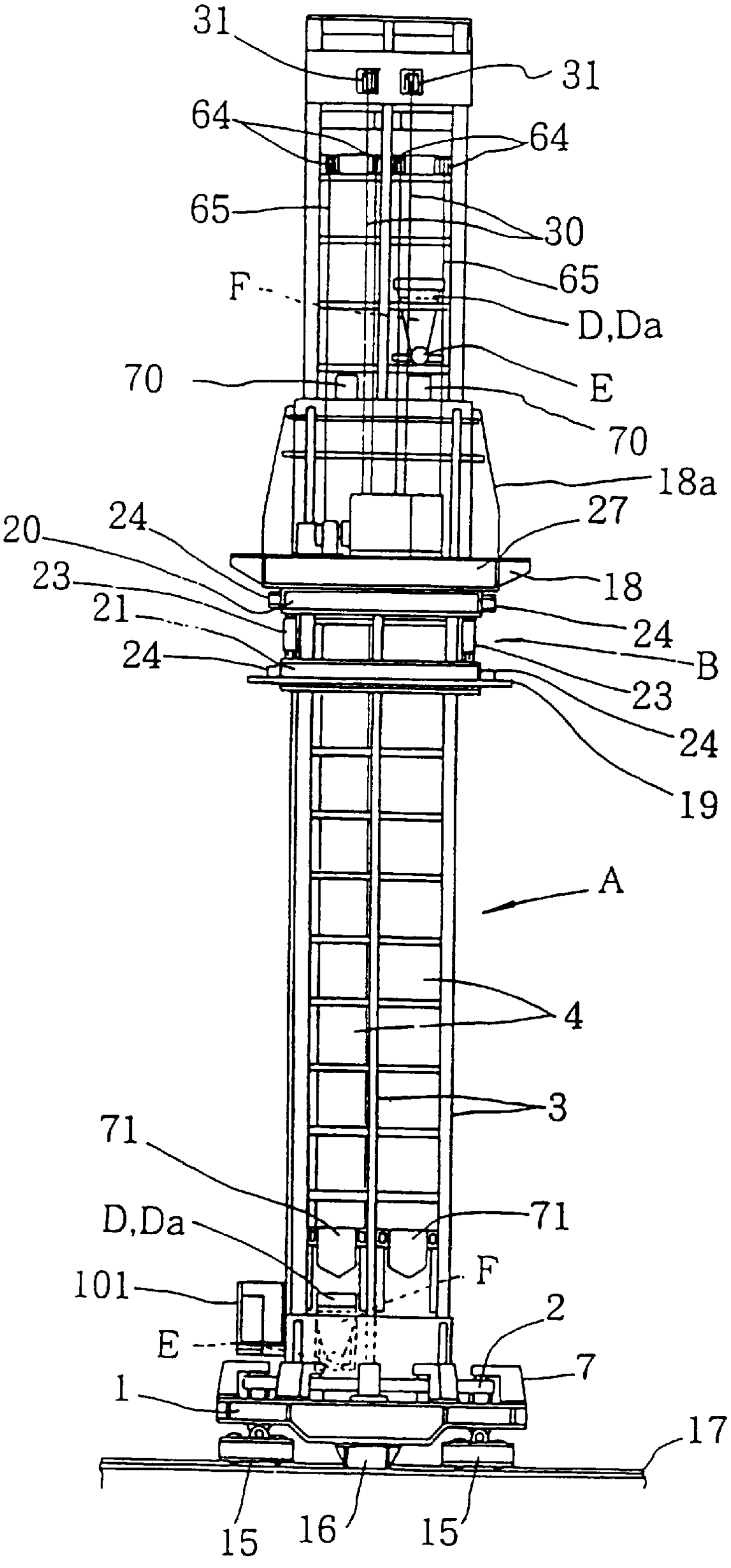
Figure 7:
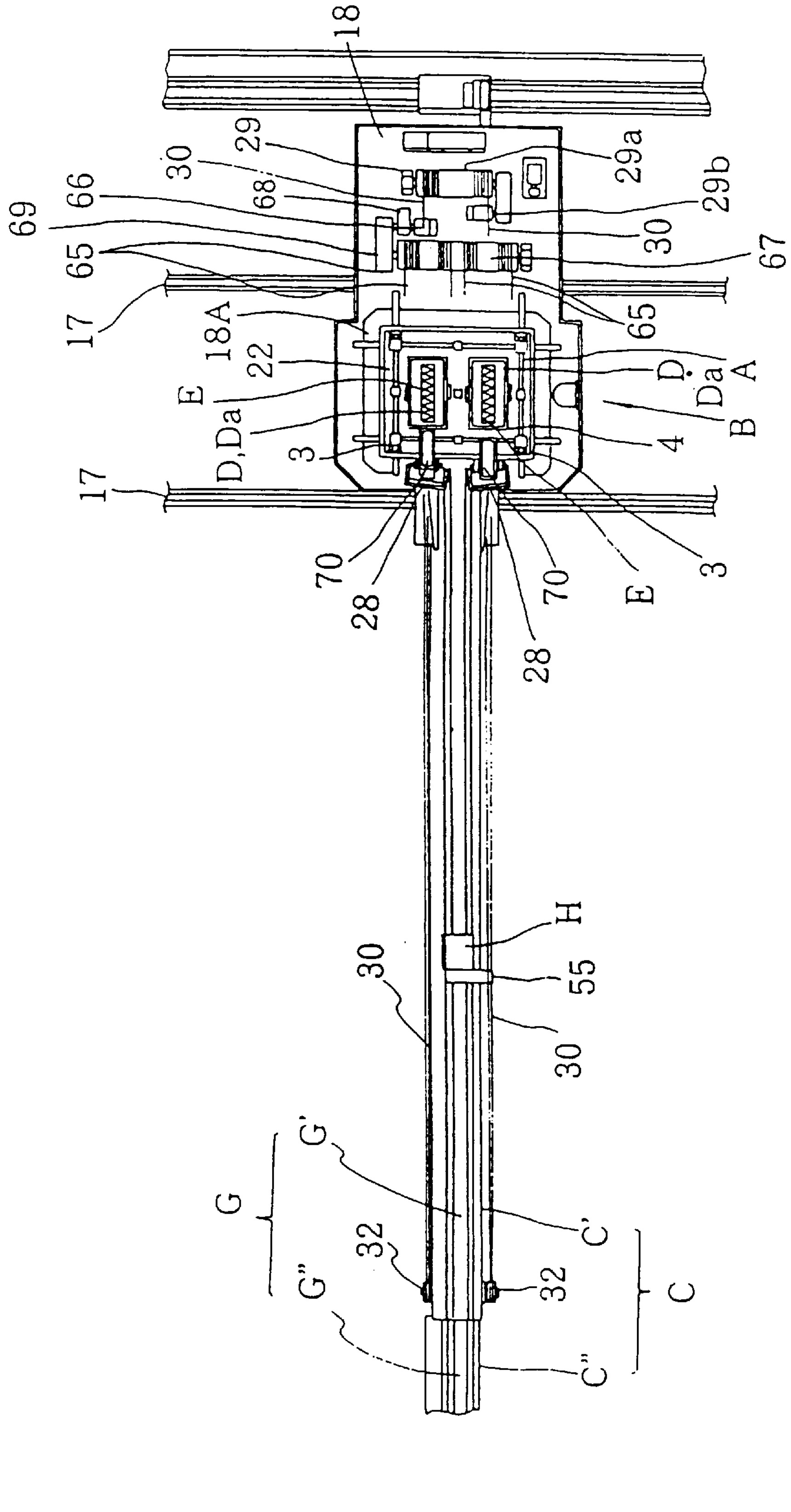

Next, the conveying apparatus shown in FIG. 4 is constructed so that it comprises the tower mast A, the lift B arranged on the tower mast A so as to be liftable, the rotary portion N arranged on the lift B so as to be rotatable, and the boom C which is arranged on the rotary portion N and which comprises two connected booms C' and C".

The tower mast A is constructed so that the container-like carriers D used for conveyance of the concrete F (the container-like carriers Db without the supply means E in the example shown) are arranged so as to be liftable, and that the boom C is provided with the belt conveyor G for conveyance of the concrete F conveyed by the carriers D.

The inner boom C' of the boom C has the tripper H provided thereon.

A transferring route between the conveyance of the concrete F by the carriers D and the conveyance of the concrete F by the belt conveyor G contains the transferring container M which is provided with the receiving container P for receiving the concrete conveyed by the carriers D and the supply means E for continuously and quantitatively feeding out the received concrete F. The transferring container M is constructed so that it is arranged on the lift B, the rotary portion N or the boom C.

The conveying apparatus shown in FIG. 4 has the same or substantially the same structure as the conveying apparatus shown in FIG. 2 except that the concrete F which has been carried up by the carriers D is delivered to the belt conveyor G through the transferring container M.

For these reasons, constituent elements which are the same or substantially the same as those of the apparatus shown in FIG. 2 are indicated by the same reference symbols, and explanation on these elements will be omitted.

The conveying apparatus shown in FIG. 4 is constructed so that the transferring container M is arranged on the rotary portion N, in particular, on the boom C in the example shown, and that the transferring container M is provided with the receiving container P for receiving the concrete F carried up by the carriers D and the supply means E for continuously and quantitatively feeding out the received concrete F.

Accordingly, the container-like carriers D which are arranged on the tower mast A so as to be liftable are constructed so that they are not provided with the supply means E for continuously and quantitatively feeding out the concrete F.

The apparatus having such a structure can continuously and quantitatively supply the concrete F to a position appropriate to concrete placing by substantially the same method as the apparatus shown in FIG. 2, i.e. by using the lifting frames 20 and 21 to raise or lower the lift B along the tower mast A up to a height of appropriate to concrete placing, locating the rotary portion N at such an angular position to locate the boom C at the position appropriate to concrete placing, carrying out the extending and withdrawing operation of the outer boom C" and the displacing operation of the tripper H.

The apparatus may be used so that the rotary portion N is turned at an interval between each concrete placing using the extending and withdrawing operation of the outer boom C' and the displacing operation of the tripper H, or the rotary portion N is turned while carrying out concrete placing using the extending and withdrawing operation of the outer boom C' and the displacing operation of the tripper H.

The apparatus shown in FIG. 4 may be formed to be movable using the rails like the apparatus shown in FIG. 1, though not shown. In that case, the apparatus may be used so as to move and set the tower mast A at the ready mixed concrete placing position before carrying out each operation stated above, or to carry out each operation while moving the tower mast A.

The apparatus having such a structure is constructed so that the concrete F which has been carried up by the carriers D on the tower mast A is delivered to the feeding means L, i.e. the rotary feeder rotating around the tower mast A in the example shown, using a chute 198, that the concrete F which has been received into the feeding means L is delivered to the transferring container M using a chute 199, and that the concrete F is continuously and quantitatively fed out to the belt conveyor G from the transferring container M.

In this manner, the concrete F thus guided to the belt conveyor G is continuously and quantitatively fed to the concrete placing position from the leading edge of the belt conveyor G on the outer boom C", or the tripper H.

Delivering the concrete F from the container-like carriers D to the transferring container M can be made so that, for example, the concrete F is delivered from the carriers D directly to the feeding means L, such as the rotary feeder, rotating around the tower mast A.

The apparatus may be constructed so that the concrete F is delivered from the feeding means L directly to the transferring container M without help of the chute 199.

The apparatus may be constructed so that the concrete F is transferred from the carriers D to the transferring container M directly or through e.g. a chute without provision of the feeding means L.

The transferring container M which is provided with the receiving container P for receiving the concrete F and the supply means E for continuously and quantitatively feeding out the received concrete F may be arranged on the boom C like the example shown, or may be provided on the rotary portion N with the boom C assembled thereto. The transferring container M may be formed to be provided on the lift B with the rotary portion N assembled thereto.

(1) Ready mixed concrete conveying apparatus according to a first mode

Firstly, the ready mixed concrete conveying apparatus according to a first mode shown in FIGS. 5–36 will be explained.

The apparatus according to the first mode is constructed so that it comprises the tower mast A, the lift B arranged on the tower mast A so as to be liftable, and the boom C arranged on the lift B so as to be turnable mainly in the horizontal direction.

The boom C which is arranged on the lift B is constituted by the inner boom C' and the outer boom C" connected thereto, and the outer boom C" is formed so as to be extensible from and withdrawn into the inner boom C'.

The tower mast A is provided with the container-like carriers D used for conveyance of the ready mixed concrete F so as to be liftable.

The inner boom C' and the outer boom C" of the boom C are provided with the belt conveyor G' and G" for taking over the concrete F one after another, presenting a structure to convey the concrete F supplied from the carrier D directly or through transferring means additionally provided.

The boom C is provided with the trippers H which feed the conveyed concrete F into the belt conveyor G" of the outer boom C", takes out the concrete F at a position on the belt conveyor G' and G", or takes out the concrete at the leading edge of the belt conveyor G".

The container-like carriers D are provided with supply means E for continuously and quantitatively feeding out the concrete F conveyed by the carriers D.

The concrete F which has been conveyed by the carriers D is continuously and quantitatively fed out by the supply means E on the carriers D to the belt conveyor G for conveyance directly or the transferring means additionally provided.

The conveying apparatus according to the first mode is constructed so that the tower mast A forming a part of the apparatus is standed so as to be rotatable using its vertical axis as the rotary axis.

The apparatus according to the first mode is formed to be movable along the rails 17 in the horizontal direction.

The tower mast A forming a part of the apparatus can be standed by various standing methods. For example, in this mode, the turntable 2 is arranged on the basic table 1 so as to be rotatable, the respective mast frames 3, 3 . . . are assembled to the turntable, and the spaces 4 are provided within the mast frames so as to raise and lower a pair of the carriers D and D.

The tower mast A which is constituted by the mast frames 3, 3 . . . has the lift B mounted thereto to be engaged therewith from outwardly. The climbing means which forms a part of the lift can be activated to the respective mast frames 3, 3 . . . to move the lift B vertically with respect to the tower mast A.

The turntable 2 which the tower mast A stands on is constructed so that a normal load is received by lower rollers 5, 5 . . . and lower slide shoes 6 on the basic table 1, and that an overturning moment is received by upper rollers 8, 8 . . . which are arranged on overturning preventing arms 7, 7 . . . extended from the turntable 2 upwardly.

The turntable 2 has a central portion formed with a bearing portion 9, which has a center post 10 of the base table 1 engaged therewith through an slide shoe 11 to bear a thrust load caused on the tower mast A.

In this manner, the tower mast A is constructed so that it can rotate with respect to the tower mast A, having the center line of the center post 10 in the vertical direction as the rotary center line.

Figure 8:
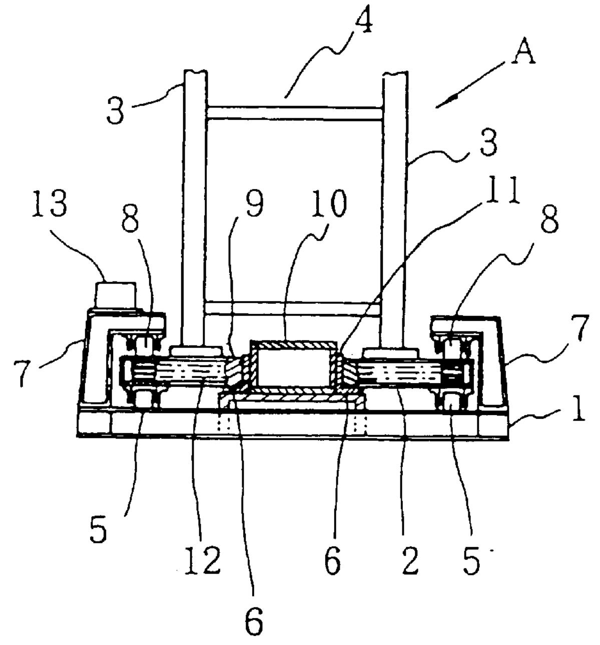
Figure 9:
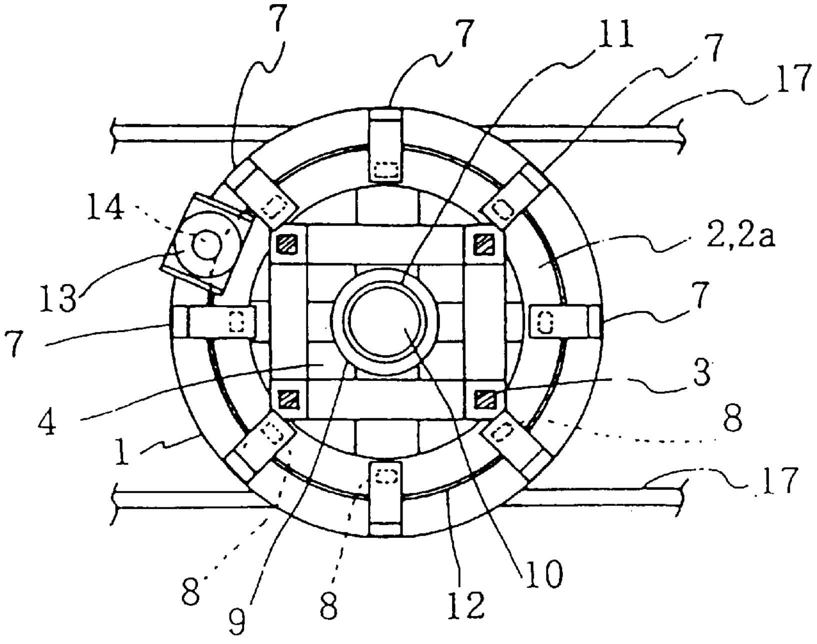

In order to rotate the tower mast A, there is provided slewing drive means wherein a sprocket 14 with a slewing motor 13 is engaged with a chain 12 wound on an outer periphery of an annular frame 2*a* of the turntable 2 (see FIGS. 8 and 9).

The base table 1 has a lower side provided with four set of running means 15, 15 . . . and overturn-preventing means 16, providing a structure wherein the tower mast A can move on the rails 17 and 17 fixed on an installation site.

Figure 10:
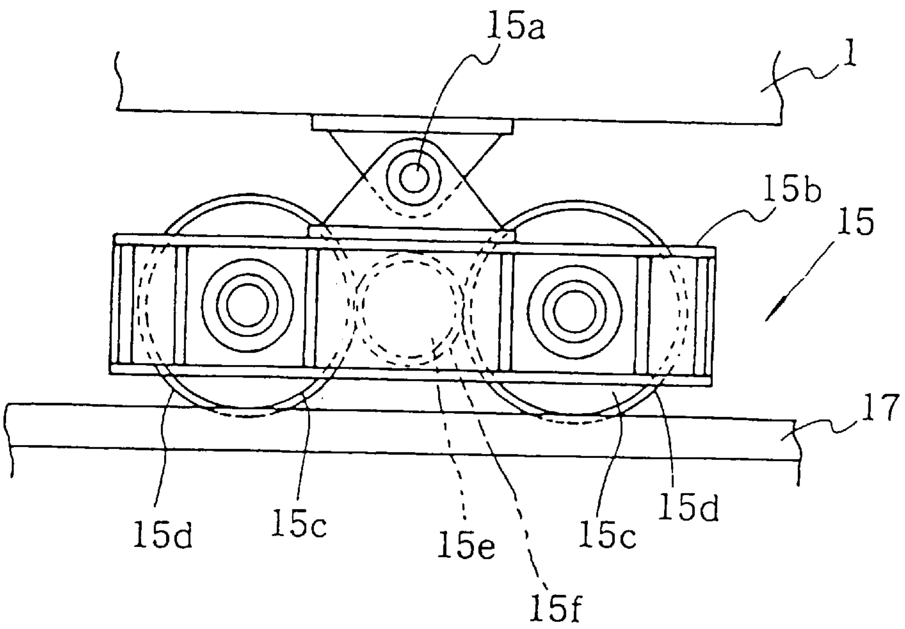
Figure 11:
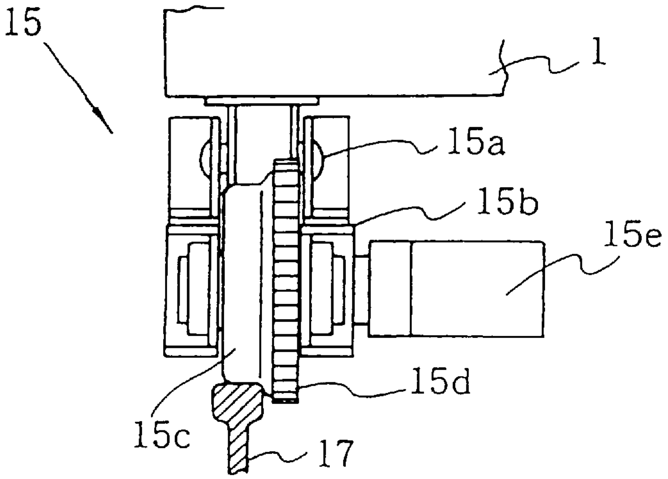
Figure 12:
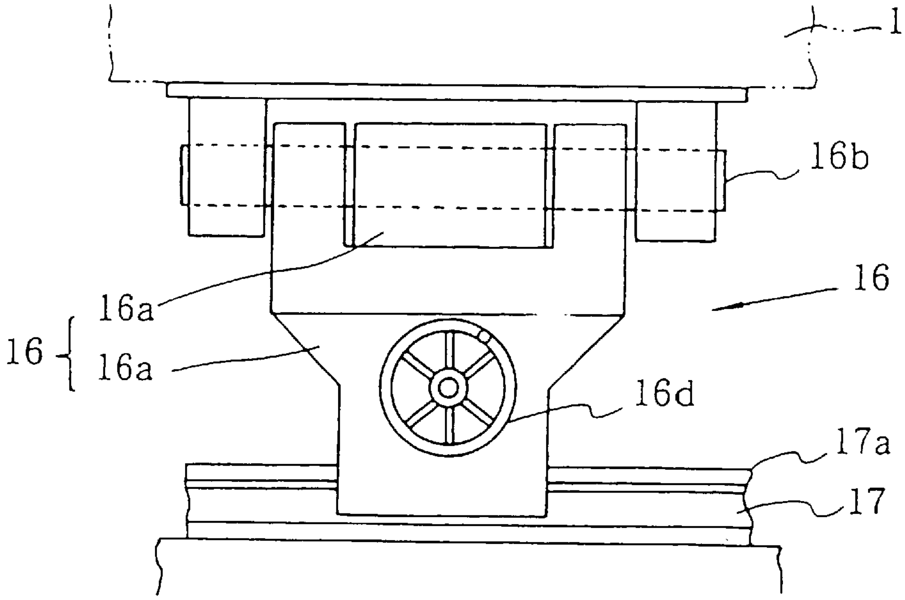
Figure 13:
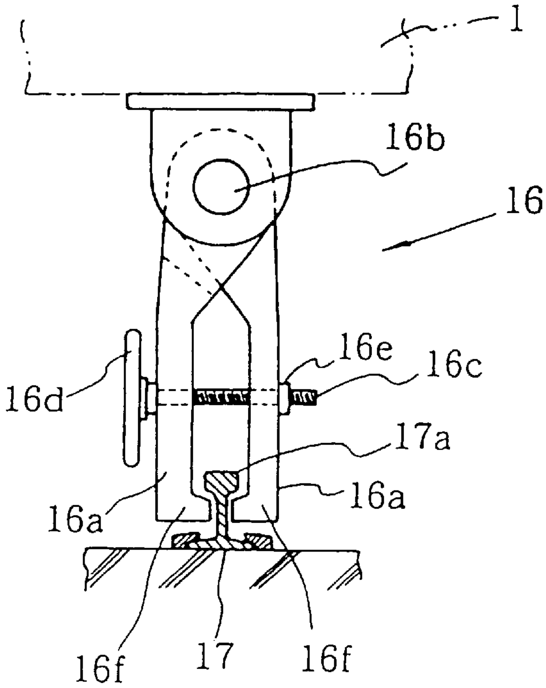
Figure 14:
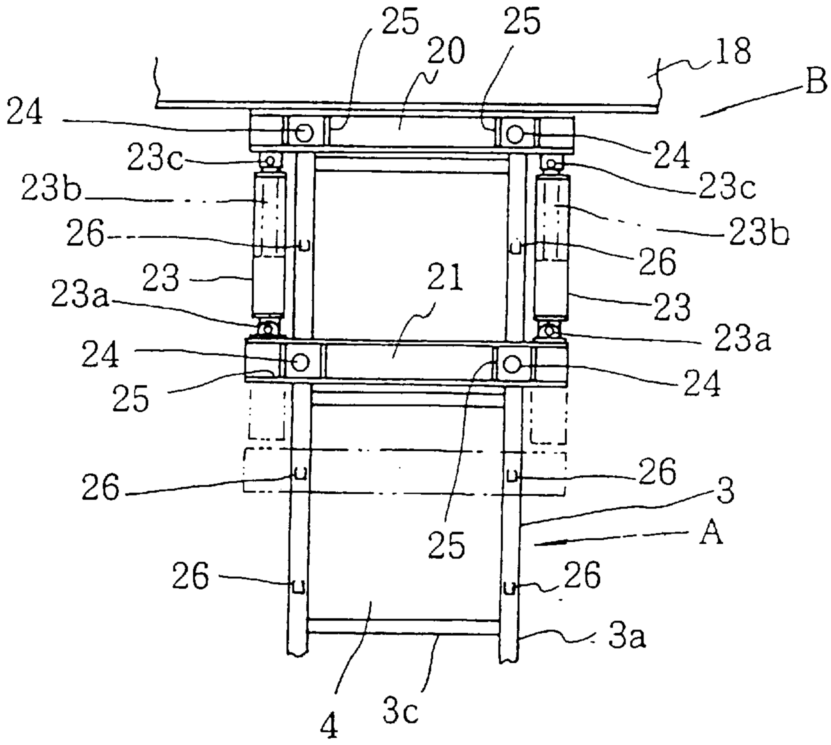
Figure 15:
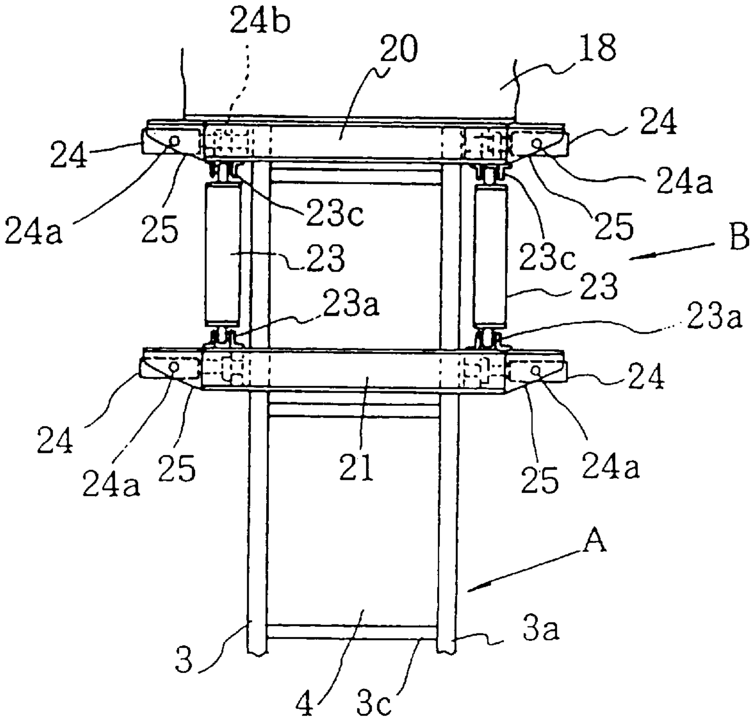
Figure 16:
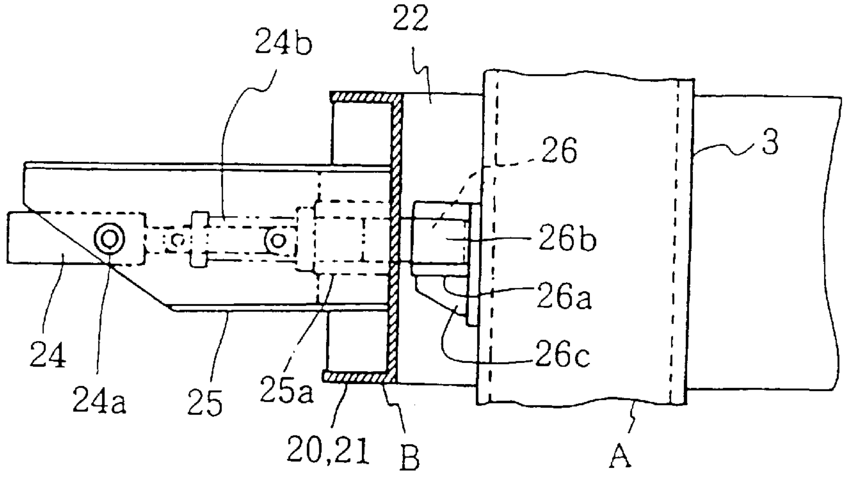
Figure 17:
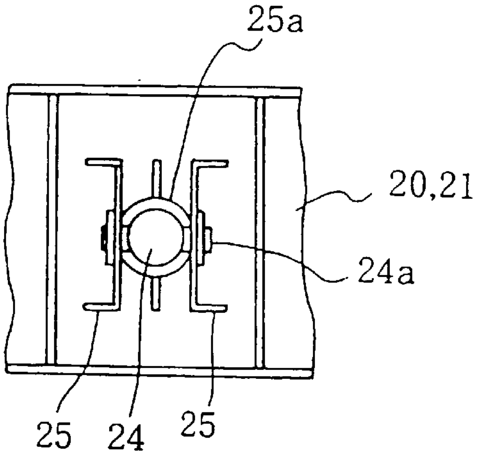
Figure 18:
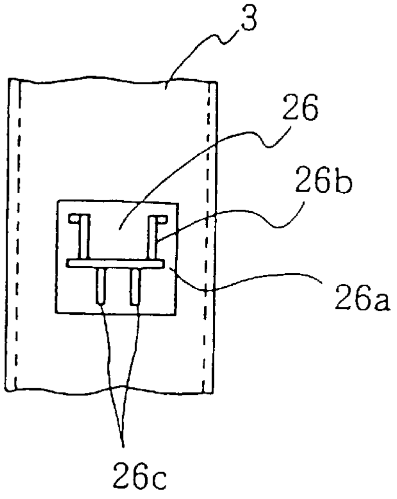

In the specific example shown, the running means 15 of the basic table 1 are constructed so that each pair of wheels 15*c* and 15*c* is rotatably arranged on a wheel frame 15*b* rotatably mounted to the base table 1 by use of a shaft 15*a*, that a gear 15*d* arranged to coaxial with each wheel 15*c* is engaged with a driving gear 15*f* driven by a driving motor 15*e* mounted to the wheel frame 15*b*, and that the tower mast A can be moved along the rails 17 at any time (see FIGS. 10 and 11).

Each overturn-preventing means 16 which is provided on the lower side of the basic table 1 is constructed so that it includes a pair of clamping pieces 16*a* and 16*a* having inner surfaces of the leading edges provided with clamping projections 16*f* facing each other. The clamping pieces 16*a* and 16*a* can clamp the web of a rail 17 on both sides to produce an engagement state with a rail head 17*a*. In addition, a control wheel 16*d* with a threaded shaft 16*c* passing through the paired clamping pieces 16*a* and 16*a* is tightened, specifically, the threaded shaft 16*c* is screwed into a nut 16*e* provided on one 16*a* of the paired clamping pieces, and the paired clamping pieces 16*a* and 16*a* are drawn together by rotating the control wheel 16*d*, thereby presenting a structure to clamp and release the rails (see FIGS. 12 and 13).

Now, the lift B which is arranged on the tower mast A will be explained referring to FIGS. 14–19. The lift B which is arranged on the tower mast A so as to be liftable is constructed so that the lift has a base constructed by the upper lifting frame 20 and the lower lifting frame 21 connected together by the hydraulic lifting cylinders 23, that the upper lifting frame 20 and the lower lifting frame 21 have the main stage 18 and an auxiliary stage 19 formed, respectively, therewith, and that the main stage 18 has stage posts 18A formed therewith. The lift B constituted by these members has an arrangement wherein the lift is mounted to the standed tower mast A so as to surround the tower mast A and engage with the tower mast from outwardly.

The main stage 18 which is arranged on the upper lifting frame 20 is formed as an annular frame to be engaged with the standed tower mast A from outwardly. The main stage has a lower side formed integrally with the lifting frame 20 as the annular frame. The lower lifting frame 21 which is formed as an annular frame is coupled to and below the upper lifting frame 20 through the hydraulic cylinders 23. The auxiliary stage 19 which is arranged on the lower lifting frame 21 is mounted to the tower mast A be engaged with the tower mast from outwardly together with the upper lifting frame 21.

The lift B which is constituted by the lifting frames 20 and 21, the main stage 18 and the auxiliary stage 19 assembled thereto and so on is constructed so that the lifting frames include the annular frames, and they have openings 22 facing each other, i.e. openings 22 engaged with the tower mast A.

The lifting operation of the lift B thus constructed is carried out mainly by the lifting frames 20 and 21. The lifting frames 20 and 21 are formed in a substantially square frame shape so as to surround the mast frames 3, 3 of the tower mast A, and can vertically move along the outer periphery of the tower mast A.

Shafts 23*a* are used to mount the hydraulic lifting cylinders 23, 23 . . . to four corners of the lifting frame 21 so as to stand therefrom, and the hydraulic lifting cylinders 23 have plunger rods 23*b* mounted to the upper lifting frame 20 using shafts 23*c*, presenting a structure wherein the respective lifting frames 20 and 21 can be raised and lowered by the hydraulic cylinder 23.

Figure 19:
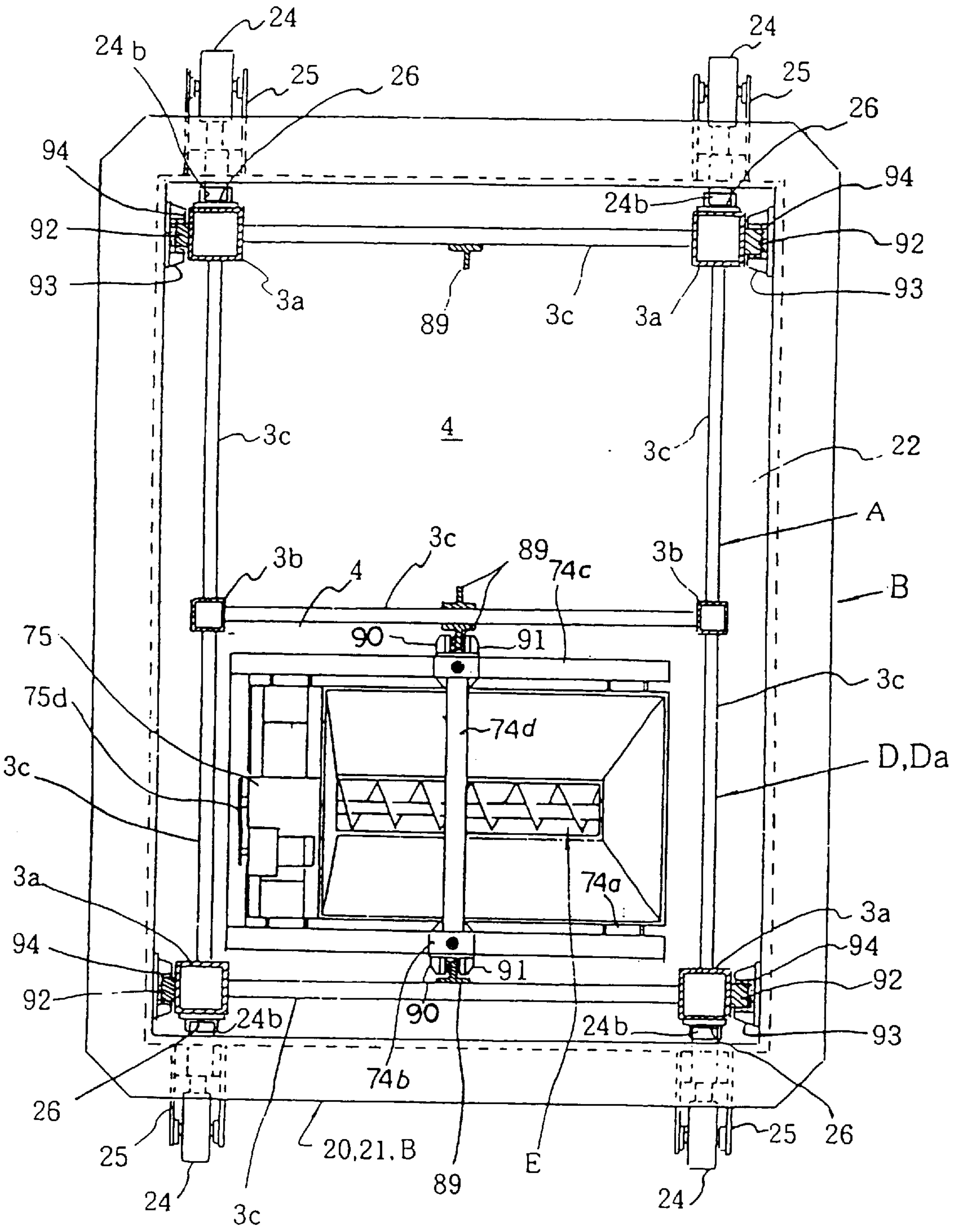
Figure 20:
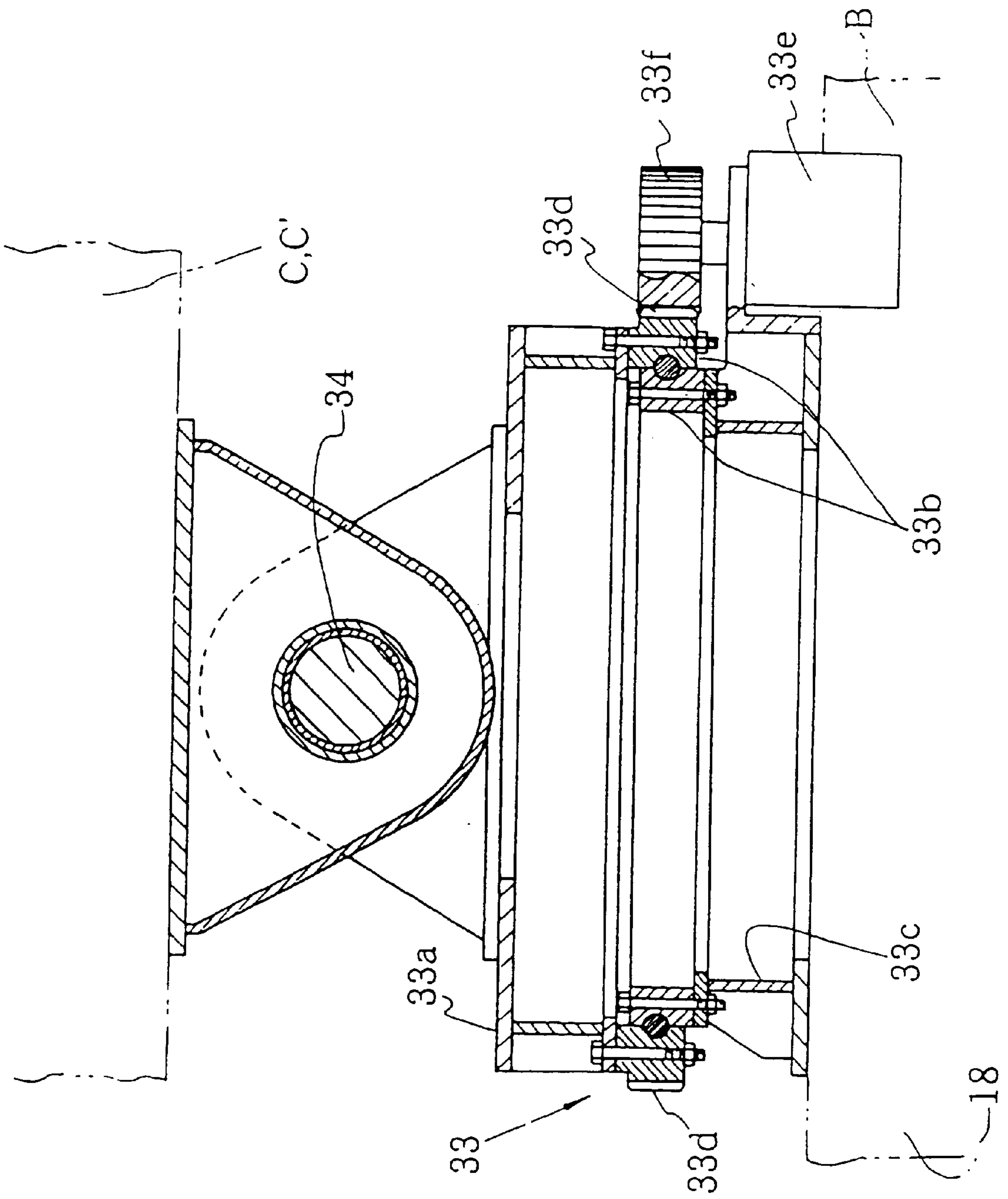
Figure 21:
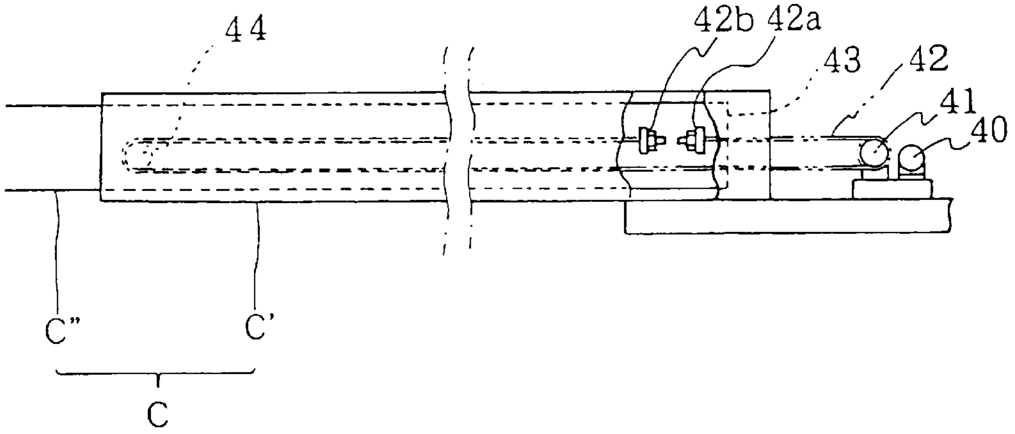
Figure 22:
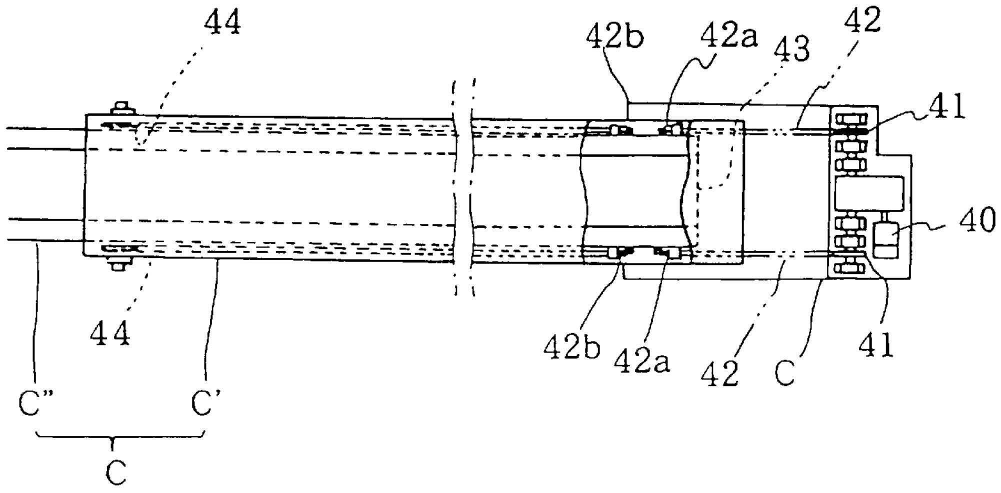
Figure 23:
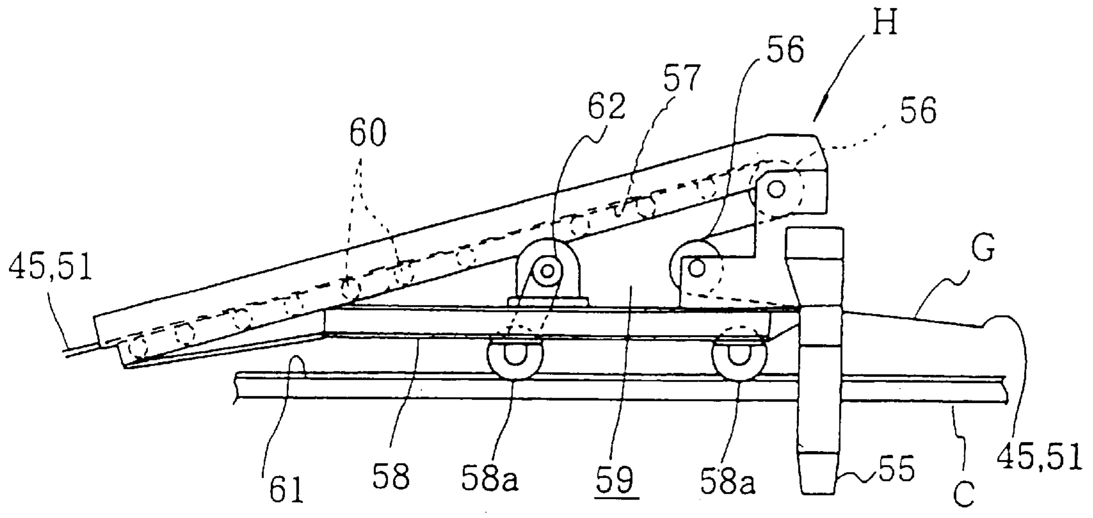
Figure 24:
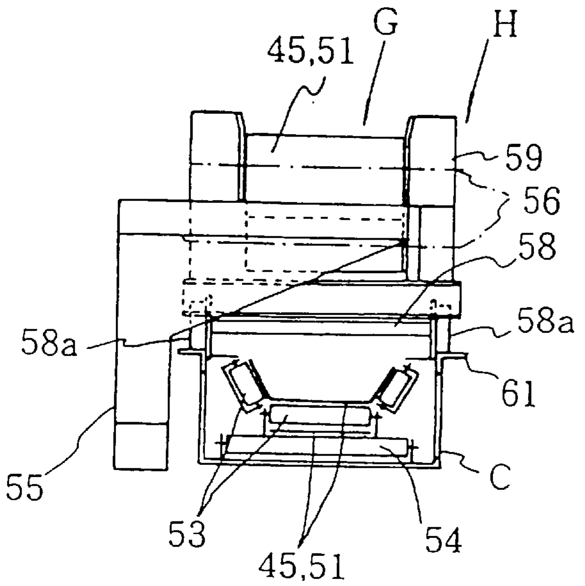

It is clearly shown in e.g. FIG. 19 how the lift B, in particular the lifting frames 21 and 21 are assembled to the mast frames 3.

In this mode, the tower mast A is constructed so that an imaginary plane with main masts 3*a*, 3*a* . . . standed on four corners thereof is substantially rectangular, that the main mast have auxiliary posts 3*b* arranged therebetween at longer sides, and that the main mast and the auxiliary posts 3*b* are suitably connected by crossbars 3*c*, allowing the container-like carriers D to vertically move in the respective spaces 4 defined by the paired main masts 3*a,* 3*a* at the shorter sides and the auxiliary posts 3*b,* 3*b*.

The respective main masts 3*a* of the tower mast A have outer side surfaces provided with guide rails 92 to extend along the tower mast A vertically and the guide rails 92 are fitted through slide shoes 94 in slide guides 93 provided on inner side surfaces of the lifting frames 20 and 21, presenting a structure wherein the lifting frames 20 and 21 can stably and vertically move with respect to the tower mast A.

The lifting frames 20 and 21 have respective corners provided with hydraulic cylinders 24, 24 . . . to lock the lifting frames 20 and 21 to the mast frames forming the tower mast A.

Shafts 24*a* are used to mount the hydraulic cylinders 24 to cylinder supporting frames 25 which are arranged to project from the lifting frames 20 and 21 outwardly and which lie substantially in the horizontal direction. The hydraulic cylinders 24 have plunger rods 24*b* projected from the side of the lifting frames 20 and 21 toward the side of the mast frames 3 so as to use the plunger rods 24 as lock shafts, presenting a structure wherein the plunger rods are engageable with receivers 26 provided on the mast frames 3.

The receivers 26 which are provided on the mast frames 3 are located to correspond to levels where the respective lifting frames 20 and 21 vertically moved by the hydraulic cylinders 23 can be selectively stopped.

The cylinder supporting frame 25 for each hydraulic cylinder 24 has a mounting side formed with a receiving cylinder 25*a* to move the plunger rod 24*b* of the hydraulic cylinder 24 substantially in the horizontal direction so as to obtain reliable operation of the hydraulic cylinder 24, and the plunger rod is interposed between the receiving cylinder 25 and the receiver 26, presenting a structure wherein the respective lifting frames 20 and 21 can be reliably fixed to the mast frames 3. By this structure, when each plunger rod 24*b* is withdrawn, the plunger rod 24*b* has the leading edge disengaged from the receiver 26 while having the leading edge left in the receiving cylinder 25*a.*

Each receiver 26 provided on each mast frame 3 is formed as a recessed portion wherein a metal fitting 26*a* and metal fittings 26*b* are provided on an outer surface of the mast frame 3 so as to project therefrom, and the top surrounded by the metal fittings 26*a* and 26*b* is opened.

Each receiver 26 provided on each mast frame 3 is constituted by the lower receiving metal fitting 26*a* provided on the mast frame 3 so as to project therefrom substantially in the horizontal direction, the paired vertical metal fittings 26*b* perpendicularly projected from the mast frame 3 so as to extend from the receiving metal fitting 26*a* upwardly, and a pair of backup metal fittings 26*c* provided on the lower surface of the receiving metal fitting 26*a* so as to extend therefrom downwardly. The recessed portion with the top opened which is defined by the receiving metal fitting 26*a* and the receiving metal fittings 26*b* forms the receiver 26 for the leading edge of each plunger rod 24*b*.

The climbing means on the respective lifting frames 20 and 21 are normally in such a state that the respective hydraulic cylinders 24, 24 . . . have the plunger rods 24*b* extended to insert the leading edges of the plunger rods into the receivers 26 of the mast frames 3 while the hydraulic cylinders 23 are in a retracted position.

In the operation to upwardly move the lift B with the main stage 18, the auxiliary stage 19 and so on using the respective lifting frames 20 and 21, first the lifting frame 20 has the plunger rods 24*b* of the hydraulic cylinders 24 got out of the receivers 26 upwardly by extending the plunger rods 23*b* of the hydraulic cylinders 23, and simultaneously the hydraulic cylinders 24 of the lifting frame 20 are retracted.

Under the circumstances, the hydraulic cylinders 23 have the plunger rods 23*b* further extended to push up the upper lifting frame 20 together with the main stage 18.

In this case, it is detected by sensors whether the hydraulic cylinders 24 have completely retracted. If affirmative, the hydraulic cylinders 23 continue to raise. If the hydraulic cylinders 24 on the upper lifting frame 20 has not completely retracted, the hydraulic cylinders 23 stop working.

Such an arrangement can prevent the leading edges of the hydraulic cylinders 24 from colliding against higher receivers 26 at a higher position, in particular the receiving metal fittings 26*a* thereof due to the raising operation of the lifting frame 20, and move the lifting frame 20 beyond the higher receivers 26 at the higher position.

In this manner, the lifting frame 20 is pushed up by the hydraulic cylinders 23, and is located at a predetermined position. At this position, the hydraulic cylinders 24 on the upper lifting frame 20 have the plunger rods 24 extended to insert the plunger rods 24*b* into the higher receivers 26 on the mast frames 3, thereby fixing the lifting frame 20, consequently the main stage 18 to the tower mast A.

Next, the lower lifting frame 21 is pulled up by retracting the hydraulic cylinders 23 so as to get out the plunger rods 24*b* of the hydraulic cylinders 24 on the lifting frame 21 from the receivers 26 on the mast frames 3, and the hydraulic cylinders 24 start to retract.

Accompanying such a series of operation, i.e. the retracting operation of the plunger rods 23*b* of the hydraulic cylinders 23, the lower lifting frame 21 is upwardly moved. The lifting frame 21 which has been moved at such a predetermined upper position has the hydraulic cylinders 24 extended in the horizontal direction to insert the plunger rods 24*b* into higher receivers 26 on the mast frames 3, thereby fixing the lift frame 21 at the upper position.

Also in this case, if sensors detect that the locking hydraulic cylinders 24 have completely retracted, the lifting hydraulic cylinders 23 continue the upward movement, thereby preventing the leading edges of the hydraulic cylinders 24 from colliding against the receiving metal fittings 26 of the higher receivers 26.

The lowering operation of the lift B with the main stage 18, the auxiliary stage 19 and so on can be made in substantially reverse operation to the raising operation. That is to say, first, the lower lifting frame 21 is downwardly moved by the operation stated above, and the lower lifting frame is fixed to the mast frames 3. After that, the upper lifting frame 20 is downwardly moved together with the main stage 18, and the upper lifting frame is locked to the mast frames 3 at a position where the upper lifting frame has completed the movement. Thus, the lift B can be downwardly moved.

In detail, first, the hydraulic cylinders 24 on the lower lifting frame 21 are activated to retract the plunger rods 24*b* of the hydraulic cylinders 24. After it is confirmed that the leading edges of the rods 24*b* have completely got out from the receivers 26, in particular the surfaces of the receiving metal fittings 26*a,* the hydraulic cylinders 23 have the plunger rods 23*b* extended to a predetermined position. With the plunger rods 23*b* extended, the hydraulic cylinders 24 on the lower lifting frame 21 have the plunger rods 24*b* extended to support the leading edges of the rods 24*b* on the surfaces of the receiving metal fittings 26*a* of the receivers 26.

Next, the upper lifting frame is downwardly moved by similar operation, thereby moving the main stage 18 to a lower position of the tower mast A.

Now, the boom C, the belt conveyor G, the tripper H and so on will be explained referring to FIGS. 20–26.

The main stage 18 which forms a part of the lift B arranged on the tower mast A has one end provided with the boom C and the other end provided with a counter weight 27 and a boom supporting winch 29 for supporting the boom C. The boom supporting winch 29 has wire ropes 30 passed around guide sheaves 31, 31 . . . on top of the tower mast A and guide sheaves 32 on the leading edge of the boom C to support the boom C so as to be swingable vertically.

Reference numeral 29*a* designates a winding drum of the boom supporting winch 29, and reference numeral 29*b* designates an electric motor.

The boom C is mounted to the lift B having such a structure, i.e. the main stage 18 in the example shown.

In order to mount the boom C to the main stage 18 forming the lift B, the following mounting procedure is used in this mode.

The boom C is constituted by the inner boom C' and the outer boom C" assembled to the inner boom C' so as to be slidable.

The inner boom C' is mounted to a swinging table 33*a* of the boom swinging device 33 which is provided on the main stage 18, i.e. the lift B. The inner boom is vertically swingable using a shaft 34. The inner boom is operated by the boom supporting winch 29.

The boom swinging device 33 is constructed so that it uses a bearing 33*b* to rotatably arrange the swinging table 33*a* on a swinging table supporter 33*c* provided on the main stage 18, i.e. the lift B. The boom swinging device 33 is constructed so that a gear 33*d* provided on the circumferential surface of the swinging table 33*a* in the circumferential direction is meshed with a gear 33*f* of an electric motor 33*e* provided on the swinging table supporter 33*c,* and that the swinging table 33*a* of the boom swinging device 33, consequently the inner boom C' mounted thereto can be slewed so as to be swingable substantially in the horizontally direction (see FIG. 20).

The inner boom C' has the leading edge provided with the guide sheaves 32, and the inner boom is supported by the boom supporting winch 29. The inner boom has a lower part provided with sliding means 35 for the outer boom C".

The sliding means 35 for the outer boom C" is formed as an elongated groove-like frame which has a lower side 35*b* opened. The frame has side plates at the opposite sides in the width direction extended downwardly, and the side plates have lower edges bent inwardly to form U-character shape recessed portions to face each other. By such an arrangement, the slide means 35 has a pair of sliding grooves 35*a* and 35*a* extended in the longitudinal direction thereof and faced each other inside the opposite sides in the width direction. The outer boom C" is extensibly and withdrawably assembled to the slide means 35, in particular the sliding grooves 35*a,* and the outer boom C" has a lower portion, in particular an inspection platform 36 extended outwardly from the opening 35*b*.

The outer boom C" which is assembled to the slide means 35 provided on the inner boom C' has guide projections 37 formed thereon at the opposite sides in the longitudinal direction so as to be smoothly fitted into the sliding grooves 35 and 35. Using the guide projections 37, the outer boom C" is slidably incorporated into the sliding grooves 35 and 35 of the inner boom C'.

Figure 25:
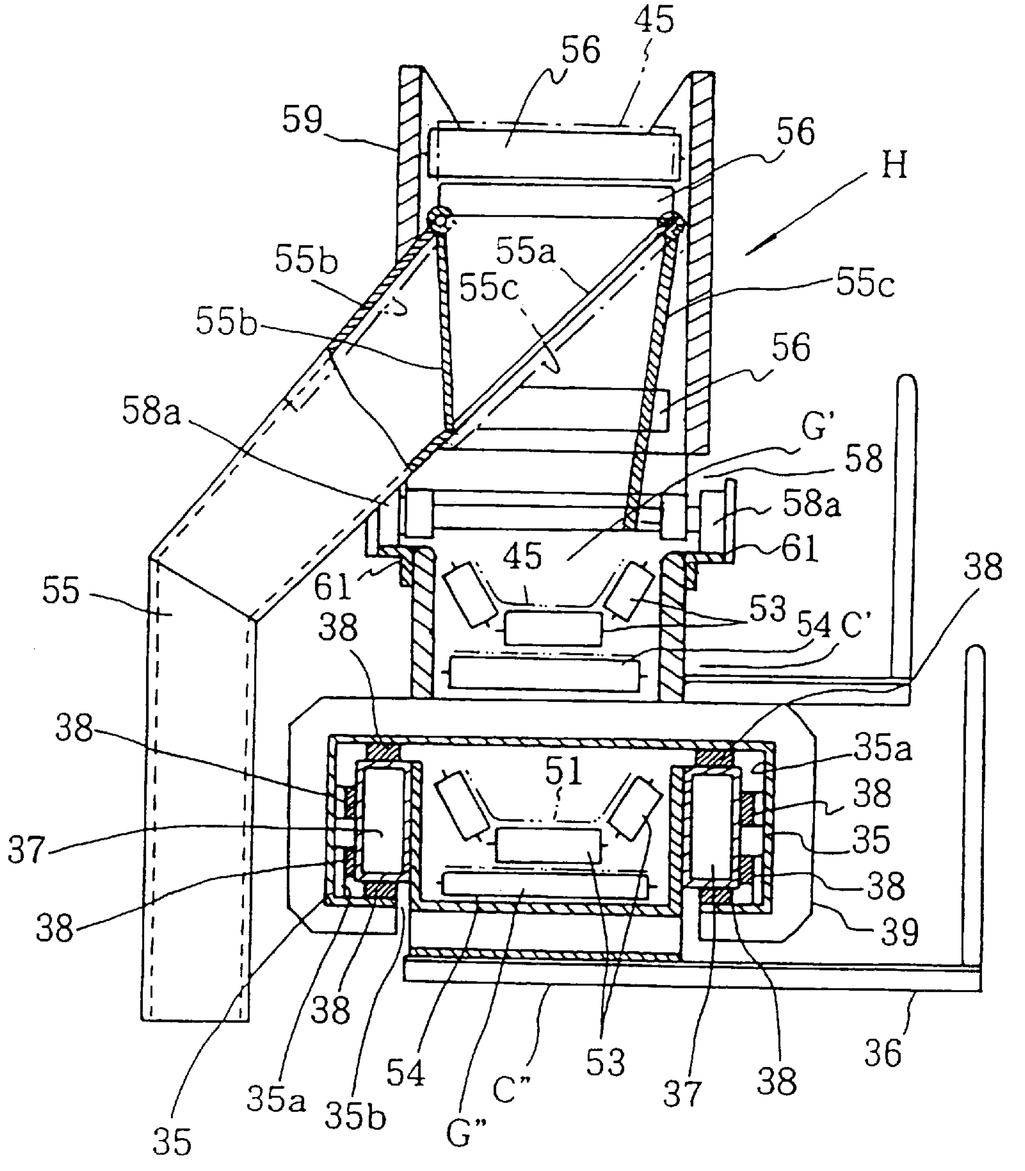
Figure 26:
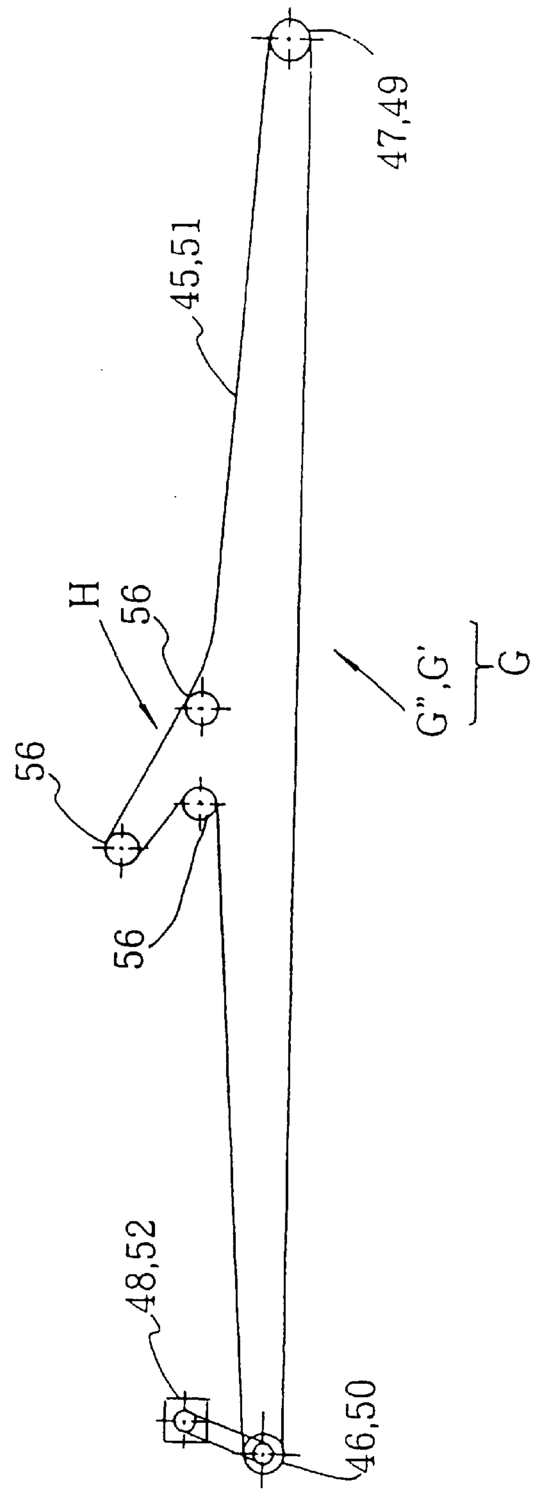

Reference numeral 38 designates slide shoes, and reference numeral 39 designates reinforcing ribs provided on the inner boom C' (see FIG. 25).

The outer boom C" is extended from and withdrawn into the slide means 35 as follows: Roller chains 42 which have ends 42*a* secured to an inner end 43 of the outer boom C" are passed around sprockets 41 which are provided on the inner boom C' and which are driven by an electric motor 40 arranged on the inner boom C'. The roller chains are passed around sprockets 44 which are arranged on inner surfaces of the leading end of the inner boom C', and the roller chains 42 have other ends 42*b* secured to the inner end 43 of the outer boom C". The outer boom C" can be extended from the slide means 35 of the inner boom C' and withdrawn into the slide means 35 by driving the roller chains 42 using the electric motor 40 (see FIG. 21).

The boom C having such a structure is provided with the belt conveyor G.

The belt conveyor G provided on the boom C is constituted by a first belt conveyor G' provided on the inner boom C' and a second belt conveyor G" provided on the outer boom C". The ready mixed concrete F which is supplied from the chutes 70 is received on the first belt conveyor G' through belt conveyors 28 which are located below the chutes 70 and transfer the concrete F laterally. The concrete received on the first belt conveyor is further transferred to the second belt conveyor G".

In detail, the first belt conveyor G' is located so that runs on the inner boom C' and above the slide means 35 with the extensible and withdrawable boom C" slidably assembled thereto. A conveyor belt 45 has a driving pulley 46 and a driven pulley 47 arranged at the leading edge and at the inner edge of the inner boom C', respectively. The conveyor belt 45 is passed around the pulleys in an endless manner, and an electric motor 48 is used to drive the conveyor belt. The outer boom C" mounted to the slide means 35 is provided with the second belt conveyor G".

The second belt conveyor G" has a driven pulley 49 at the inner end 43 of the outer boom C" located below the belt conveyor 45 of the first belt conveyor G'. A conveyor belt 51 is endlessly extended between the driven pulley and a driving pulley 50 provided on the leading end of the outer boom C". The belt conveyor 51 is driven by an electric motor 52 provided on the leading end of the outer boom C".

The first and the second belt conveyors G' and G" which are provided on the inner boom C' and the outer boom C" are arranged in such a manner to be convenient for transferring the ready mixed concrete F, e.g. in such a manner wherein rollers 53 in a trough arrangement are located above return rollers 54 in a flat arrangement.

Below the chutes 70 and between the chutes and the belt conveyor G' are arranged the belt conveyors 28 and 28 which are relatively short and which transfer the ready mixed concrete F laterally. The ready mixed concrete F supplied from the respective chutes 70 and 70 are guided to the belt conveyor G' on the inner boom C', which is arranged at a substantially central portion between the chutes 70 and 70.

The respective belt conveyors G' and G" have the trippers H provided thereon as shown in FIGS. 23–26. The conveyed ready mixed concrete F can be supplied to concrete placing positions through chutes 55 of the trippers H at arbitrary positions on the conveyor belts 45 and 51, or can be supplied from the belt conveyor G' to the belt conveyor G".

For the trippers used in this mode, the trippers according to this embodiment is constructed as follows: The trippers H which are provided on the first belt conveyor G' and the second belt conveyor G" are constructed so that the respective conveyor belts 45 and 51 include tripper pulleys 56 and 56 to be bent in an S-character shape at a side with the ready mixed concrete F carried thereon, that the chutes 55 are arranged below the S-character shaped bent portions of the conveyor belts, and that the ready mixed concrete F which is carried on the respective belt conveyors G' and G" is directed out laterally or in front of the belt conveyors G' and G" through the chutes 55.

The respective trippers H and H include sloped guide surfaces 57 and travelling frames 59 with a truck 58 as travelling means. The sloped guide surfaces 57 have rollers 60, 60 . . . arranged between frames thereof. The conveyor belts 45 and 51 which have moved on the belt conveyors G' and G" are guided onto the rollers 60, 60 . . . , and the conveyor belts are downwardly directed at the top of the slopes and bent in the S-character shape not only to form receiving spaces for the chutes 55 but also to return the belts 45 and 51 onto the belt conveyors G' and G".

In the example shown, the tripper which is arranged on the belt conveyor G, in particular on the first belt conveyor G' is constructed as follows:

In the tripper H which is arranged on the first belt conveyor G', a cylindrical member which forms the chute 55 has a part of a bottom surface formed with an opening 55*a*. A cover plate 55*c* for closing the opening 55*a,* and a blocking plate 55*b* which partitions the inside of the chute 55 in the cylindrical member of the chute 55 are arranged on the chute so as to be openable and closable. The tripper H having such a structure may be provided on the outer boom C".

Because the tripper H has such a structure, the ready mixed concrete F transferred by the belt conveyor G can be selectively supplied to a concrete placing surface or to the belt conveyor G" of the outer boom C" from either the leading edge of the chute 55 or the opening 55*a* at any time.

In FIG. 25, there is shown the tripper H to facilitate understanding it. The blocking plate 55*b* can be downwardly swung to partition the inner space of the chute 55 substantially in the vertical direction, thereby preventing the ready mixed concrete F from moving to the discharge end of the chute 55. In addition, the cover plate 55*c* can be opened to take out the ready mixed concrete F from the opening 55 ahead of the tripper H.

On the other hand, when the cover plate 55*c* and the blocking plate 55*b* take the positions indicated by chain lines in FIG. 25, i.e. when the cover plate 55*c* is swung to a position to close the opening 55*a* and the block plate 55*b* is swung to adhere to an upper wall of the chute 55 so as to pass the ready mixed concrete F through the cylindrical chute 55, the concrete F can be taken out laterally of the tripper H.

Because the ready mixed concrete F which is transferred to the belt conveyors G' and G" must be placed while shifting the concrete placing positions, the trippers H are constructed so that wheels 58*a* of the trucks 58 can move on rails 61 and 61, that the wheels 58*a* are driven by electric motors 62 with reduction gears, and that moving and locating the trippers H is controlled by additional control means.

By such an arrangement, the tripper provided on the first belt conveyor G' can be arranged at the leading end of the inner boom C' to supply the ready mixed concrete F to the belt conveyor G" of the outer boom C", and to take out the concrete F laterally of the belt conveyor G' while moving the inner boom C'.

The tripper H provided on the second belt conveyor G" can take out the concrete F laterally from the belt conveyor G" while moving the outer boom C".

The tripper H provided on the second belt conveyor G" can be provided on the leading end of the outer boom C" to take out the ready mixed concrete F from the leading end of the belt conveyor G" while extending the outer boom C".

The tripper H may be provided only on the inner boom C'.

Moving and locating the truck 58 of each tripper H may be made by a wire rope of a winch for locating the truck instead of moving and locating the truck by the electric motor 62.

Using the lifting winch 63 and guide sheaves 64 and 64, the container-like carriers D are suspended by wire ropes 65 in the spaces 4 of the tower mast A having the belt conveyor G on the boom C, and the carriers can be moved to be raised and lowered in the spaces 4.

Raising and lowering operation of the container-like carriers D can be made using various lifting means.

In the example shown, the winch is used. The wire ropes 65 which are passed around a winding drum 67 rotated by an electric motor 66 provided on the main stage 18 have one side of ends secured to the carriers D, and the wire ropes 65 are guided to the tops of the spaces 4 of the tower mast A by the guide sheaves 64, 64, thereby suspending the carriers D in the spaces 4 so as to smoothly move the carriers in the vertical direction.

Reference numeral 68 designates an electromagnetic brake, and reference numeral 69 designates a reduction gear unit.

Figure 27:
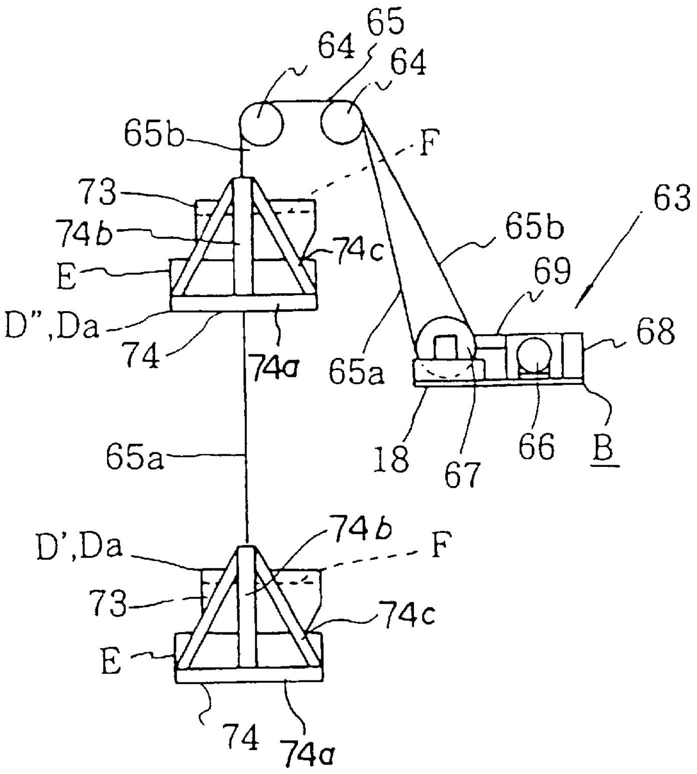
Figure 28:
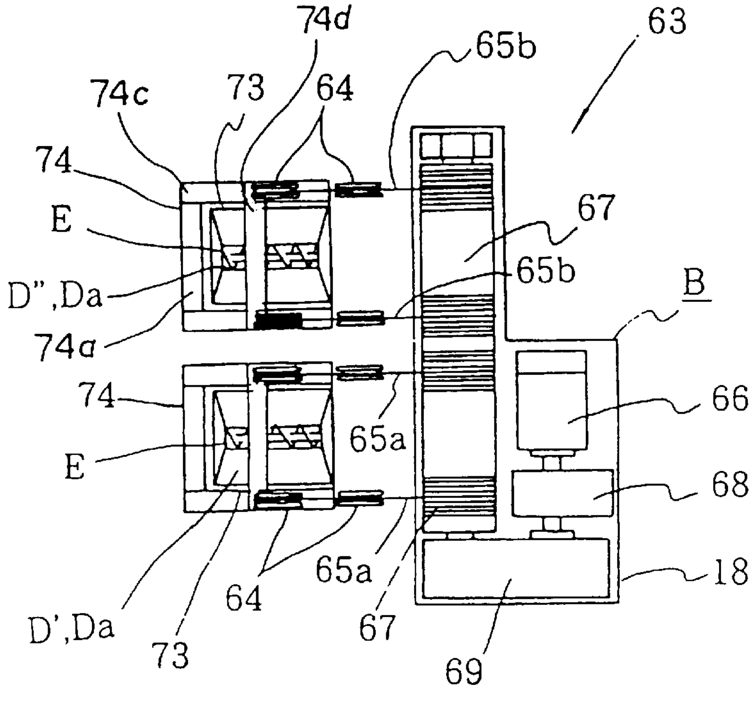
Figure 29:
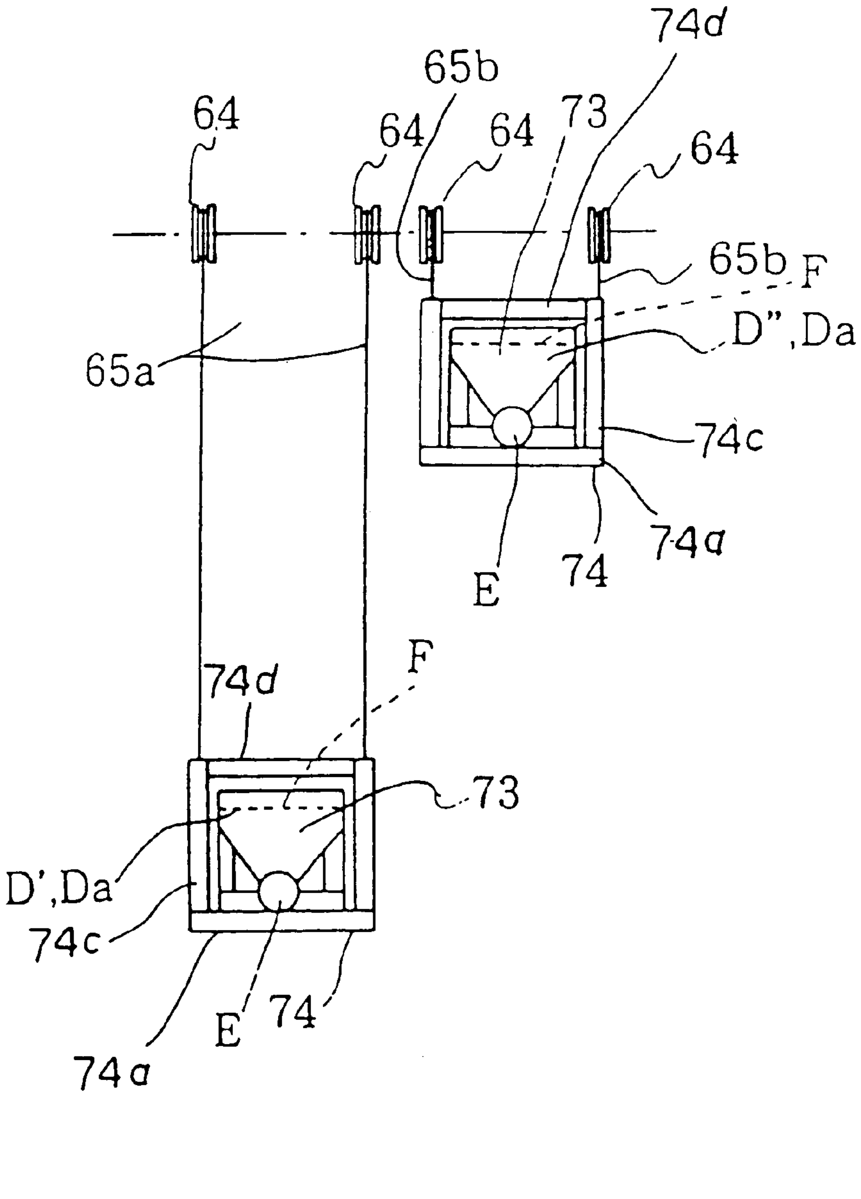

In FIGS. 27–29, there is shown a first example of the lifting means for the carriers D.

The carriers D are arranged so that the two carriers D and D are side by side in the spaces 4 of the tower mast A. One of the carriers D' is secured to the wire ropes 65*a* wound on the winding drum 67 from the lower side thereof, and the other carriers D" is secured to the wire ropes 65*b* wound on the winding drum 67 from the upper side thereof.

As a result, when the winding drum 67 is rotated by the electric motor 66, either one of the carriers D is raised, and simultaneously the other carrier D is lowered, thereby decreasing the load applied to the electric motor 66 during the lifting operation of the carriers D.

In the example shown, when one of the carriers D, D raised and lowered in the spaces 4 of the tower mast A takes the lowest position to receive the ready mixed concrete F from a supply hopper 71, the other carrier D takes the highest position to quantitatively supply the concrete F from the chute 70 onto the belt conveyor G through the belt conveyor 28, thereby presenting an arrangement wherein the carriers are alternatively raised and lowered between the chutes 70 and the hopper 71 with good timing.

Figure 30:
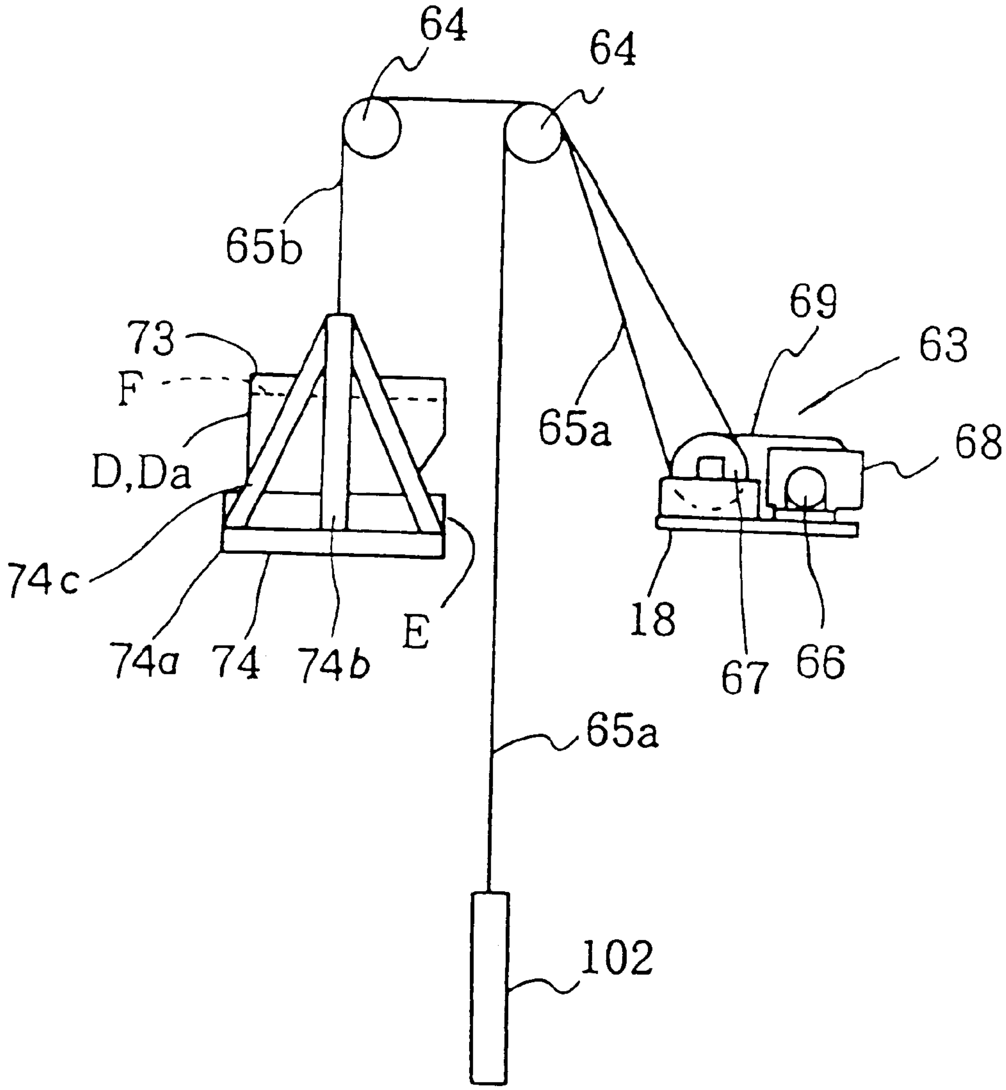
Figure 31:
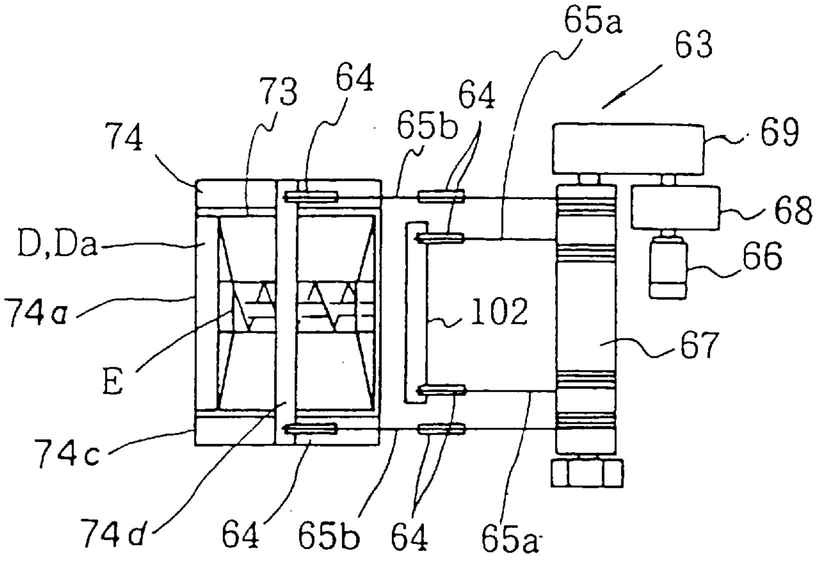

In FIGS. 30 and 31, there is shown a second example of the lifting means for the carriers D. The carriers D, D are arranged so as to be suspended in the spaces 4, 4 of the tower mast A, and the respective carriers D, D include the respective lifting winches 63 for raising and lowering the carriers independently. The wire ropes 65 which are wound on the respective winding drums 67 from the lower side thereof are used as the wire ropes 65*a* to suspend counter weights 102, and the carriers D are suspended by the remaining wire ropes i.e. the wire ropes 65*b* wound on the winding drums from the upper side thereof.

The second example of the lifting means for the carriers D have the same structure as the first example of the lifting means shown in FIGS. 27–29 except that the counter weights 102 are used.

For this reason, constituent elements which are the same or substantially the same as the first example of the lifting means are indicated by the same reference symbols, and explanation on these elements will be omitted.

The chutes 70 which supply the ready mixed concrete F from the container-like carriers D to the belt conveyor G through the belt conveyors 28 are constructed so that each chute is swung around a shaft 70*a* by a torque actuator 70*b* to take a stand-up position when the related carrier D is passing through its related space 4, and that the chute 70 is swung by the torque actuator 70*b* to locate an upper opening of the chute 70 below an exit 72 of the carrier D when the carrier D has passed the chute 70 and located above the chute 70. The chutes 70 having such a construction are provided below the exits 72, 72 of the two carriers D, and are arranged on the stage post 18A provided on the main stage 18 in a stand-up position, being constructed to standup and tilt depending on the raising and lowering operating of the carriers D.

The container-like carriers D may be operated in such a manner that container-like carrier main bodies 73 are put on suspended tables 74, and that the suspended tables 74 are raised and lowered using the lifting winches 63, or that the container-like carrier main bodies 73 are directly raised and lowered using the lifting winches 63.

The suspended tables 74 are constructed so that they can be housed in the respective spaces 4, 4 defined by the main masts 3*a*, 3*a*, the auxiliary posts 3*b* and the cross bars 3*c* of the tower mast A, that they have a substantially square frame table 74*a* which has a pair of main posts 74*b* formed at central portions on both sides thereof, that auxiliary frames 74*c* are slantwise extended from corners toward the tops of the main posts 74*b*, that the tops of the main posts 74*b*, 74*b* are connected by a cross bar 74*d*, and that the wire ropes 65 are secured to the tops of the main masts 74.

The main posts 74*b* of the suspended tables 74 have outer surfaces provided with slide guides 90, and guide rails 89 which are vertically provided on the tower mast A are fit into the slide guides 90 through slide shoes 91, presenting a structure wherein the suspended tables 74 can be smoothly raised and lowered in the spaces 4 (see FIG. 19).

The container-like carrier main bodies 73 forming the container-like carriers D are constructed so that they have containers 73*a* for the ready mixed concrete F which have a lower portion provided with the supply means E for continuously and quantitatively feeding out the ready mixed concrete F. The carriers D having such supply means E are shown as container-like carriers Da in order to differentiate them from other types of carriers D, in particular container-like carriers Db without the supply means E, which will be explained later on.

Figure 32:
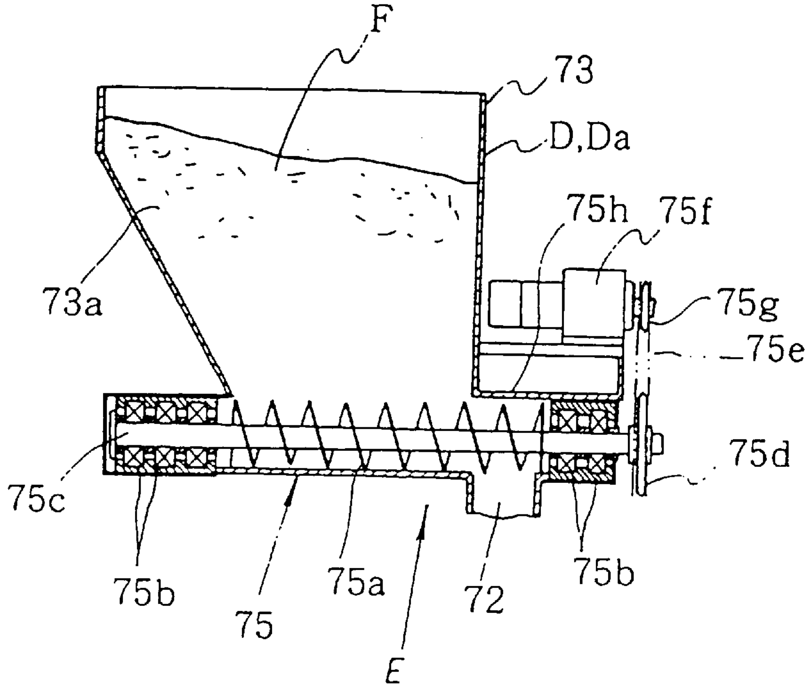
Figure 33:
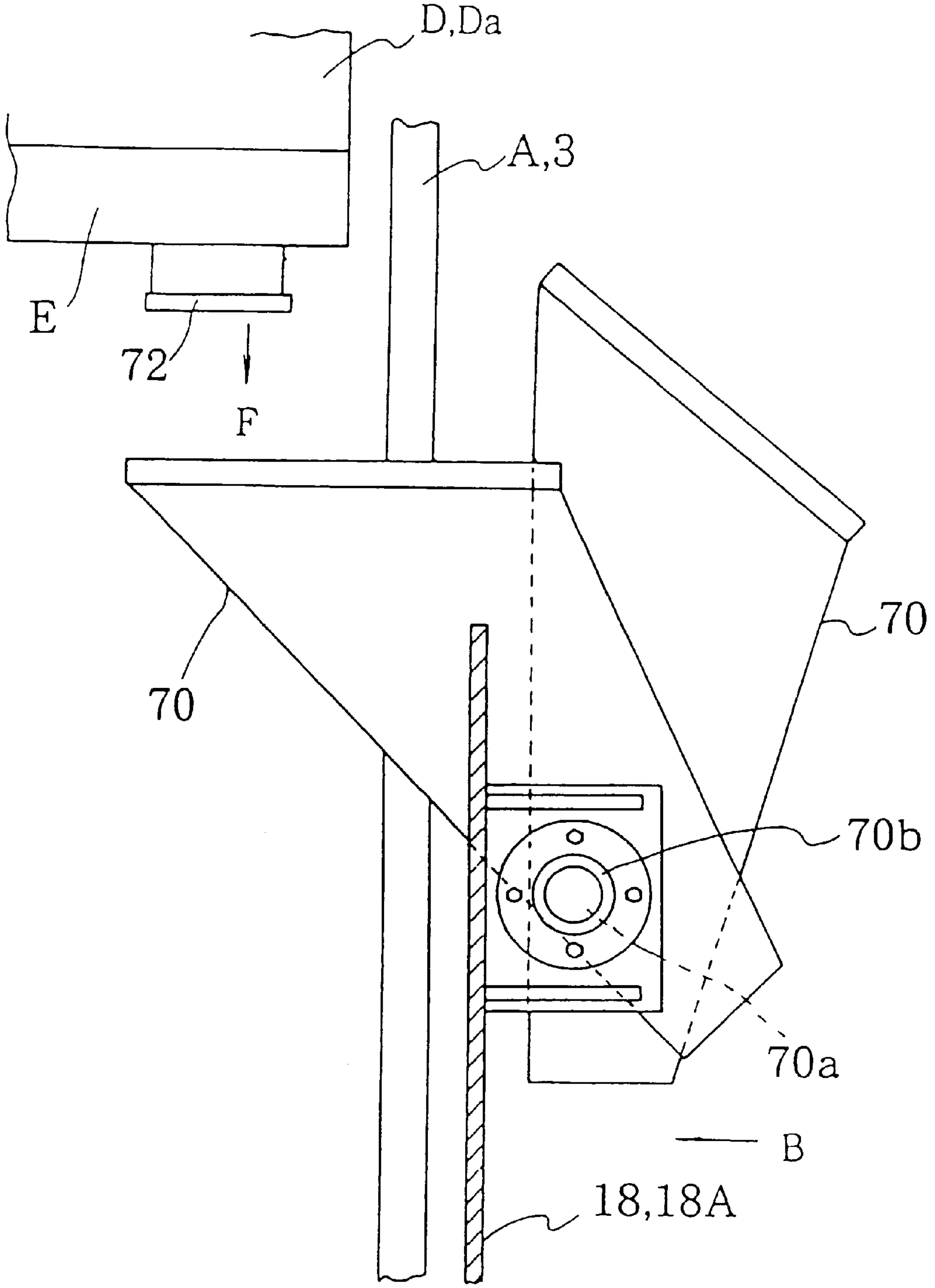
Figure 34:
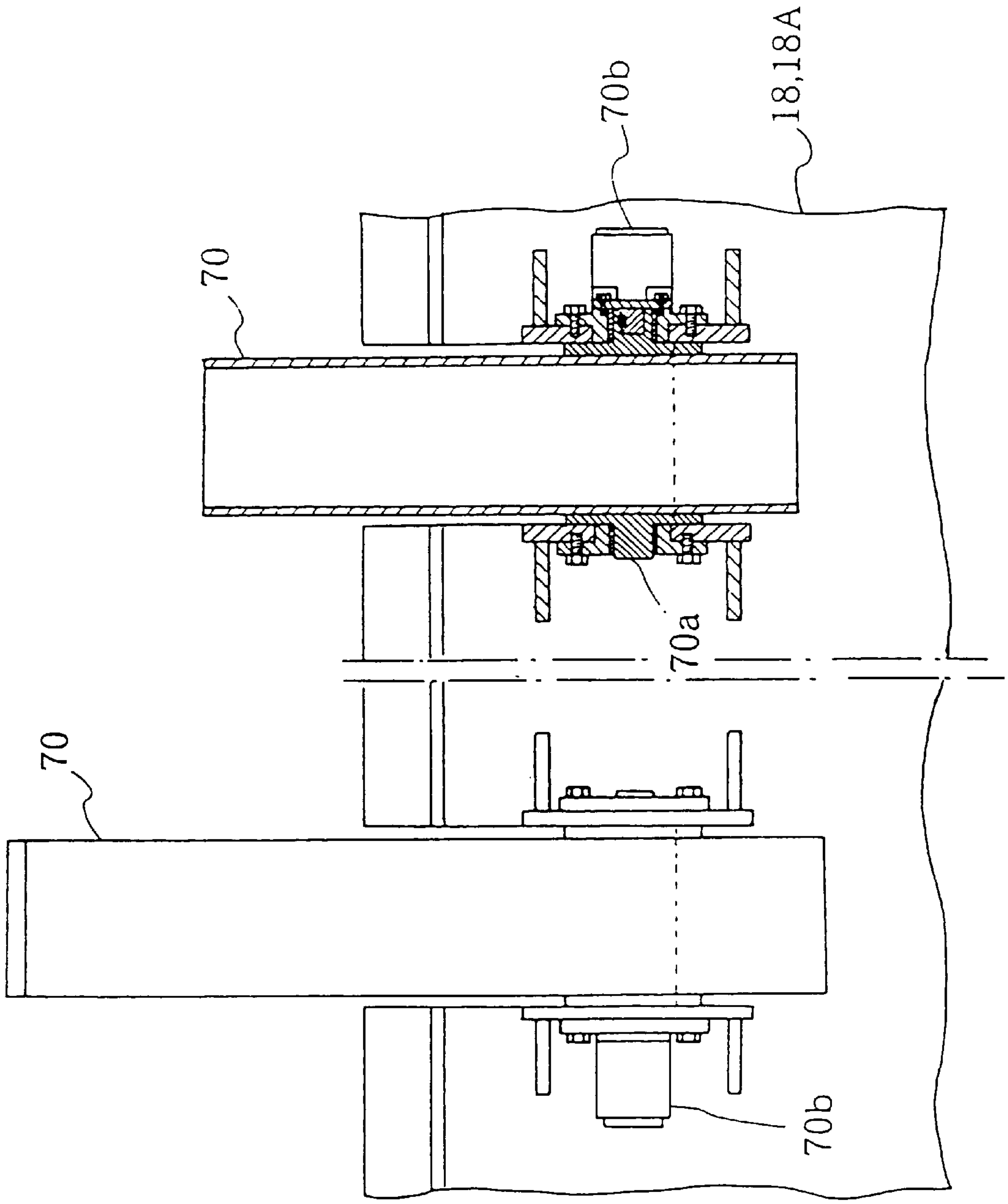

In FIG. 32, there is shown one of the container-like carriers Da which comprises the container-like carrier main body 73 having the container 73*a* provided with a screw feeder 75 as the supply means E for continuously and quantitatively feeding the ready mixed concrete F.

In each container-like carrier Da which includes the screw feeder 75 as the supply means E of a type to continuously and quantitatively supply the ready mixed concrete F, the discharge by the screw feeder 75 is set so that the ready mixed concrete F can be quantitatively and continuously taken out from the exit 72 by the screw feeder 75.

The screw feeder 75 has a structure appropriate to feed the ready mixed concrete F quantitatively and continuously, and includes a continuous supply screw 75*a* in the lower portion of the container 73*a*. The screw 75*a* has a front end toward the direction of feeding the concrete F housed in a cylindrical portion 75*h*. The inner peripheral surface of the cylindrical portion 75*h* cooperates with the screw 75*a* to quantitatively and continuously take out the concrete F in the container 73*a* from the exit 72 formed in the cylindrical portion 75*h* by rotation of the screw 75*a*.

Reference numeral 75*b* designates thrust bearings for bearing a shaft 75*c* of the screw 75*a*, reference numeral 75*d* designates a sprocket provided on the shaft 75*c*, and reference numeral 75*e* designates a chain which transmits torque to the sprocket 75*d* by a sprocket 75*g* of an electric motor 75*f*.

The supply means E having such a type which are provided the carriers D to continuously and quantitatively take out the ready mixed concrete F are not limited to the screw feeder 75, and may have any kinds of structure as long as they are means capable of quantitatively and continuously supplying the ready mixed concrete F from the carriers Da toward the belt conveyor G, or means capable of continuously and intermittently supplying the concrete F from the carriers Da onto the belt conveyor G while quantitatively sectioning the concrete.

Supplying the ready mixed concrete F to the carriers D is made in e.g. such a manner that the ready mixed concrete F which is supplied from a conveyor stage 76 beside the tower mast A is supplied to the hoppers 71 by belt conveyors 77, and then the concrete F supplied to the hoppers 71 is in turn supplied to the carriers D of the tower mast A.

In the supply of the ready mixed concrete F, the hoppers 71 are constructed so that the hoppers are introduced from outside the tower mast A into the spaces 4 within the mast frames 3 by guide means 79. When each carrier D has been moved downwardly in the related space 4 beyond a location to introduce the related hopper 71, the hopper 71 is introduced in the space 4 using the guide 79 to locate an upper opening of the carrier D just below the hopper 71, and the ready mixed concrete F is supplied from the hopper 71 to the carrier D.

The hopper 71 which has supplied the concrete F to the carrier D is brought out from the space 4 of the tower mast A guided by the guide means 79, avoiding an obstacle to the lifting operation of the carrier D by the winch 63.

The hoppers 71 have opening and closing means 78 provided thereon. The two hoppers 71, 71 are provided to correspond to the two carriers D. While one of the hoppers supplies the ready mixed concrete F to the related carrier D, the other hopper 71 receives the ready mixed concrete F from the related belt conveyor 77.

Figure 35:
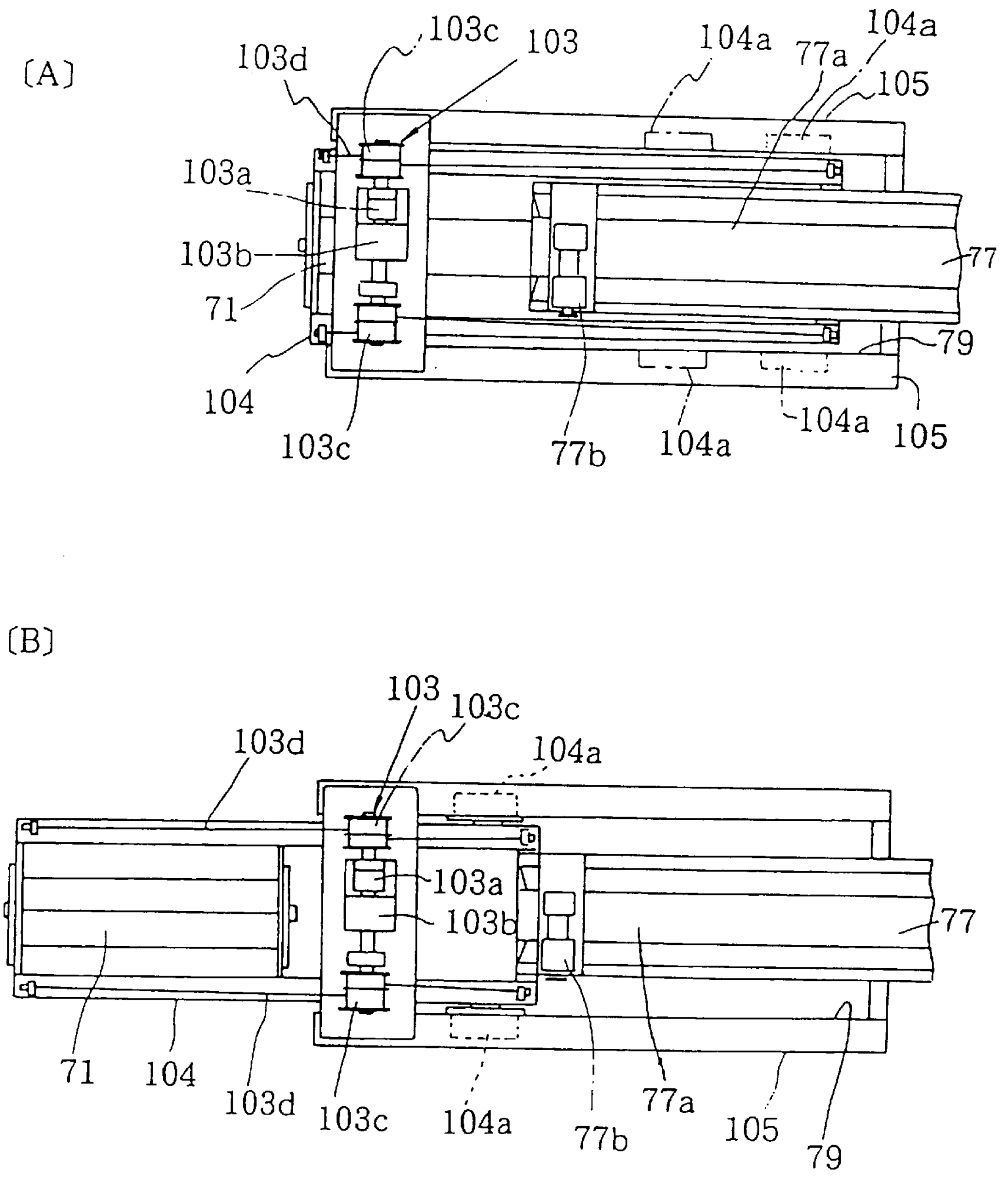
Figure 36:
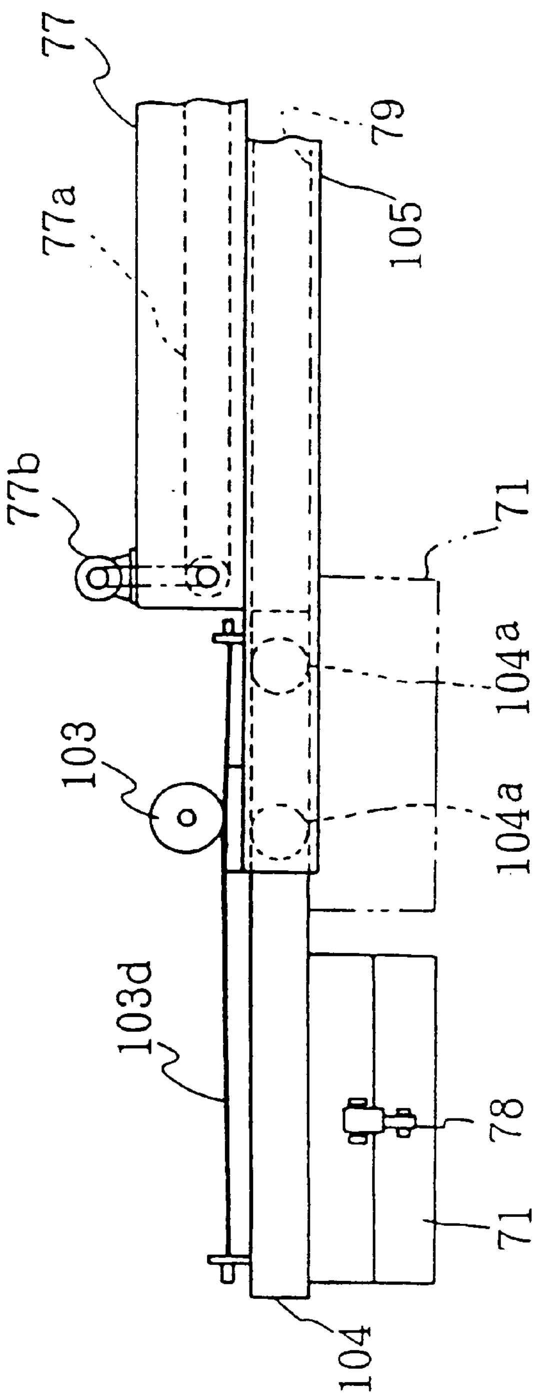
Figure 37:
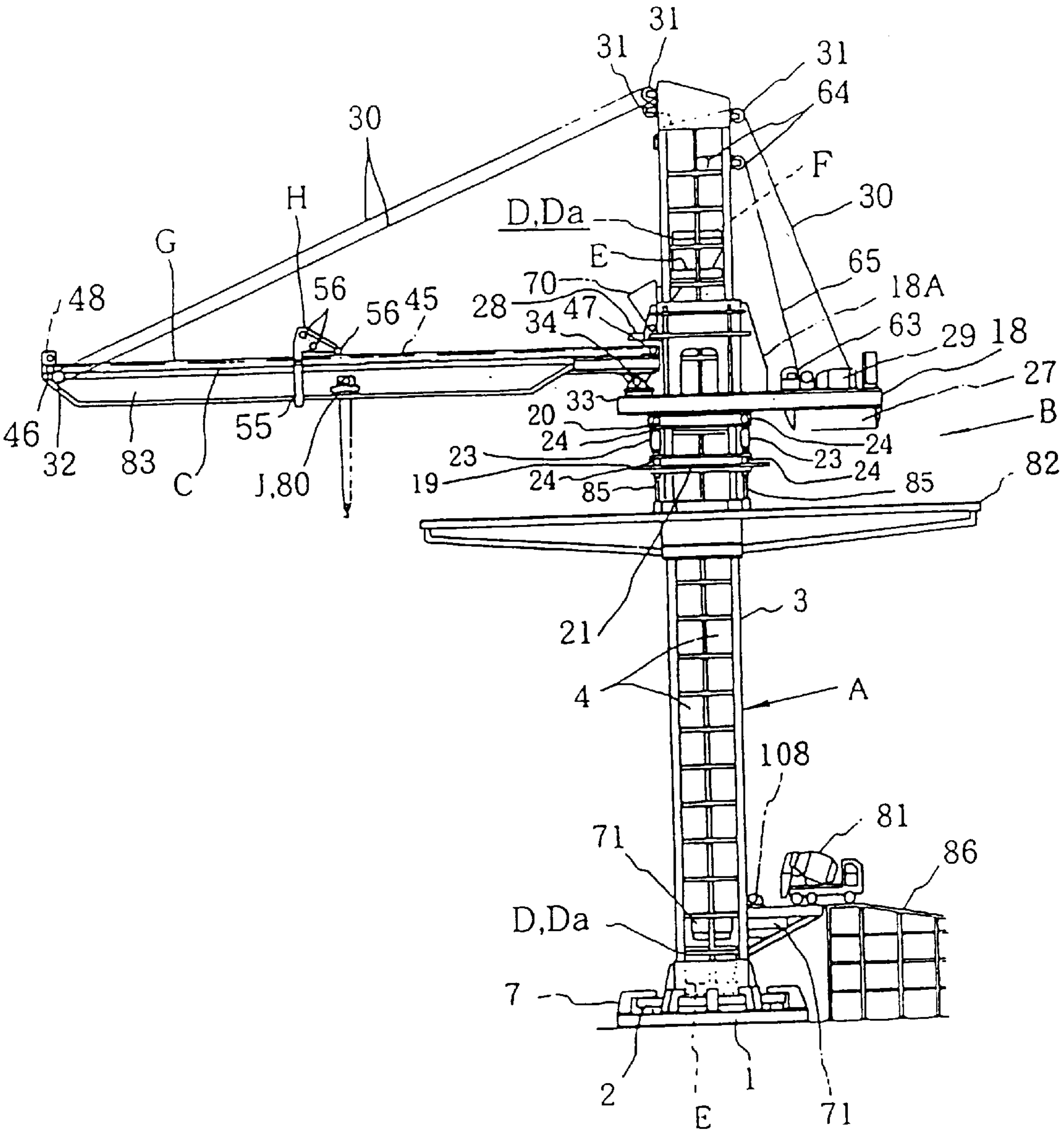
FIGS. 37–44 are views showing the ready mixed concrete conveying apparatus according to a second mode.
Figure 38:
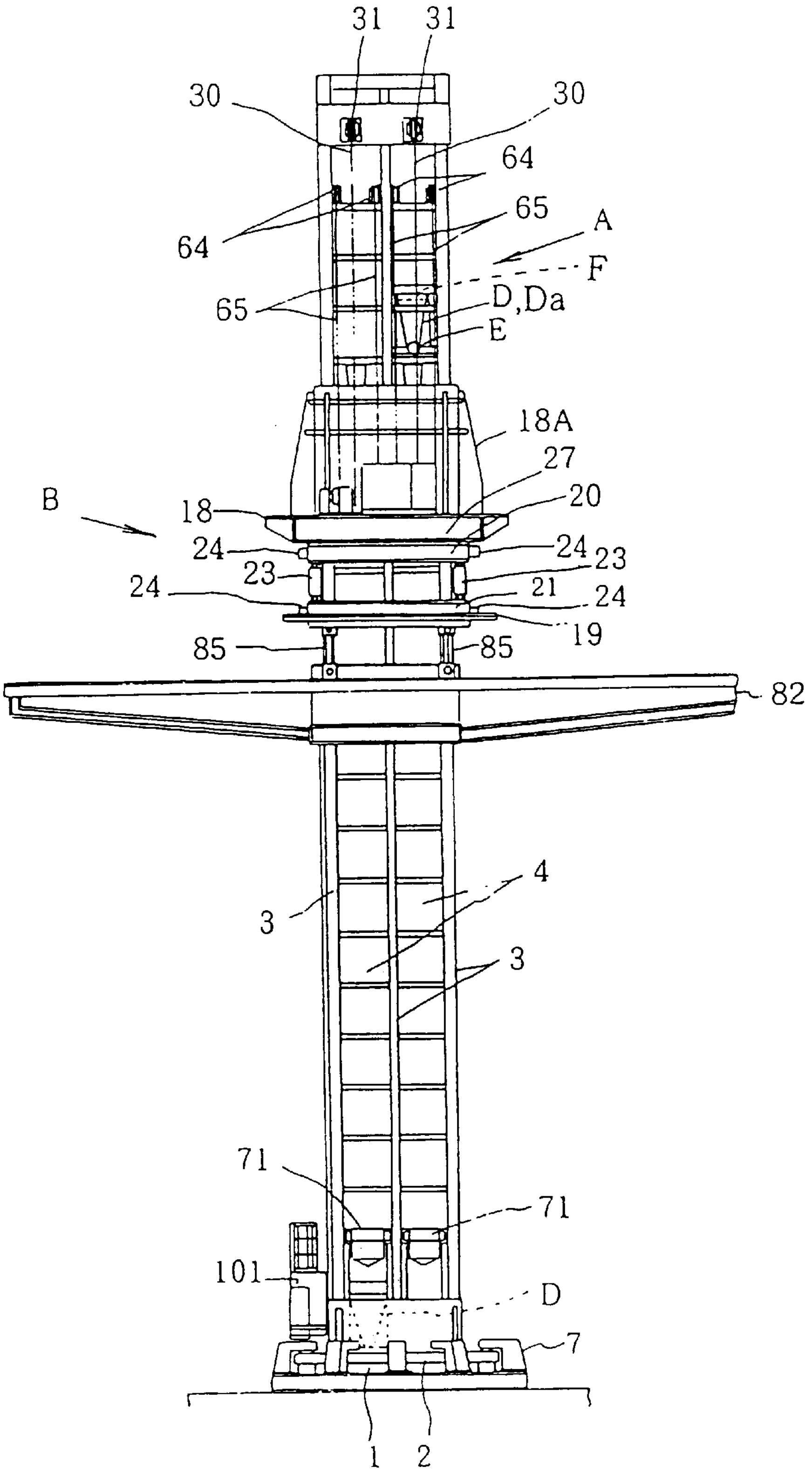
Figure 39:
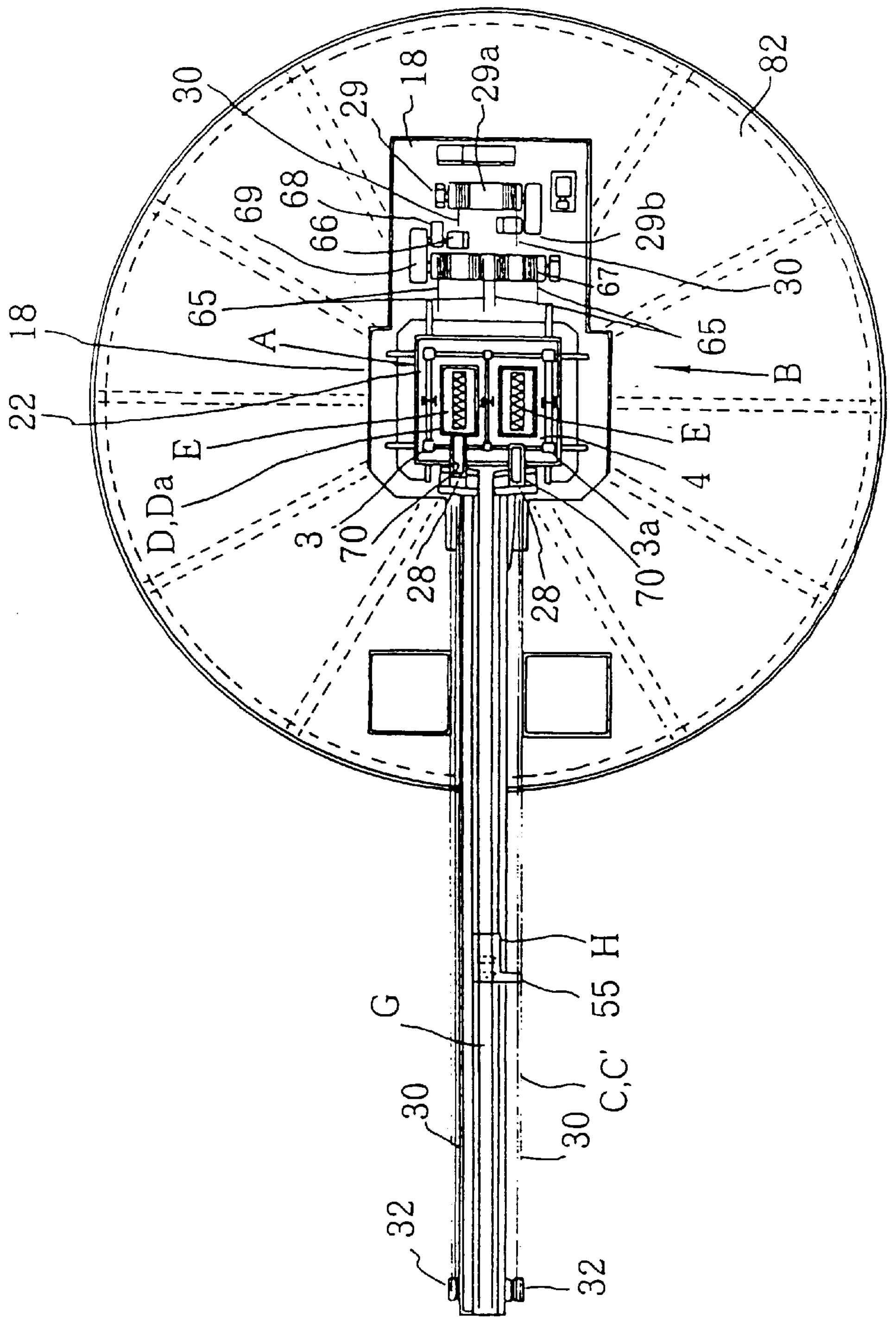
Figure 40:
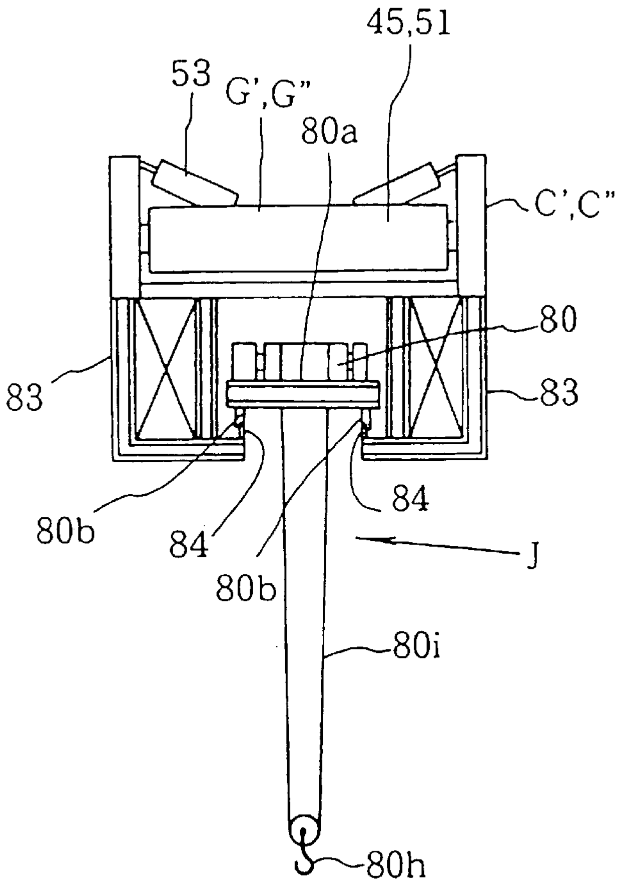
Figure 41:
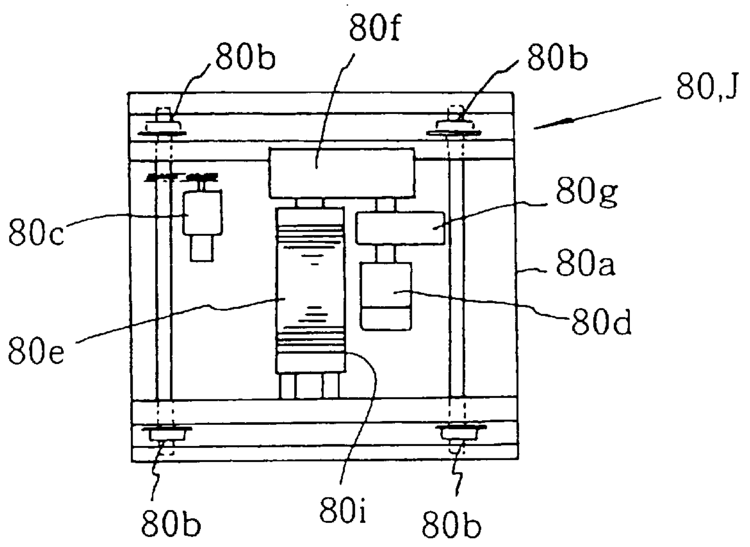
Figure 42:
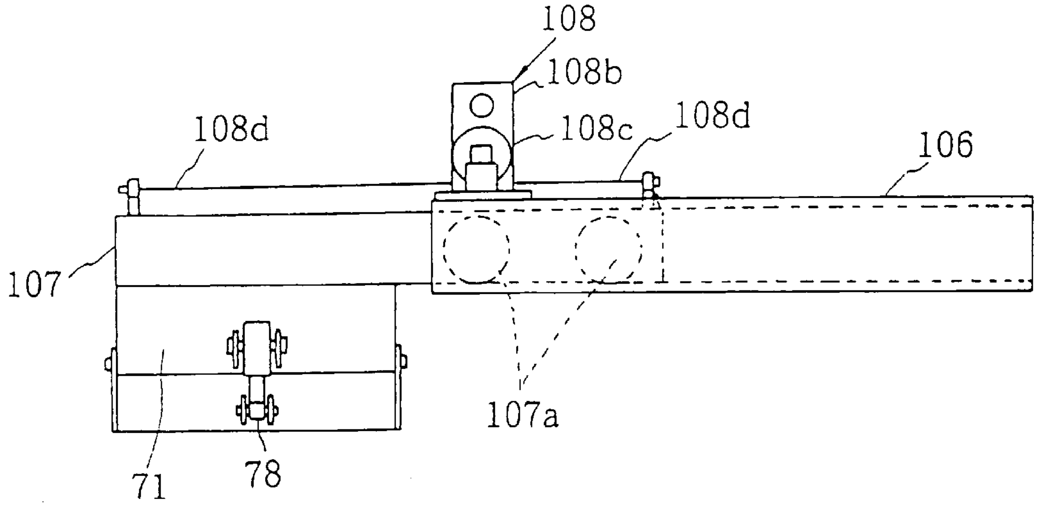
Figure 43:
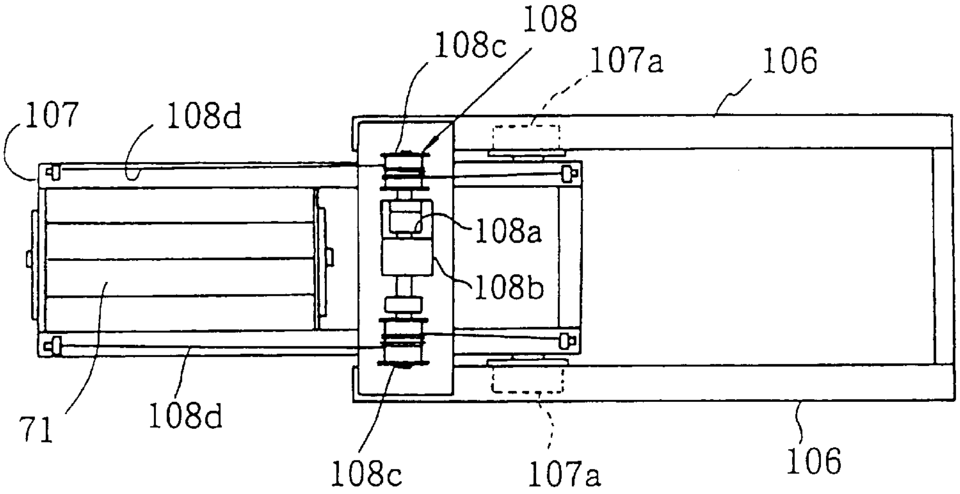
Figure 44:
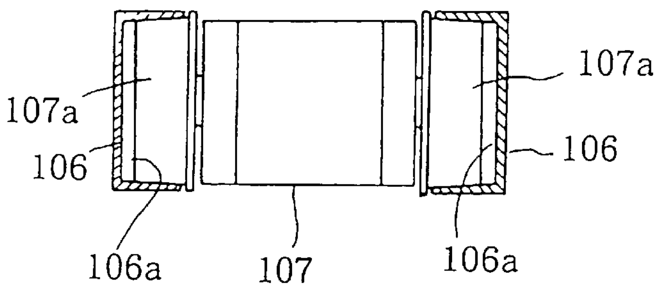
Figure 45:
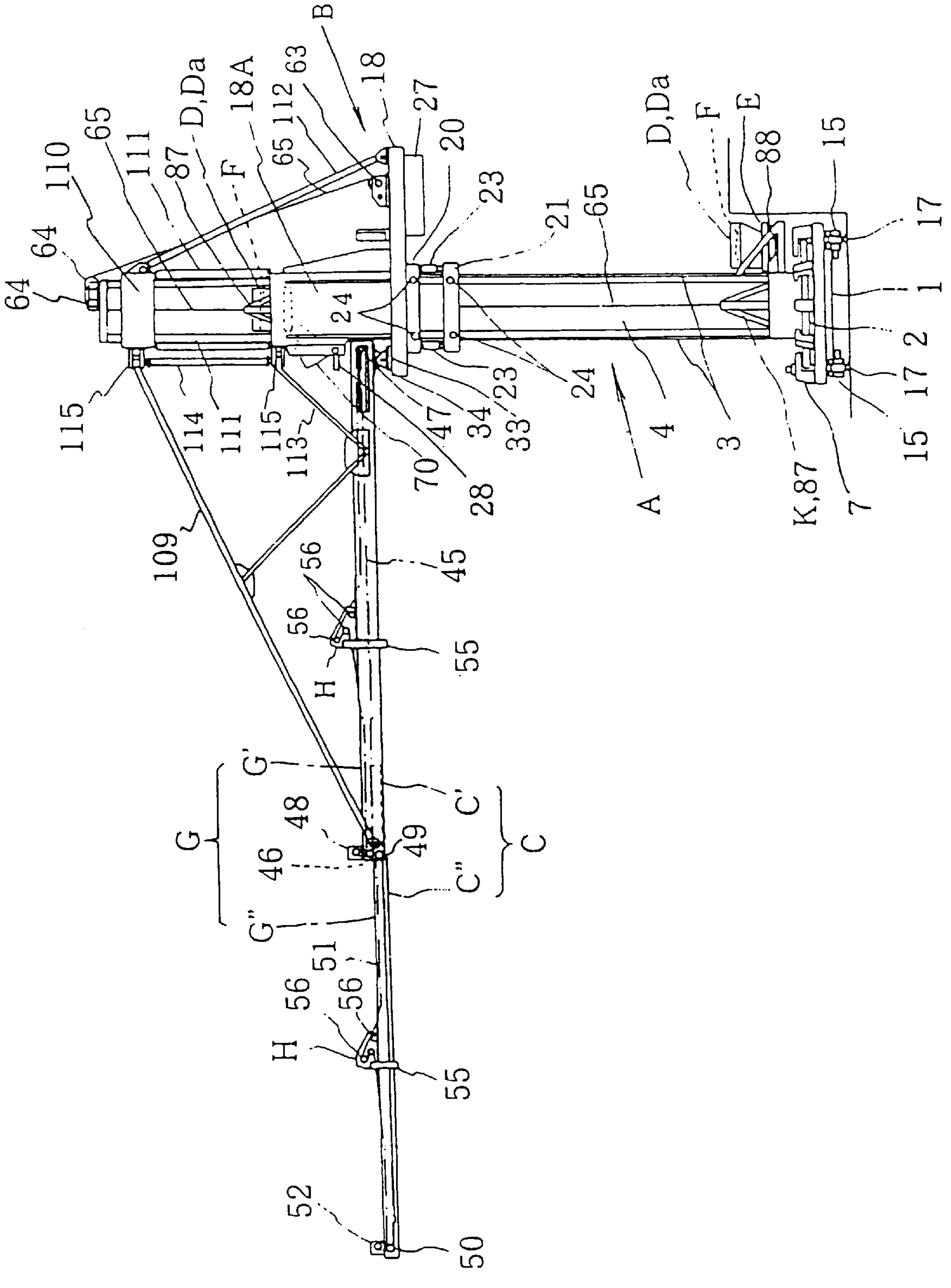
FIGS. 45–61 are views showing the ready mixed concrete conveying apparatus according to a third mode.
Figure 46:
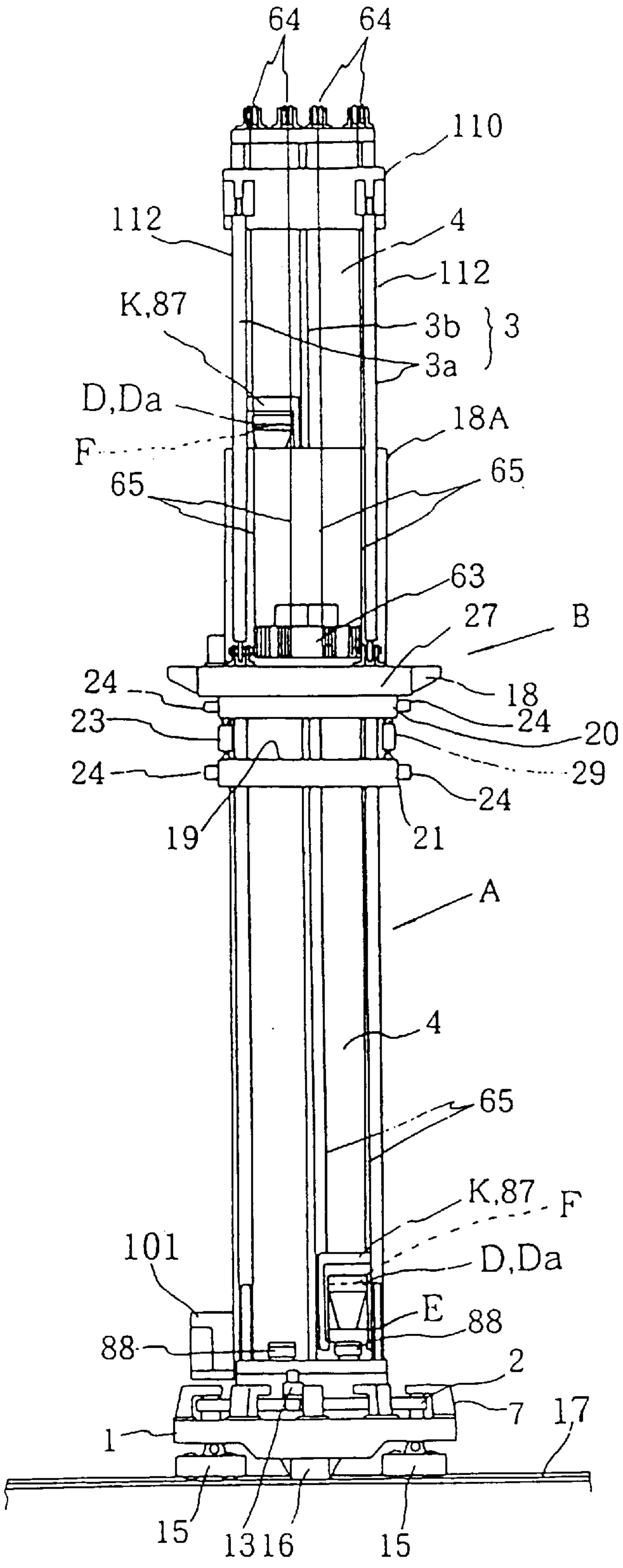
Figure 47:
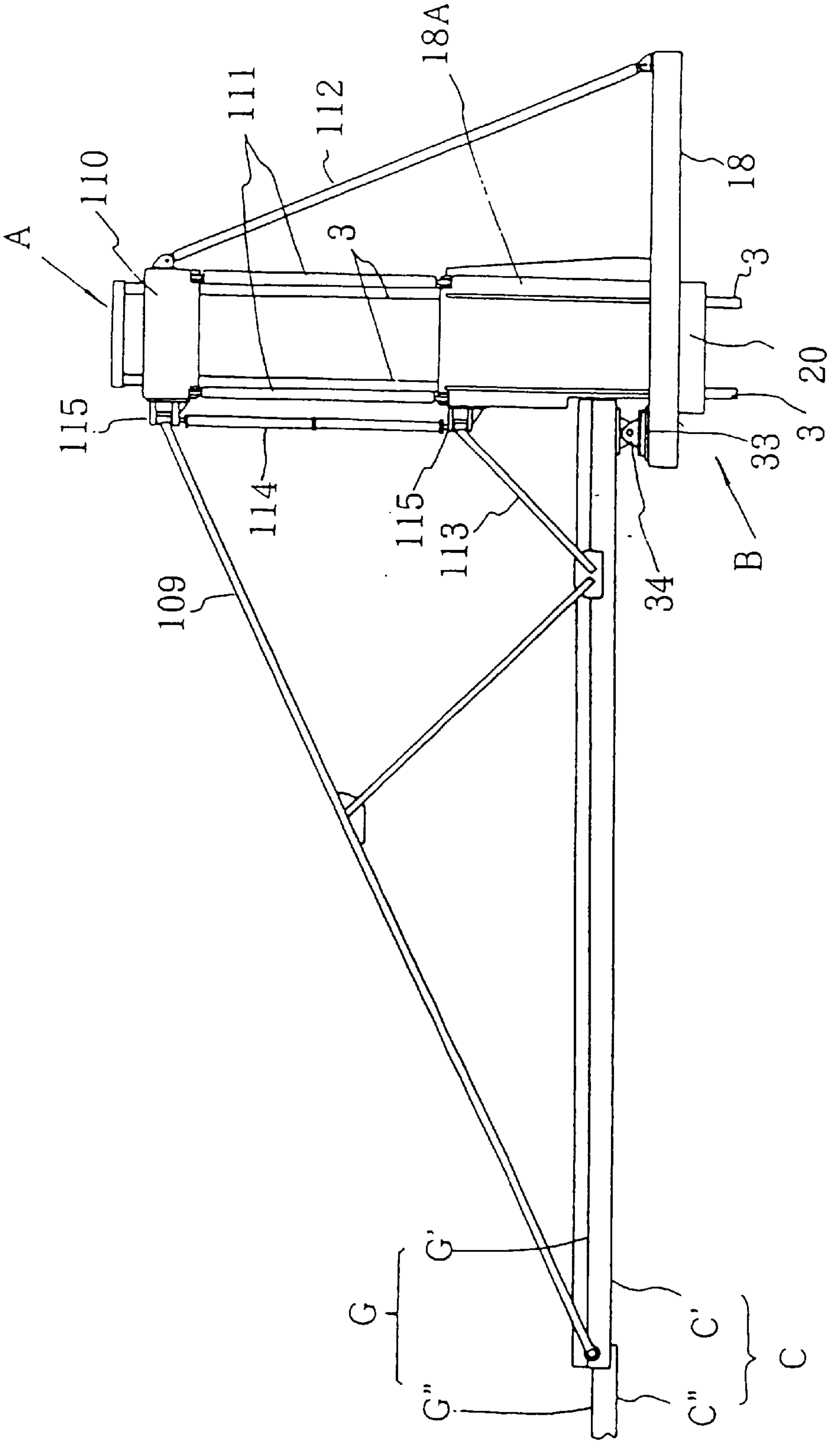
Figure 48:
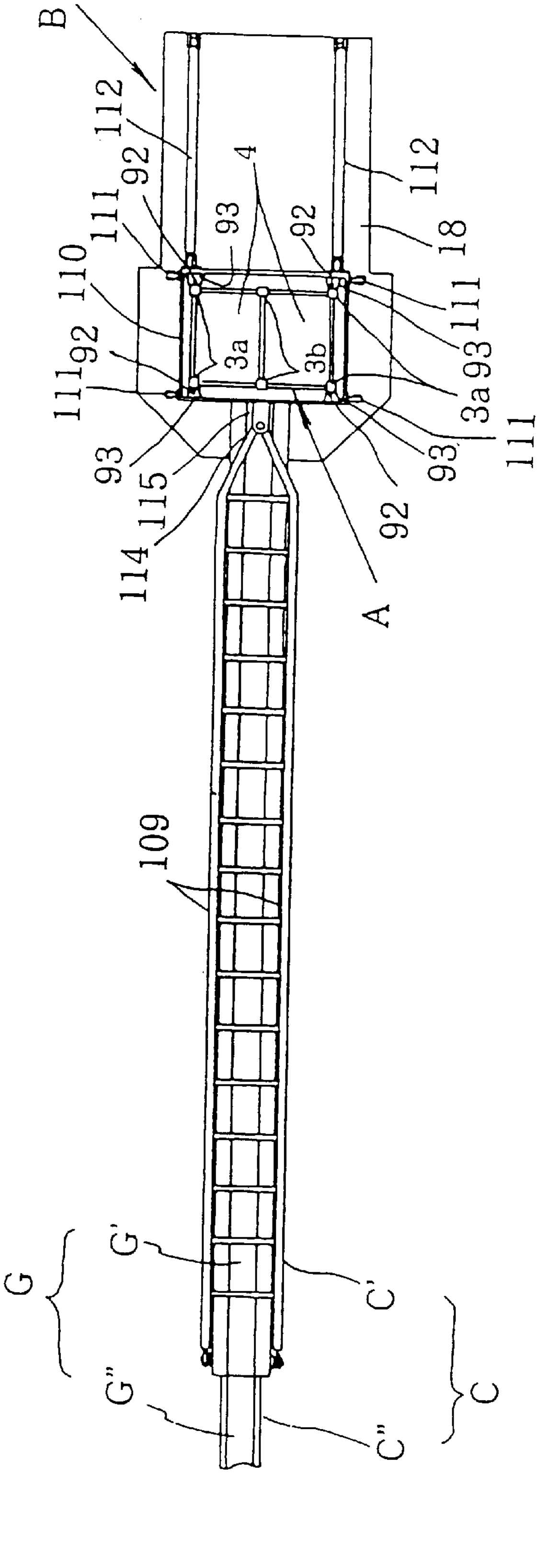
Figure 49:
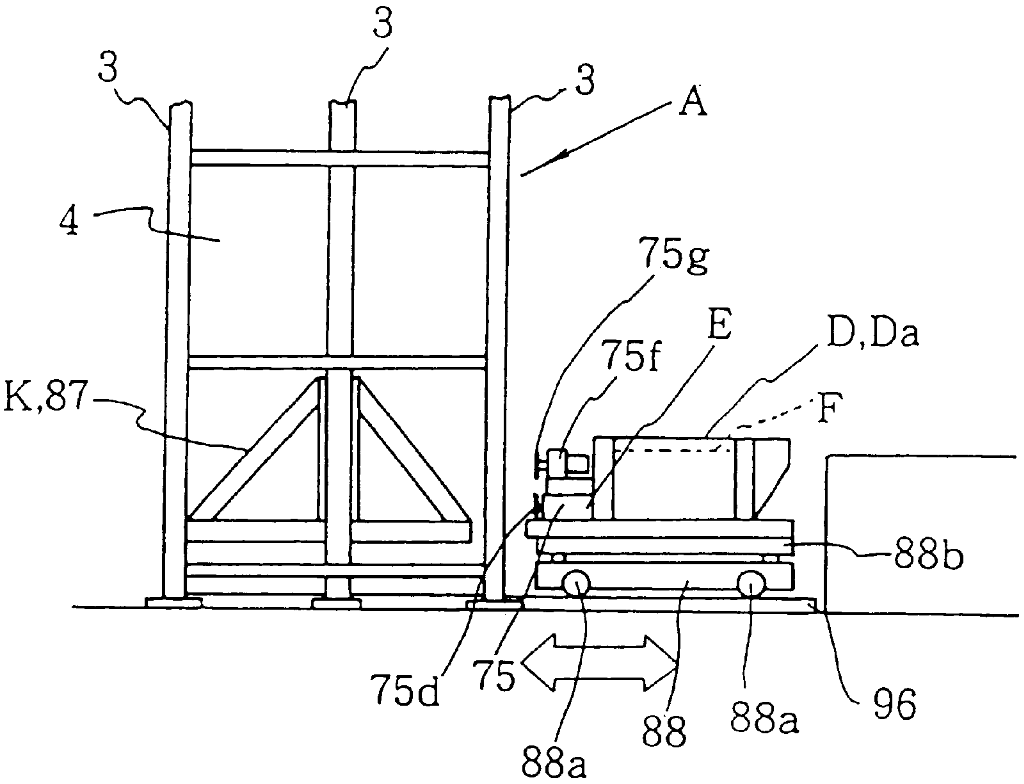
Figure 50:
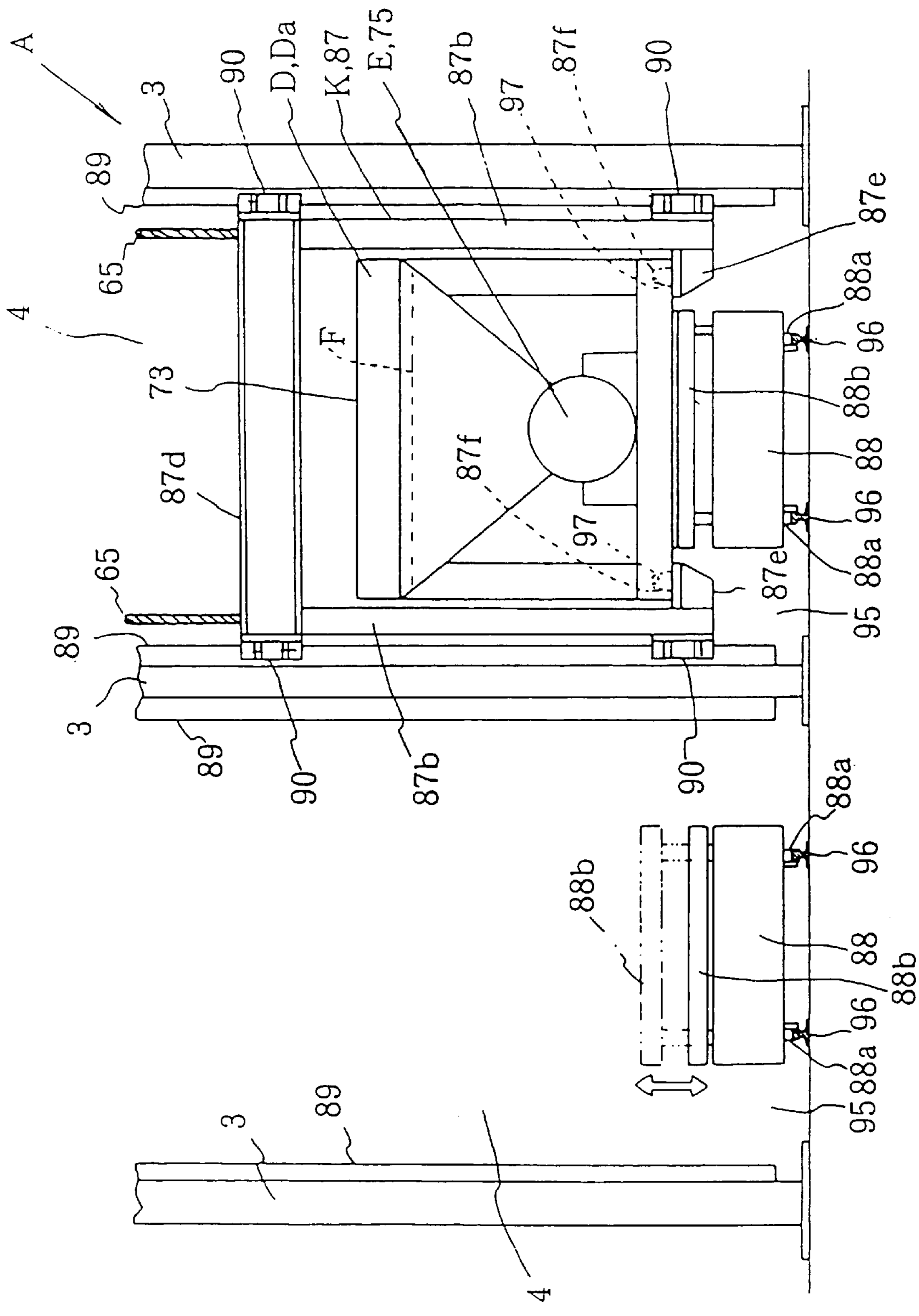
Figure 51:
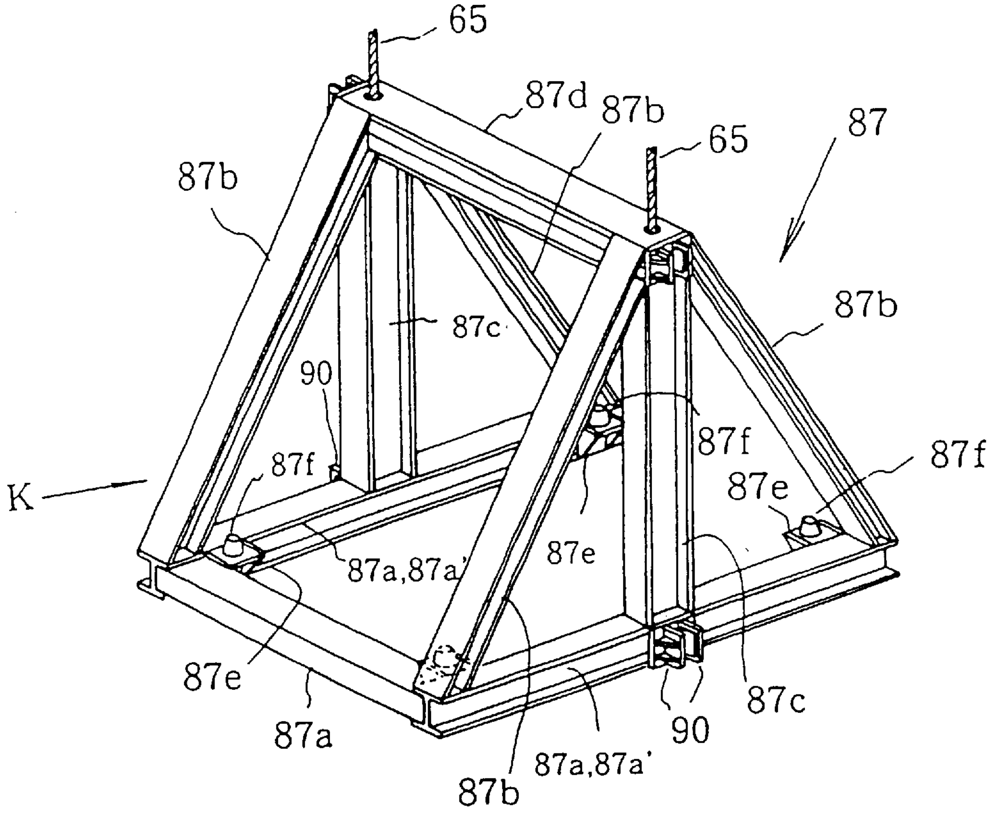
Figure 52:
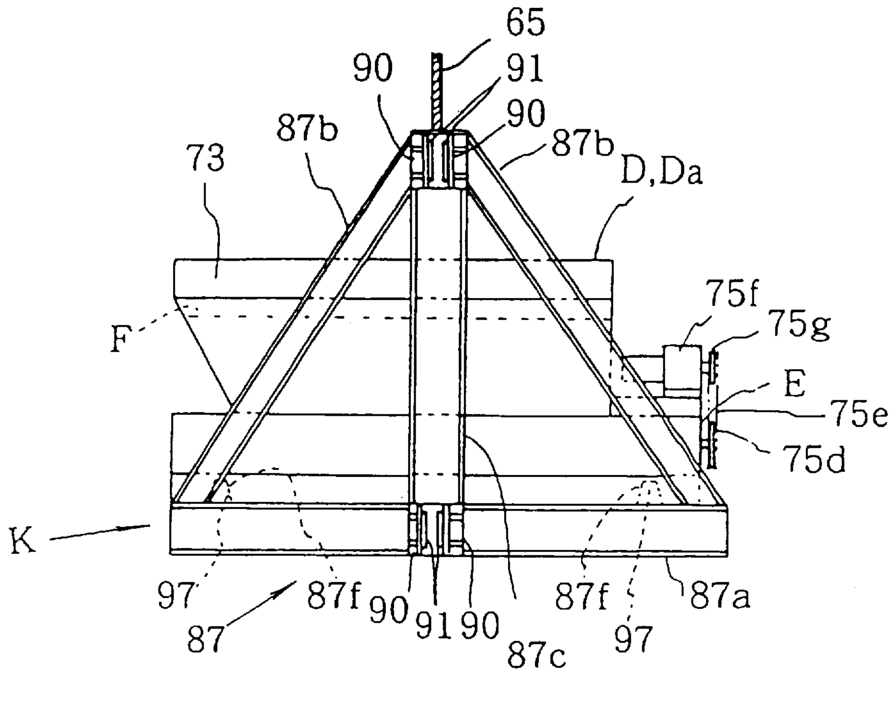
Figure 53:
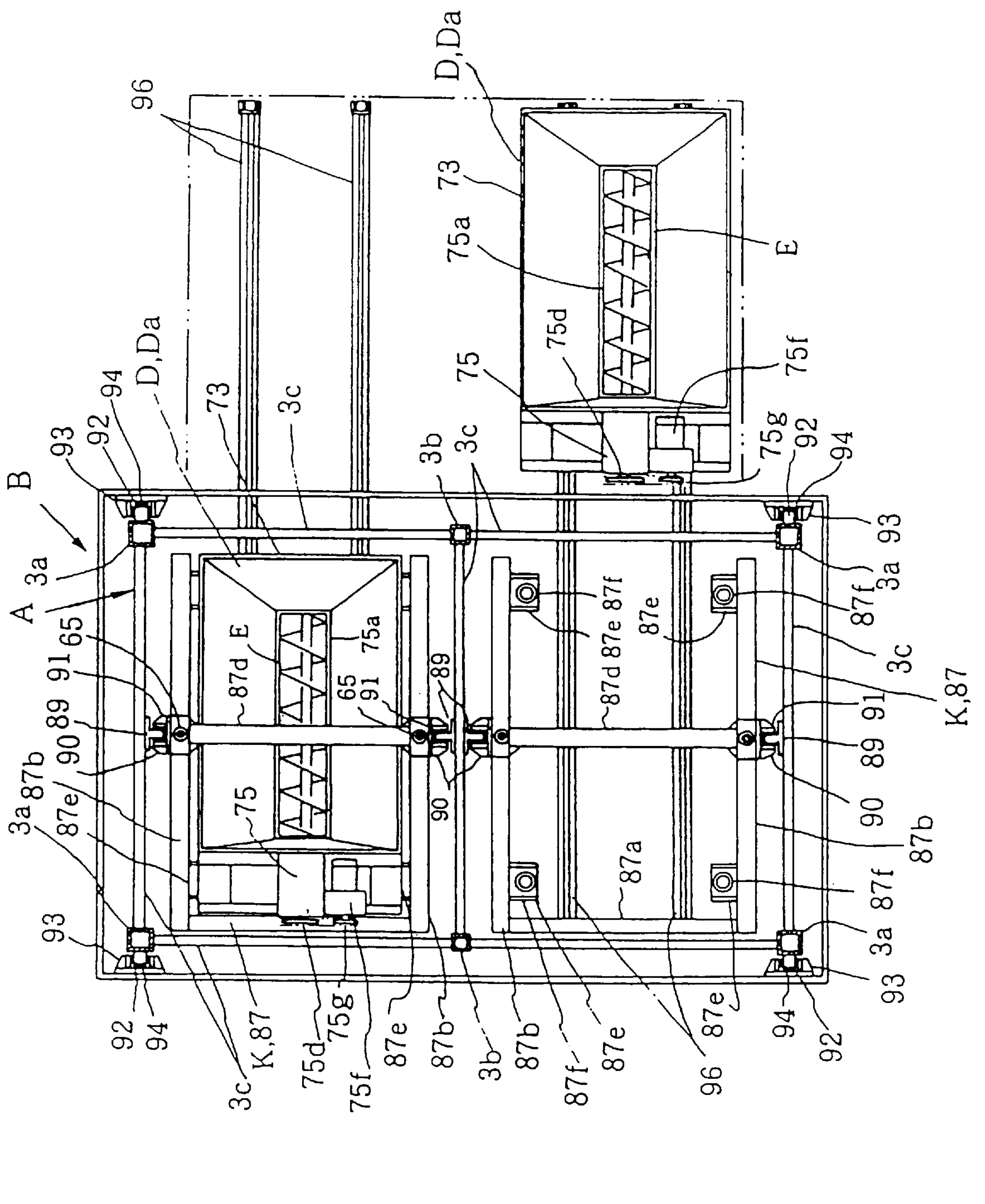

The hoppers 71 which receive the supply of the concrete F from the belt conveyors 77 are provided so that sliding frames 104 having the hoppers 71 are substantially horizontally slidable on racks 105 having the belt conveyors 77, and that the racks 105 have the guide means 79 provided thereon, as shown in e.g. FIGS. 35 and 36.

The sliding frames 104 have paired guide wheels 104*a* rotated along the guide means 79 on the racks 105, presenting a structure wherein the sliding frames 104 can be withdrawn into the racks 105 having the guide means 79 or be drawn out from the racks 105 having the guide means 79.

The drawing and withdrawing operation of the sliding frames 104 from the racks 105 is carried out by e.g. winching means 103 provided on the sliding frames 104.

In each winching means 103, wire ropes 103*d* which are wound on winding drums 103*c* driven by an electric motor 103*a* with reduction gears 103*b* have ends secured to a front end of the related sliding frame 104 and other rends secured to a rear end of the sliding frame 104, i.e. to a mounting side of the sliding frame to the related rack 105. As a result, the sliding frame 104, consequently the hopper 71 provided on the sliding frame 104 can be drawn below the related belt conveyor 77 of the rack 105, in particular, a position to receive the ready mixed concrete F supplied from the conveyor belt, and the hopper 71 with the ready mixed concrete F filled therein can be moved in the space of the tower mast A, in particular above the related carrier D.

The belt conveyors 77 are provided on upper sides of the racks 105, avoiding the sliding movement of the hoppers 71 slided along the guide means 79 below the racks 105. In order to supply the ready mixed concrete F independently to the paired carriers D which are provided in the paired spaces 4, 4 arranged side by side in the lower portion of the tower mast A, there are provided a pair of devices having the belt conveyors, and the corresponding hoppers 71 for the ready mixed concrete F, respectively.

In Figures, reference numeral 77*a* designates conveyor belts of the belt conveyors 77, and reference numeral 77*b* designates driving motors for the conveyor belts 77*a*.

In Figures, reference numeral 101 designates a gondola for inspection which is provided on the tower mast A to be liftable.

(2) Ready mixed concrete conveying apparatus according to a second mode

In FIGS. 37–44, there is shown the ready mixed concrete conveying apparatus according to a second mode.

The conveying apparatus according to the second mode is constructed so that it comprises the tower mast A, the lift B arranged on the tower mast A so as to be liftable, and the boom C which is arranged on the lift so as to be swingable.

The tower mast A is provided with the container-like carriers D used for conveyance of the ready mixed concrete F so as to be liftable.

The boom C is provided with the belt conveyor G for conveyance of the ready mixed concrete F which is supplied from the carriers D directly or through the transferring means additionally provided.

The boom C is provided with the tripper H which takes out the concrete F conveyed by the belt conveyor G from the leading edge of the belt conveyor G or at a position on the belt conveyor G.

The carriers D are provided with the supply means E for continuously and quantitatively feeding out the concrete F conveyed by the carriers D, and the carriers can continuously and quantitatively feed the concrete F onto the belt conveyor G.

In the conveying apparatus according to the second mode, the tower mast A is standed so as to rotatable, having the vertical axis thereof as a rotary axis.

The conveying apparatus according to the second mode has the same or substantially the same structure as the conveying apparatus according to the first mode except that the boom C comprises only the inner boom C', that the inner boom C' is provided with crane means J such as a hoist 80, that the tower mast A is directly fixed through turning means such as the turntable 2, that the ready mixed concrete F is supplied directly to the hoppers 71 by truck mixer agitators 81 without provision of the conveyor stage 76, and that there is provided an inspection stage 82.

The operation of the constituent elements and the functions performed by the constituent elements in the second mode are the same or substantially the same as those of the conveying apparatus according to the first mode.

The constituent elements which have the same or substantially the same structure and the same or substantially the same functions as those of the conveying apparatus according to the first mode are indicated by the same reference symbols, and explanation on these elements will be omitted.

The hoist 80 as the crane means J which is provided in the second mode uses reinforcing trusses 83, 83 as saddles which are downwardly extended from both side edges of the inner boom C' in the longitudinal direction. The reinforcing trusses which face each other have rails 84, 84 provided therein and the hoist 80 is arranged so as to run on the rails 84, 84.

In Figures, reference numeral 80*a* designates the main body of the hoist, reference numeral 80*b* designates wheels which runs on the rails 84, reference numeral 80*c* an electric motor as means for moving the hoist main body 80*a*, and reference numeral 80*d* designates an electric motor for a winding drum 80*e*. Reference numeral 80*f* designates a reduction gear unit for the motor 80*e*, and reference numeral 80*g* designates a brake for the motor which can operate a wire rope 80*i* with a hook 80*h*.

The working stage 82 is constructed so that it uses supporting poles 85 to be downwardly arranged on the lower lifting frame 21 as the climbing means which is provided with the auxiliary stage 19, and that it can be raised and lowered along the tower mast A by the climbing means together with the raising and lowering operation of the lifting frame 21.

In the second mode, the lift B is additionally provided with the working stage 82, and these members constitute, as one unit, the lift B which raises and lowers on the tower mast A.

The working stage 82 which is provided on the tower mast A is constructed so that it can raise and lower together with the lifting frame 21 with respect to the tower mast A in substantially the same way as the main stage 18, or more specifically that the working stage has an opening 22 formed therein to be mounted to the tower mast A so as to engage with the tower mast from outwardly, and the working stage is provided with slide guides to slidably house the guide rails provided on the mast frames 3, in particular the main masts 3*a*, inserted into the opening 22 in the same manner as the first mode.

Supplying the ready mixed concrete F to the hoppers 71 can be made so as to supply the concrete directly from the truck mixer agitators 81 into there, and there is provided a ramp 86 for truck mixer agitators 81 so as to be directed to the tower mast A.

In detail, there are provided the ramp 86 for the truck mixer agitators 81, and guide frames 106 which are extended into the tower mast A, in particular the mast frames 3 in this mode. Each guide frame 106 has a sliding frame 107 assembled thereto so as to slidable. In particular, each guide frame 107 has paired wheels 107*a*, 107*a* of the sliding frame 107 assembled thereto, having, as guides, grooves 106*a* of the guide frame which face each other in a U-character shape.

The sliding frame 107 is constructed so that it is moved along the guide frame 106 by an operating winch means 108 provided on the guide frame 106, and that wire ropes 108*d* which are wound around winding drums 108*c* rotated by an electric motor 108*a* with reduction gears 108*b* can have ends secured to one end of the sliding frame 107 and the other ends secured to the other end of the sliding frame 107 so as to move the sliding frame along the guide frame 106. Each sliding frame having such a structure is provided with the hopper 71, presenting a structure wherein the ready mixed concrete F from the truck mixer agitators 81 can be provided, at any time, to the carriers Da provided on the tower mast A.

The conveying apparatus according to the second mode having such a structure and shown in FIGS. 37–44 has the same or substantially the same as the conveying apparatus according to the first mode shown in FIGS. 5–36 in terms of the operating methods and the structure of the apparatus, such as the turning method and the structure of the tower mast A, the lifting method and the structure of the respective lifts B, the swinging method and the structure of the boom C, the lifting method and the structure of the carriers D, the function and the structure of the supply means E as means for quantitatively supply the ready mixed concrete F from the carriers Da, the method and the structure to supply the concrete F from the carriers D to the belt conveyor G using the chutes 70, the method and the structure to transfer the concrete F by the belt conveyor G, and the structure of the tripper H which feeds out the concrete F from the belt conveyor G to the chute 55.

The provision of the inspection stage 82 for working and the crane means J on the conveying apparatus of the ready mixed concrete F can convey various kinds of machinery and materials needed to placing the ready mixed concrete F at the same time as placing the ready mixed concrete, thereby streamlining e.g. dam construction.

The conveying apparatus for the ready mixed concrete F has no need for setting up a scaffold one by one when placing the ready mixed concrete for a smokestack or piers, and offers advantages in that a series of works such as conveying e.g. forms for placing the concrete, setting up forms, and removing forms can be carried out without scaffolds.

(3) Ready mixed concrete conveying apparatus according to a third mode

In FIGS. 45–61, there is shown the conveying apparatus according to a third mode.

The conveying apparatus according to the third mode is constructed so that it comprises the tower mast A, the lift B arranged on the tower mast A so as to be liftable, and the boom C which is constituted by two booms arranged on the lift B so as to be swingable.

The tower mast A is provided with the container-like carriers D used for conveyance of the ready mixed concrete F.

The boom C which is constituted by the inner boom C' and the outer boom C" arranged thereon so as to be extensible and withdrawable is provided with the belt conveyor G for conveyance of the concrete F supplied from the carriers D directly or through the transferring means additionally provided. The belt conveyor G is constituted by connected belt conveyors.

The boom C is provided with the trippers H which take out the conveyed concrete F from the leading edge of the belt conveyor G provided on the boom C, or at a portion of the belt conveyor.

The carriers D are provided with the supply means E for continuously and quantitatively feeding out the concrete F conveyed by the carriers D to the conveyance belt conveyor G directly or through the transferring means additionally provided.

In the conveying apparatus according to the third mode, the tower mast A is standed so as to be rotatable using the vertical axis thereof as a rotational axis.

In the conveying apparatus according to the third mode, the tower mast A is constructed so that it is movable along the rails 17 in the horizontal direction.

The conveying apparatus according to the third mode has the same or substantially the same structure as the conveying apparatus according to the first mode except that the boom C is supplied so as to be swingable only in the horizontal direction, and the boom C is coupled to the lift B by boom supporting frames 109, and that the container-like carriers D which are provided with the supply means E for continuously and quantitatively feeding out the concrete F can be introduced into the tower mast A and drawn out therefrom to be filled with the concrete F, and the carriers can be raised and lowered in the tower mast A by suspended frame tables 87 as the lifting carriers K.

The operation of the constituent elements and the functions performed by the elements are the same or substantially the same as those of the conveying apparatus according to the first mode.

For these reasons, the constituent elements which have the same or substantially the same structure as and perform the same or substantially the same functions as those of the apparatus according to the first mode are indicated by the same reference symbols, and explanation on these elements will be omitted.

In the conveying apparatus thus constructed, the tower mast A is provided so as to be turnable and movable like the conveying apparatus according to the first mode shown in FIGS. 5–36, and the lift B is arranged to the tower mast A so as to be liftable to a desired level like the conveying apparatus according to the first mode.

The boom C which is arranged on the lift B has the inner boom C' provided with the outer boom C" to be extensible and withdrawable in the same manner as the conveying apparatus according to the first mode, and the boom C is arranged on the lift B so as to be swingable by the swinging device 33 like the conveying apparatus according to the first mode.

In the conveying apparatus according to the third mode, the means for supporting the boom C is constituted by the boom supporting frames 109 without relying on the operation of the wire ropes 30 by the winch 29.

In detail, the boom C which has the innermost side supported to the lift B by the shaft 34 like the conveying apparatus according to the first mode has the outermost side of the boom C, in particular the outermost side of the inner boom C' suspended by the boom supporting frames 109.

The supporting frame 110 which is located above the lift B, is raised and lowered together with the lift B and forms a part of the lift B is arranged to the mast frames 3, 3 of the tower mast A so as to be engaged therewith from outwardly. The supporting frame 110 forming the lift B, and the boom C, in particular the front end portion of the inner boom C' are coupled by the boom supporting frame 109, and the boom C is suspended and held by the supporting frames 109.

The supporting frame 110 is formed as a frame body whose shape is substantially square in plan. The slide guides 93 which house the guide rails 92 provided on the outer surface of the mast frames 3 of the tower mast A are arranged on the inner surface of the supporting frame 110, presenting a structure wherein the supporting frame can be raised and lowered together with the lift B along the tower A, being guided by the guide rails 92 of the mast frames 3.

The supporting frame 110 is coupled to the lift B, in particular the stage post 18A of the main stage 18 by the poles 111, and is supported to the main stage 18 by supporting frames 112, forming a part of the lift B. The boom supporting frames 109 are provided to extend in the direction parallel with the supporting frames 112, and the boom supporting frames have the leading edges supporting the outermost side of the inner boom C'.

The boom supporting frames 109 are arranged on the supporting frame 110 so as to be swingable together with the boom C. In particular, in this embodiment, auxiliary frames 113 which are provided to extend from an inner side of the inner boom C' to an upper portion of the stage post 18*a,* and the boom supporting frames 109 are coupled by connecting poles 114, and the auxiliary frames and the boom supporting frames are mounted so as to be turnable on bearings 115, 115 on the supporting frame 110 and the stage post 18*a*.

Next, how to convey the container-like carriers D used in this mode will be explained.

In this mode, supplying the ready mixed concrete F to the carriers D is carried out without the hoppers 71.

The carriers D in this mode are not constructed so as to be suspended directly by the winches 63. The carriers D can be put on and drawn out from suspended frame rests 87 suspended by the winches 63, using motor-driven carts 88 with a lifter.

The suspended frame rests 87 used in this mode are provided to be vertically movable in the paired spaces 4, 4 which are provided as spaces defined by the mast frames 3, 3 . . . in the tower mast A to extend in the vertical direction.

Each suspended frame rests 87 has side frames 87*b* standed from opposite ends of a pair of frame members 87*a*', 87*a*' so as to form substantially isosceles triangles, the paired frame members facing each other to form a lower frame body 87*a* in a U-character shape. The side frames have tops secured to the tops of post frames 87*c* which are arranged so as to be standed from substantially central portions of the frame members 87*a*' as one unit. The tops of the side frames are coupled by an upper beam 87*d* as one unit. The paired frame members 87*a*', 87*a*' which face each other have inner sides supporting projections 87*e*, 87*e* . . . formed thereon so as to project therefrom to face each other.

The supporting projections 87*e* are formed with stoppers 87*f* in a substantially truncated corn shape for the carriers D to be guided.

In each suspended frame rest 87 having such a structure, the post frames 87*c* at both sides have top portions secured to the ropes 65 of the lifting winch 63, and the grooves in the slide guides 90 which are arranged on upper and lower portions of the respective post frames 87*c* house the guide rails 89 which are arranged on the inner surfaces of the mast frames 3 to extend in the vertical direction.

In Figures, reference numeral 91 designates the slide shoes.

The mast frames 3 where the suspended frame rests 87 are housed include the main masts 3*a*, 3*a* . . . at four corners of an imaginary plane defined in a rectangular shape, and the auxiliary posts 3*b*, 3*b* at substantially central portions of the longer sides of the imaginary plane. The main masts 3*a*, 3*a* . . . , and the auxiliary posts 3*b*, 3*b* . . . are coupled together by the cross bars 3*c*, 3*c* . . . to form the spaced 4, 4 for housing the paired suspended frame rests 87, 87.

The main masts 3*a*, 3*a* . . . of the mast frames 3 which form the tower mast A have outer surfaces provided with the guide rails 92 as one unit to extend in the vertical direction, and the guide rails 92 are housed in the grooves of the slide guides 93 so as to be slidable, the slide guides being arranged on the main stage 18, the auxiliary stage 19, the working stage 82 and the respective lifting frames 20, 21 forming the lift B.

In Figures, reference numeral 94 designates the slide shoes.

The mast frames 3 have a lower portion formed with openings 95, 95 for taking the motor-drive carts with a lifter in and out of there, there are provided rails 96 to move the motor-drive carts 88 with respect to the openings 95, and the motor-driven carts 88 are arranged on the rails so as to be movable.

The motor-driven carts 88 are formed to include motor drive wheels 88*a* and lifters 88*b*, respectively. The container-like carriers D which are put on the motordrive carts 88 are constructed so that they include e.g. screw feeder means as the supply means E of a quantitative supply type, and that they are the container-like carriers Da with the same structure as that of the conveying apparatus according to the first mode.

Each container-like carrier Da having such a structure is put on the related lifter 88*b*. The carrier is lifted up by the lifter 88*b*, and is taken into the related space 4 of the tower mast A from the related opening 95. After that, the lift-up state by the lifter 88*b* is released to lower the carrier and put it onto the supporting projections 87*e*, 87*e* of the suspended frame rest 87.

When the lifter 88*b* is lowered to support the carrier Da on the supporting projections 87*e*, the stoppers 87*f* on the supporting projections 87*e* are inserted into and engaged with holes 97 which are formed a lower surface of the carrier D.

In the ready mixed concrete conveying apparatus wherein the motor-driven carts 88 are used to take the carriers D into the tower mast A in that manner, for example, a supply system 98 using a belt conveyor can be used to supply the ready mixed concrete F to the carriers D. For example, a supply system 99 by a transfer carrier may be used to supply the concrete F. For example, a supply system 100 by truck mixer agitators may also be used to supply the concrete F.

Figure 54:
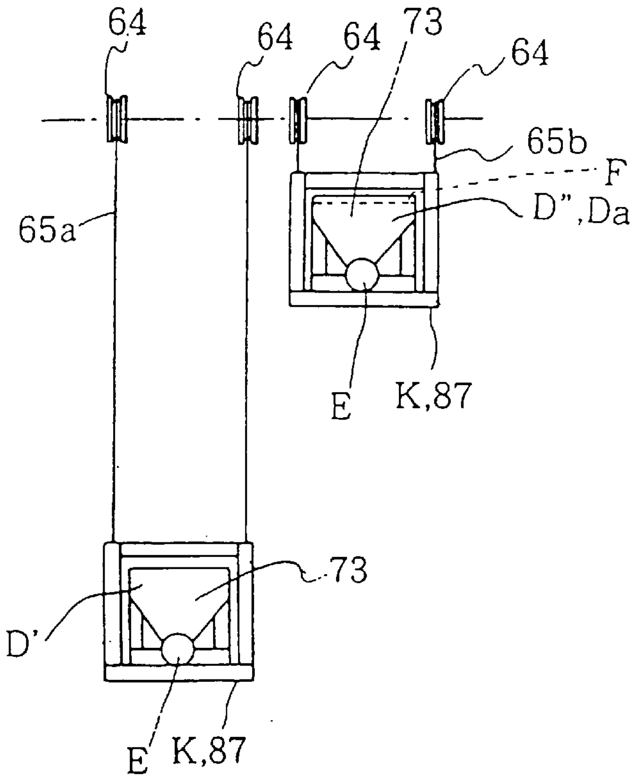
Figure 55:
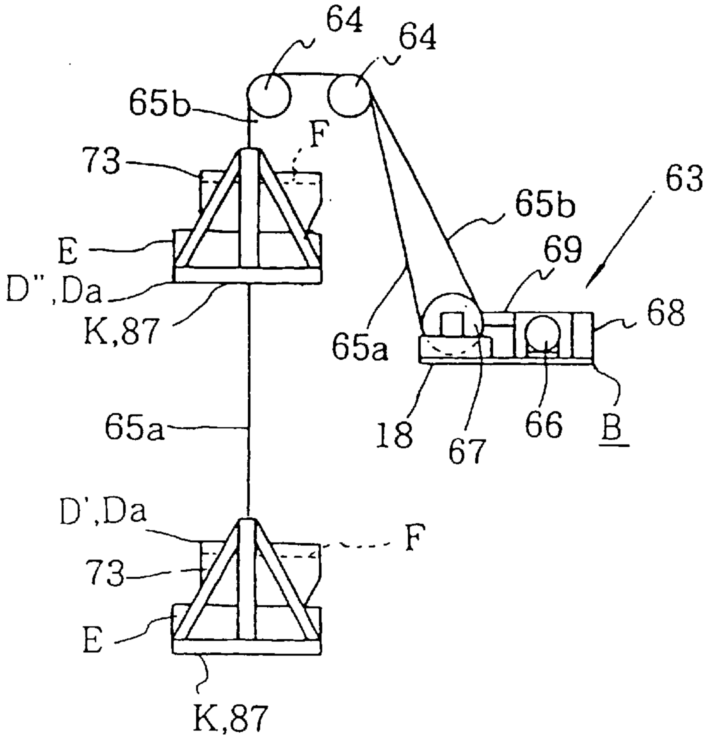
Figure 56:
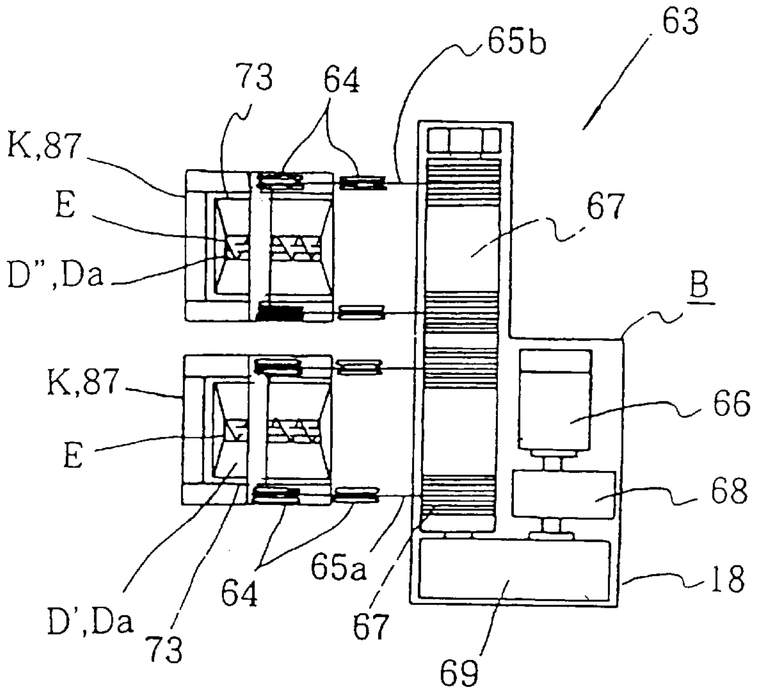

In FIGS. 54–56, there is shown a first example of the lifting means for the lifting carriers K. The lifting carriers K are arranged so that the two lifting carriers K, K are side by side in the spaces 4 of the tower mast A. The lifting carrier K with one D' of the container-like carriers taken therein is secured to the wire ropes 65*a* wound around the winding drum 67 from the lower side, and the lifting carrier K with the other container-like carrier D" is secured to the wire ropes 65*b* wound around the winding drum 67 from the upper side.

As a result, when the winding drum 67 is rotated by the electric motor 66, one of the lifting carriers K is raised, and simultaneously the other lifting carrier K is lowered, decreasing the load applied to the motor 66 during the lifting operation of the lifting carriers K.

When one of the container-like carriers D, D which raise and lower in the spaces 4 of the tower mast A is receiving the ready mixed concrete F from the related supply hopper 71, the other container-like carrier D takes the uppermost position to quantitatively supply the concrete F from the related chute 70 to the belt conveyor G through the related belt conveyor 28. In that manner, the two container-like carriers D, D are raised and lowered between the chutes 70 and the hoppers 71 with good timing.

Figure 57:
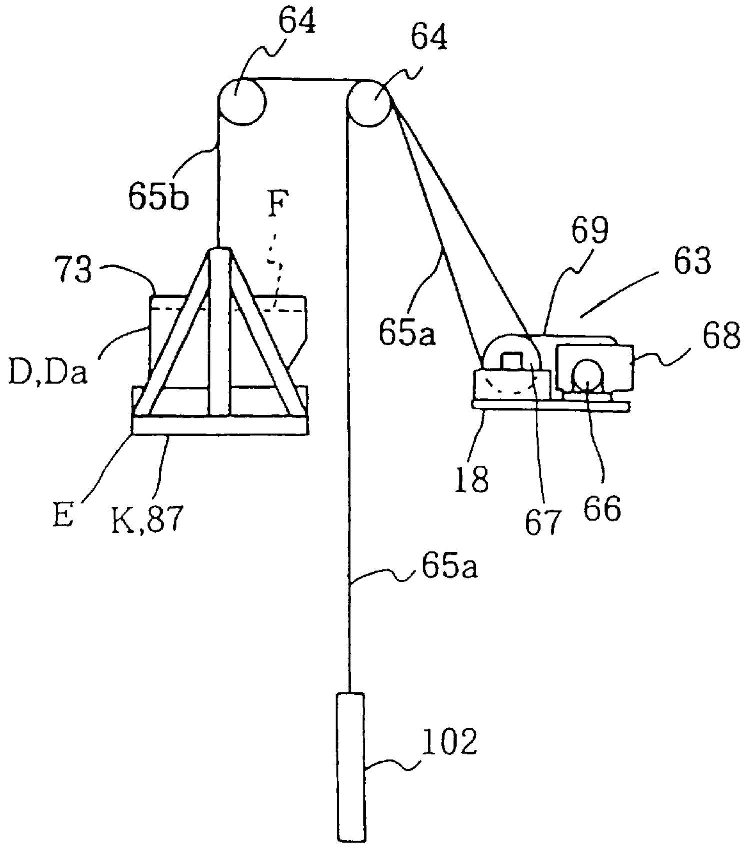
Figure 58:
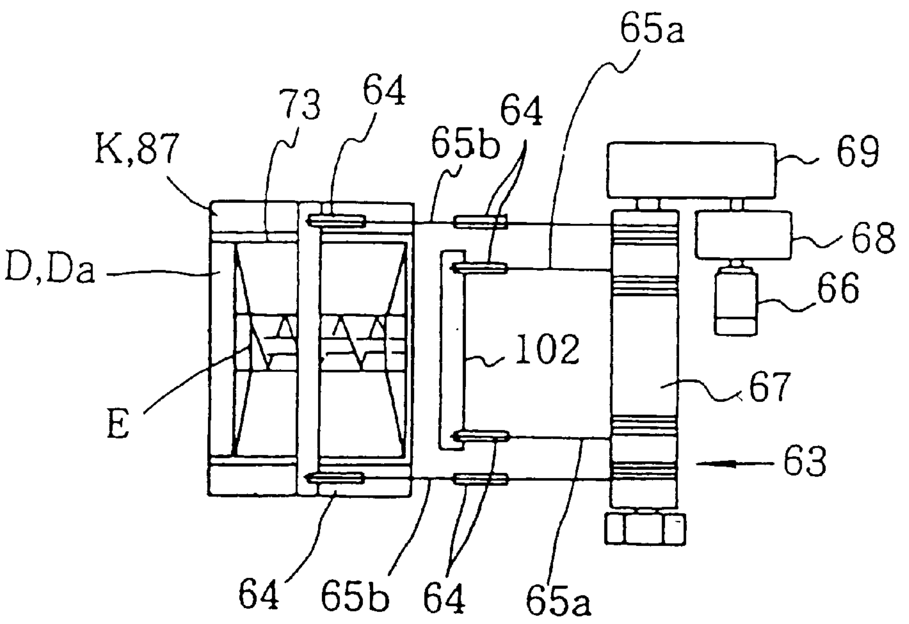
Figure 59:
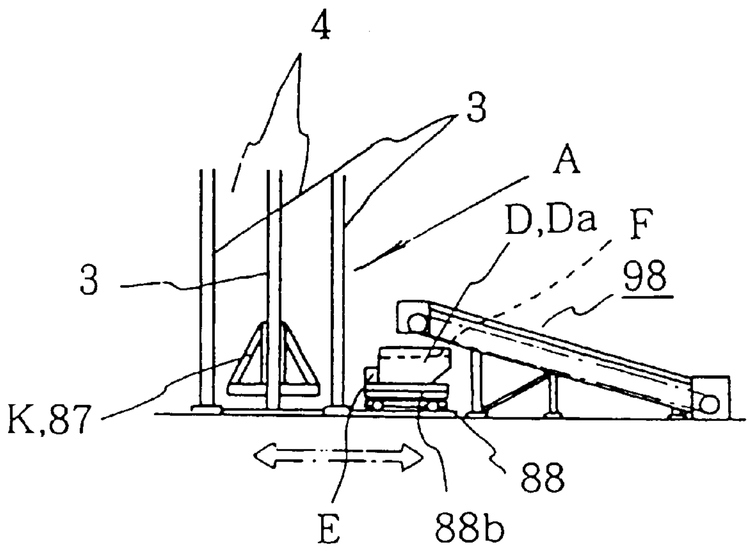
Figure 60:
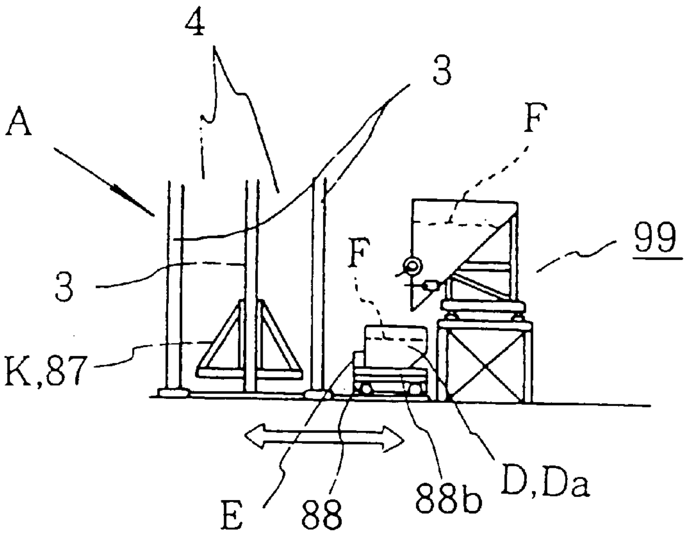
Figure 61:
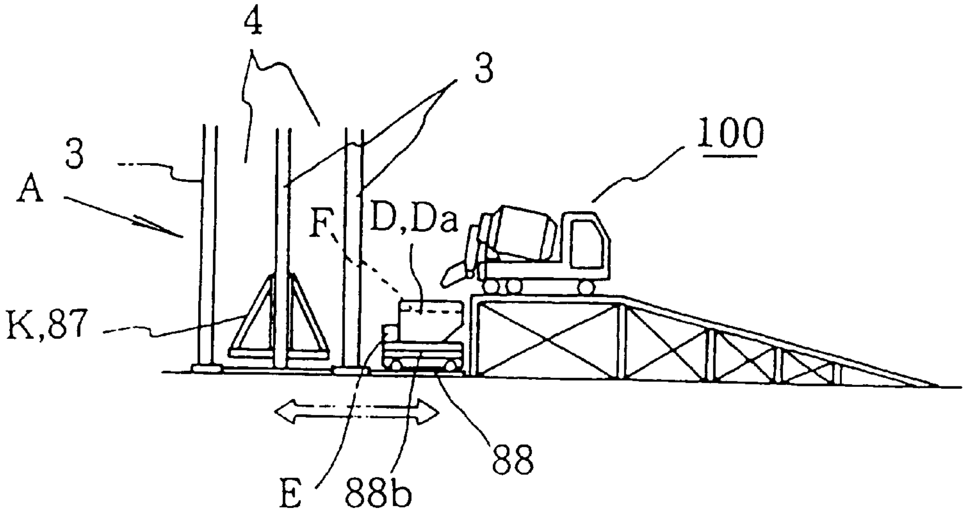
Figure 62:
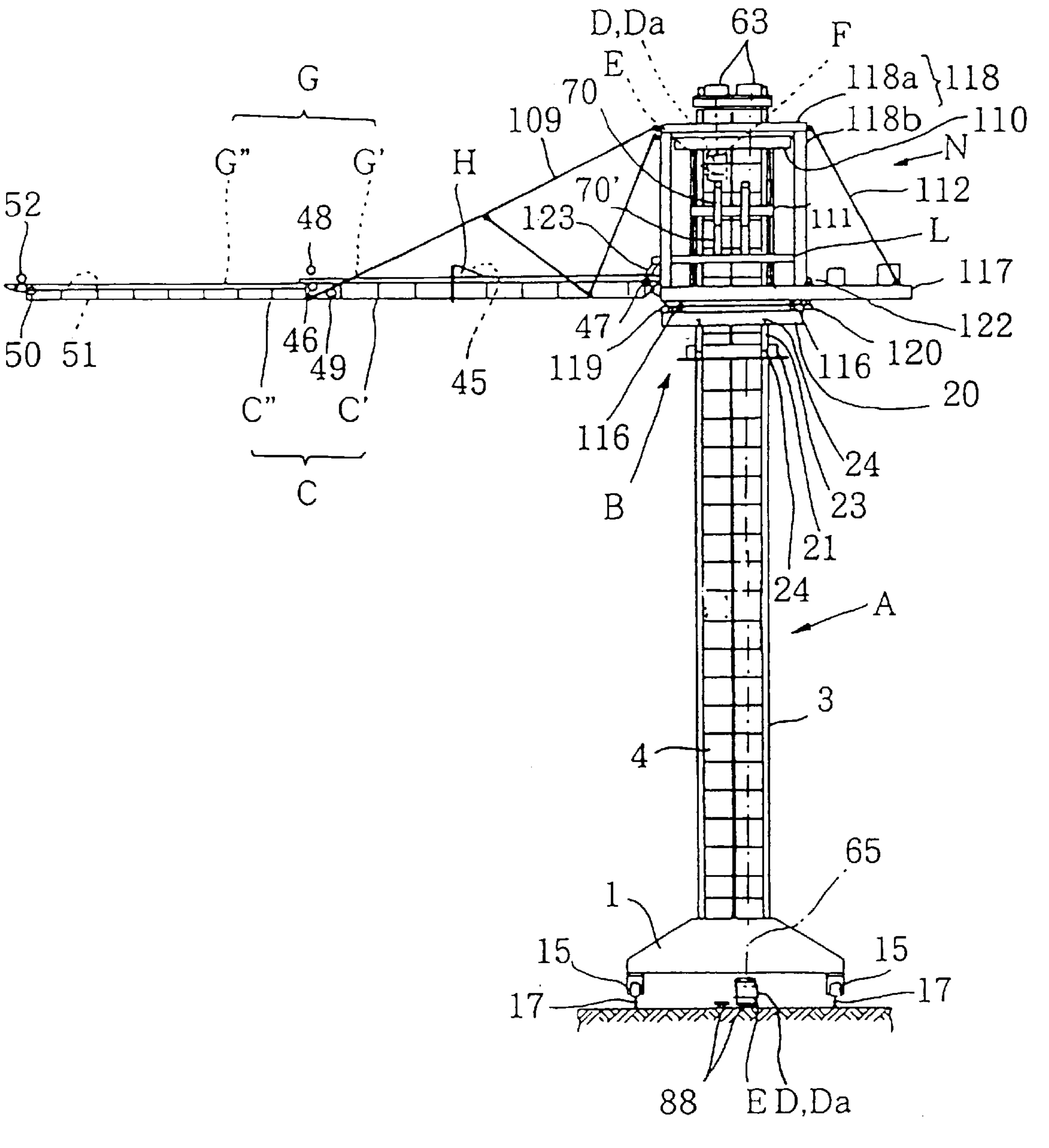
FIGS. 62–68 are views showing the ready mixed concrete conveying apparatus according to a fourth mode.
Figure 63:
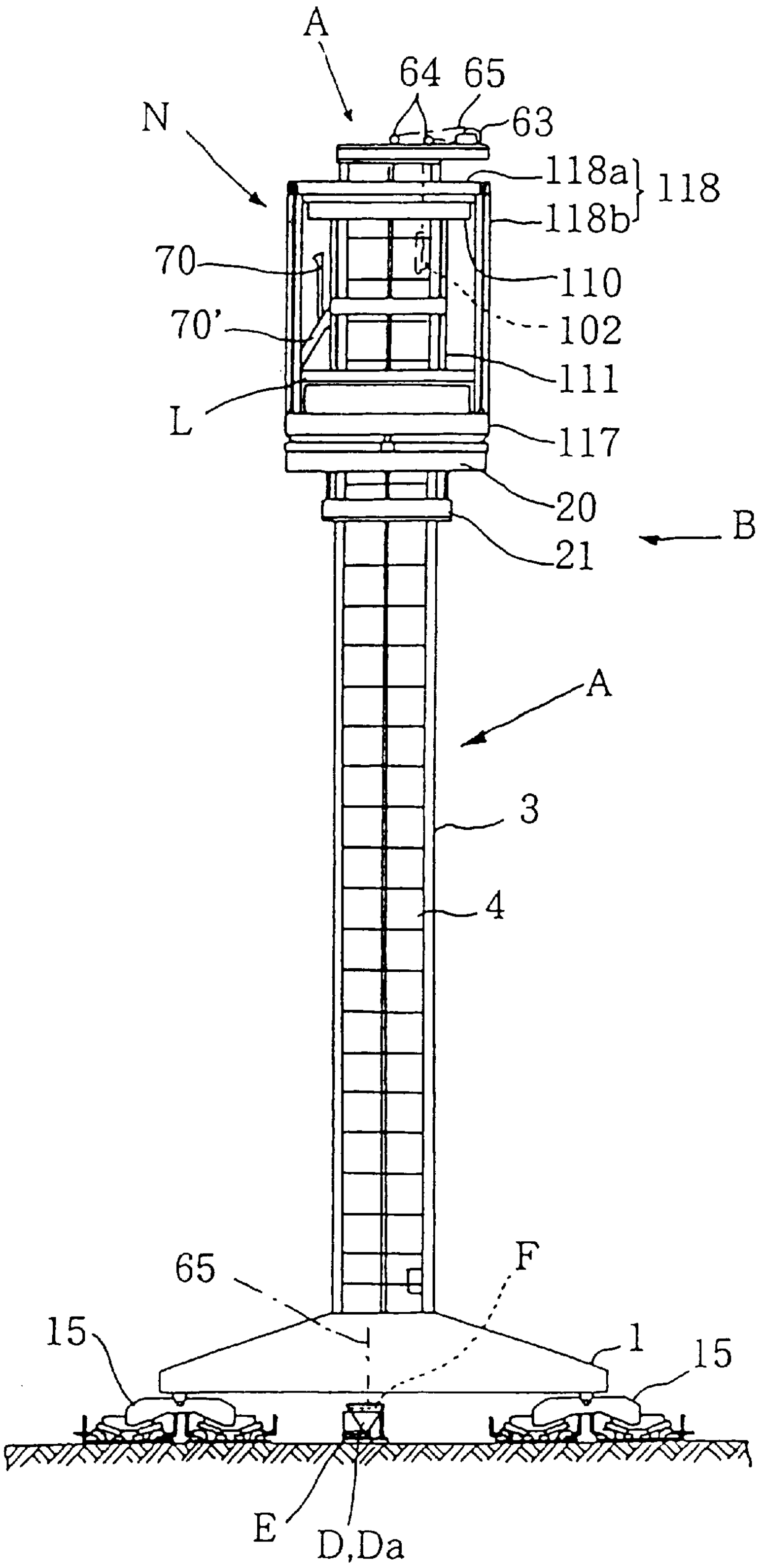
Figure 64:
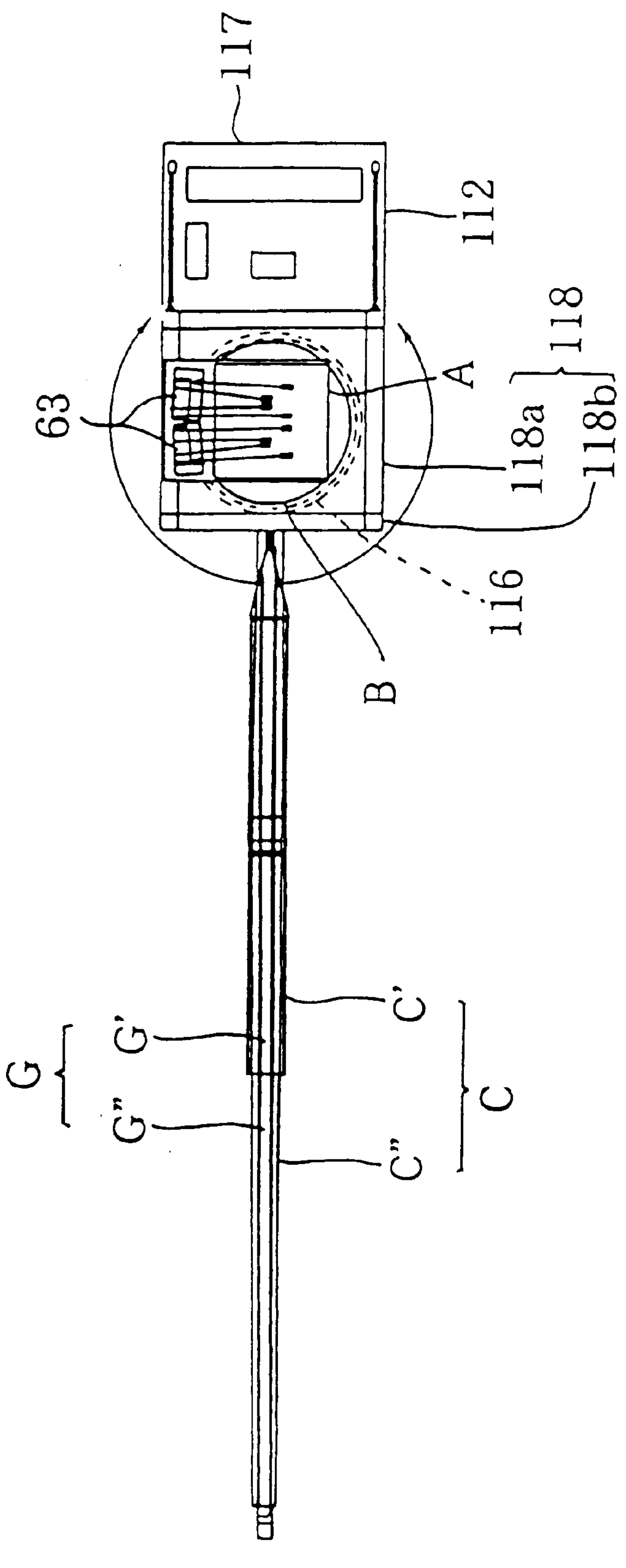
Figure 65:
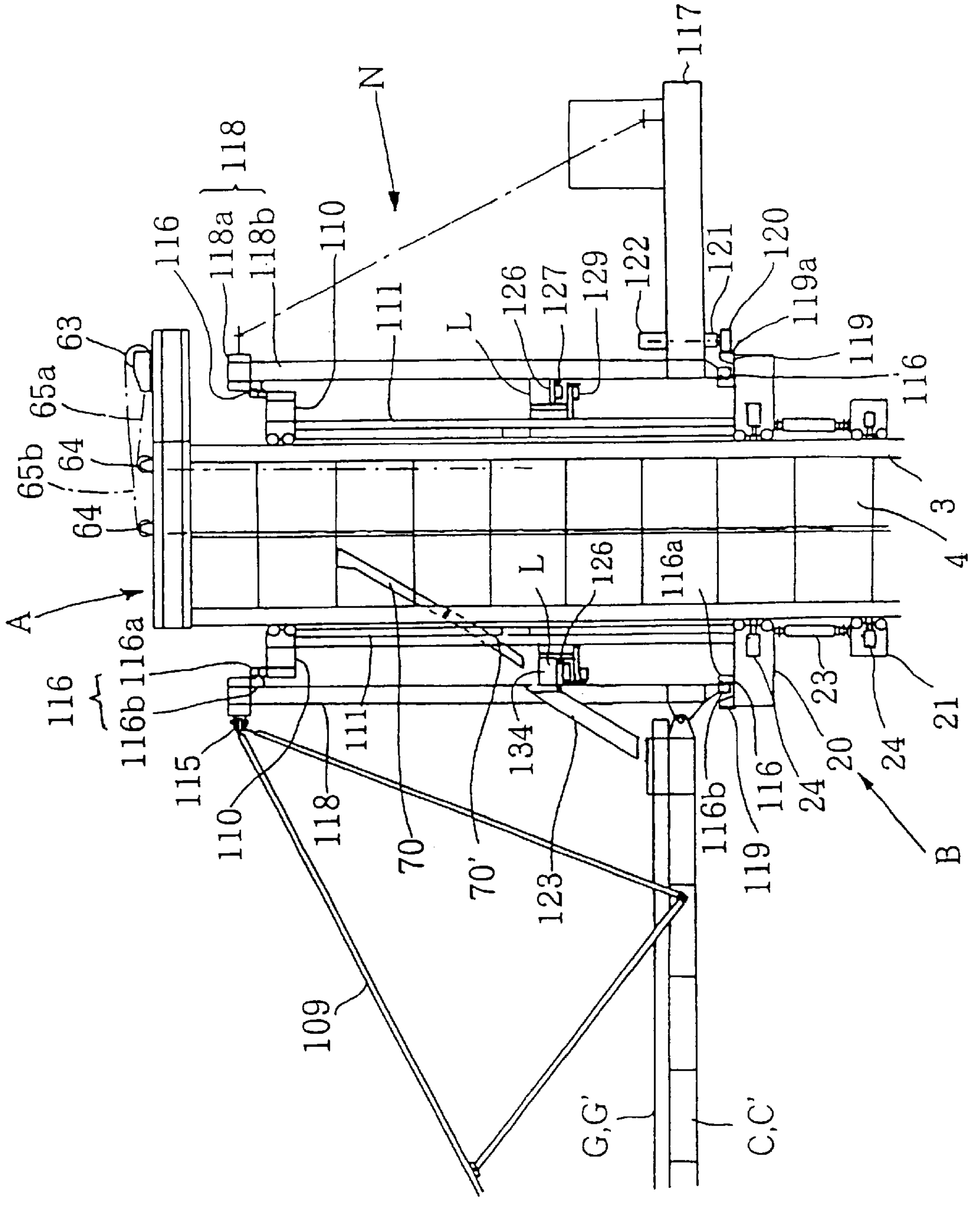
Figure 66:
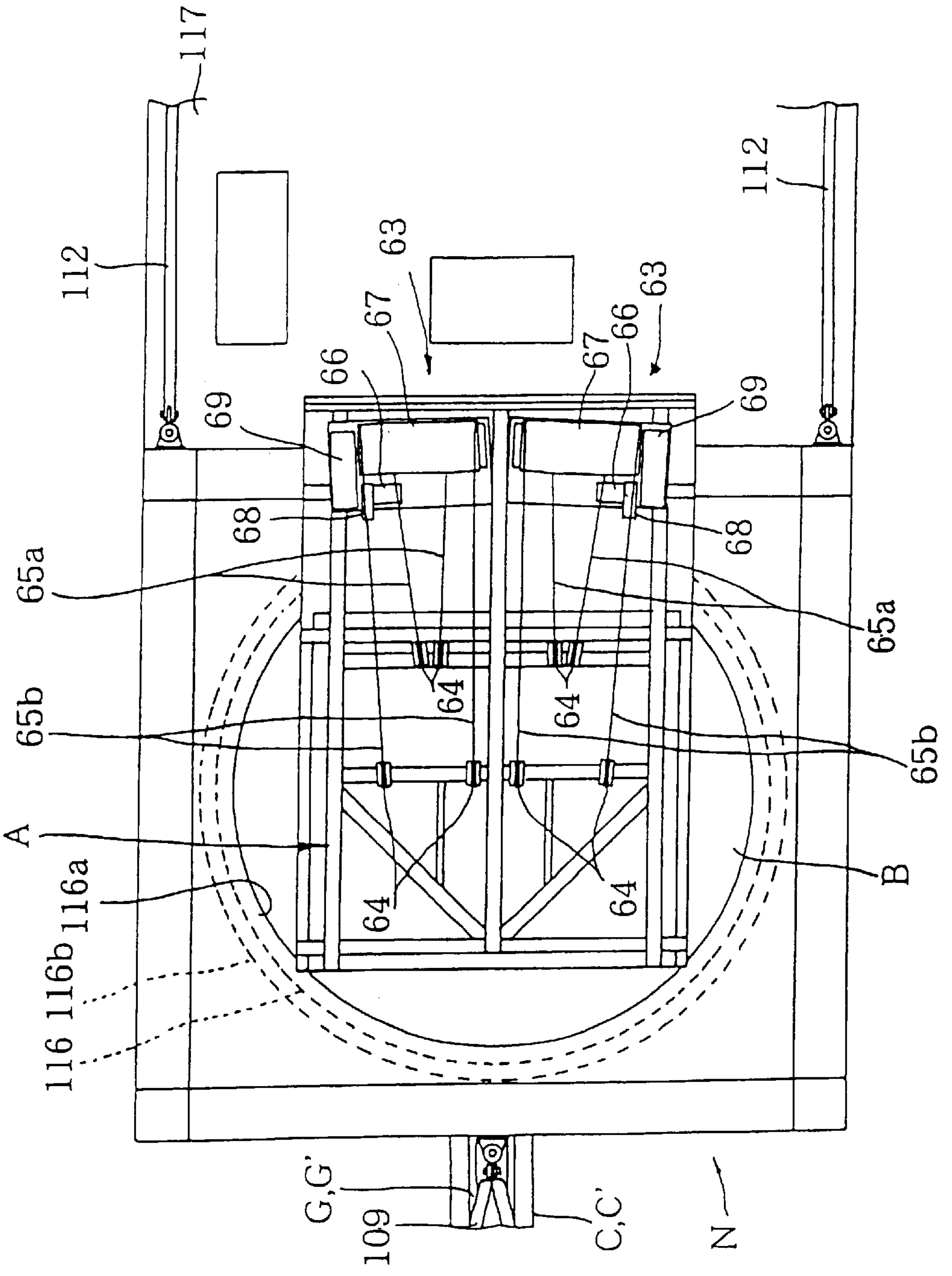
Figure 67:
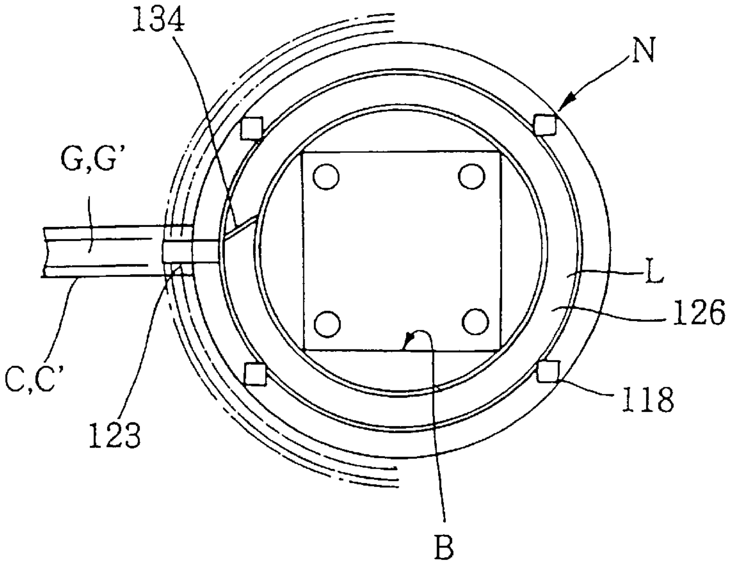
Figure 68:
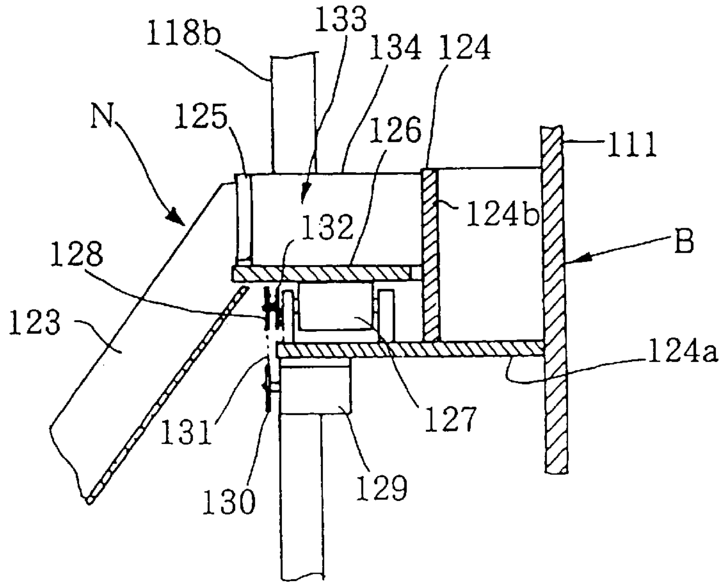
Figure 69:
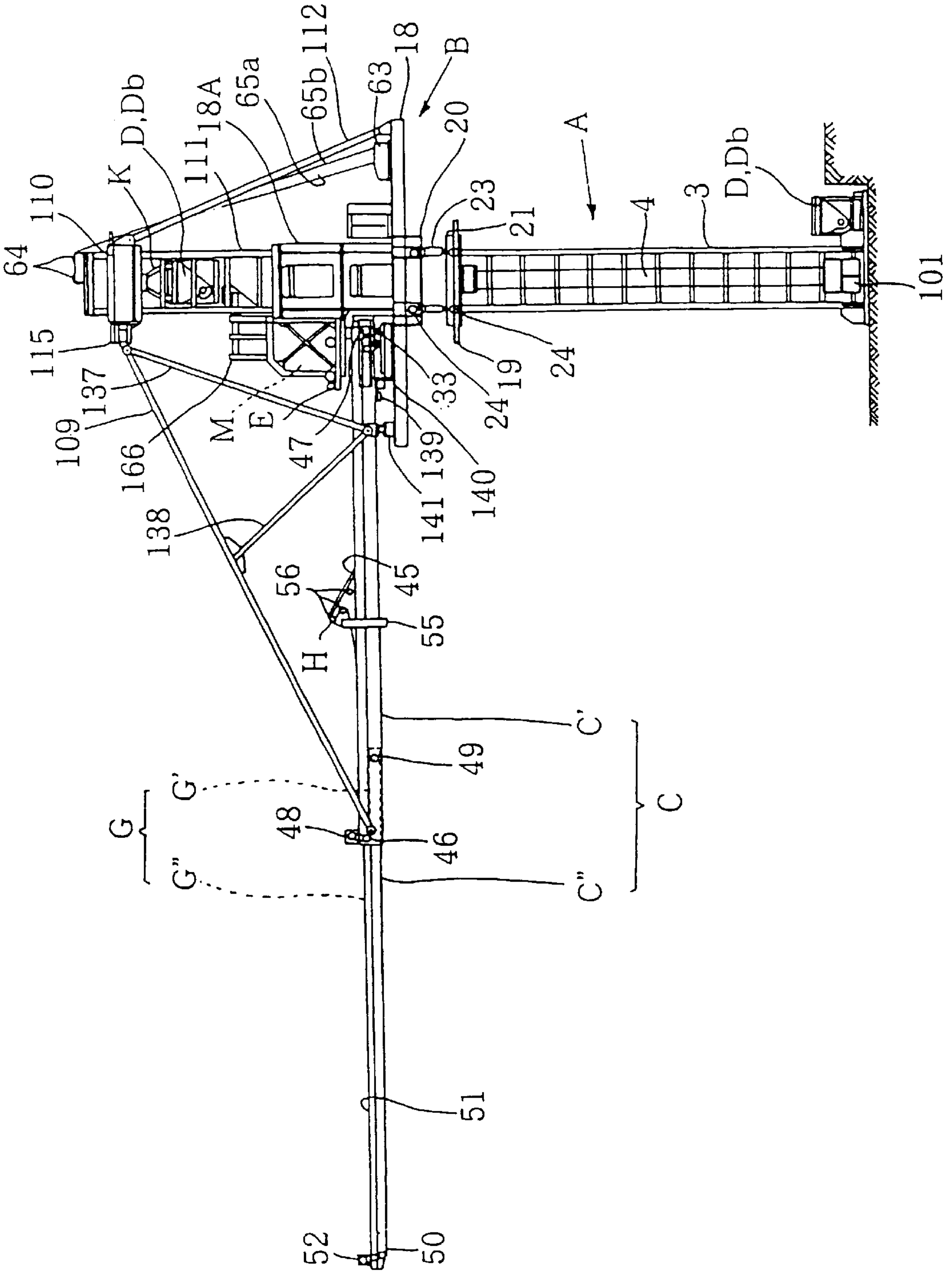
FIGS. 69–98 are views showing the ready mixed concrete conveying apparatus according to a fifth mode.
Figure 70:
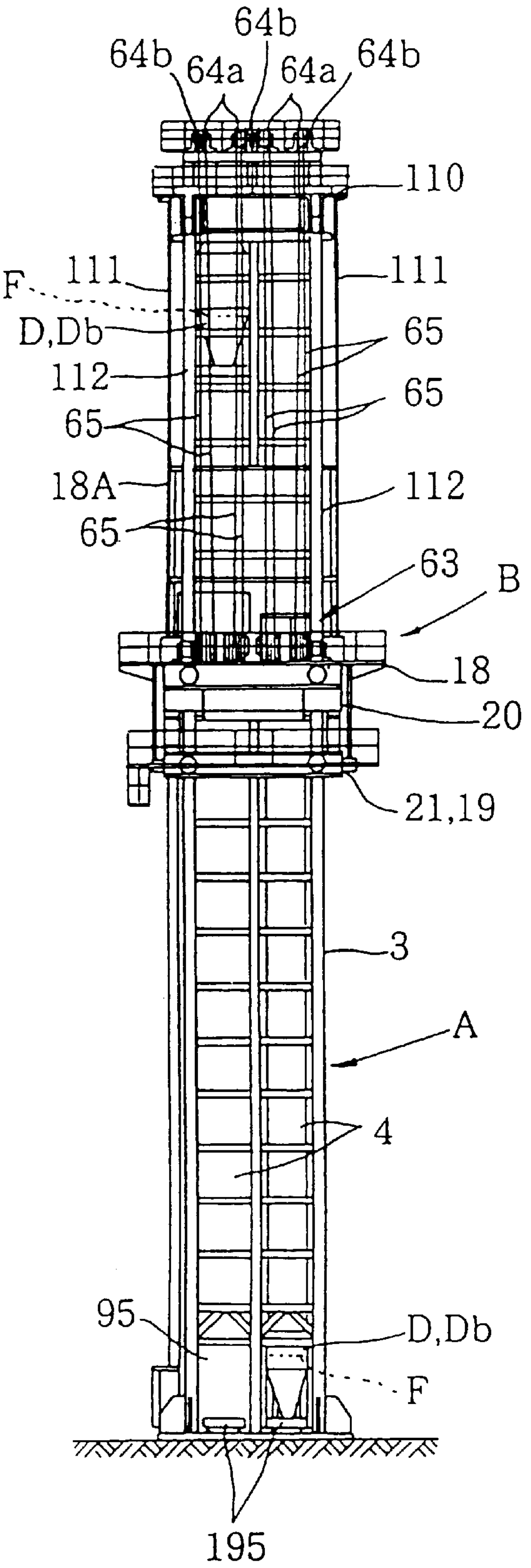

In FIGS. 57–58, there is shown a second example of the lifting means for the lifting carriers K. In the second example of the lifting means, the respective lifting carriers K, K are arranged so as to be suspended in the spaces 4, 4 of the tower mast A. The respective lifting carriers K, K include, independently, the lifting winches 63 for the lifting operation. The respective winding drums 67 have one pair of the wire ropes 65 wound thereon as the wire ropes 65*a* wound from the lower side thereof, and counter weights 102 are connected to the paired wire ropes 65*a* so as to be suspended therefrom. The other pair of the wire ropes, i.e. the wire rope 65*b* wound from the upper side are connected to the respective lifting carriers K for taking the respective container-like carriers D therein so as to suspend therefrom.

The second example of the lifting means for the lifting carriers K have the same structure as the first example of the lifting means shown in FIGS. 54–56 except that the counter weights 102 are used.

For this reason, the constituent elements which have the same or substantially the same structure as the first example of the lifting means are indicated by the same reference symbols, and explanation on these elements will be omitted.

The conveying apparatus according to the third mode constructed as stated above and shown in FIGS. 45–61 is the same or substantially the same as the conveying apparatus according to the first mode shown in FIGS. 5–36 in terms of the operation methods and structure of the apparatus, such as the rotary method and the structure of the tower mast A, the lifting method and the structure of the lift, the swinging method and the structure of the boom C, the lifting method and the structures of the lifting carriers K and the container-like carriers D, the functions and the structure of the supply means E as the means for quantitatively supplying the ready mixed concrete F from the container-like carriers D, the method and the structure to supply the concrete F from the container-like carriers D to the belt conveyor G using the chutes, the structure of the belt conveyor G, and the structures of the trippers H for taking out the concrete F from the belt conveyor G to the chutes 55.

The arrangement wherein the suspended frame rests 87 are used as the lifting carriers K can simplify the structure of the tower mast A, offering advantages in that the cost of equipment required for the tower mast A can be saved, that the maintenance of the tower mast A, in particular the maintenance of the container-like carriers D becomes easier, and that the apparatus is adaptable to any kinds of supply means of the ready mixed concrete. In addition, a shortened term of construction work and saved expense as well as streamlined dam construction can be realized.

The boom C which is arranged on the apparatus is stably and smoothly raised and lowered together with the lift B with respect to the tower mast A.

(4) Ready mixed concrete conveying apparatus according to a fourth mode

In FIGS. 62–68, there is shown the conveying apparatus according to a fourth mode.

The conveying apparatus constructed according to the fourth mode is constructed so that it comprises the tower mast A, the lift B arranged on the tower mast A so as to be liftable, the rotary portion N arranged on the lift B so as to be swingable, and the boom C arranged on the rotary portion N.

The tower mast A is provided with the container-like carriers Da used for conveyance of the ready mixed concrete F so as to be liftable. The boom C is provided with the belt conveyor G for conveyance of the concrete F, and the tripper H which is used to take out the concrete F conveyed by the belt conveyor G at a position on the belt conveyor G.

The container-like carriers D are provided with the supply means E for continuously and quantitatively feeding out the ready mixed concrete F received in the container-like carriers D, presenting a structure wherein the concrete F received into the container-like carriers Da can be continuously and quantitatively supplied to the belt conveyor G directly or through the transferring means additionally provided.

The conveying apparatus having such a structure is installed so as to be movable along the rails 17.

The conveying apparatus according to the fourth mode has the same or substantially the same structure as the conveying apparatus according to the first mode except that the rotary portion N is rotatably arranged on the lift B liftably provided on the tower mast A by the climbing means, and that the boom C is mounted to the rotary portion N to supply the concrete F carried up by the carriers D to the belt conveyor G directly through the conveying means L or the transferring means additionally provided.

The operation and the functions performed by the constituent elements in this mode are the same or substantially the same as those of the conveying apparatus according to the first mode except for the differences stated earlier.

For this reason, the constituent elements which have the same or substantially the same structure and perform the same or substantially the same functions as those of the conveying apparatus according to the first mode are indicated by the same reference symbols, and explanation on these elements will be omitted.

In the fourth mode, the lift B which is provided on the tower mast A so as to be liftably provided with the rotary portion N to be rotatable around the tower mast A in substantially the horizontal direction.

The lift B which is provided on the tower mast A so as to be liftable is constructed in substantially the same manner as the conveying apparatus according to the first mode.

In detail, the lift B is constructed so that the upper lifting frame 20 and the lower lifting frame 21 which are coupled together by the lifting hydraulic cylinders 23 are positioned as a base, to provide the climbing means, and that the supporting frame 110 which is arranged above the climbing means so as to be liftable along the tower mast A and to be engaged with the tower mast from outwardly is assembled to the upper lifting frame 20 or the stage member on the upper lifting frame 20 by the poles 111 like one unit.

In the lift B having such a structure, the lower lifting frame 21 and the upper lifting frame 20 are provided with the hydraulic cylinders 24, respectively, like the conveying apparatus according to the first mode.

The lifting frames 20 and 21 which are moved upwardly and downwardly by the hydraulic cylinders 23 are constructed so that the lifting frames are locked, at a stopping level, to and unlocked to be movable along the tower mast A, in particular the mast frames 3 like the conveying apparatus according to the first mode.

The lift B having such climbing means has the rotary portion N arranged thereon so as to be rotatable in the horizontal direction by rotary bearing means 116.

In the example shown, the rotary bearing means is constructed in such a manner that annular bearing portions **116*b*, 116*b* which are respectively arranged on a lower side and an upper side of the rotary portion N are engaged with an annular bearing portion 116*a* provided on an upper side of the upper lifting frame 20 and an annular bearing portion 116*a* provided on the supporting frames 110 coupled to the upper lifting frame 20 by the poles 111 like one unit, and that loads in the rotary direction and in the vertical direction are born by the bearing means 116. In this specific example, swing bearing means are used to constitute the bearing means 116**.

The rotary portion N which is arranged on the lift B so as to be rotatable is constituted by the stage 117 which is arranged above the upper lifting frame 20 so as to be rotatable with respect to the tower mast A, and the rotary frame 118 which is provided on the stage 117 like one unit.

The rotary frame 118 is constructed by upper annular frames **118*a* provided on the tower mast A so as to be engaged with the tower mast A from outwardly, and posts 118*b* which assemble the upper annular frame 118*a* to the stage 117**.

The rotary portion N having such a structure is constructed so that it is supported by the upper lifting frame 20 so as to be rotatable with respect to the tower mast A, and that the annular bearing portion **116*a* of the lift B, in particular the annular bearing portion 116*a* provided on the upper lifting frame 20, and the annular bearing portion 116*a* provided on the supporting frame 110 are assembled to the annular bearing portion 116*b* provided at the side of the stage 117 on the rotary portion N, and the annular bearing portion 116*b* provided at the side of the upper annular frame 118*a*** through ball bearings.

The rotary portion N which is provided on the lift B so as to be rotatable is constructed so that a pinion 120 which is provided on the stage 117 forming a part of the rotary portion N is engaged with a rack 119*a* which is arranged on the outer peripheral surface of an annular guide rail 119 provided on the lifting frame 20.

The pinion 120 is driven by an electric motor 122 through a reduction gear unit 121 provided on the stage 117.

The rotary portion N having such a structure can drive the pinion 120 along the rack 119*a* using the electric motor 122 provided on the stage 117 forming the rotary portion N, thereby rotating the rotary portion N with respect to the tower mast A.

The boom C is assembled to the rotary portion N which is arranged on the tower mast A so as to be liftable and rotatable in that manner.

Although the boom C which is provided on the rotary portion N is not constructed to have a swingable structure, in particular a structure to swing in the horizontal direction because the rotary portion N is rotatable, the boom C may be arranged so as to be swingable in the horizontal direction like the first mode.

In the example shown, the tipper H which is provided on the boom C is provided only on the inner boom C', and the outer boom C" is operable as being withdrawable and extensible with respect to the inner boom C', thereby presenting an arrangement wherein placing the ready mixed concrete can be made from the leading edge of the belt conveyor G" on the outer boom C" without using the tripper H on the outer boom.

The conveying apparatus having such a structure is constructed so that the tower mast A has the top provided directly with the lifting winches 63 and the guide sheaves 64 as the lifting means for raising and lowering along the tower mast A the container-like carriers, i.e. the container-like carriers Da with the supply means E for continuously and quantitatively feeding the ready mixed concrete F like the first mode.

The winching means which are provided on the top of the tower mast A are constructed so that a pair of groups including the winding drums 67 driven by the electric motors 66 through the electromagnetic brakes 68 and the reduction gears 69 are provided, and that each winding drum 67 suspends the related carrier D and the related counter weight by the related wire ropes 65 so as to raise and lower the carrier and the counter weight, in particular that, in the example shown, each counter weight and each carrier D are suspended by the wire ropes 65*a* wound on the related winding drum from a lower side and by the wire ropes 65*b* wound around the winding drum from an upper side through the guide sheaves 64, respectively.

Next, conveyance of the ready mixed concrete in the conveying apparatus having such a structure, in particular, delivery means to deliver the concrete F from the carriers D to the belt conveyor G will be described.

The ready mixed concrete F which has been carried up by the carriers D arranged on the tower mast A, i.e. the container-like carriers Da with the supply means E for continuously and quantitatively supplying the concrete F in this example is guided by the tiltable chutes 70 and the fixed chutes 70' to the transferring means L provided on the tower mast A so as to be rotatable there around, and the concrete thus guided is delivered by the chute 123 to the belt conveyor G provided on the boom C.

The conveying means L which is used to deliver the ready mixed concrete F is constituted by an annular frame 124 provided on the outer periphery of e.g. the posts 111 or the stage post on the lift B, an annular frame 125 provided on inner surfaces of posts 118*b* of the rotary frames 118 of the rotary portion N, and an annular strip 126 arranged between the annular frames 124, 125 so as to be rotatable around the tower mast A, providing a so-called rotary feeder.

The conveying means will be further explained in detail. The annular frame 125 is formed with a horizontal plate 124*a,* and the horizontal plate has an upper surface carrying a plurality of rollers 127 in a row so as to direct their respective axial center lines toward radial directions of the annular frame 124. The shaft of one of the rollers 127 includes a sprocket 128 with which a sprocket 130 provided on the rotary shaft of an electric motor 129 is coupled by a chain 131. The rollers 127 have their sprockets 132 coupled by chains one another. The rollers 127 having such a structure have the annular strip 126 carried thereon to drive the strip 126 by the rollers 127.

An annular side plate 124*b* which extends vertically from the horizontal plate 124*a* in close proximity to the inner periphery of the annular strip 126 rotated by the rollers 127, and the annular frame 125 which faces the annular side plate 124*b* and is positioned along the outer periphery of the annular strip 126 so as to be formed as a side plate at the side of the rotary frames 118 constitute a groove-like guide 133 by which the ready mixed concrete F supplied onto the annular strip 126 is guided toward the chute 123 without dropping on the way to be conveyed.

The ready mixed concrete F which is conveyed by the annular strip 126 is forced to be directed to the chute 123 by blocking with a blocking plate 134 the groove-like guide 133 as a conveyance space for the concrete F which is constituted by the annular strip 126, the annular frame 125 and the annular side plate 124*b*.

The conveying apparatus according to the fourth mode thus constructed and shown in FIGS. 62–68 has the same or substantially the same as the conveying apparatus according to the first mode in terms of the operation and the structure of the apparatus such as the running system of the structure of the tower mast A, the lifting system and the structure of the lift, the assembling system and the structure of the boom C, the lifting system of the carriers D, the functions and the structure of the supply means E for continuously and quantitatively feeding the concrete F, the structure of the belt conveyor G, and the structure of the tripper H provided on the belt conveyor G, except for the structure stated clearly above.

(5) Ready mixed concrete conveying apparatus according to a fifth mode.

In FIGS. 69–98, there is shown the conveying apparatus according to a fifth mode.

The conveying apparatus according to the fifth mode is constituted by the tower mast A, the lift B arranged on the tower mast A so as to be liftable, and the boom C arranged on the lift B so as to be swingable.

The boom C forming the conveying apparatus is constituted by the inner boom C', and the outer boom C" which is arranged on the inner boom C' so as to be withdrawable into and extensible from the inner boom.

The tower mast A is provided with the container-like carriers D used for conveyance of the ready mixed concrete F so as to be liftable.

In the boom C, the belt conveyor G for conveying the ready mixed concrete F carried by the carriers D is constructed so that the belt conveyor G" on the outer boom C" takes over the ready mixed concrete F from the belt conveyor G' provided on the inner boom C'.

The boom C, in particular the inner boom C' is provided with the tripper.

The transferring container M which receives the ready mixed concrete F and feeds out the concrete to the belt conveyor G is provided between the conveyance of the concrete F by the carriers D and the receipt of the concrete F by the belt conveyor G.

The transferring container M is constructed so as to be arranged on the lift B, or arranged the boom C provided on the lift B.

The transferring container M includes the receiving container P for receiving the ready mixed concrete F from the carriers d directly or through the transferring means additionally provided, and the supply means E for continuously and quantitatively feeding the concrete F received into the receiving container P.

The conveying apparatus according to the fifth mode has the same or substantially the same structure as the conveying apparatus according to the first mode and the other modes except that the carriers D are formed as the carriers Db without the supply means E for continuously and quantitatively feeding the ready mixed concrete, and that there is provided the transferring container M, the transferring container M is contained in the transferring route between the conveyance of the ready mixed concrete by the carriers D and the conveyance of the ready mixed concrete F by the belt conveyor G, and the transferring container M is constituted by the container P for receiving the ready mixed concrete F and the supply means E for continuously and quantitatively feeding the received concrete F.

The operation and the functions of the constituent elements in the conveying apparatus constructed according to the fifth mode are the same or substantially the same as those of the conveying apparatus according to the first mode and the other modes except that the carriers D are formed as the carriers Db without the supply means E, and except for the operation and the functions brought into by the provision of the transferring container M, i.e. except that the ready mixed concrete F is put into the transferring container M from the carriers D without being directly, continuously and quantitatively directed to the belt conveyor G, and then the concrete F received into the transferring container M is continuously and quantitatively fed to the belt conveyor G. For these reasons, the constituent elements which are the same or substantially the same structure, or the same or substantially the same functions as those of the conveying apparatuses according to the other modes are indicated by the same reference symbols, and explanations on these elements will be omitted.

The tower mast A constructed according to the fifth mode is standed in such a state that it is fixed on an installation site.

The tower mast A may be constructed so that there is additionally provided movable means such as rails to make the tower mast movable.

The tower mast A may be rotatable at the installation site, i.e. be rotatable using the vertical axis of the tower mast A as a rotary axis though the tower mast in this mode is not rotatable.

The tower mast A having such a structure is constructed so that it is formed in substantially the same manner as the other modes, i.e. that the main masts 3*a* . . . 3*a* formed as pipes are standed at four corners, the auxiliary posts 3*b* . . . 3*b* are standed between the main masts 3*a*, 3*a*, and the cross bars 3*c* . . . 3*c* are arranged between adjacent main masts 3*a* and auxiliary posts 3*b,* and between the paired auxiliary posts 3*b,* 3*b* provided between the main mast 3*a*, 3*b* standed with a wider distance to form the mast frames 3.

The mast frames 3 thus constructed have the spaces 4, 4 for lifting the carriers D extended in a pair in the vertical direction of the mast frames 3, and have lower portions formed with the openings 95 for taking in the motor-driven carts. The mast frames 3 include openings with chutes operable therein at positions for taking out the concrete F from the carriers D.

In the tower mast A having such a structure, the lift B is assembled to the tower mast so as to be engaged with the tower mast from outwardly, using the main masts 3*a* . . . 3*a* as guides, and the lift B is movable in the vertical direction.

The raising and lowering operation of the lift B with respect to the tower mast A is carried out by climbing operation such as the movable operation of the lifting frames 20, 21 in the vertical direction by the lifting hydraulic cylinders 23 provided on the lifting frames 20, 21 forming the lift B, and the operation to lock the lifting frames 20, 21 to the main masts 3*a* by the hydraulic cylinders 24 provided on the lift B.

The lift B which is provided on the tower mast A is constructed so that the climbing means for the lift B is constituted by the upper lifting frame 20 and the lower lifting frame 21 which are assembled to the mast frames 3 so as to be engaged therewith from outwardly is provided as a base and that the lift includes e.g. the main stage 18 and the auxiliary stage 19.

The upper lifting frame 20 and the lower lifting frame 20 which form the lift B are constructed so that they can be alternately moved in the vertical direction by the lifting hydraulic cylinders 24, and that both frames can be locked to the tower mast A at each stopping level by the hydraulic cylinders 24.

To the upper lifting frame 20 forming the lift B are assembled the main stage 18 assembled to the mast frames 3 so as to be engaged therewith from outwardly, the stage posts 18A provided on the main stage 18 so as to surround the mast frame A, the supporting frame 110 positioned above the stage post 18A and coupled thereto by e.g. the poles 111 and so on, thereby forming the lift B as a whole.

The lower lifting frame 21 forming the lift B is provided with the auxiliary stage 19 like one unit, and the lower lifting frame 21 and the auxiliary stage 19 form the lift B as well.

The lifting frames 20, 21, the main stage 18, the auxiliary stage 19 and so on are assembled to the tower mast A so as to be engaged therewith from outwardly, and these members can be raised and lowered on the tower mast A by the climbing means. These members have basically the same structure as those in the respective modes.

In FIGS. 73–77, there are shown how to assemble the respective lifting frames 20, 21 as the lifting means for the lift B to the main masts 3*a*, and the arrangement of the respective hydraulic cylinders 23, 24. Only the main constituent elements are schematicly shown. The constituent elements to carry out the lifting operation for the lift B have the same structure as those to carry out the lifting operation in the conveying apparatus according to the other modes though the lifting means according to the fifth mode is different from that of the other modes e.g. in that the receivers 26 which receive the plunger rods 24*b* of the hydraulic cylinders 24 provided on the lifting frames 20, 21 are formed as slightly elongated holes 26', and that receiving cylinders 25*a*' to guide the plunger rods 24*b* are provided on the lifting frames 20, 21, and the hydraulic cylinders 24 for driving the plunger rods 24*b* are provided on the lifting frames 20, 21 by cylinder supporting frames 25'.

In the conveying apparatus according to the fifth mode, in order to carry out lifting operation for the lift B, the lifting frames 20, 21, the main stage 18, the stage post 18A, the auxiliary stage 19 and other members forming the lift B include rotatable guide rollers 135, and the guide rollers 135 carry out sliding and rotating movement on guide rails 136 which are provided on the tower mast A, in particular the main masts 3*a* to extend in the vertical direction.

The guide rails 136 which are provided on the main masts 3*a* are constructed so that rail backing strips 136*a* which are secured to the pipe-like main masts 3*a* so as to pinch a part of the peripheral surfaces of the main masts and which are formed in an L-character shape are welded to the tower mast A at the four corners thereof in the vertical direction, and that the respective guide rails 136, 136 are arranged on orthogonal surfaces of the rail backing strips 136*a* which are arranged on the outer edges of the main masts 3*a* to extend in the vertical direction.

The guide rollers 135 which slide and rotate on the guide rails 136 are arranged so that a pair of the guide rollers 135, 135 which are provided at the four corners of e.g. the lifting frames 20, 21 assembled to the tower mast A so as to engage therewith from outwardly are positioned so as to have their rotary axes orthogonally directed, and that these guide rollers 135 . . . 135 sandwich the tower mast A from the four corners.

In Figures, reference numeral 135*a* designates the rotary axis of the guide rollers 135.

The raising and lowering operation of the lift B according to this mode is carried out so that the operation for drawing the plunger rods 24*b* from the receivers 26' is made before the raising operation and the lowering operation of the lifting hydraulic cylinders 23 because the portions for receiving the plunger rods 24*b* of the hydraulic cylinders 24 are formed as the elongated holes 26'. The other basic raising and lowering operation of the lift B is substantially the same as that in the other modes.

The lift B which has such a structure and is provided on the tower mast A is arranged on the tower mast A so as to be vertically movable together with the main stage 18 arranged to the tower mast A so as to engage therewith from outwardly along with the lifting frames 20, 21, the stage posts 18A arranged on the main stage 18, the supporting frame 110 arranged on the tower mast A so as to engage therewith from outwardly and coupled to the stage post by the connecting poles 111, the auxiliary stage 19 and so on. In addition, the supporting frames 112, the supporting frames 192, supporting frames 137 and so on are assembled to the tower mast like one unit.

The boom C is assembled to the lift B in such a manner to be swingable upwardly and downwardly using the shaft 34. The mounting portion of the boom C using the shaft 34 is assembled to the lift B using a boom swinging device 33 substantially similar to the boom swinging device 33 used in the first mode.

In detail, the swinging table supporter 33*c* which is provided on the lift B has the swinging table 33*a* assembled thereto through the bearing. The swinging table 33*a* has the bearing portion for the boom C, i.e. the bearing portion for the shaft 34 in this example provided thereon, allowing the boom C to be swingable in the horizontal direction with respect to the lift B.

The boom C which is arranged so as to be swingable in the horizontal direction with respect to the lift B in that manner is constituted by the inner boom C' and the outer boom C" arranged on the inner boom C' so as to be withdrawable and extensible therefrom, and is supported by the supporting frames 109, 137 having ends pivoted on the supporting frame 110 and by sub poles 138.

The arrangement of the devices for swinging the boom C in the horizontal direction is in such a manner that the boom C has a lower side provided with a pinion 139 driven by an electric motor (not shown), that the lift B, in particular the main stage 18 has an upper side provided with a rail 140 which extends in a half-circle shape in plan along a half-circle shaped track having the swinging shaft of the boom swinging device 33 as the center of rotation, and that the rail 140 has an outer side formed with a rack 140*a* which the pinion is engaged with, thereby allowing the boom C to be swingable in the horizontal direction with respect to the lift B.

Figure 71:
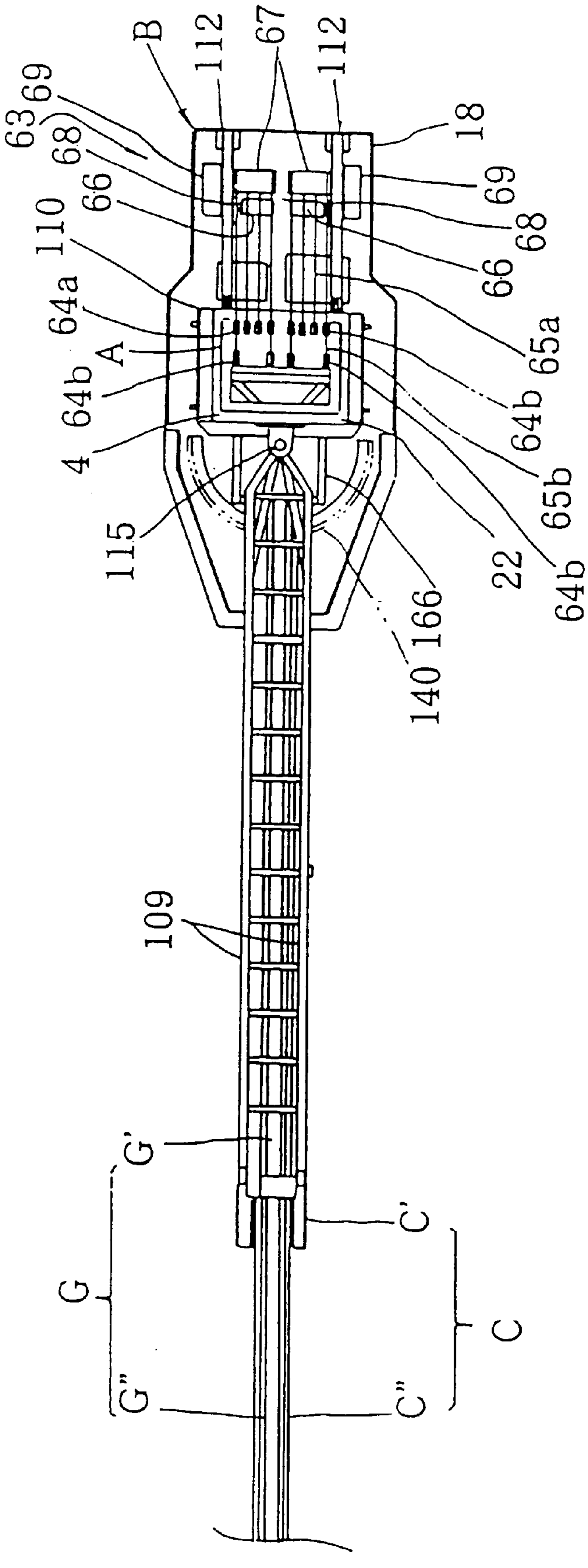
Figure 72:
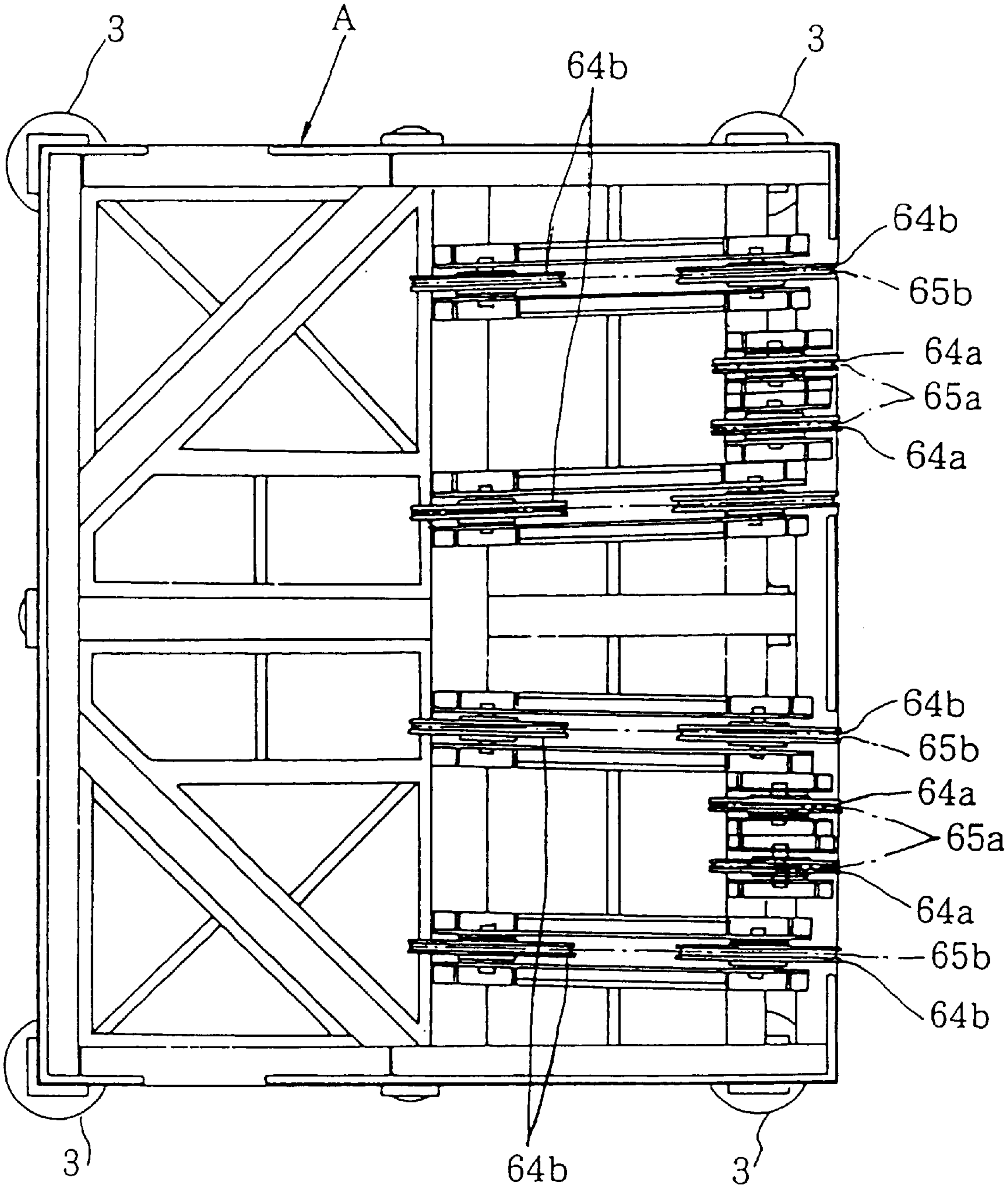
Figure 73:
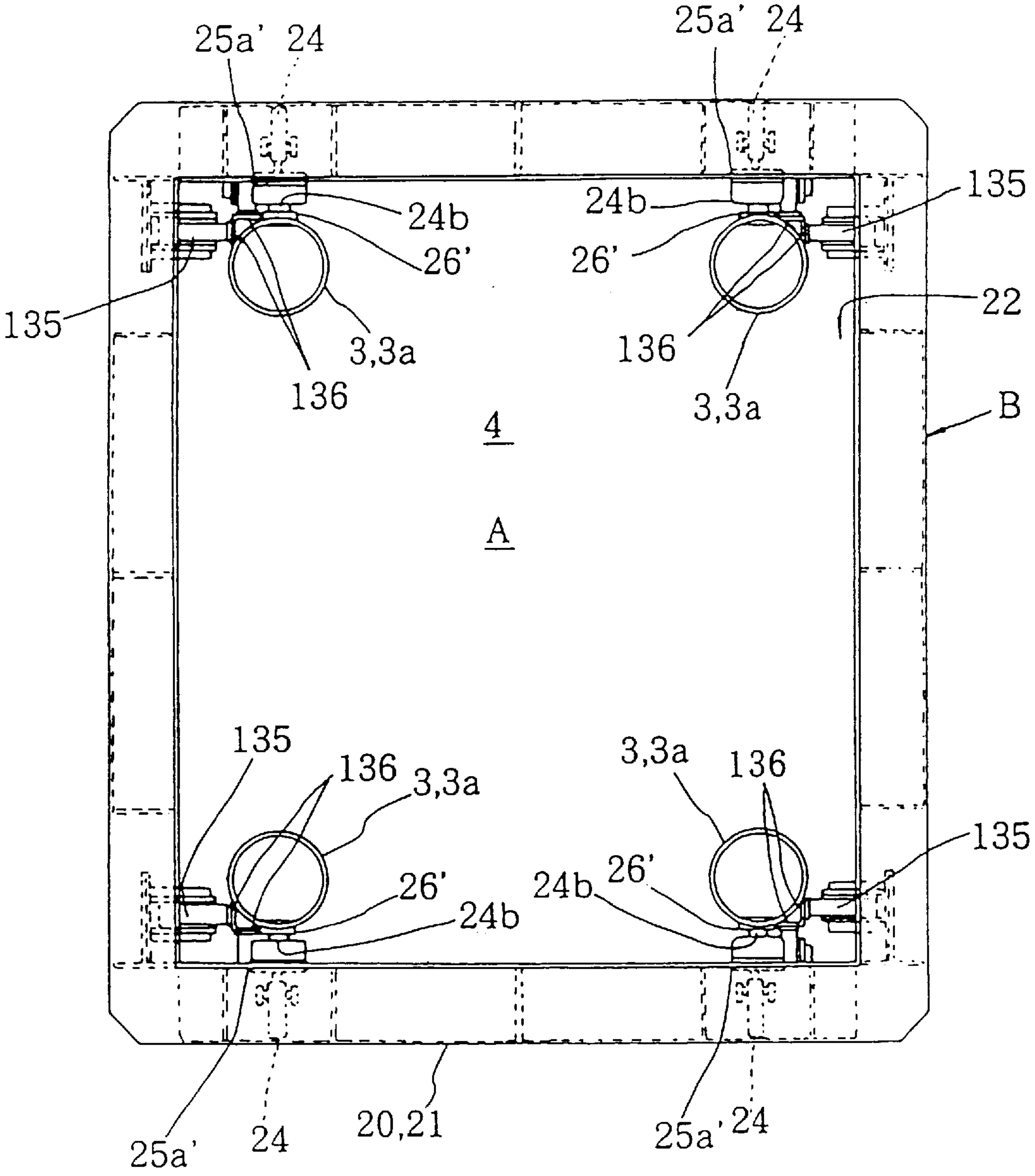
Figure 74:
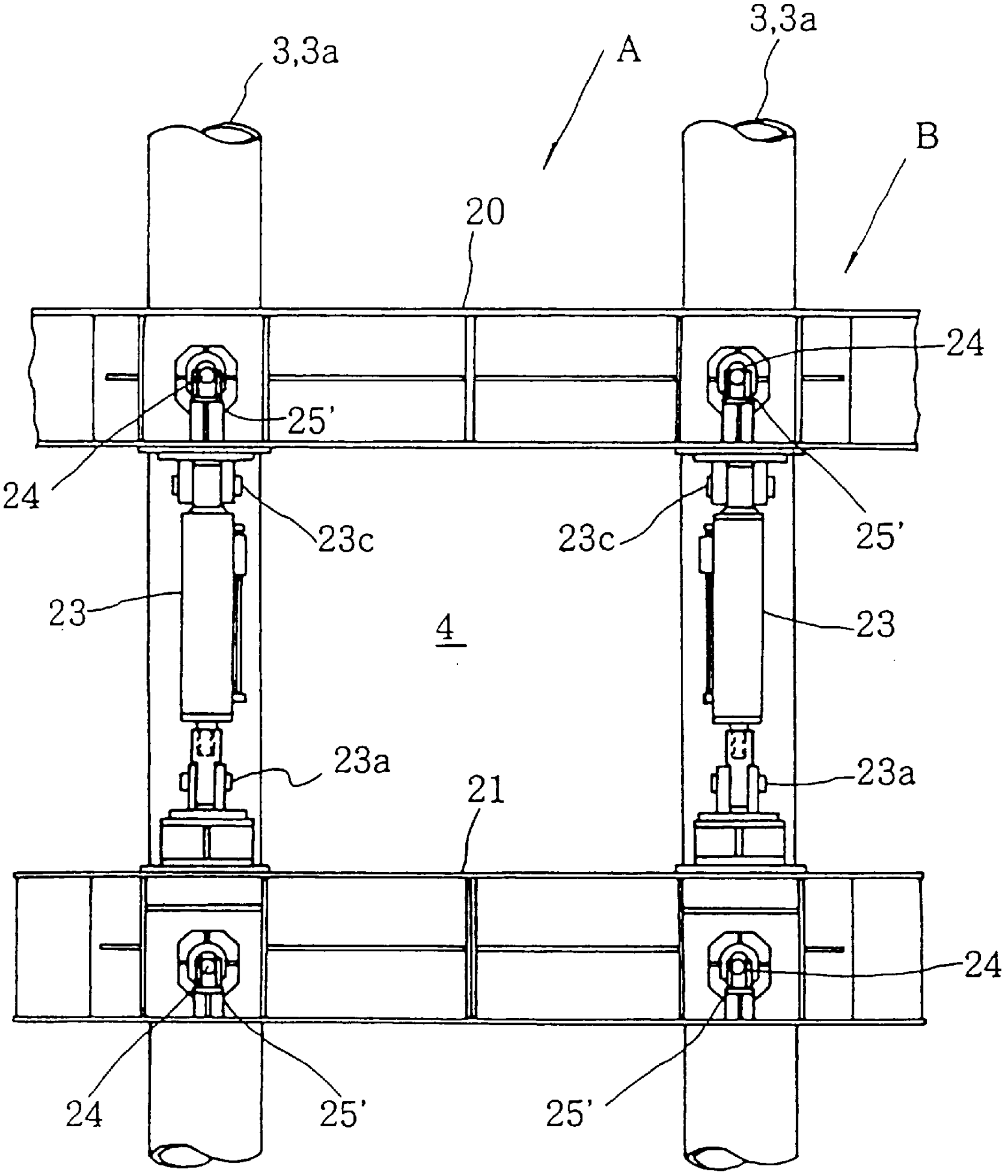
Figure 75:
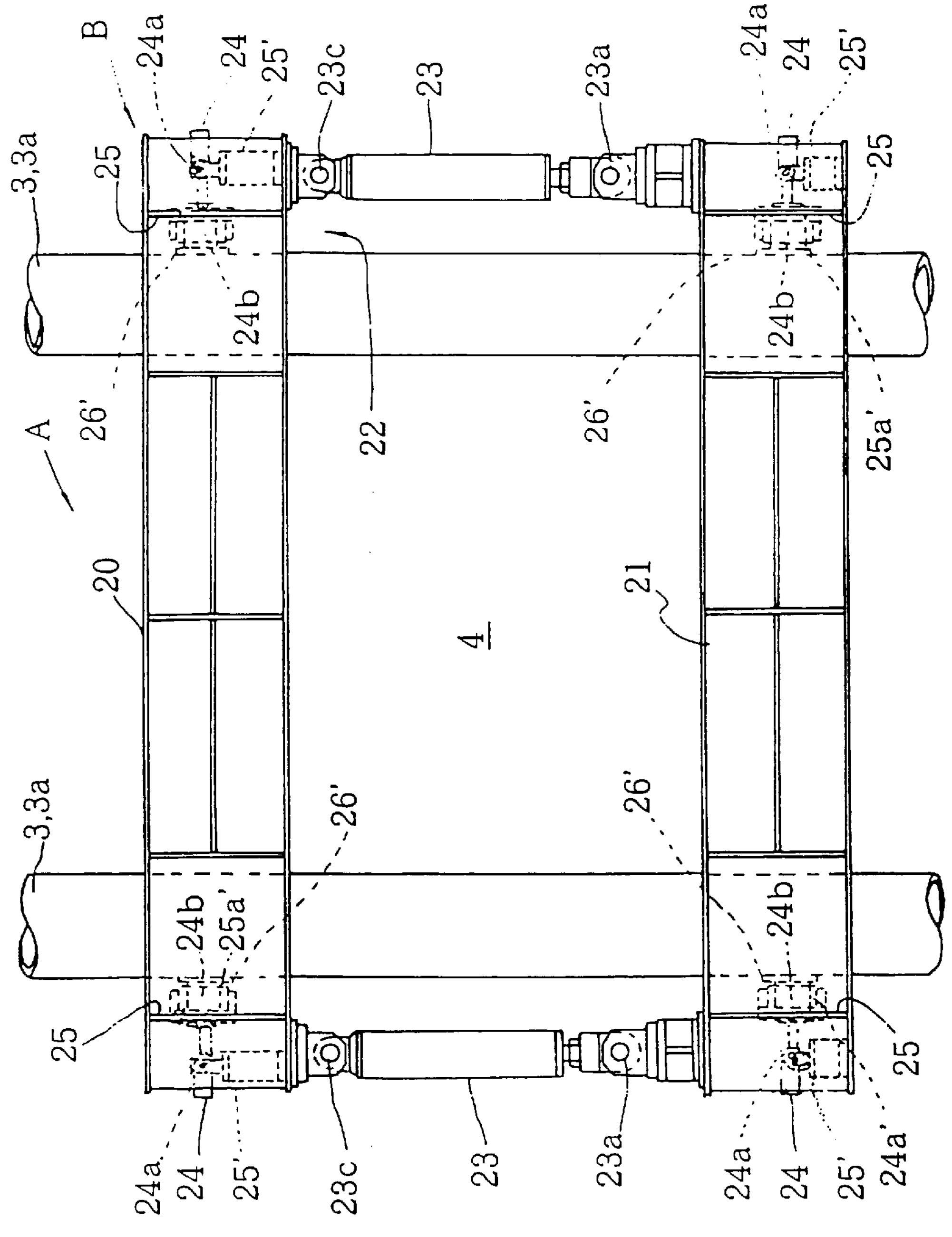
Figure 76:
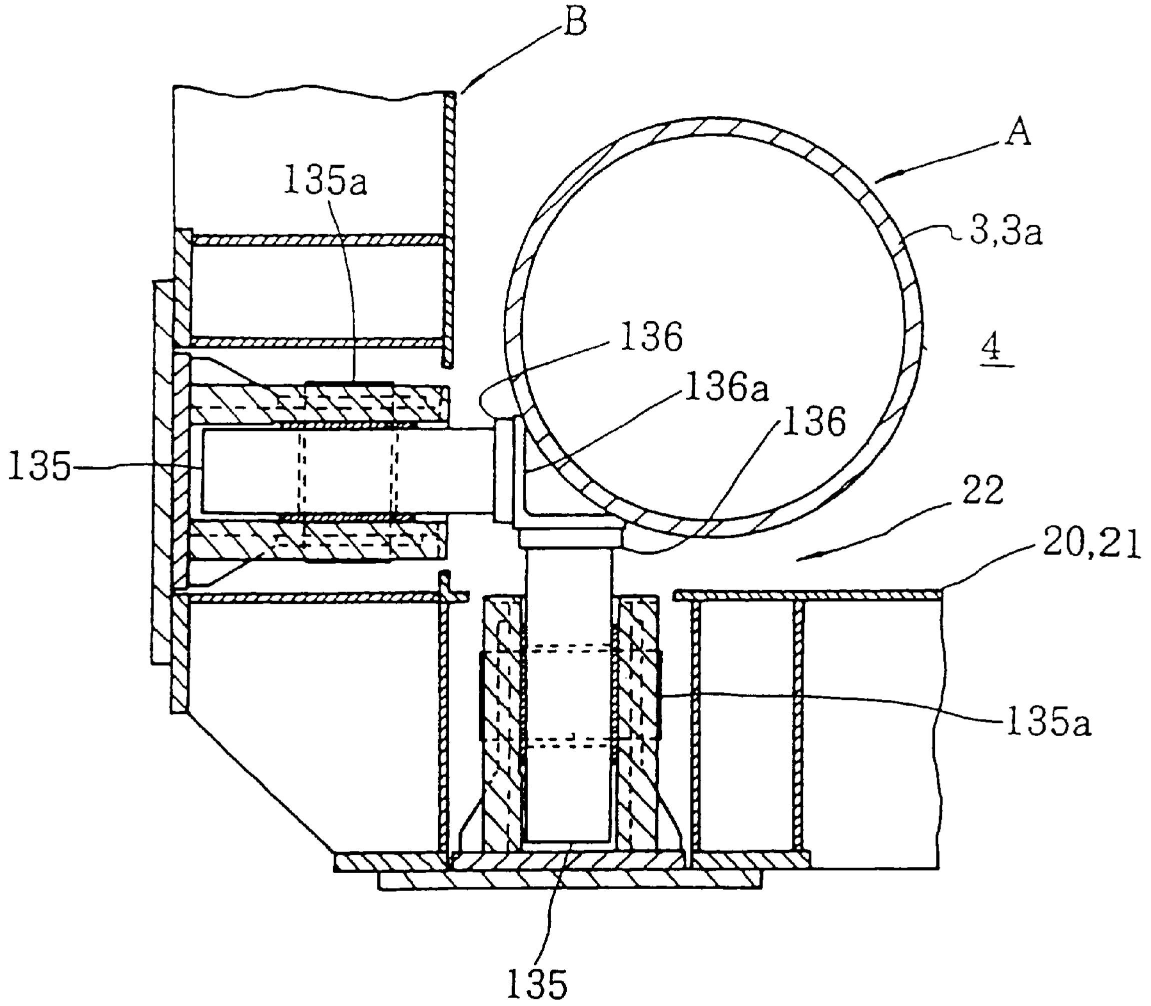
Figure 77:
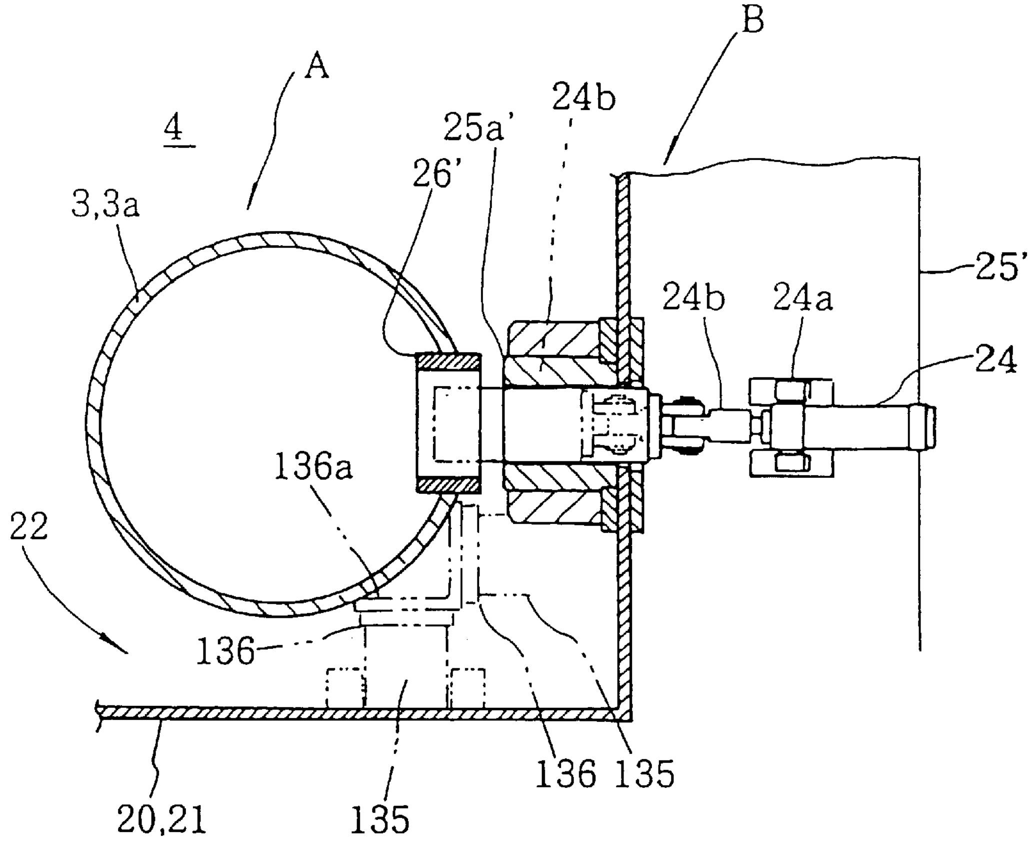
Figure 78:
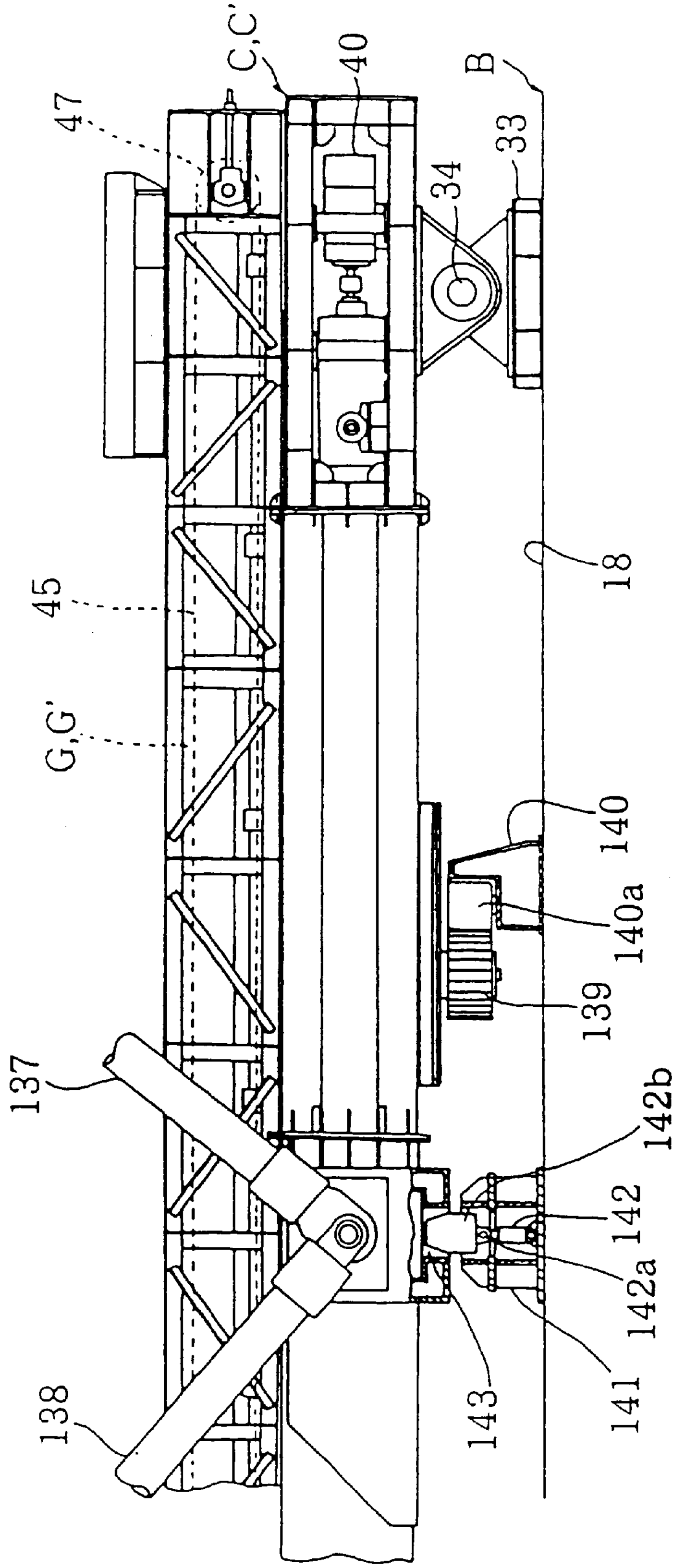
Figure 79:
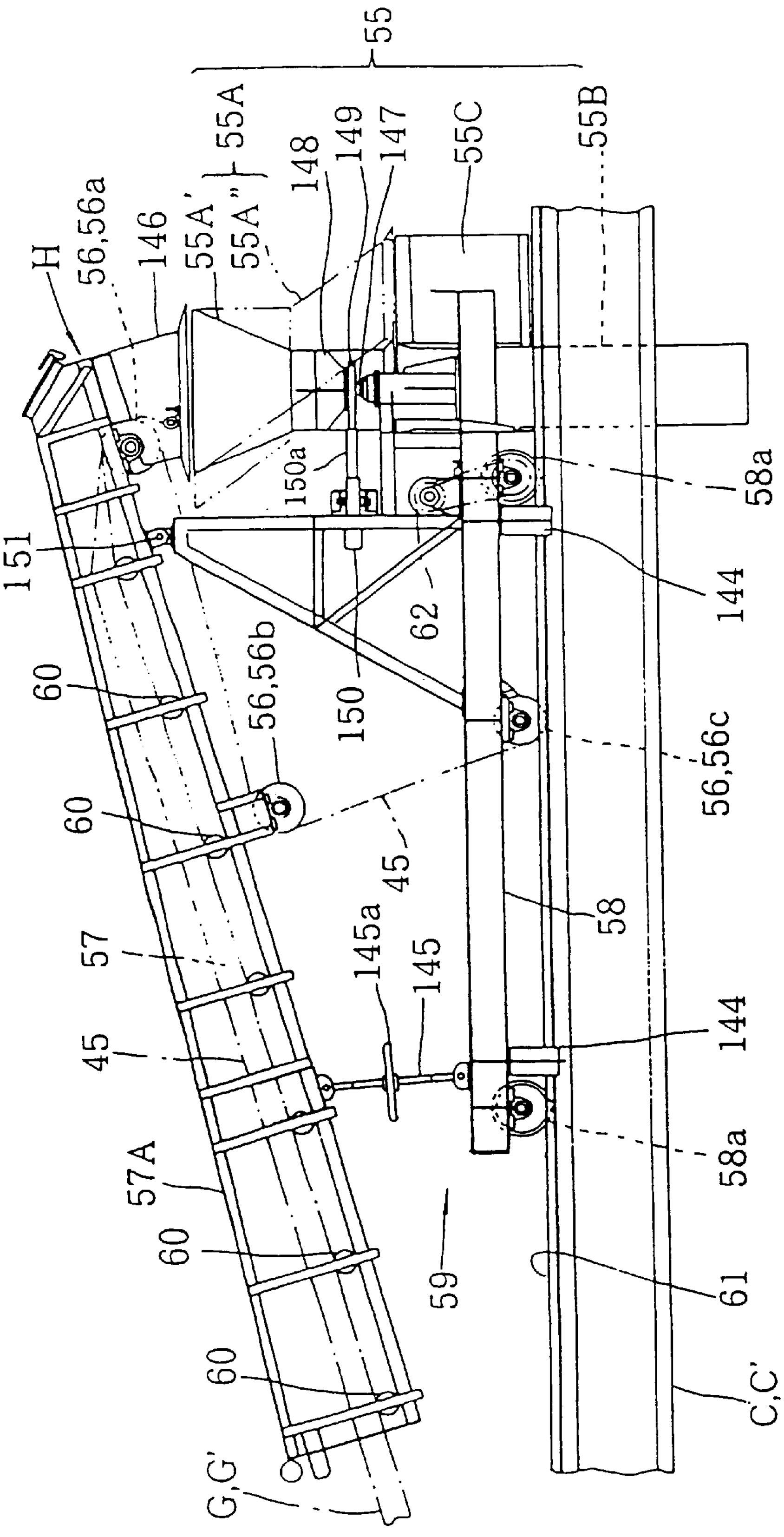
Figure 80:
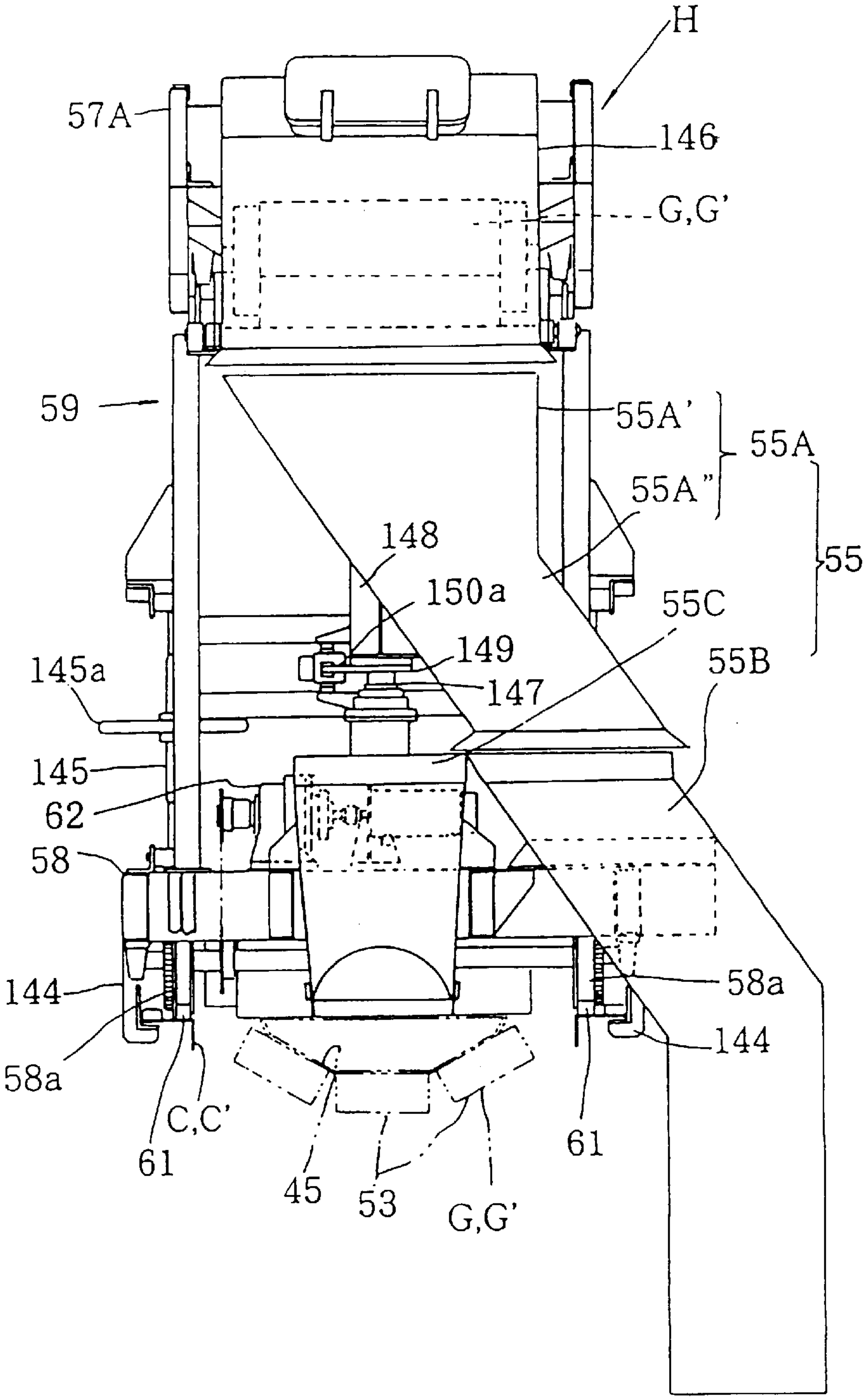
Figure 81:
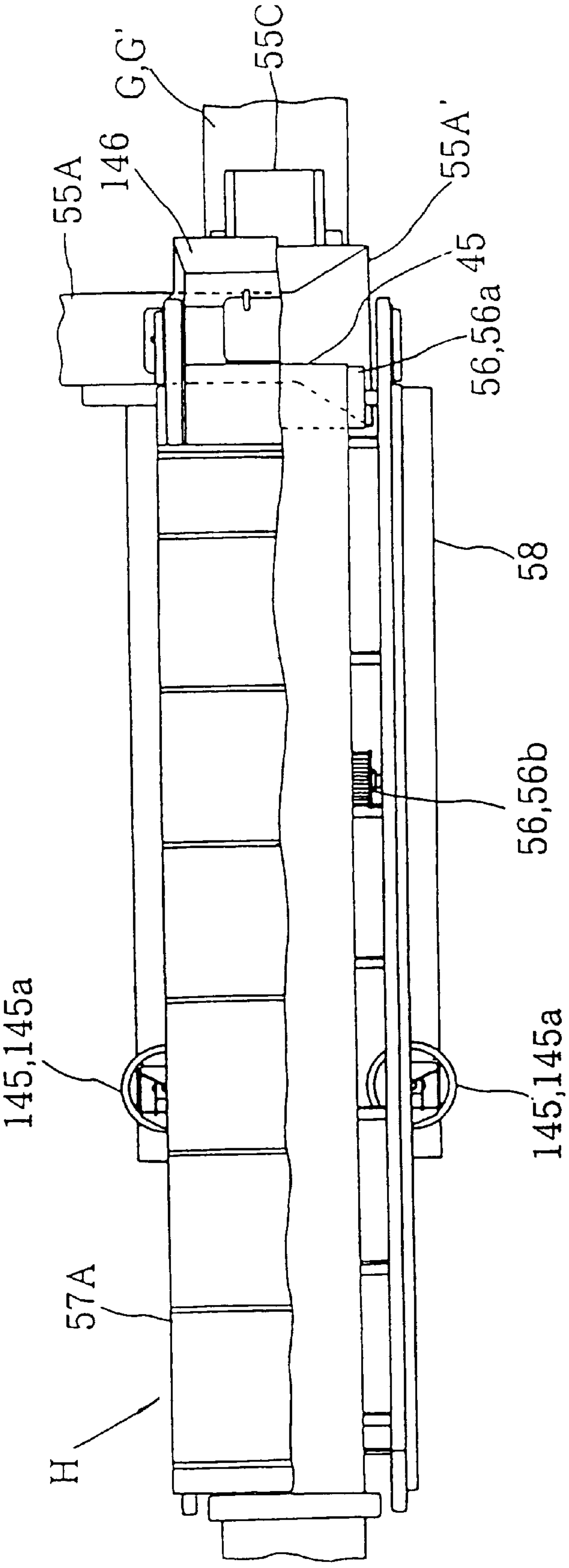
Figure 82:
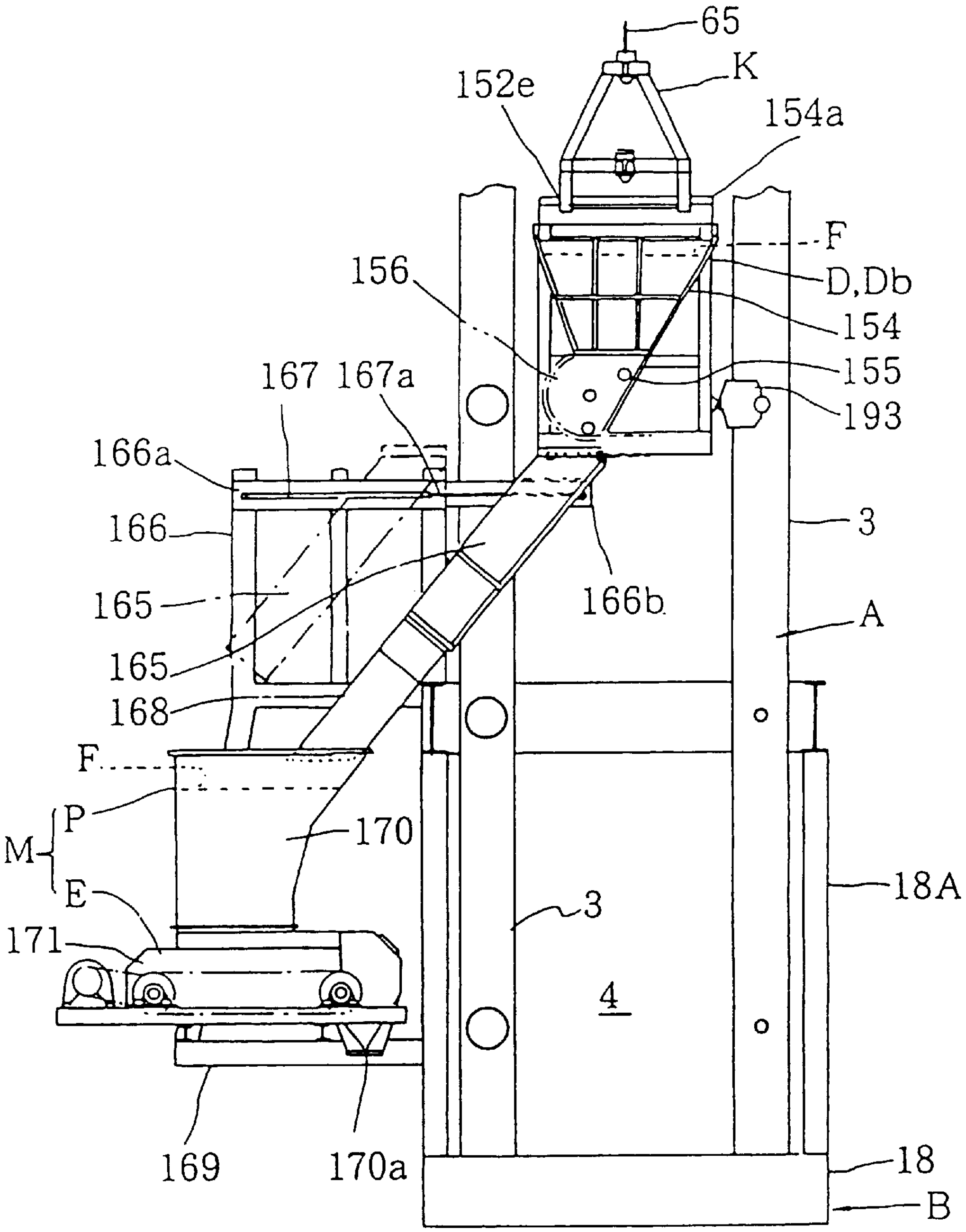
Figure 83:
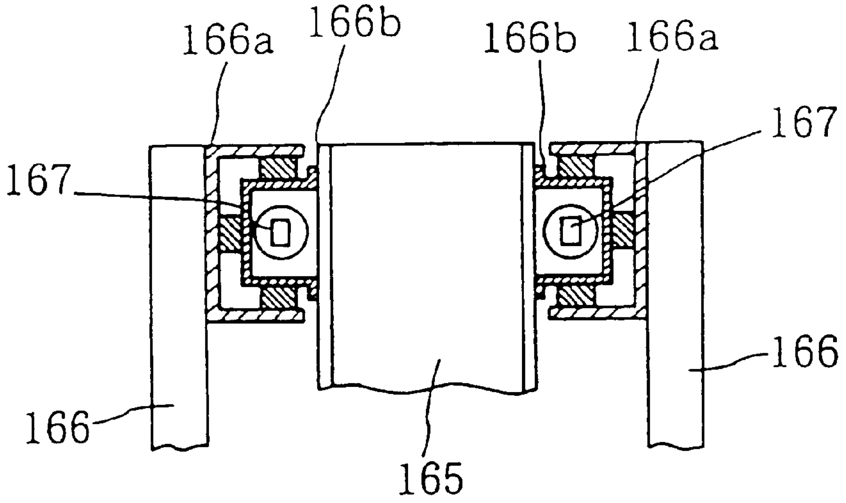
Figure 84:
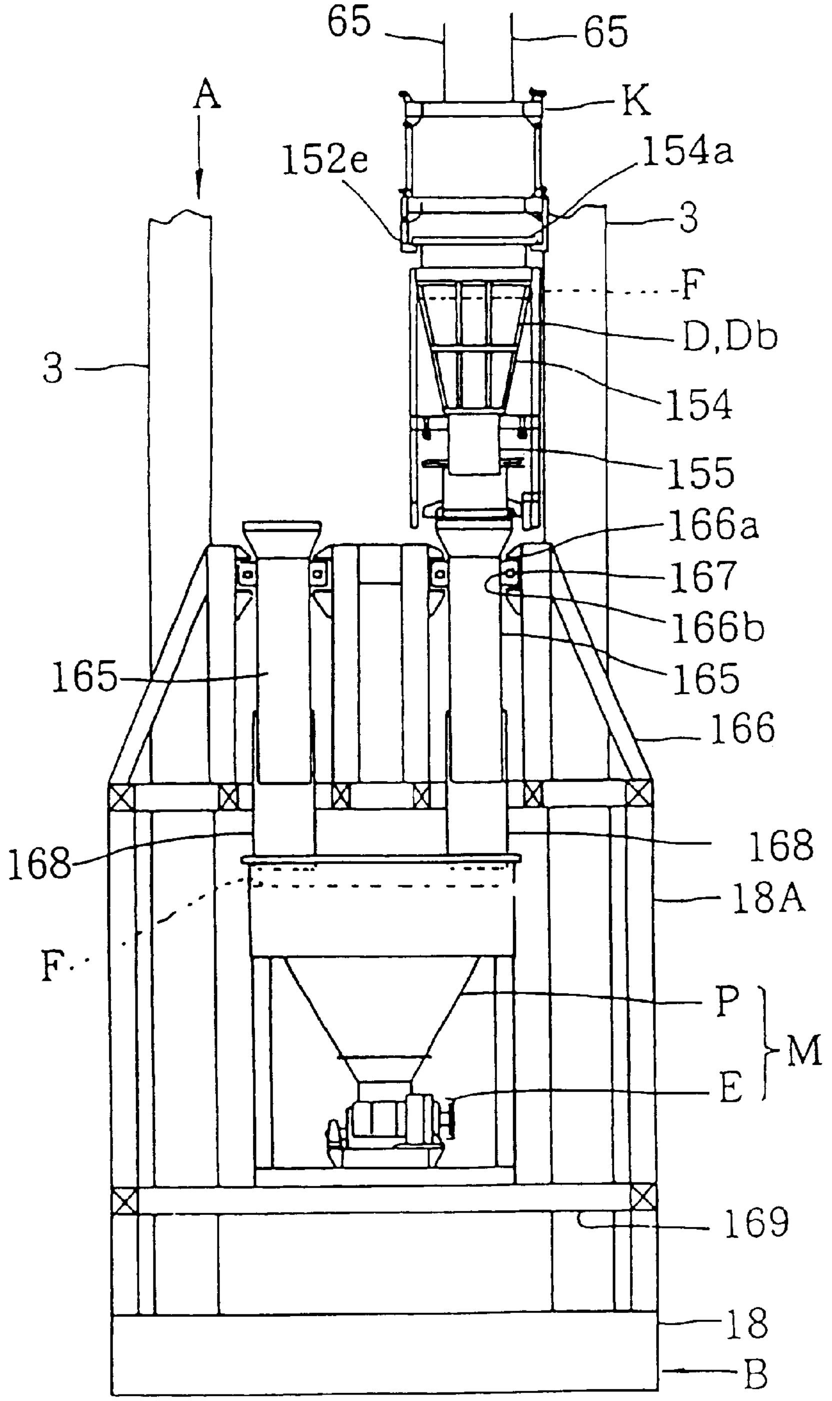
Figure 85:
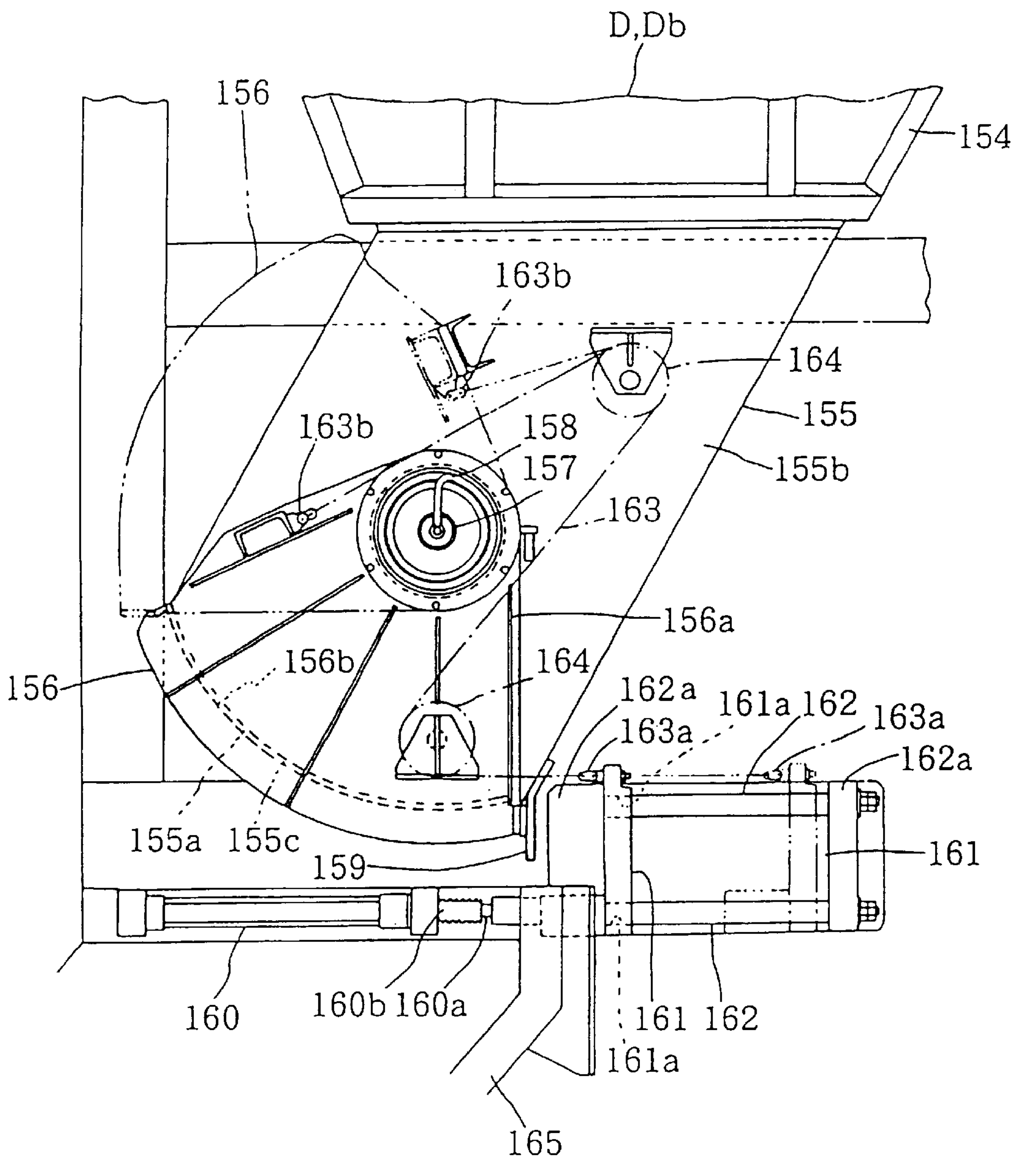
Figure 86:
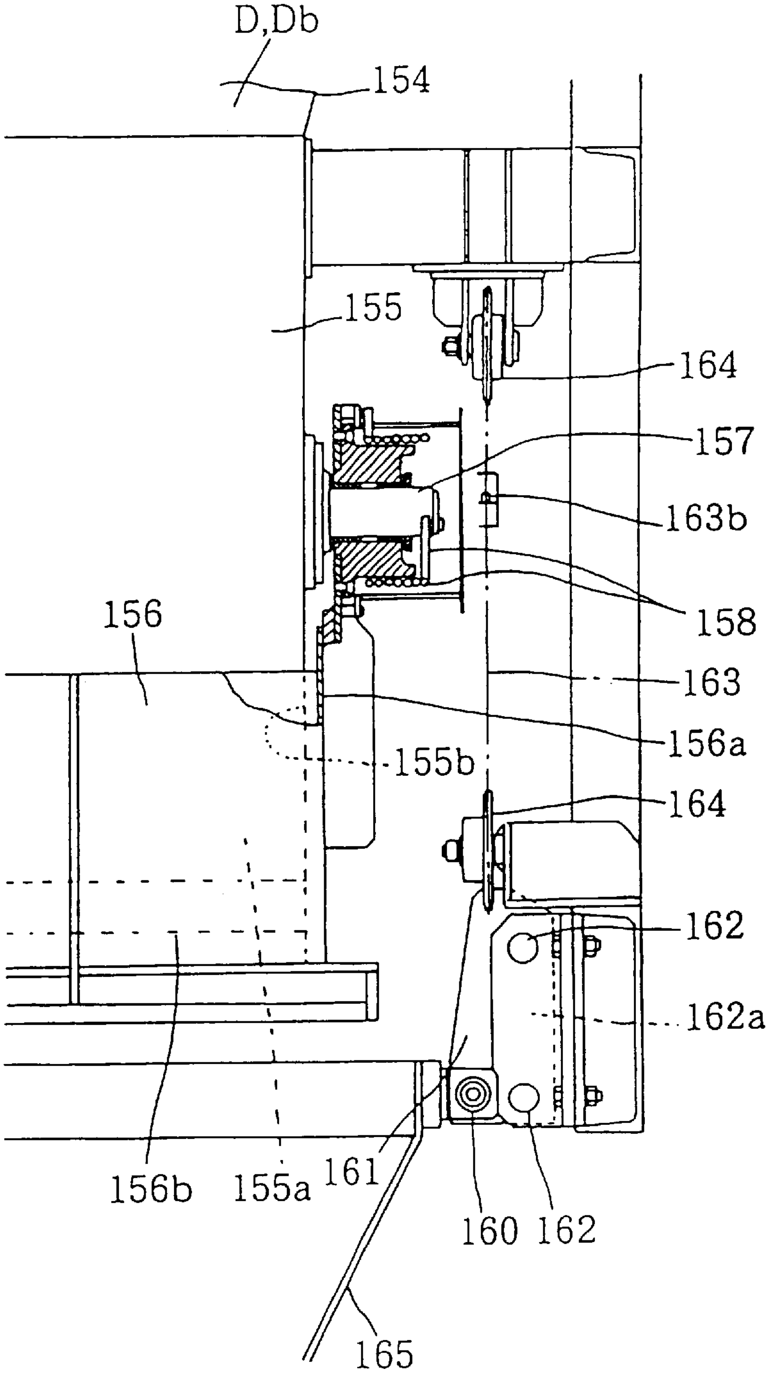

There is provided a locking device 141 as means for holding the boom C in a regular position, i.e. means for stopping swinging the boom in the position shown in FIGS. 71 and 78 in the specific example.

The locking device 141 is constituted by a lock pin 142*b* which is carried on a plunger rod 142*a* of a hydraulic cylinder 142 provided on the lift B, and an engagement hole 143 which is formed in the lower side of the swingable boom C. When the engagement hole 143 of the boom C is located just above the lock pin 142*b*, the lock pin 142*b* can be inserted into the engagement hole 143.

As with the other modes, the boom C is constituted by the inner boom C' arranged on the lift B, and the outer boom C" arranged on the inner boom C' so as to be extensible in and with drawable from the inner boom, and is constructed so that the ready mixed concrete F on the belt conveyor G' provided on the boom C can be taken over to the belt conveyor G" on the outer boom C" by the tripper H.

The structure which allows the outer boom C" on the boom C to be withdrawn in and extended from the inner boom C' is substantially the same as the structures which have been clarified with respect to the other modes. In Figures, reference numeral 40 designates an electric motor which is used to move the outer boom C".

The belt conveyors C', C" which are provided on the boom C include the driving pulleys 46, 50 which are driven, respectively, by the electric motors 48, 52, and the driven pulley 47, 49, the conveyor belts 45, 51 being extended between the driving pulley 46 and the driven pulley 47 and between the driving pulley 50 and the driven pulley 49, respectively. The belt conveyors can convey and guide the concrete F conveyed by the carriers D to a concrete placing position.

How to arrange the belt conveyor G on the boom C in this mode is substantially the same as that in the other modes.

The belt conveyor G is provided with the tripper H which can take out the concrete F conveyed by the belt conveyor G, at an arbitrary position on the way of conveyance on the belt conveyor.

Although the inner boom C' and the outer boom C" may include, respectively the trippers H, the tripper H may be provided only on the inner boom C' like this mode.

The tripper H which is provided on the boom C in this mode has substantially the same structure as the tripper H used in the first mode except that the chute 55 is constituted by a swingable chute 55A, a fixed chute 55B for delivering the concrete F supplied from the swingable chute 55A toward laterally of the belt conveyor G, and a fixed chute 55C for delivering the concrete F supplied from the swingable chute 55A to the belt conveyor G" on the outer boom C".

In detail, in the tripper H, a guide frame 57A forming the guide surface 57 has an end mounted by a shaft 151 to the traveling frame 59 which has the truck 58 with the wheels 58*a*. The guide frame has the other end mounted to the traveling frame 59 by an adjusting screw pole 145 with a handle 145*a* so as to be liftable. The traveling frame 59 has the swingable chute 55A and the fixed chutes 55B, 55C provided thereon.

The tripper H which is constructed according to this mode includes a structure to drive the wheels 58*a* by an electric motor 62 provided on the truck 58, is provided with overturn-preventing means 144, and is movable on the rails 61.

The guide frame 57A has a lower side at the top end and at a lower position provided with the pulleys 56, 56. The conveyor belt 45 of the belt conveyor G' which is guided along the guide surface 57 formed by the rollers 60 . . . 60 of the guide frame 57A is turned another way by a pulley 56*a* of the pulleys 56 at the top end, and the conveyor belt 45 is further turned another way by a pulley 56*b* at the middle portion on the lower side of the guide frame 57A, thereby being guided toward the outermost end of the boom C' by a pulley 56*c* provided on the traveling frame 59, in particular on the truck 58.

In order to take out the ready mixed concrete F fed by the belt conveyor G', the chute 55 is provided below the conveyor belt 45, in particular below the pulley 56*a* of the conveyor belt 45, which is turned by the pulley 56*a* at the top end of the guide frame 57A and is bent in an S-character shape by being further turned by the pulleys 56*b*, 56*c*.

The swingable chute 55A which is used in this mode includes an upper chute 55A' opened to a box-shaped chute 146 for receiving the ready mixed concrete F delivered from the leading end of the pulley 56*a*, a lower chute 55A extended from the upper chute in a bending manner. A rotary shaft 147 for the swingable chute 55A is provided on the traveling frame 59 to extend on the axial center line of the upper chute 55A' having a rectangular shape in section. The swingable chute 55A is assembled to the rotary shaft so as to be rotatable, thereby presenting a structure to swing the lower chute 55A" with respect to the upper chute 55A'.

In detail, in the swingable chute 55A, the rotary shaft 147 provided on the traveling frame 59 is fitted into a bearing portion 148 formed on a lower side of the upper chute 55A'. The swingable chute 55A is mounted to the rotary shaft 147 so as to be rotatable. The bearing portion 148 has an arm 149 fixed thereto, and the arm 149 has the leading end connected to the leading end of a plunger rod 150*a* of a hydraulic cylinder 150 provided on the traveling frame 59, thereby allowing the swingable chute to be swung.

The traveling frame 59 has the fixed chute 55C provided thereon at a position where the concrete F is received from the swingable chute 55A when the lower chute 55A' of the swingable chute 55A is turned at a position in front of the leading end of the conveyor belt 45 by the hydraulic cylinder 150. The concrete F is delivered onto the belt conveyor G" of the outer boom C" through the fixed chute 55C.

The traveling frame 59 also has the fixed chute 55B provided thereon at a lateral position of the front end of the traveling frame 59, i.e. at a position where the concrete F is received from the swingable chute 55A when the swingable chute 55A is turned through substantially 90° from the position stated just above by the hydraulic cylinder 150 to locate the lower chute 55A' of the swingable chute 55A at the lateral position of the leading end of the conveyor belt 45. The concrete F is delivered to a concrete placing surface through the fixed chute 55B.

The container-like carriers D which are provided on the tower mast A so as to be liftable are constructed as the container-like carriers Db without the continuous supply means E in the example shown, and the carriers are provided in a suspended state in a pair of the spaces 4, 4 defined by the mast frames 3 of the tower mast A.

The carriers Db are constructed so that the lifting winches 63 provided on the main stage 18, the guide sheaves 64 provided on the top of the tower mast A, and the counter weights 102 are used, and that the wire ropes 65 operated by each lifting winch 63 have one side of ends connected to the related carrier Db and the other side of ends connected to the related weight 102 so as to suspend the carrier and the counter weight through the guide sheaves 64.

In the example shown, the winding drums 67 are driven by the electric motors 66 through the electromagnetic brakes 68 and the reduction gears 69, respectively. The wire ropes 65*a*, 65*a* which are wound on the respective winding drums from a lower side thereof are directed onto the sheaves 64*a*, 64*a*, and have the related counter weight 102 suspended therefrom. The wire ropes 65*b*, 65*b* which are wound on the respective winding drums 67 from an upper side thereof are directed onto the sheaves 64*b*, 64*b*, and have the related carrier Db suspended therefrom.

The container-like carriers Db which are raised and lowered along the tower mast A by the lifting winches 63 are constructed, in the example shown, so that the carriers are raised and lowered by the lifting carriers K, and that the lifting carriers K have the wire ropes 65 secured thereto.

The lifting operation of the carriers Db by the lifting winches 63 is substantially the same as the lifting operation described with reference to the other modes.

The carriers Db are constructed so that the carriers do not include the supply means E for continuously and quantitatively delivering the concrete F unlike the carriers Da used in the conveying apparatus according to the first mode. The carriers Db may have any kinds of structure as long as the carriers are formed as containers which have a bottom formed with opening and closing means and house the ready mixed concrete F therein.

The lifting carriers K which are used to raise and lower the container-like carriers Db are constructed so that engagement projections are formed on each carrier K so as to be hooked at flanges 154*a* of the related carrier Db entering from a lateral side of the carrier K, and that the flanges 154*a* of the carrier Db hook at the engagement projections 152*e* to be suspended therefrom.

Each lifting carrier K used in this mode is constituted by a pair of side frames 152*a*, 152*a* constructed in a substantially isosceles triangle shape, an upper frame 152*b* connected between top ends of the side frames 152*a*, 152*a*, and a lower frame 152*c* connected between substantially central portions of a paired of horizontal poles 152*a*', 152*a*' of the opposed side frames 152*a*. Supporting poles 152*d* for the related container-like carrier Db are arranged so as to be suspended from edges of the horizontal poles 152*a*' of the side frames 152*a*. The engagement projections 152*e* which are arranged on lower ends of the supporting poles 152*d* suspended from one of the opposed side frames 152*a*, and the engagement projections 152*e* arranged on lower ends of the supporting poles 152*d* suspended from the other side frame 152*a* are projected so as to face each other.

Each carrier K is constructed so that two sets of guide rollers 153A and 153B which are different in the extending direction of the rotary axes in the respective sets are provided on each top of the side frames 152*a* and on the horizontal poles 152*a*' just below each top so as to project outwardly, and that the guide rollers make driving and rotating movement on the paired guide rails 89 provided in the spaced 4, 4 defined in the tower mast A.

The guide rails 89 which are arranged in the spaces 4 are arranged so as to extend vertically along the opposed surfaces of the respective spaces 4, and the guide rails are fixed on the auxiliary posts 3*b* and the cross bars 3*c*.

One set 153A of the two sets of guide rollers, which make sliding and rotating movement on each guide rail 89 comprises paired rollers, and the paired rollers are arranged to sandwich the guide rail 89 from both sides.

The other set of guide roller 153B which makes sliding and rotating movement on each guide rail 89 is arranged so that the roller rotates along the top end surface of the guide rail 89.

Each container-like carrier Db which is raised and lowered in the suspended state by the related lifting carrier K is constructed so that a container main body 154 for housing the ready mixed concrete F has a top edge formed with the flanges 154*a,* that the flanges 154*a* can be hooked at the engagement projections 152*e* of the lifting carrier K to take the container main body into the lifting carrier K and suspend the container main body from the lifting carrier, and that the container main body can be taken out of the lifting carrier K.

In each container-like carrier Db, the container main body 154 has a bottom formed with a discharge port 155 having a rectangular shape in section, and the discharge port 155 has an opening 155*a* formed with an openable cover 156 for closing the opening.

The cover 156 includes a pair of side plates 156*a* which are extended to sandwich both sides of the discharge port 155, and a covering plate 156*b* which can extend between the side plates 156*a*, 156*a* to close the front end of the opening 155*a* and is formed to arc in section. The covering plate 156*b* of the cover 156 can be closely in contact with the opening edge of the opening 155*a* of the discharge port 155, which is formed by the leading edges of the side plates 155*b* as arced edges 155*c*.

The cover 156 for closing the opening 155*a* of the discharge port 155 is assembled to the discharge port 155 at the side plates 156*a* so as to be rotatable with shafts 157, and the cover 156 is constructed so that it is urged by a coiled spring 158 in the direction of normally closing the opening 155*a*.

The cover 156, which is urged by the coiled spring 158, normally has the leading end in the closing direction elastically contacted to a stopper 159 which is arranged at a lower end of the opening 155*a* of the discharge port 155.

The cover 156 which is normally urged in the closing direction by the coiled spring 158 can be opened against action of the coiled spring by extending a plunger rod 160*a* of a hydraulic cylinder 160 provided on each movable chute 165 which will be explained. The opening of the cover 156 against the coiled spring can be released by withdrawing operation of the plunger rod 160*a* to close the cover 156 under action of the coiled spring 158.

In Figures, reference numeral 160*b* designates a protection cover which covers the plunger rod 160*a* and is formed in a bellows like shape. Reference numeral 193 designates a reaction receiver for making each carrier Db stand still in a proper manner.

In the example shown, a sliding member 161 which is moved by guide rods 162 is provided at a position where the plunger 160*a* of the hydraulic cylinder 160 provided on each movable chute 165 has the leading edge contacted when the movable chute 165 is moved below the related carrier Db, in particular below the related discharge port 155.

In the sliding member 161 which is guided by the guide rods 162, the upper and lower guide rods 162, 162 which extend between rod frames 162*a*, 162*a* in the horizontal direction are assembled to upper and lower guide holes 161*a* in the sliding member so as to be inserted thereinto, and the guide rods can be moved by the extending operation of the plunger rod 160*a*.

A chain 163 has one end secured to the sliding member 161 and the other end secured to the cover 156. The cover 156 which is normally urged toward the closing direction under action of the coiled spring 158 pulls the sliding member 161 to draw the sliding member toward the direction of contacting with the plunger rod 160*a*. The chain 163 which has the one end 163*a* secured to the sliding member 161 is passed around sprockets 164, 164 provided on a portion except for the cover 156, and the other end 163*b* of the chain is secured to the cover 156.

Securing the chain 163 to the cover 156 is made at a position where the cover 156 which is assembled to the discharge port 155 by the shafts 157 so as to be rotatable can be swung and pulled in the direction against action of the coiled spring 158.

In the opening and closing structure for the cover 156 which is constructed as stated above, each movable chute 165 is moved to locate the opening of the chute 165 below the opening 155*a*, and the plunger rod 160*a* of the hydraulic cylinder 160 provided on the movable chute 165 is extended to push the sliding member 161 against action of the coiled spring 158, causing the cover 156 to rotate around the shafts 157 to open the opening 155*a* of the discharge port 155.

In order to stop taking out the ready mixed concrete F from the discharge port 155, the plunger rod 160*a* is withdrawn to release the pressing force to the sliding member 161, causing the cover 156 to be rotated by the urging force of the coiled spring 158 until the cover contacts the stopper 159. Thus, the opening 155*a* of the discharge port 155 is closed.

Each movable chute 165 which takes the concrete F out of the related carrier Db and supplies the concrete to the transferring container M is arranged so as to be movable in the horizontal direction, keeping a slant position with respect to a mounting frame 166 which is provided on the stage post 18A.

Horizontal guide frames 166*a* which are secured to the mounting frame 166 so as to direct opened surfaces inwardly are combined with sliding frames 166*b* which are secured to each movable chute 165 so as to direct opened surfaces to the movable chute, thereby making the movable chutes movable. In particular, the sliding frames 166*b* which are arranged on both sides of each movable chute 165 are housed in the horizontal guide frames 166*a*, thereby allowing the sliding frames 166*b* to be moved in the horizontal guide frames 166*a*.

The horizontal guide frames 166*a* have hydraulic cylinders 167 mounted thereto at the side opposite to the side of projecting the sliding frames 166*b*, and the hydraulic cylinders 167 have the leading edges of plunger rods 167*a* mounted to the leading edges of the sliding frame 166*b* in the sliding frame housed in the horizontal guide frames. The hydraulic cylinders 167 are activated to move the movable chutes 165 in the horizontal direction.

The movable chutes 165 comprise two chutes which are arranged so as to correspond to the two container-like carriers Db, Db provided on the tower mast A and so as to be movable in the horizontal direction, maintaining a predetermined tilt angle with respect to the mounting frame 166.

When the carriers Db are moving in the tower mast A, the horizontally movable chutes 165 are directed out from the tower mast A, in particular from the spaces 4 toward the mounting frame 166. When the movable chutes receive the ready mixed concrete F from the carriers Db guided to the uppermost portion of the tower mast A, the movable chutes can be moved into the spaces 4 of the tower mast A to be located in a proper manner at positions for receiving the ready mixed concrete F from the carriers Db.

The mounting frame 166 has fixed chutes 168 provided thereon to communicate with the movable chutes 165 and below the movable chutes when the movable chutes 165 are located at the positions for receiving the ready mixed concrete F from the carriers Db.

The fixed chutes 168 are arranged not to obstruct the raising and lowering operation of the carriers Db in the tower mast A, and the fixed chutes supply the ready mixed concrete F from the movable chutes 165 to the transferring container M.

The lift B, i.e. the stage posts 18A assembled to the main stage 18 as one unit in the example shown has a table frame 169 integrally assembled thereto together with the mounting frame 166, and the table frame 169 has the transferring container M provided thereon.

The transferring container M is constructed so that its upper portion is formed as the receiving container P and it has a lower portion provided with the supply means E. The ready mixed concrete F which is received into the receiving container P can be continuously and quantitatively delivered by the supply means E through a chute 170*a* therefrom.

Figure 87:
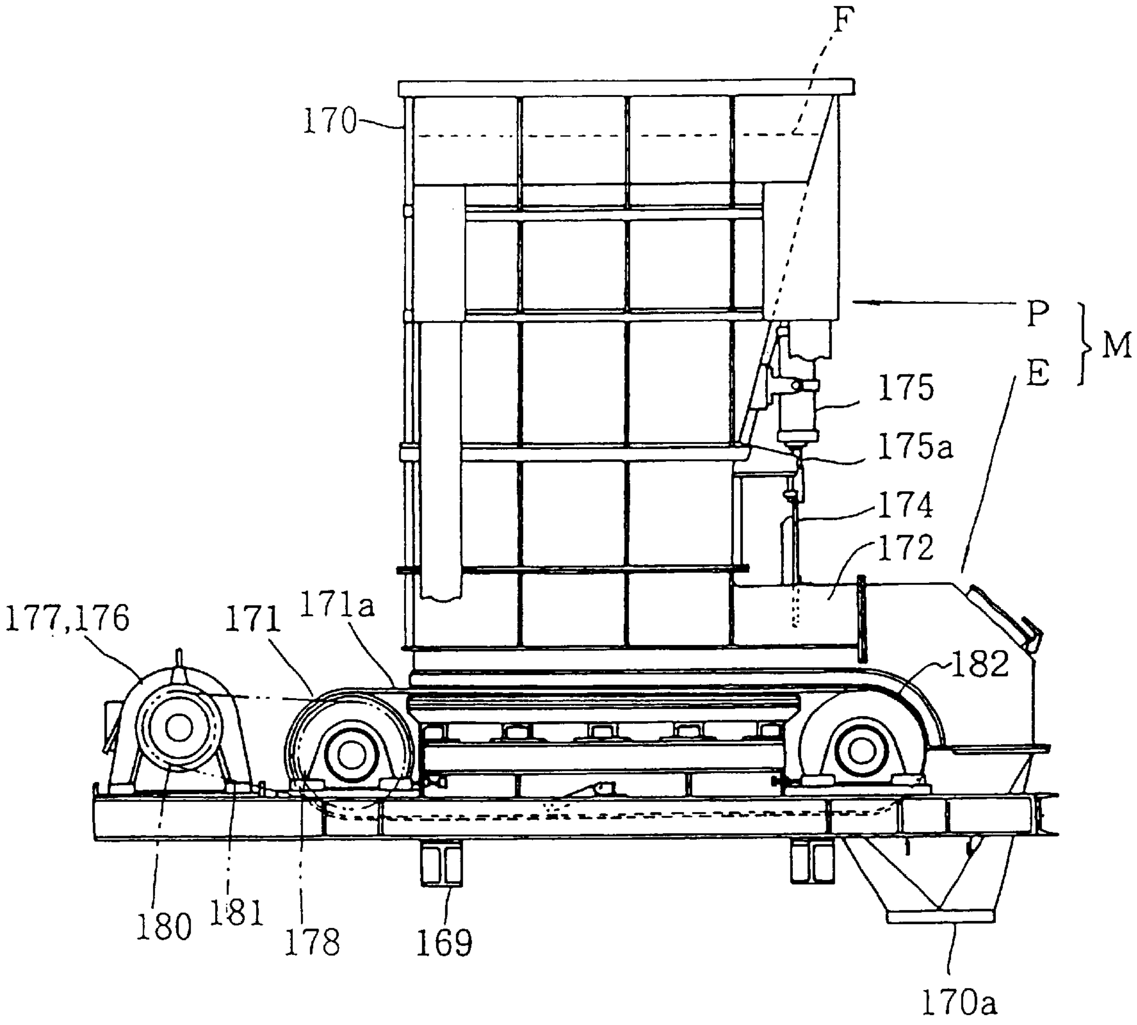
Figure 88:
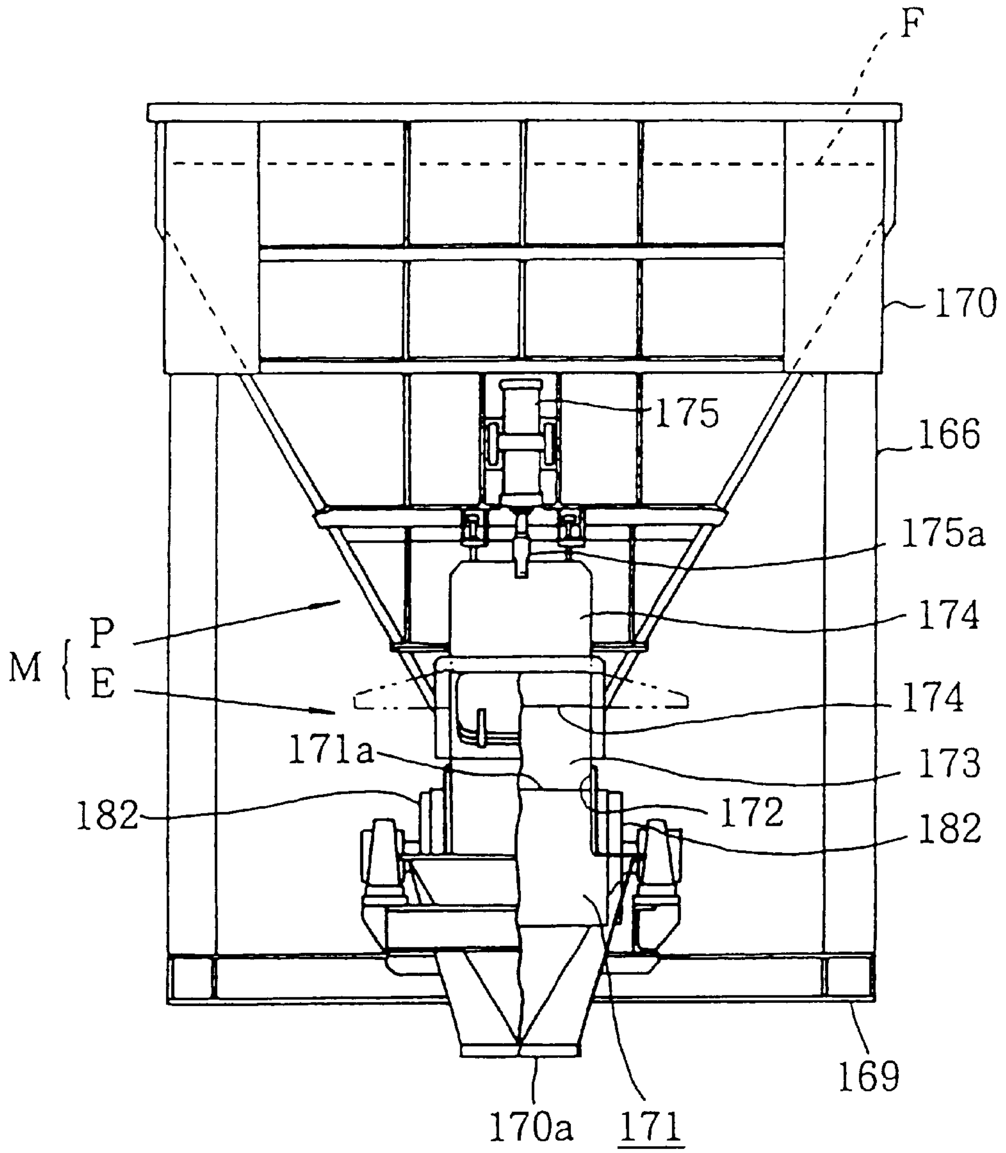
Figure 89:
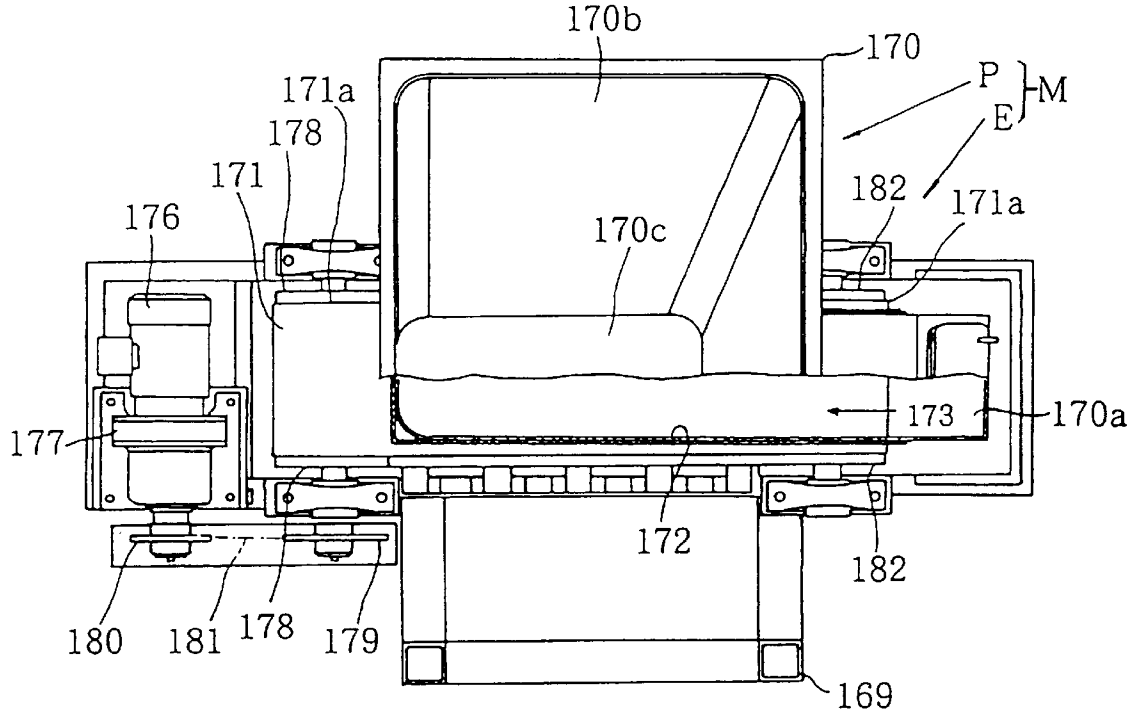

As shown in FIGS. 87–89, the transferring container M is constructed so that e.g. a hopper-shaped container main body 170 forms the receiving container P, the container main body has a top portion formed with an opening 170*b,* and the container main body 170 is formed to be downwardly tapered and has a hopper-shaped lower opening 170*c* located above a conveyor belt 171*a* of a belt conveyor 171. This arrangement provides the supply means E which continuously and quantitatively takes out the ready mixed concrete F housed in the container main body 170 from the lower opening 17*c,* depending on the amount of the ready mixed concrete F conveyed out by driving the belt conveyor 170*l*. Thus, the supply means E is formed as a so-called belt feeder.

The ready mixed concrete F which is delivered out of the lower opening 170*c* is guided in a space 173 which is defined by an upper surface of the conveyor belt 171*a* of the belt conveyor 171 and a cylindrical guide portion 172 formed so as to surround the conveyor belt 171*a*. The concrete F which is carried into the space 173 is delivered from the chute 170*a* toward the conveyor belt G.

An adjusting gate plate 174 is arranged so as to be inserted into the conveyance space 173 for the ready mixed concrete F defined by the cylindrical guide portion 172 and the conveyor belt 171*a*. The amount of the ready mixed concrete F which is conveyed in the space 173 can be adjusted by the adjusting gate plate 174.

The adjusting gate plate 174 can be vertically moved by a plunger rod 175*a* of a hydraulic cylinder 175 provided on the container main body 170. The gate plate is inserted from above the guide portion 172 into the space 173 so as to adjust the insertion depth of the gate.

The adjusting gate plate 174 is arranged to be in a direction orthogonal to the moving direction of the conveyor belt 171*a*. It is preferable that the gate plate is arranged to extend throughout the entire width of the space in the the orthogonal direction.

In Figures, reference numerals 167 designates an electric motor, and reference numeral 177 designates a reduction gear unit. A sprocket 179 coaxial with a driving pulley 178 of the conveyor belt 171*a,* and a sprocket 180 coaxial with the reduction unit 177 are driven by a chain 181, and there is provided a driven pulley 182 for the conveyor belt 171*a*.

Figure 90:
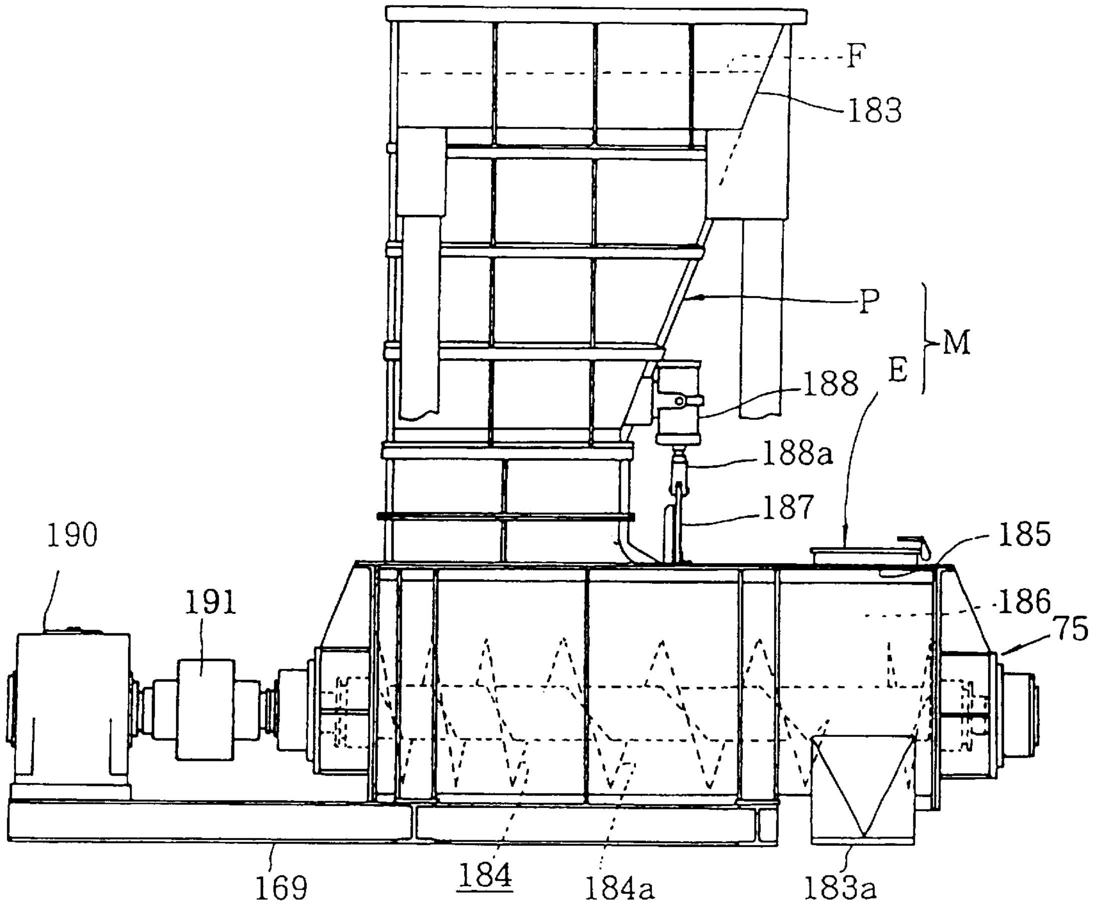
Figure 91:
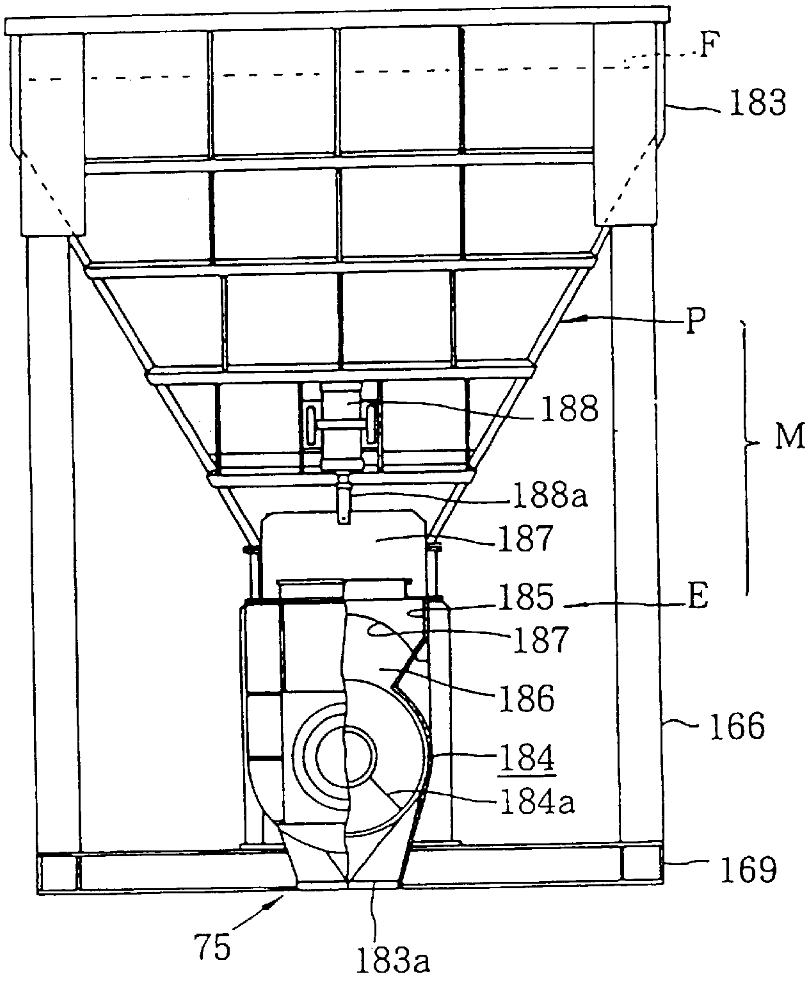
Figure 92:
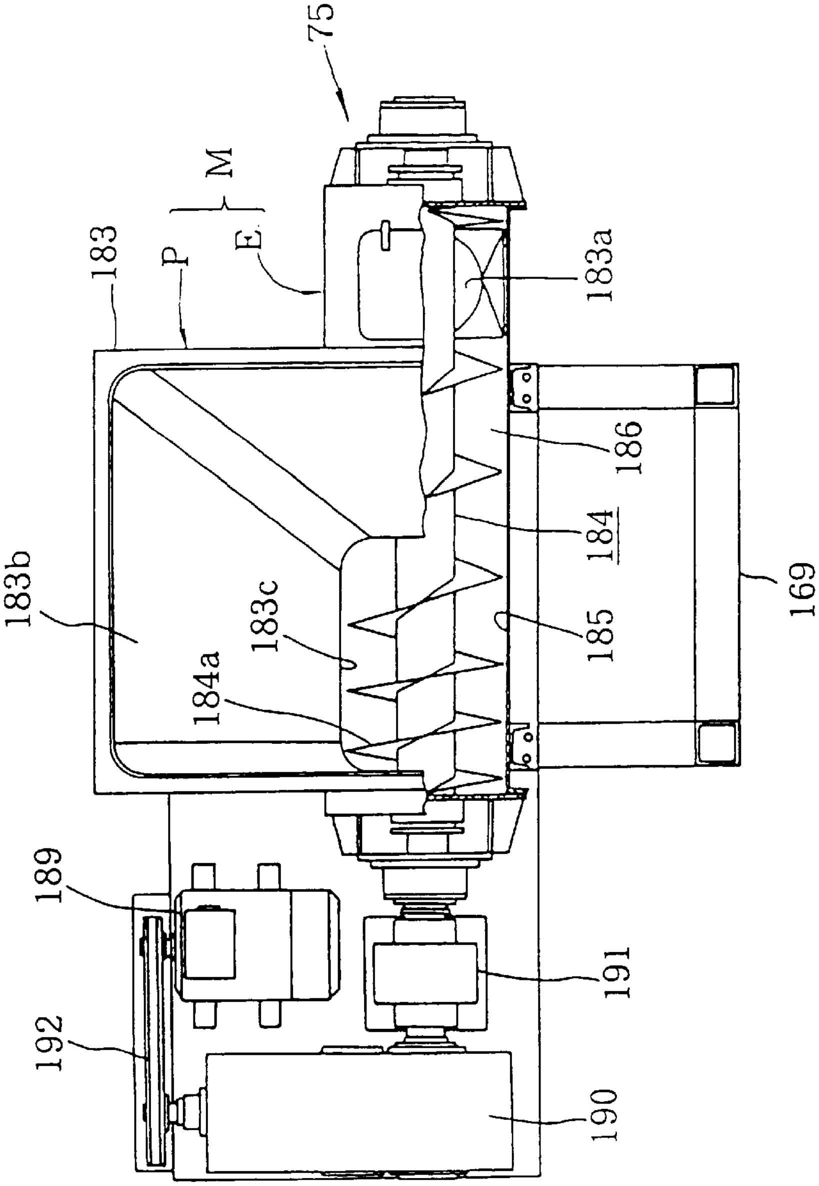
Figure 93:
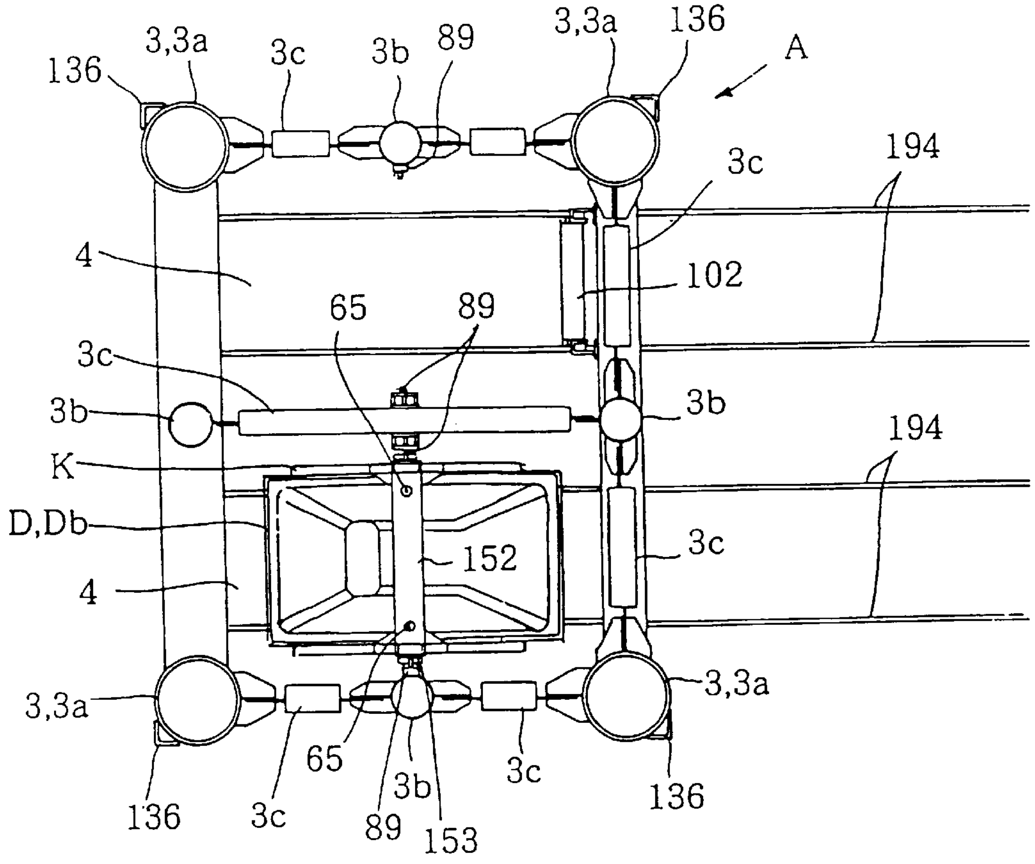
Figure 94:
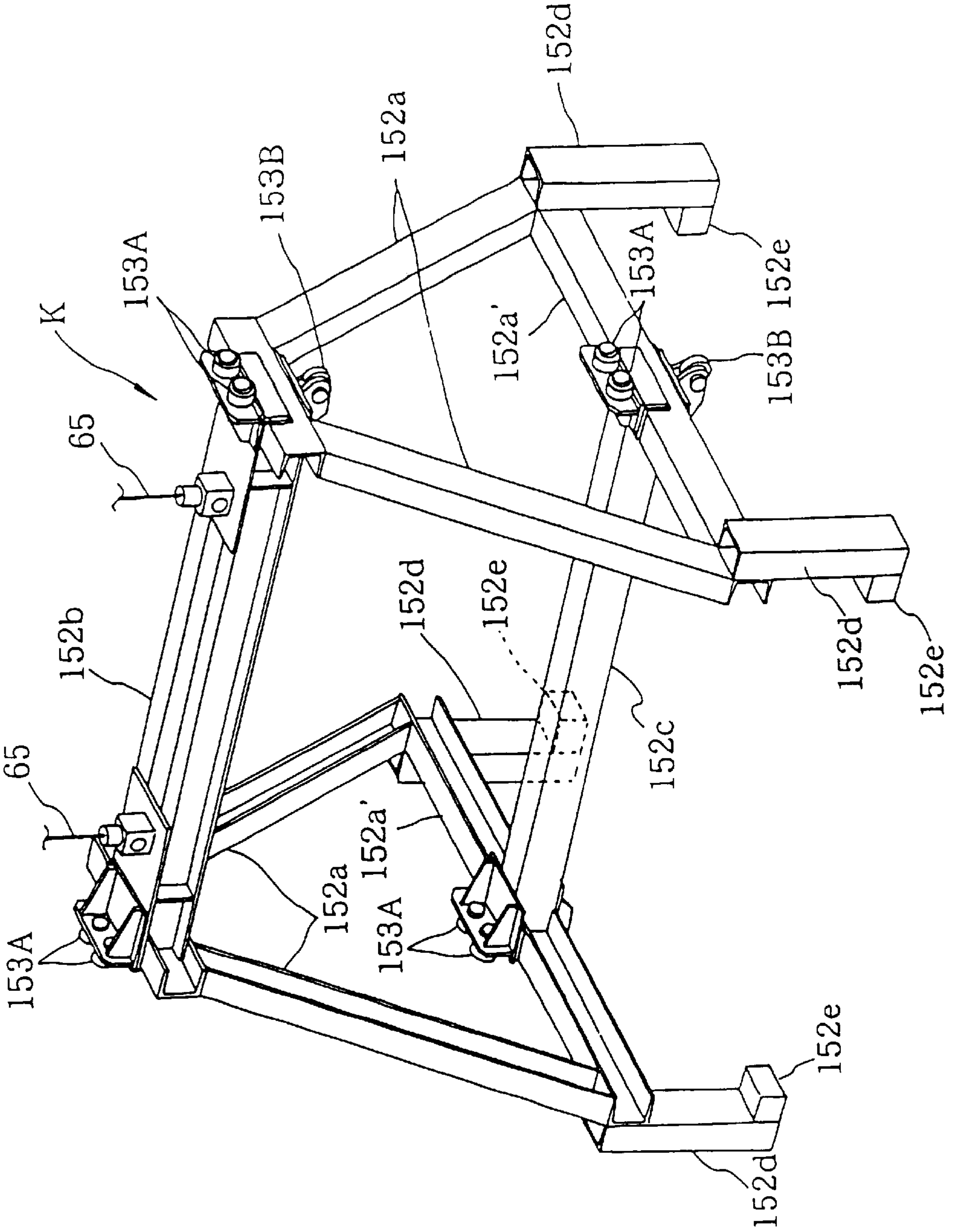
Figure 95:
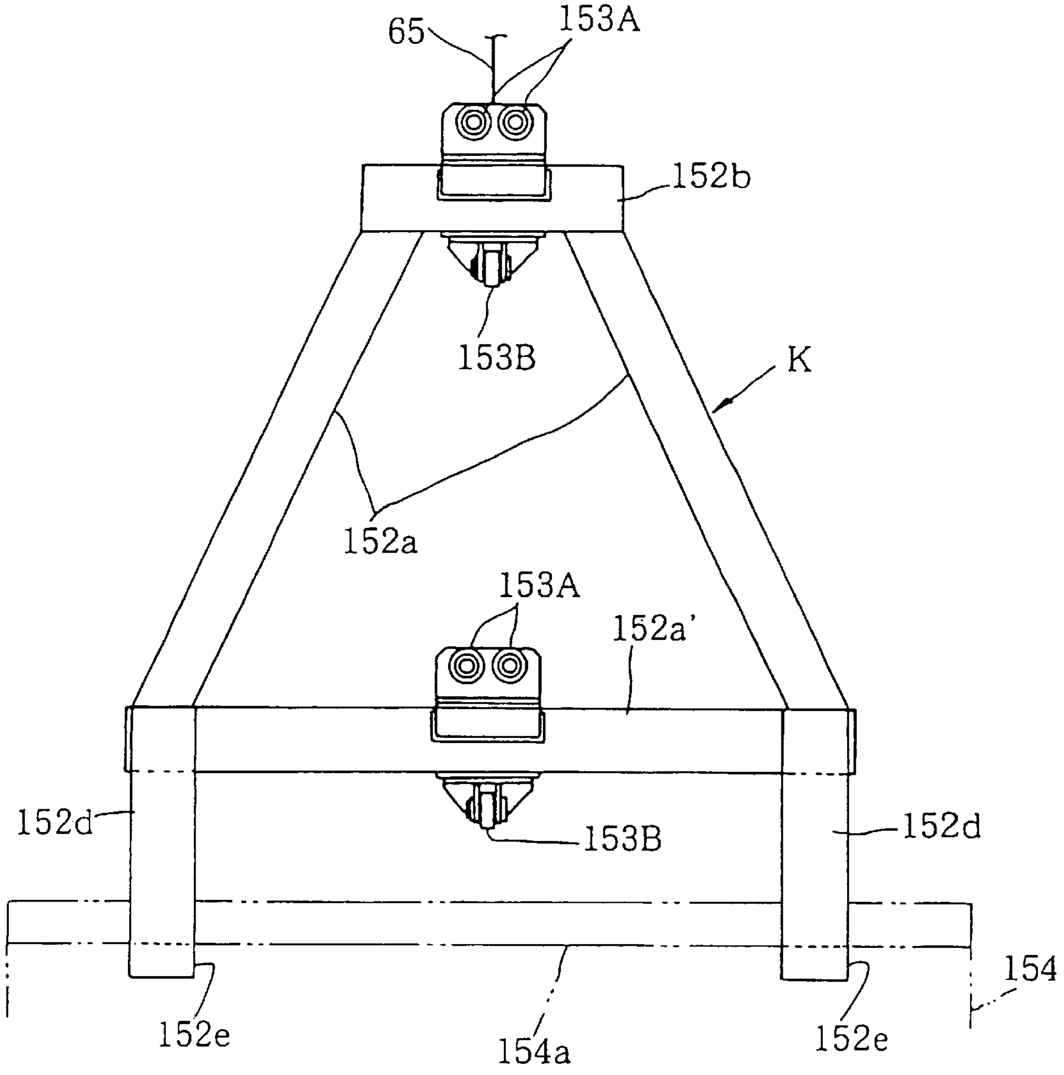
Figure 96:
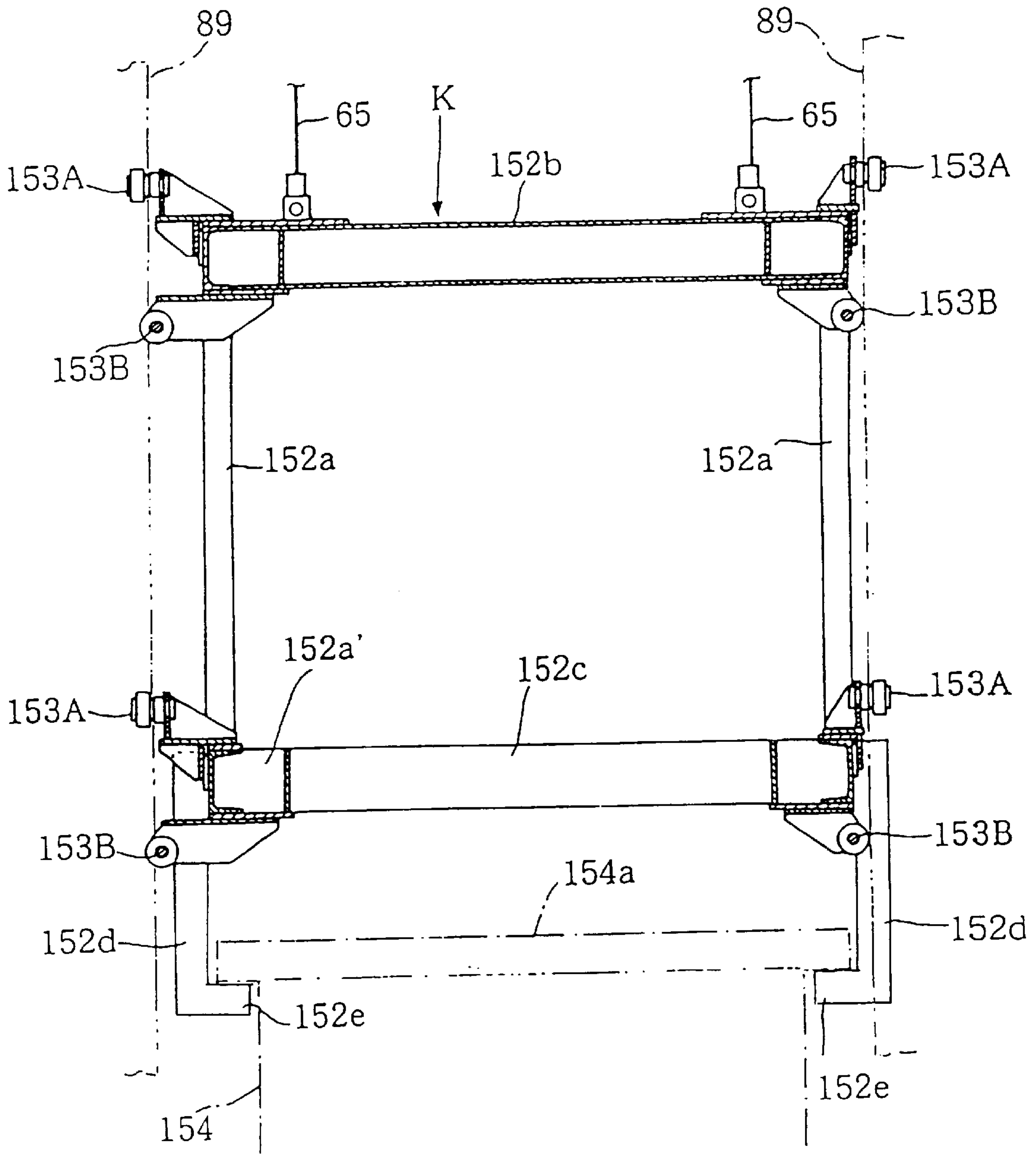
Figure 97:
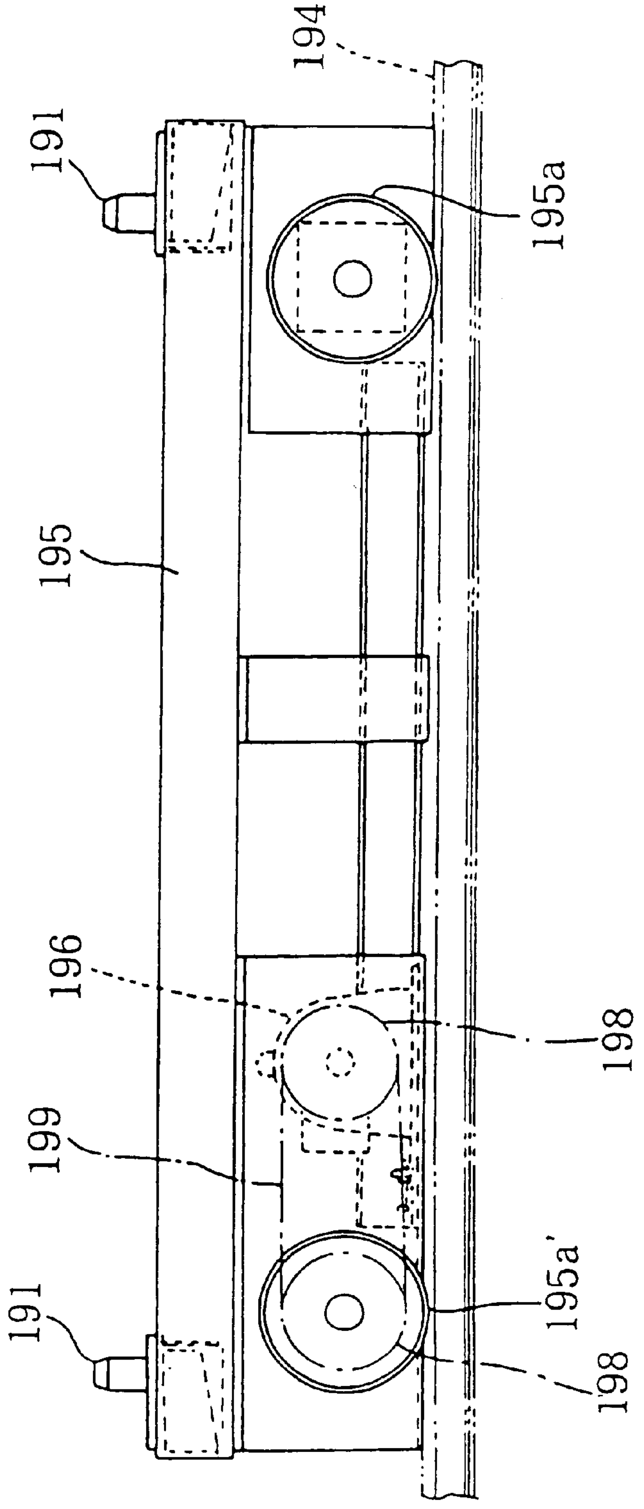
Figure 98:
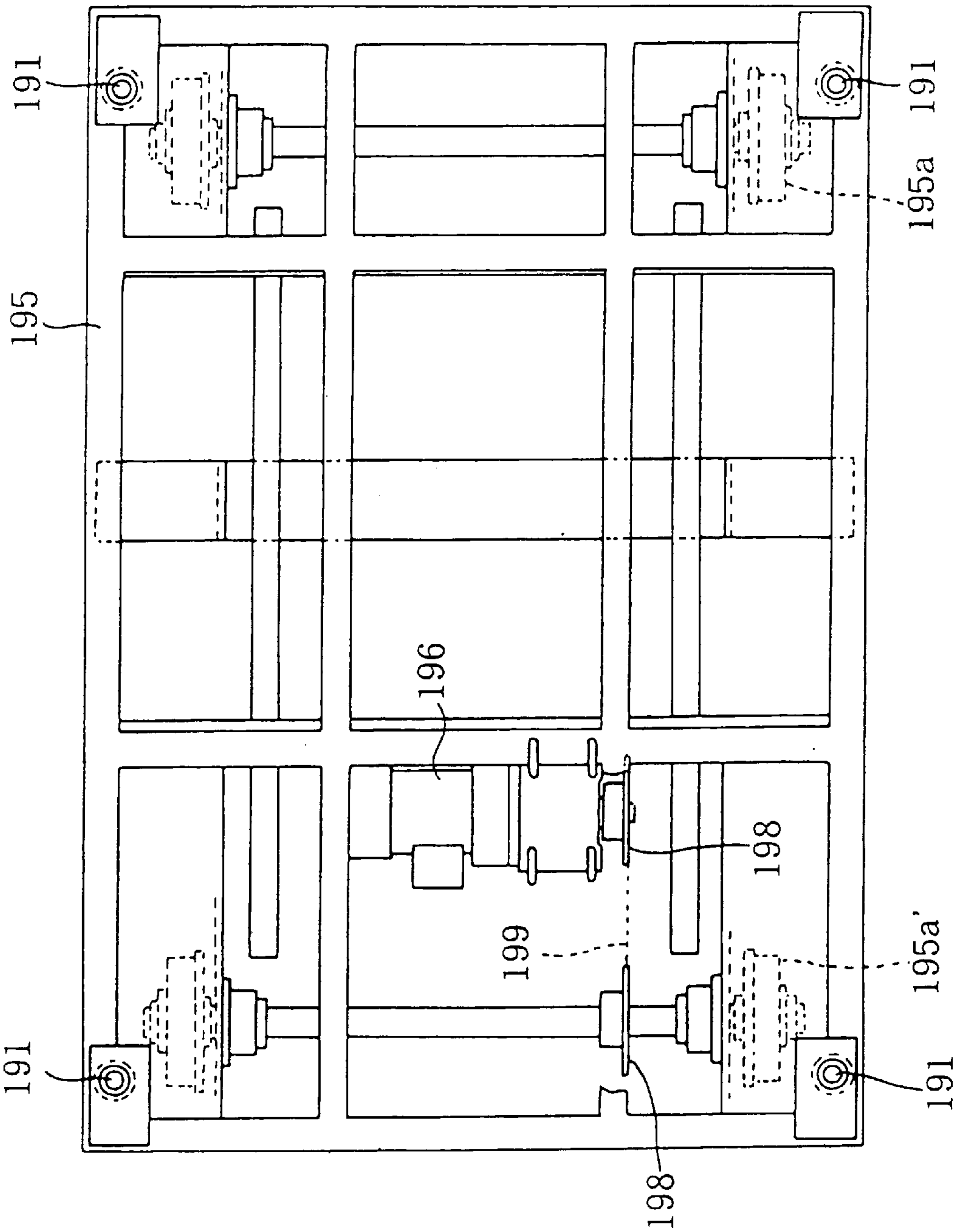

Now, another type of the transferring container M shown in FIGS. 90–92 will be explained.

This type of transferring container M is constructed so that it has an upper portion formed as the receiving container P and a lower portion provided with the supply means E, and that the ready mixed concrete F received into the receiving container P can be continuously and quantitatively delivered by the supply means E through a chute 183*a* thereof.

The transferring container M is constructed so that e.g. a hopper-shaped container main body 183 forms the receiving container P, the container main body has a top portion formed with an opening 183*b,* and the container main body 183 is formed to be downwardly tapered and has a hopper-shaped lower opening 183*c* located above a screw 184*a* of a screw feeder 184. The screw feeder 184 are used as the supply means E for the concrete F, and the screw 184*a* is driven to continuously and quantitatively take out the concrete F housed in the container main body 183 through the lower opening 183*c*.

The ready mixed concrete F which is delivered from the lower opening 183*c* is guided in a space 186 defined by the screw 184*a* of the screw feeder 184 and a cylindrical guide portion 185 formed so as to surround the screw 184*a*. The concrete F which is carried in the space 186 is continuously and quantitatively taken out from the chute 183*a.*

An adjusting gate plate 187 is arranged so as to be inserted into the conveyance space 186 for the concrete F defined by the guide portion 185 and the screw 184*a*. The amount of the ready mixed concrete F which is conveyed in the space 186 can be adjusted by the adjusting gate plate 187.

The adjusting gate plate 187 can be vertically moved by a plunger rod 188*a* of a hydraulic cylinder 188 provided on the container main body 183. The gate plate can be inserted into the space 186 from above the guide portion 185 so as to adjust the insertion depth.

The gate plate 187 is arranged in a direction orthogonal to the axial direction of the screw 184*a.* It is preferable that the gate plate is arranged to extend throughout the entire width of the space in the orthogonal direction. In particular, the gate plate has a lower portion cut out in an arched shape to be apart from the outer periphery of the screw 184*a* with equal spaces.

In Figures, reference numeral 189 designates an electric motor, and reference numeral 190 designates a reduction unit. The screw 184*a* has a shaft coupled through a coupling 191 to the reduction unit 190 driven by the electric motor 189 through a belt 192, thereby to be rotated by the electric motor 189.

By the way, each container-like carrier Db which is provided on the tower mast A so as to be liftable can be conveyed by having the flanges 154*a* removably hooked over the related carrier K.

From this standpoint, in order that each container-like carrier Db can enter the tower mast A, each carrier can be conveyed into the tower mast A by using a cart 195 movable on rails 194. Each container-like carrier can have the flanges 154*a* hooked over the related lifting carrier K to be suspended therefrom.

Each cart 195 which is used to move each carrier Db is constructed so that one of pairs of wheels 195*a* work as driven wheels 195*a*' and are driven by an electric motor 196 provided on the cart 195. The cart 195 has four corners on an upper portion provided with guide pins 191, which project upwardly so as to be housed in guide holes (not shown) provided in an upper side of the carrier Db, thereby allowing the carrier Db to be put on the cart 195 without shifting sideway thereon.

In Figures, reference numeral 198 designates sprockets which are arranged at the side of the motor 196 and at the side of the driving wheels 195*a*'. Reference numeral 199 designates a chain which is passed around the sprocket 198, 198.

The conveying apparatus according to the fifth mode constructed as stated above and shown in FIGS. 69–98 has substantially the same operation and structure as the conveying apparatus according to the other modes except for the operation and structure stated above, such as the lifting operation and the structure of the lift B with respect to the tower mast A, the extending and withdrawing operation, the swinging operation and the structure of the boom C, the lifting operation and the structure of the container-like carriers Db, the transferring operation and the structure of the belt conveyor G on the boom C, the takeout operation and the structure of the ready mixed concrete F by the tripper H on the boom C, and the takeout operation and the structure of the ready mixed concrete F by the supply means E.

(6) Ready mixed concrete conveying apparatus according to a sixth mode

Figure 99:
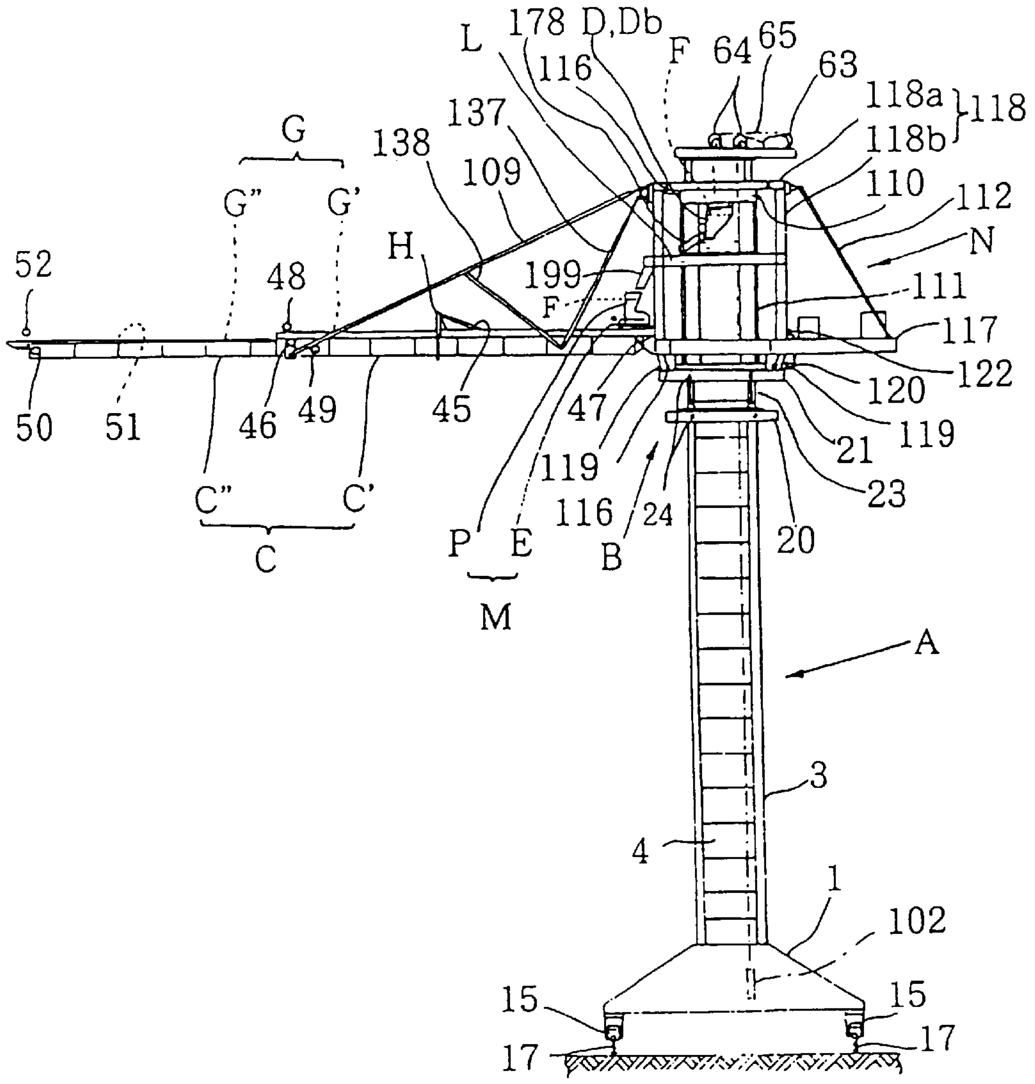
FIGS. 99–100 are views showing the ready mixed concrete conveying apparatus according to a sixth mode.
Figure 100:
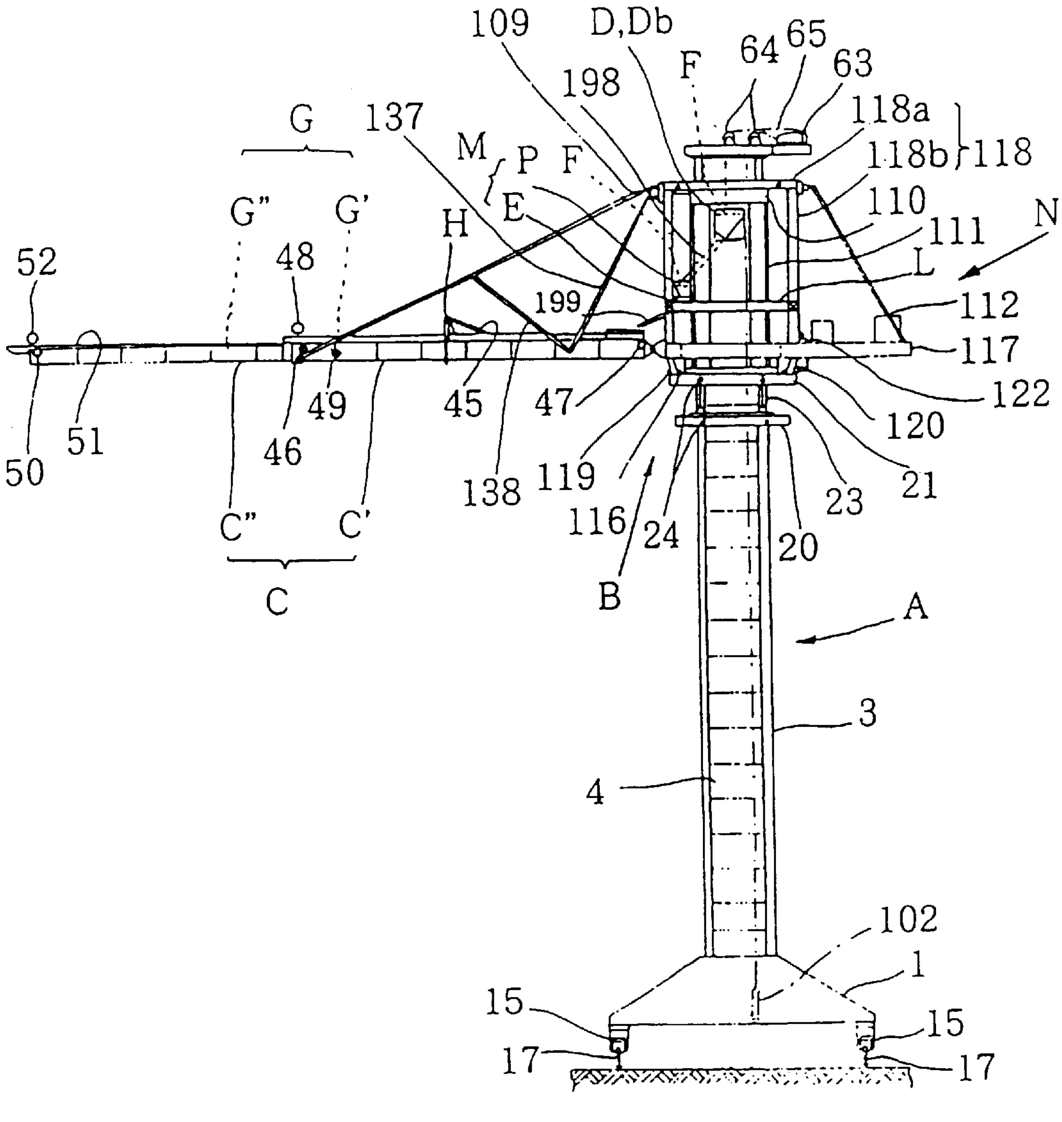

In FIGS. 99–100 there is shown the conveying apparatus according to a sixth mode.

The conveying apparatus according to the sixth mode is constructed so that it comprises the tower mast A, the lift B arranged at the tower mast A so as to be liftable, the rotary portion N arranged on the lift B so as to be rotatable, and the boom C which is arranged on the rotary portion N and which comprises two connected booms C', C".

The tower mast A is provided with container-like carriers D used for conveyance of the ready mixed concrete F so as to be liftable.

The boom C is provided with the belt conveyor G for conveyance of the concrete F, and the boom C, in particular the inner boom C' is provided with the tripper H.

The lift B, the boom C or the rotary portion N is provided with the transferring container M.

The lift B, the boom C, or the transferring container arranged on the rotary portion B includes the receiving container P which receives the ready mixed concrete from the container-like carriers D directly or through the transferring means such as a chute, and the supply means E for continuously and quantitatively delivering the received ready mixed concrete F to the conveyance belt conveyor G directly or through the conveying means additionally provided.

In the conveying apparatus having such a structure, the ready mixed concrete F which has been carried up from a lower portion of the tower mast A by the container-like carriers Db without the supply means E is delivered into the transferring container M directly or through the conveying means additionally provided, and is continuously and quantitatively fed to the belt conveyor G of the boom C directly or through the other additionally provided conveying means by the supply means E which is provided on the transferring container M to continuously and quantitatively feed out the ready mixed concrete.

As a result, the ready mixed concrete F which is continuously and quantitatively supplied can be continuously supplied toward a concrete placing target position from an arbitrary position of the belt conveyor G or the leading end of the belt conveyor G by using the tripper H.

Locating the supply position of the ready mixed concrete F toward the concrete placing position can be made by e.g. moving operation of the tower mast A using the rails 17, determination of the lifting position of the lift B, angular location of the rotary portion N arranged on the lift B, determination of displacing position of the tripper H arranged on the boom C with respect to the boom C, and extending and withdrawing operation of the outer boom C".

The conveying apparatus according to the sixth mode has the same or substantially the same structure as the conveying apparatus according to the fourth mode except that the ready mixed concrete F which is carried up the container-like carriers Db is delivered to the transferring container M which includes the receiving container P for receiving the concrete F from the container-like carriers Db directly or through suitable transferring means such as the conveying means L additionally provided, and the supply means E for continuously and quantitatively feeding out the received concrete F, and the concrete F which has been received in the transferring container M is further delivered to the belt conveyor G continuously and quantitatively.

The operation and the functions of the constituent elements of the sixth mode are the same or substantially the same as those of the conveying apparatus according to the fourth mode except for the differences stated above.

For this reason, the constituent elements which have the same or substantially the same structure, or the same or substantially same functions as the conveying apparatus according to the fourth mode are indicated by the same reference symbols, and explanation on those elements will be omitted.

The conveying apparatus according to the sixth mode having such a structure and shown in FIGS. 99–100 is the same or substantially the same as the conveying apparatus according to the fourth mode in terms of the operation manner and the structure of the apparatus, except for the structure which is different from the fourth mode as clearly stated above, i.e. the running manner and the structure of the tower mast A, the lifting manner and the structure of the lift, the assembling manner and the structure of the boom C, the supply manner and the structure of the ready mixed concrete from the container-like carriers D, the function and the structure of the supply means E for continuously and quantitatively feeding out the ready mixed concrete F, the structure of the belt conveyor G, and the structure to take out the ready mixed concrete F from the belt conveyor G with or without the tripper H.

The conveying apparatus shown in FIG. 99 is constructed so that the transferring container M is arranged on the rotary portion N, in particular on the boom C provided on the rotary portion N, and that the ready mixed concrete F is continuously and quantitatively delivered to the belt conveyor G by the supply means E which is arranged on the transferring container M and which feeds out the ready mixed concrete F continuously and quantitatively.

In the conveying apparatus shown in FIG. 99, the conveying means L such as a rotary feeder is provided so as to rotate around the tower mast A as means to deliver to the transferring container M the ready mixed concrete F which has been carried up the container-like carriers Db provided on the tower mast A.

The conveying means L is constructed so that it is arranged between the lift B and the rotary portion N provided on the lift B so as to have no obstacle to the lifting movement of the lift B or the rotary movement of the rotary portion N like the conveying means L forming a part of the conveying apparatus according to the fourth mode.

The conveying apparatus shown in FIG. 99 is constructed so that the ready mixed concrete F which has been carried up the container-like carriers D is delivered to the conveying means L from the container-like carriers Db directly or through the transferring means such as a chute, and that the ready mixed concrete F which has been received into the conveying means L is further delivered through the chute 199 to the transferring container M, in particular the receiving container P forming a part of the transferring container M.

Such an arrangement allows the ready mixed concrete F received into the transferring container M to be continuously and quantitatively fed out to the belt conveyor G of the boom C by the supply means E for continuously and quantitatively feeding out the concrete housed in the transferring container.

The conveying apparatus shown in FIG. 100 is constructed so that the transferring container M is arranged on the side of the lift B.

The transferring container M which is arranged on the lift B is constructed so that it includes the receiving container P for receiving the ready mixed concrete F, and the supply means E for continuously and quantitatively feeding out the received ready mixed concrete F.

The transferring container M is constructed so that it receives the ready mixed concrete F from the container-like carriers Db through chutes 198, and that the received concrete F is continuously and quantitatively fed out to the conveying means L.

The conveying means L which receives the ready mixed concrete F from the transferring container M is constituted by e.g. a rotary feeder arranged so as to rotate around the tower mast A.

For example, the conveying means L can be constituted by a rotary feeder which is formed as an annular band to rotate around the tower mast A between the lift B, and the rotary portion N rotatably arranged on the lift B.

The ready mixed concrete F which has been transferred to the conveying means L is taken over to the belt conveyor G of the boom C through the chute 199.

The conveying apparatus shown in FIG. 99 and 100 has the same or substantially the same structure as the conveying apparatus according to the fourth mode except that the supply means E for continuously and quantitatively feeding out the ready mixed concrete F is not arranged on each container-like carrier Db, and that as a replacement, the transferring container M is provided with the supply means E for continuously and quantitatively feeding out the ready mixed concrete F, and the transferring container M is arranged in the transferring route for delivering the concrete F between the container-like carriers Db and the belt conveyor G.

For these reasons, the constituent elements which have the same or substantially the same structure as those of the conveying apparatus according to the fourth mode are indicated by the same reference symbols, and explanation on those elements will be omitted.

The transferring container M which is used in the conveying apparatus shown in FIGS. 99 and 100 may have the same structure as the transferring container M which is used in the conveying apparatus according to the fifth mode.

For this reason, the constituent elements which have the same or substantially the same structure as those of the transferring container M used in the conveying apparatus according to the fifth mode are indicated by the same reference symbols, and explanation on these elements will be omitted.

In this typical type of the ready mixed concrete conveying apparatus, the tower mast A may be standed in a fixed state, and the rotary portion N can have any kinds of structures such as a rotating frame body, and a rotating stage body, as long as the rotary portion is rotatably arranged on the lift B.

The boom C is arranged on the rotary portion N so as to be fixed thereon or be swingable thereon. The boom is provided with the belt conveyor G, and the boom may be formed as a single horizontal frame, or be constituted by more than two connected booms. The conveying apparatus according to the fifth mode constructed stated earlier and shown in FIGS. 69–98 has substantially the same operation manner and structure as the conveying apparatus according to the other modes except for e.g. the lifting operation and the structure of the lift B with respect to the tower mast A, the rotary operation and the structure of the rotary portion N with respect to the lift B, the extending and withdrawing operation, the swinging operation and the structure of the boom C, the lifting operation and the structure of the container-like carriers Db, the conveying operation and the structure of the belt conveyor G on the boom C, the takeout operation and the structure of the ready mixed concrete F by the tripper H on the boom C, the takeover operation and the structure by the transferring container M, and the takeout operation and the structure of the ready mixed concrete F by the supply means E.

The various kinds of devices, the structure and the parts which are used in the respective modes are typical examples of devices, structure and parts. The present invention is not limited to those modes.

For example, the container-like carriers Da and the transferring container M which includes the supply means E for continuously and quantitatively feeding out the ready mixed concrete F may be constructed using various kinds of feeders without modification.

The running manner of the tower mast A, the turning manner of the tower mast A, the standing manner of the tower mast A, the climbing manner of the lift B, the rotary manner of the rotary portion N, the swinging manner of the boom C, the suspending manner of the boom C, the extending and withdrawing manner of the boom C and so on may be carried out by other manners than those stated above.

The lifting operating manner of e.g. the container-like carriers D and the lifting carriers K, the constituting manner of the each belt conveyor G', G", the tripper H for taking out the ready mixed concrete F from the belt conveyor G, the various kinds of transferring means such as the chutes to deliver the ready mixed concrete from the container-like carriers D to the belt conveyor G or the transferring container M, the transferring means such as the chute to deliver the ready mixed concrete F from the transferring container M to the belt conveyor G, the supply manner of the ready mixed concrete F to the container-like carriers D and so on may be constituted by other various manners than the manners stated earlier.

INDUSTRIAL APPLICABILITY

The ready mixed concrete conveying apparatus according to the present invention can carry up a great deal of ready mixed concrete to a targeted height by the lifting carriers D provided on the tower mast A. The conveying apparatus can guide the ready mixed concrete to a concrete placing position by the belt conveyor G arranged on the boom C. Because the ready mixed concrete is continuously and quantitatively fed out to the belt conveyor G by the supply means E, it is possible to easily and reliably convey the ready mixed concrete toward the placing position.

As a result, the ready mixed concrete conveying apparatus is appropriate to be used for conveyance of the ready mixed concrete during dam construction.

The conveying apparatus is also appropriate to be used to convey the ready mixed concrete during construction of reinforced concrete piers.

The conveying apparatus is also appropriate to be used to convey the ready mixed concrete during construction of a reinforced concrete smokestack.

The conveying apparatus is also appropriate to be used for conveyance of the ready mixed concrete during construction of other types of buildings and other types of constructions than the ones stated earlier.

We claim:

1. A ready mixed concrete conveying apparatus, comprising:

a tower mast extending vertically;

a lift arranged on the tower mast and configured to move vertically with respect to said tower mast;

a rotary portion arranged on the lift;

a boom arranged on the rotary portion and configured to swing horizontally with respect to said tower mast;

motive means for rotating the rotary portion to swing the boom horizontally with respect to said tower mast;

motive means for vertically moving the lift, the rotary portion, and the boom in unison;

a carrier configured to carry the ready mixed concrete between a receiving position where the carrier receives concrete and an emptying position where the carrier is emptied of concrete said receiving position and said emptying position being at different heights;

motive means for moving said carrier between said receiving and emptying positions:

a belt conveyor arranged on said boom and configured to convey the concrete fed from the carrier away from the carrier and toward an end of the boom distal from said tower mast; a tripper arranged on the belt conveyor at a point distal from the lift and configured to divert the flow of concrete from the belt conveyor to a location below the tripper; and wherein the carrier includes supply means for continuously feeding the concrete at a constant rate from the carrier to the belt conveyor when the carrier is in the emptying position.

2. The ready mixed concrete conveying apparatus of claim 1, wherein the boom comprises:

a plurality of connected booms.

3. The ready mixed concrete conveying apparatus of claim 2, wherein the concrete is conveyed from the carrier to the belt conveyor directly.

4. The ready mixed concrete conveying apparatus of claim 2, further comprising:

transferring means for conveying the concrete from the carrier to the belt conveyor.

5. The ready mixed concrete conveying apparatus of claim 1, wherein the concrete is conveyed from the carrier to the belt conveyor directly.

6. The ready mixed concrete conveying apparatus of claim 1, further comprising:

transferring means for conveying the concrete from the carrier to the belt conveyor.

* * * * *

UNITED STATES PATENT AND TRADEMARK OFFICE

CERTIFICATE OF CORRECTION

PATENT NO. : 5,980,190
DATED : November 9, 1999
INVENTOR(S) : Mitsuo Takeda

It is certified that error appears in the above-indentified patent and that said Letters Patent is hereby corrected as shown below:

On the title page, item [54], and at the top of column 1, the title should be:

-- [54] READY MIXED CONCRETE CONVEYING APPARATUS --

Signed and Sealed this

Tenth Day of April, 2001

*Attest:*

NICHOLAS P. GODICI

*Attesting Officer*

*Acting Director of the United States Patent and Trademark Office*